United States Patent
Chang et al.

(10) Patent No.: US 11,392,221 B2
(45) Date of Patent: *Jul. 19, 2022

(54) TOUCH SENSITIVE PROCESSING APPARATUS, SYSTEM AND OPERATING METHOD THEREOF FOR RECEIVING ELECTRICAL SIGNALS CARRYING PRESSURE INFORMATION

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 40 days.

This patent is subject to a terminal disclaimer.

(21) Appl. No.: 16/672,862

(22) Filed: Nov. 4, 2019

(65) Prior Publication Data
US 2020/0064941 A1 Feb. 27, 2020

Related U.S. Application Data

(63) Continuation-in-part of application No. 15/184,286, filed on Jun. 16, 2016, now Pat. No. 10,503,318, and
(Continued)

(30) Foreign Application Priority Data

Dec. 31, 2015 (TW) ................................. 104144644

(51) Int. Cl.
*G06F 3/0354* (2013.01)
*G06F 3/044* (2006.01)
(Continued)

(52) U.S. Cl.
CPC ........ *G06F 3/03545* (2013.01); *G06F 3/0383* (2013.01); *G06F 3/044* (2013.01); *G06F 3/0416* (2013.01); *G06F 2203/04108* (2013.01)

(58) Field of Classification Search
None
See application file for complete search history.

(56) References Cited

U.S. PATENT DOCUMENTS 7,148,882 B2  12/2006 Kamrath et al.
7,292,229 B2  11/2007 Morag et al.
(Continued)

FOREIGN PATENT DOCUMENTS

CN       1679078      10/2005
CN     202563463      11/2012
(Continued)

*Primary Examiner* — Benjamin C Lee
*Assistant Examiner* — Emily J Frank
(74) *Attorney, Agent, or Firm* — WPAT, PC

(57) ABSTRACT

The present invention provides a touch sensitive processing apparatus for receiving electrical signals carrying pressure information transmitted from a first stylus, comprising: a sensing circuit, configured for receiving the electrical signals via electrodes of a touch panel; and a processor, coupled to the sensing circuit, configured for: despreading a first preamble code of the received electrical signals in accordance with a first pseudo-random number (PN) code; despreading a second preamble code of the received electrical signals in accordance with a second PN code; and calculating the pressure information according to a first signal strength ratio of a first part of the received electrical signal and a second part of the received electrical signal, wherein the first part comprises the first preamble code and the second part comprises the second preamble code, wherein the first PN code is orthogonal to the second PN code.

18 Claims, 58 Drawing Sheets

Related U.S. Application Data a continuation-in-part of application No. 15/788,051, filed on Oct. 19, 2017, now Pat. No. 10,606,375, which is a continuation of application No. 14/537,082, filed on Nov. 10, 2014, now Pat. No. 9,851,816.

(60) Provisional application No. 62/180,272, filed on Jun. 16, 2015, provisional application No. 62/055,995, filed on Sep. 26, 2014, provisional application No. 61/992,340, filed on May 13, 2014, provisional application No. 61/945,397, filed on Feb. 27, 2014, provisional application No. 61/902,137, filed on Nov. 8, 2013.

(51) Int. Cl.
*G06F 3/038* (2013.01)
*G06F 3/041* (2006.01)

(56) References Cited

U.S. PATENT DOCUMENTS

| | | | |
|---|---|---|---|
| 8,217,918 | B2 | 7/2012 | Morag et al. |
| 9,250,719 | B2 * | 2/2016 | Shahparnia ............ G06F 3/0383 |
| 10,895,921 | B2 * | 1/2021 | Chang ................ G06F 3/03545 |
| 2004/0095333 | A1 | 5/2004 | Morag et al. |
| 2005/0195770 | A1 | 9/2005 | Baliga et al. |
| 2006/0166681 | A1 * | 7/2006 | Lohbihler ................ H04B 1/69 |
| | | | 455/456.2 |
| 2008/0169132 | A1 * | 7/2008 | Ding .................. G06F 3/03545 |
| | | | 178/19.02 |
| 2008/0311948 | A1 * | 12/2008 | Hans ..................... H04W 52/24 |
| | | | 455/522 |
| 2010/0155153 | A1 * | 6/2010 | Zachut ............. G06F 3/041661 |
| | | | 178/18.03 |
| 2011/0064116 | A1 * | 3/2011 | Mateus ..................... H04L 1/08 |
| | | | 375/E1.033 |
| 2011/0193776 | A1 * | 8/2011 | Oda .................... G06F 3/03545 |
| | | | 345/157 |
| 2011/0279366 | A1 * | 11/2011 | Lohbihler ............. H01H 13/88 |
| | | | 345/157 |
| 2012/0182259 | A1 | 7/2012 | Han |
| 2012/0242603 | A1 | 9/2012 | Engelhardt et al. |
| 2012/0278031 | A1 | 11/2012 | Oda et al. |
| 2013/0249823 | A1 | 9/2013 | Ahn et al. |
| 2014/0002422 | A1 | 1/2014 | Stern et al. |
| 2015/0153845 | A1 | 6/2015 | Chang et al. |
| 2015/0193025 | A1 | 7/2015 | Rebeschi et al. |
| 2015/0199035 | A1 | 7/2015 | Chang et al. |
| 2015/0301577 | A1 | 10/2015 | Leigh et al. |

FOREIGN PATENT DOCUMENTS

| | | |
|---|---|---|
| TW | M255462 | 1/2005 |
| TW | 200508580 | 3/2005 |
| TW | M387304 | 8/2010 |
| TW | 201040797 | 11/2010 |
| TW | 201106239 | 2/2011 |
| TW | 201209654 | 3/2012 |
| TW | 201234226 | 8/2012 |
| TW | 201235884 | 9/2012 |
| TW | 201237692 | 9/2012 |
| TW | M439852 | 10/2012 |
| TW | 201305859 | 2/2013 |
| TW | 201308129 | 2/2013 |
| TW | 201339904 | 10/2013 |
| TW | 201342175 | 10/2013 |

* cited by examiner

TOUCH SENSITIVE PROCESSING APPARATUS, SYSTEM AND OPERATING METHOD THEREOF FOR RECEIVING ELECTRICAL SIGNALS CARRYING PRESSURE INFORMATION

CROSS REFERENCE TO RELATED APPLICATIONS

This application is a continuation-in-part application claims benefits of a U.S. patent application Ser. No. 15/184,286 and a U.S. patent application Ser. No. 15,788,051, filed on Oct. 19, 2017, which is a continuation application of U.S. patent application Ser. No. 14/537,082, filed on Nov. 10, 2014 and issued as U.S. Pat. No. 9,851,816, which claims priorities under 35 U.S.C. 119 to U.S. provisional patent application, 61/902,137, filed on Nov. 8, 2013, U.S. provisional patent application, 61/945,397, filed on Feb. 27, 2014, U.S. provisional patent application, 61/992,340, filed on May 13, 2014, and U.S. provisional patent application, 62/055,995, filed on Sep. 26, 2014. The U.S. patent Ser. No. 15/184,286 is filed on Jun. 16, 2016, which claims priority to a U.S. provisional patent application No. 62/180,272, filed on Jun. 16, 2015 and a Taiwan patent application No. 104144644, filed on Dec. 31, 2015, the disclosures of which are incorporated herein by reference.

BACKGROUND OF THE INVENTION

1. Field of the Invention

The present invention relates to transmitter, and more particularly, to transmitter which is able to transmit an electric signal precisely representing a pressure on the transmitter.

2. Description of the Prior Art

Touch panel or touch sensitive screen is important human machine interface in modern age. In addition to detecting approximation or touch of human body, touch panel is also used for detecting approximation or touch of stylus or tip of stylus such that user is able to precisely control a trace painted by a touching tip.

Stylus may actively emit electrical signals via its tip. In this present application, it is called active stylus. When the tip approximating or touching a touch panel, electromagnetic response of the electric signal occurs to electrodes of the touch panel. By detecting the electromagnetic response corresponding to the electric signal, the stylus approximating or touching the sensing electrodes could be detected. Therefore a position of the tip relative to the touch panel could be concluded accordingly.

Hence, it is required to have active stylus transmitting electrical signals which precisely reflect the pressure level.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

One object of the present invention is to provide a stylus which is able to transmit electric signals precisely representing a pressure on the stylus.

One object of the present invention is to provide a stylus for transmitting electrical signals carrying pressure information, comprising: a first component with variable impedance reflecting a pressure, wherein the first component is configured for receiving first signals encoded by a first pseudo-random number (PN) code; a second component with fixed impedance, wherein the second component is configured for receiving second signals encoded by a second PN code; and a conductive tip section configured for: receiving, simultaneously, the first signals from the first component and the second signals from the second component; and transmitting electrical signals which is composed of the first signals and the second signals, wherein the first PN code is orthogonal to the second PN code.

In one embodiment, in order to provide the first PN code and the second PN code onboard the stylus, the stylus further comprises a controller, configured for: generating the first signals according to the first PN code; generating the second signals according the second PN code; transmitting the first signals to the first component; and transmitting the second signals to the second component.

In one embodiment, in order to transmit status of onboard sensor of the stylus, the stylus further comprises: at least one onboard sensor coupled to the controller. The controller is further configured for: generating data codes according to status of the at least one onboard sensor; generating first data codes according to the data codes and the first PN code; and transmitting the first data codes to the first component. The first component is further configured for receiving the first data codes from the controller. The conductive tip section is further configured for: receiving the first data codes from the first component; and transmitting the first data codes.

In one embodiment, in order to transmit status of onboard sensor of the stylus, the stylus further comprises: at least one onboard sensor coupled to the controller. The controller is further configured for: generating data codes according to status of the at least one onboard sensor; generating second data codes according to the data codes and the second PN code; and transmitting the second data codes to the second component. The second component is further configured for receiving the second data codes from the controller. The conductive tip section is further configured for: receiving the second data codes from the second component; and transmitting the second data codes.

In one embodiment, in order to synchronize with receiving procedure of a touch sensitive processing apparatus of a touch panel, the controller is further configured for: receiving a synchronization signal from an electronic device; and after the synchronization signal is received, executing the generating steps and the transmitting steps.

In one embodiment, in order to synchronize with receiving procedure of the touch sensitive processing apparatus of the touch panel where the stylus touches or approximates, the controller is coupled to the conductive tip section for receiving the synchronization signal which is being transmitted from electrodes of a touch panel of the electronic device.

In one embodiment, in order to prevent conflicts of PN codes when multiple styli operate with one touch panel, the stylus further comprises a human-machine interface for user's input of PN codes, wherein the controller is further configured for receiving a setting instruction from the human-machine interface for designating a set of the first PN code and the second PN code.

In one embodiment, in order to provide PN code setting information to user, the stylus further comprises at least one of following device coupled to the controller for indicating a set of the first PN code and the second PN code: a visual indicator; and an audio indicator.

In one embodiment, in order to provide a wire connection between the corded or tethered stylus and a touch sensitive processing apparatus, the stylus further comprises: a first signal circuit, coupled to the first component and a touch sensitive processing apparatus, configured for propagating the first signals from the touch sensitive processing apparatus to the first component; and a second signal circuit, coupled to the second component and the touch sensitive processing apparatus, configured for propagating the second signals from the touch sensitive processing apparatus to the second component.

In one embodiment, in order to provide a switch status to a touch sensitive processing apparatus, the stylus further comprises a third switch configured for receiving the first signals; and a third component with fixed impedance, coupled to the third switch and the conductive tip section, wherein the third switch is selectively being opened or closed, the first signals are propagated through the third switch and the third component to the conductive tip section when the third switch is being closed.

In one embodiment, in order to provide a switch status to a touch sensitive processing apparatus, the stylus further comprises a fourth switch configured for receiving the second signals; and a fourth component with fixed impedance, coupled to the fourth switch and the conductive tip section, wherein the fourth switch is selectively being opened or closed, the second signals are propagated through the fourth switch and the fourth component to the conductive tip section when the fourth switch is being closed.

One object of the present invention is to provide a method for transmitting electrical signals carrying pressure information from a stylus, comprising: receiving, by a first component with variable impedance reflecting a pressure, first signals encoded by a first PN code; receiving, by a second component with fixed impedance, second signals encoded by a second PN code; receiving, simultaneously, the first signals from the first component and the second signals from the second component by a conductive tip section; and transmitting electrical signals which is composed of the first signals and the second signals by the conductive tip section, wherein the first PN code is orthogonal to the second PN code.

In one embodiment, in order to provide the first PN code and the second PN code onboard the stylus, the method further comprises: generating the first signals according to the first PN code; generating the second signals according the second PN code; transmitting the first signals to the first component; and transmitting the second signals to the second component.

In one embodiment, in order to transmit status of onboard sensor of the stylus, the method further comprises: generating data codes according to status of at least one onboard sensor; generating first data codes according to the data codes and the first PN code; transmitting the first data codes to the first component; transmitting, by the first component, the first data codes to the conductive tip section; and transmitting, by the conductive tip section, the first data codes.

In one embodiment, in order to transmit status of onboard sensor of the stylus, the method further comprises: generating data codes according to status of at least one onboard sensor; generating second data codes according to the data codes and the second PN code; transmitting the second data codes to the second component; transmitting, by the second component, the second data codes to the conductive tip section; and transmitting, by the conductive tip section, the first data codes.

In one embodiment, in order to synchronize with receiving procedure of a touch sensitive processing apparatus of a touch panel, the method is further configured for: receiving a synchronization signal from an electronic device; and after the synchronization signal is received, executing the generating steps and the transmitting steps.

In one embodiment, in order to synchronize with receiving procedure of the touch sensitive processing apparatus of the touch panel where the stylus touches or approximates, the synchronization signal which is being transmitted from electrodes of a touch panel of the electronic device to the conductive tip section.

In one embodiment, in order to prevent conflicts of PN codes when multiple styli operate with one touch panel, the method further comprises: receiving a setting instruction from a human-machine interface of the stylus for designating a set of the first PN code and the second PN code.

In one embodiment, in order to provide PN code setting information to user, the method further comprises at least one of following steps: having a visual indicator of the stylus indicating a set of the first PN code and the second PN code; and having an audio indicator of the stylus indicating the set of the first PN code and the second PN code.

In one embodiment, in order to provide a wire connection between the corded or tethered stylus and a touch sensitive processing apparatus, the method further comprises: receiving, by a first signal circuit, the first signals from a touch sensitive processing apparatus; propagating, by the first signal circuit, the first signals to the first component; receiving, by a second signal circuit, the second signals from the touch sensitive processing apparatus; and propagating, by the second signal circuit, the second signals to the second component.

In one embodiment, in order to provide a switch status to a touch sensitive processing apparatus, the method further comprises: selectively receiving, by a third component with fixed impedance, the first signals; and selectively transmitting, by the third component, the first signals to the conductive tip section.

In one embodiment, in order to provide a switch status to a touch sensitive processing apparatus, the method further comprises: selectively receiving, by a fourth component with fixed impedance, the second signals; and selectively transmitting, by the fourth component, the second signals to the conductive tip section.

One object of the present invention is to provide a touch sensitive processing apparatus for receiving electrical signals carrying pressure information transmitted from a first stylus, comprising: a sensing circuit, configured for receiving the electrical signals via electrodes of a touch panel; and a processor, coupled to the sensing circuit, configured for: despreading a first preamble code of the received electrical signals in accordance with a first pseudo-random number (PN) code; despreading a second preamble code of the received electrical signals in accordance with a second PN code; and calculating the pressure information according to a first signal strength ratio of a first part of the received electrical signal and a second part of the received electrical signal, wherein the first part comprises the first preamble code and the second part comprises the second preamble code, wherein the first PN code is orthogonal to the second PN code.

In one embodiment, in order to trigger the stylus for transmitting electrical signals synchronously, the touch sensitive processing apparatus further comprises a driving circuit, coupled to the electrodes of the touch panel, wherein the processor is further configured for having the driving circuit to transmit a beacon signal via the electrodes of the touch panel before the receiving step is being executed.

In one embodiment, in order to receive status of sensor onboard the stylus, the processor is further configured for: decoding first data codes of the received electrical signal in accordance with the first PN code, wherein the first data codes represents status of at least one onboard sensor of the first stylus.

In one embodiment, in order to receive status of sensor onboard the stylus, the processor is further configured for: decoding second data codes of the received electrical signal in accordance with the second PN code, wherein the second data codes represents status of at least one onboard sensor of the first stylus.

In one embodiment, in order to correctly receive status of sensor onboard the stylus, the processor is further configured for: decoding first data codes of the received electrical signal in accordance with the first PN code; decoding second data codes of the received electrical signal in accordance with the second PN code; and determining data codes if the first data codes and the second data codes are the same, wherein the data codes represents status of at least one onboard sensor of the first stylus.

In one embodiment, in order to receive more smooth and averaged pressure information in a longer transmission, the first part further comprises the first data codes and the second part further comprises the second data codes.

In one embodiment, in order to synchronize with the transmission of the stylus more quickly, the processor is further configured for: coupling at least two of second electrodes of the touch panel as a synchronization channel, wherein the despreading steps of the first preamble code and the second preamble code are being executed on the received electrical signals of the synchronization channel to retrieve a first synchronization information and a second synchronization information, respectively, wherein the second electrodes are arranged in parallel to each other.

In one embodiment, in order to correctly and quickly receive status of sensor onboard the stylus by utilizing synchronization information, the processor is further configured for: decoding first data codes of the received electrical signal from at least one of first electrodes of the touch panel in accordance with the first PN code and the first synchronization information; decoding second data codes of the received electrical signal from at least one of the first electrodes of the touch panel in accordance with the second PN code and the second synchronization information; and determining data codes if the first data codes and the second data codes are the same, wherein the data codes represents status of at least one onboard sensor of the first stylus, wherein the first electrodes are arranged in parallel to each other, and the first electrodes intersect with the second electrodes.

In one embodiment, in order to concurrently receive electrical signals from multiple styli, the processor is further configured for: despreading a third preamble code of the received electrical signals in accordance with a third PN code; despreading a fourth preamble code of the received electrical signals in accordance with a fourth PN code; and calculating a pressure information of a second stylus according to a second signal strength ratio of a third part of the received electrical signal and a fourth part of the received electrical signal, wherein the third part comprises the third preamble code and the fourth part comprises the fourth preamble code, wherein the first PN code, the second PN code, the third PN code and the fourth PN code are orthogonal to each other.

In one embodiment, in order to provide a wire connection between a corded or tethered stylus and the touch sensitive processing apparatus, the touch sensitive processing apparatus further comprises: a stylus interface, coupled to a first signal circuit and a second signal circuit of the first stylus, wherein the processor, coupled to the stylus interface, is further configured for: generating the first preamble code in accordance with the first PN code; generating the second preamble code in accordance with the second PN code; and transmitting the first preamble code and the second preamble code to the first signal circuit and the second signal circuit via the stylus interface, respectively.

In one embodiment, in order to receive status of a switch of the stylus, the processor is further configured for: calculating a switch status of the first stylus according to the first signal strength ratio of the first part of the received electrical signal and the second part of the received electrical signal.

In one embodiment, in order to concurrently connect with multiple corded or tethered styli, the stylus interface is further coupled to a third signal circuit and a fourth signal circuit of a second stylus. The processor, coupled to the stylus interface, is further configured for: generating a third preamble code in accordance with a third PN code; generating a fourth preamble code in accordance with a fourth PN code; and transmitting the third preamble code and the fourth preamble code to the third signal circuit and the fourth signal circuit via the stylus interface, respectively, wherein the first PN code, the second PN code, the third PN code and the fourth PN code are orthogonal to each other.

One object of the present invention is to provide a method for receiving electrical signals carrying pressure information transmitted from a first stylus, comprising: receiving the electrical signals via electrodes of a touch panel; despreading a first preamble code of the received electrical signals in accordance with a first PN code; despreading a second preamble code of the received electrical signals in accordance with a second PN code; and calculating the pressure information according to a first signal strength ratio of a first part of the received electrical signal and a second part of the received electrical signal, wherein the first part comprises the first preamble code and the second part comprises the second preamble code, wherein the first PN code is orthogonal to the second PN code.

In one embodiment, in order to trigger the stylus for transmitting electrical signals synchronously, the method further comprises: transmitting a beacon signal via the electrodes of the touch panel before the receiving step is being executed.

In one embodiment, in order to receive status of sensor onboard the stylus, the method further comprises: decoding first data codes of the received electrical signal in accordance with the first PN code, wherein the first data codes represents status of at least one onboard sensor of the first stylus.

In one embodiment, in order to receive status of sensor onboard the stylus, the method further comprises: decoding second data codes of the received electrical signal in accordance with the second PN code, wherein the second data codes represents status of at least one onboard sensor of the first stylus.

In one embodiment, in order to correctly receive status of sensor onboard the stylus, the method further comprises: decoding first data codes of the received electrical signal in accordance with the first PN code; decoding second data codes of the received electrical signal in accordance with the second PN code; and determining data codes if the first data codes and the second data codes are the same, wherein the data codes represents status of at least one onboard sensor of the first stylus.

In one embodiment, in order to receive more smooth and averaged pressure information in a longer transmission, the first part further comprises the first data codes and the second part further comprises the second data codes.

In one embodiment, in order to synchronize with the transmission of the stylus more quickly, the method further comprises: coupling at least two of second electrodes of the touch panel as a synchronization channel, wherein the despreading steps of the first preamble code and the second preamble code are being executed on the received electrical signals of the synchronization channel to retrieve a first synchronization information and a second synchronization information, respectively, wherein the second electrodes are arranged in parallel to each other.

In one embodiment, in order to correctly and quickly receive status of sensor onboard the stylus by utilizing synchronization information, the method further comprises: decoding first data codes of the received electrical signal from at least one of first electrodes of the touch panel in accordance with the first PN code and the first synchronization information; decoding second data codes of the received electrical signal from at least one of the first electrodes of the touch panel in accordance with the second PN code and the second synchronization information; and determining data codes if the first data codes and the second data codes are the same, wherein the data codes represents status of at least one onboard sensor of the first stylus, wherein the first electrodes are arranged in parallel to each other, and the first electrodes intersect with the second electrodes.

In one embodiment, in order to concurrently receive electrical signals from multiple styli, the method further comprises: despreading a third preamble code of the received electrical signals in accordance with a third PN code; despreading a fourth preamble code of the received electrical signals in accordance with a fourth PN code; and calculating a pressure information of a second stylus according to a second signal strength ratio of a third part of the received electrical signal and a fourth part of the received electrical signal, wherein the third part comprises the third preamble code and the fourth part comprises the fourth preamble code, wherein the first PN code, the second PN code, the third PN code and the fourth PN code are orthogonal to each other.

In one embodiment, in order to provide a wire connection between a corded or tethered stylus and the touch sensitive processing apparatus, the method further comprises: generating the first preamble code in accordance with the first PN code; generating the second preamble code in accordance with the second PN code; and transmitting the first preamble code and the second preamble code to a first signal circuit and a second signal circuit of the first stylus, respectively.

In one embodiment, in order to receive status of a switch of the stylus, the method further comprises: calculating a switch status of the first stylus according to the first signal strength ratio of the first part of the received electrical signal and the second part of the received electrical signal.

In one embodiment, in order to concurrently connect with multiple corded or tethered styli, the method further comprises: generating a third preamble code in accordance with a third PN code; generating a fourth preamble code in accordance with a fourth PN code; and transmitting the third preamble code and the fourth preamble code to a third signal circuit and a fourth signal circuit of a second stylus, respectively, wherein the first PN code, the second PN code, the third PN code and the fourth PN code are orthogonal to each other.

One object of the present invention is to provide a touch system, which comprising: a touch panel; a first stylus; and a touch sensitive processing apparatus for receiving electrical signals carrying pressure information transmitted from the first stylus. The touch sensitive processing apparatus comprises: a sensing circuit, configured for receiving the electrical signals via electrodes of the touch panel; and a processor, coupled to the sensing circuit, configured for: despreading a first preamble code of the received electrical signals in accordance with a first PN code; despreading a second preamble code of the received electrical signals in accordance with a second PN code; and calculating the pressure information according to a first signal strength ratio of a first part of the received electrical signal and a second part of the received electrical signal, wherein the first part comprises the first preamble code and the second part comprises the second preamble code, wherein the first PN code is orthogonal to the second PN code.

In one embodiment, the first stylus further comprises: a first component with variable impedance reflecting a pressure, wherein the first component is configured for receiving first signals encoded by the first PN code; a second component with fixed impedance, wherein the second component is configured for receiving second signals encoded by the second PN code; and a conductive tip section configured for: receiving, simultaneously, the first signals from the first component and the second signals from the second component; and transmitting the electrical signals which is composed of the first signals and the second signals.

One object of the present invention is to provide a stylus for transmitting electrical signals carrying pressure information, comprising: a first component with variable impedance reflecting a pressure, wherein the first component is configured for receiving first signals encoded by a pseudo-random number (PN) code in a first time period; a second component with fixed impedance, wherein the second component is configured for receiving second signals encoded by the PN code in a second time period; and a conductive tip section configured for: receiving the first signals from the first component in the first time period; receiving the second signals from the second component in the second time period; transmitting electrical signals which is composed of the first signals in the first time period; and transmitting electrical signals which is composed of the second signals in the second time period.

In one embodiment, in order to provide the PN code onboard the stylus, the stylus further comprises a controller, configured for: generating the first signals according to the PN code; generating the second signals according the PN code; transmitting the first signals to the first component; and transmitting the second signals to the second component.

In one embodiment, in order to transmit status of onboard sensor of the stylus, the stylus further comprises: at least one onboard sensor coupled to the controller, wherein the controller is further configured for: generating data codes according to status of the at least one onboard sensor; generating first data codes according to the data codes and the PN code; and transmitting the first data codes to the first component. The first component is further configured for receiving the first data codes from the controller in the first time period. The conductive tip section is further configured for in the first time period: receiving the first data codes from the first component; and transmitting the first data codes.

In one embodiment, in order to transmit status of onboard sensor of the stylus, the stylus further comprises: at least one onboard sensor coupled to the controller, wherein the controller is further configured for: generating data codes according to status of the at least one onboard sensor; generating second data codes according to the data codes and the PN code; and transmitting the second data codes to the second component. The second component is further configured for receiving the second data codes from the controller in the second time period. The conductive tip section is further configured for in the second time period: receiving the second data codes from the second component; and transmitting the second data codes.

In one embodiment, in order to synchronize with receiving procedure of a touch sensitive processing apparatus of a touch panel, the controller is further configured for: receiving a synchronization signal from an electronic device; and after the synchronization signal is received, executing the generating steps and the transmitting steps.

In one embodiment, in order to synchronize with receiving procedure of the touch sensitive processing apparatus of the touch panel where the stylus touches or approximates, the controller is coupled to the conductive tip section for receiving the synchronization signal which is being transmitted from electrodes of a touch panel of the electronic device.

In one embodiment, in order to prevent conflicts of PN codes when multiple styli operate with one touch panel, the stylus further comprises a human-machine interface for user's input of PN codes, wherein the controller is further configured for receiving a setting instruction from the human-machine interface for designating the PN code.

In one embodiment, in order to provide PN code setting information to user, the stylus further comprises at least one of following device coupled to the controller for indicating the PN code: a visual indicator; and an audio indicator.

In one embodiment, in order to provide a wire connection between the corded or tethered stylus and a touch sensitive processing apparatus, the stylus further comprises: a first signal circuit, coupled to the first component and a touch sensitive processing apparatus, configured for propagating the first signals from the touch sensitive processing apparatus to the first component; and a second signal circuit, coupled to the second component and the touch sensitive processing apparatus, configured for propagating the second signals from the touch sensitive processing apparatus to the second component.

In order to provide a switch status to a touch sensitive processing apparatus, the stylus further comprises: a fourth switch configured for receiving the second signals in the second time period; and a fourth component with fixed impedance, coupled to the fourth switch and the conductive tip section, wherein the fourth switch is selectively being opened or closed, the second signals are propagated through the fourth switch and the fourth component to the conductive tip section when the fourth switch is being closed.

In order to provide a switch status to a touch sensitive processing apparatus, the stylus further comprises: a fourth switch configured for receiving the second signals in the second time period; and a fourth component with fixed impedance, coupled to the third switch and the conductive tip section, wherein the fourth switch is selectively being opened or closed, the second signals are propagated through the fourth switch and the fourth component to the conductive tip section when the fourth switch is being closed.

One object of the present invention is to provide a method for transmitting electrical signals carrying pressure information from a stylus, comprising: receiving, by a first component with variable impedance reflecting a pressure, first signals encoded by a PN code in a first time period; receiving, by a second component with fixed impedance, second signals encoded by the PN code in a second time period; receiving the first signals from the first component by a conductive tip section in the first time period; receiving the second signals from the second component by the conductive tip section in the second time period; and transmitting electrical signals which is composed of the first signals in the first time period by the conductive tip section; and transmitting electrical signals which is composed of the second signals in the second time period by the conductive tip section.

In one embodiment, in order to provide the PN code onboard the stylus, the method further comprises: generating the first signals according to the PN code; generating the second signals according the PN code; transmitting the first signals to the first component; and transmitting the second signals to the second component.

In one embodiment, in order to transmit status of onboard sensor of the stylus, the method further comprises: generating data codes according to status of at least one onboard sensor; generating first data codes according to the data codes and the PN code; transmitting the first data codes to the first component; transmitting, by the first component, the first data codes to the conductive tip section; and transmitting, by the conductive tip section, the first data codes.

In one embodiment, in order to transmit status of onboard sensor of the stylus, the method further comprises: generating data codes according to status of at least one onboard sensor; generating second data codes according to the data codes and the PN code; and transmitting the second data codes to the second component; transmitting, by the second component, the second data codes to the conductive tip section; and transmitting, by the conductive tip section, the second data codes.

In one embodiment, in order to synchronize with receiving procedure of a touch sensitive processing apparatus of a touch panel, the method further comprises: receiving a synchronization signal from an electronic device; and after the synchronization signal is received, executing the generating steps and the transmitting steps.

In one embodiment, in order to synchronize with receiving procedure of the touch sensitive processing apparatus of the touch panel where the stylus touches or approximates, wherein the synchronization signal which is being transmitted from electrodes of a touch panel of the electronic device to the conductive tip section.

In one embodiment, in order to prevent conflicts of PN codes when multiple styli operate with one touch panel, the method further comprises: receiving a setting instruction from a human-machine interface of the stylus for designating the PN code.

In one embodiment, in order to provide PN code setting information to user, the method further comprises at least one of following steps: having a visual indicator of the stylus indicating the PN code; and having an audio indicator of the stylus indicating the PN code.

In one embodiment, in order to provide a wire connection between the corded or tethered stylus and a touch sensitive processing apparatus, the method further comprises: receiving, by a first signal circuit, the first signals from a touch sensitive processing apparatus; propagating, by the first signal circuit, the first signals to the first component; receiving, by a second signal circuit, the second signals from the touch sensitive processing apparatus; and propagating, by the second signal circuit, the second signals to the second component.

In one embodiment, in order to provide a switch status to a touch sensitive processing apparatus, the method further comprises: selectively receiving, by a third component with fixed impedance, the first signals; and selectively transmitting, by the third component, the first signals to the conductive tip section.

In one embodiment, in order to provide a switch status to a touch sensitive processing apparatus, the method further comprises: selectively receiving, by a fourth component with fixed impedance, the second signals; and selectively transmitting, by the fourth component, the second signals to the conductive tip section.

One object of the present invention is to provide a touch sensitive processing apparatus for receiving electrical signals carrying pressure information transmitted from a first stylus, comprising: a sensing circuit, configured for receiving the electrical signals via electrodes of a touch panel; and a processor, coupled to the sensing circuit, configured for: despreading a first preamble code of the received electrical signals in accordance with a pseudo-random number (PN) code in a first time period; despreading a second preamble code of the received electrical signals in accordance with the PN code in a second time period; and calculating the pressure information according to a first signal strength ratio of a first part of the received electrical signal and a second part of the received electrical signal, wherein the first part comprises the first preamble code and the second part comprises the second preamble code.

In one embodiment, in order to trigger the stylus for transmitting electrical signals synchronously, the touch sensitive apparatus further comprises: a driving circuit, coupled to the electrodes of the touch panel, wherein the processor is further configured for having the driving circuit to transmit a beacon signal via the electrodes of the touch panel before the receiving steps are being executed.

In one embodiment, in order to receive status of sensor onboard the stylus, the processor is further configured for: decoding first data codes of the electrical signal received in the first time period in accordance with the PN code, wherein the first data codes represents status of at least one onboard sensor of the first stylus.

In one embodiment, in order to receive status of sensor onboard the stylus, the processor is further configured for: decoding second data codes of the electrical signal received in the second time period in accordance with the PN code, wherein the second data codes represents status of at least one onboard sensor of the first stylus.

In one embodiment, in order to correctly receive status of sensor onboard the stylus, the processor is further configured for: decoding first data codes of the electrical signal received in the first time period in accordance with the PN code; decoding second data codes of the electrical signal received in the second time period in accordance with the PN code; and determining data codes if the first data codes and the second data codes are the same, wherein the data codes represents status of at least one onboard sensor of the first stylus.

In one embodiment, in order to receive more smooth and averaged pressure information in a longer transmission, the first part further comprises the first data codes and the second part further comprises the second data codes.

In one embodiment, in order to synchronize with the transmission of the stylus more quickly, the processor is further configured for: coupling at least two of second electrodes of the touch panel as a synchronization channel, wherein the despreading steps of the first preamble code and the second preamble code are being executed on the received electrical signals of the synchronization channel to retrieve a first synchronization information and a second synchronization information, respectively, wherein the second electrodes are arranged in parallel to each other.

In one embodiment, in order to correctly and quickly receive status of sensor onboard the stylus by utilizing synchronization information, the processor is further configured for: decoding first data codes of the received electrical signal from at least one of first electrodes of the touch panel in accordance with the PN code and the first synchronization information; decoding second data codes of the received electrical signal from at least one of the first electrodes of the touch panel in accordance with the PN code and the second synchronization information; and determining data codes if the first data codes and the second data codes are the same, wherein the data codes represents status of at least one onboard sensor of the first stylus, wherein the first electrodes are arranged in parallel to each other, and the first electrodes intersect with the second electrodes.

In one embodiment, in order to receive electrical signals from multiple styli, the processor is further configured for: despreading a third preamble code of the electrical signals received in a third time period in accordance with a second PN code; despreading a fourth preamble code of the electrical signals received in a fourth time period in accordance with the second PN code; and calculating a pressure information of a second stylus according to a second signal strength ratio of a third part of the received electrical signal and a fourth part of the received electrical signal, wherein the third part comprises the third preamble code and the fourth part comprises the fourth preamble code, wherein the PN code and the second PN code are orthogonal to each other, wherein part of the third time period is overlapped with part of the first time period or part of the second time period.

In one embodiment, in order to provide a wire connection between a corded or tethered stylus and the touch sensitive processing apparatus, the touch sensitive processing apparatus further comprises: a stylus interface, coupled to a first signal circuit and a second signal circuit of the first stylus, wherein the processor, coupled to the stylus interface, is further configured for: generating the first preamble code in accordance with the PN code; generating the second preamble code in accordance with the PN code; transmitting the first preamble code to the first signal circuit via the stylus interface in the first time period; and transmitting the second preamble code to the second signal circuit via the stylus interface in the second time period.

In one embodiment, in order to receive status of a switch of the stylus, the processor is further configured for: calculating a switch status of the first stylus according to the first signal strength ratio of the first part of the received electrical signal and the second part of the received electrical signal.

In one embodiment, in order to concurrently connect with multiple styli, the stylus interface is further coupled to a third signal circuit and a fourth signal circuit of a second stylus. The processor, coupled to the stylus interface, is further configured for: generating a third preamble code in accordance with a second PN code in a third time period; generating a fourth preamble code in accordance with the second PN code in a fourth time period; transmitting the third preamble code to the third signal circuit in the third time period via the stylus interface; and transmitting the fourth preamble code to the fourth signal circuit in the fourth time period via the stylus interface, respectively, wherein the PN code and the second PN code are orthogonal to each other, wherein part of the third time period is overlapped with part of the first time period or part of the second time period.

One object of the present invention is to provide a method for receiving electrical signals carrying pressure information transmitted from a first stylus, comprising: receiving the electrical signals via electrodes of a touch panel; despreading a first preamble code of the electrical signals received in a first time period in accordance with a PN code; despreading a second preamble code of the electrical signals received in a second time period in accordance with the PN code; and calculating the pressure information according to a first signal strength ratio of a first part of the received electrical signal and a second part of the received electrical signal, wherein the first part comprises the first preamble code and the second part comprises the second preamble code.

In one embodiment, in order to trigger the stylus for transmitting electrical signals synchronously, the method further comprises transmitting a beacon signal via the electrodes of the touch panel before the receiving step is being executed.

In one embodiment, in order to receive status of sensor onboard the stylus, the method further comprises: decoding first data codes of the electrical signal received in the first time period in accordance with the PN code, wherein the first data codes represents status of at least one onboard sensor of the first stylus.

In one embodiment, in order to receive status of sensor onboard the stylus, the method further comprises: decoding second data codes of the electrical signal received in the second time period in accordance with the PN code, wherein the second data codes represents status of at least one onboard sensor of the first stylus.

In one embodiment, in order to correctly receive status of sensor onboard the stylus, the method further comprises: decoding first data codes of the electrical signal received in the first time period in accordance with the PN code; decoding second data codes of the electrical signal received in the second time period in accordance with the PN code; and determining data codes if the first data codes and the second data codes are the same, wherein the data codes represents status of at least one onboard sensor of the first stylus.

In one embodiment, in order to receive more smooth and averaged pressure information in a longer transmission, the first part further comprises the first data codes and the second part further comprises the second data codes.

In one embodiment, in order to synchronize with the transmission of the stylus more quickly, the method further comprises: coupling at least two of second electrodes of the touch panel as a synchronization channel, wherein the despreading steps of the first preamble code and the second preamble code are being executed on the received electrical signals of the synchronization channel to retrieve a first synchronization information and a second synchronization information, respectively, wherein the second electrodes are arranged in parallel to each other.

In one embodiment, in order to correctly and quickly receive status of sensor onboard the stylus by utilizing synchronization information, the method further comprises: decoding first data codes of the received electrical signal from at least one of first electrodes of the touch panel in accordance with the PN code and the first synchronization information; decoding second data codes of the received electrical signal from at least one of the first electrodes of the touch panel in accordance with the PN code and the second synchronization information; and determining data codes if the first data codes and the second data codes are the same, wherein the data codes represents status of at least one onboard sensor of the first stylus, wherein the first electrodes are arranged in parallel to each other, and the first electrodes intersect with the second electrodes.

In one embodiment, in order to concurrently receive electrical signals from multiple styli, the method further comprises: despreading a third preamble code of the electrical signals received in a third time period in accordance with a second PN code; despreading a fourth preamble code of the electrical signals received in a fourth time period in accordance with the second PN code; and calculating a pressure information of a second stylus according to a second signal strength ratio of a third part of the received electrical signal and a fourth part of the received electrical signal, wherein the third part comprises the third preamble code and the fourth part comprises the fourth preamble code, wherein the PN code and the second PN code are orthogonal to each other, wherein part of the third time period is overlapped with part of the first time period or part of the second time period.

In one embodiment, in order to provide a wire connection between a corded or tethered stylus and the touch sensitive processing apparatus, the method further comprises: generating the first preamble code in accordance with the PN code in the first time period; generating the second preamble code in accordance with the PN code in the second time period; transmitting the first preamble code to a first signal circuit of the first stylus in the first time period; and transmitting the second preamble code to a second signal circuit of the first stylus in the second time period.

In one embodiment, in order to receive status of a switch of the stylus, the method further comprises: calculating a switch status of the first stylus according to the first signal strength ratio of the first part of the received electrical signal and the second part of the received electrical signal.

In one embodiment, in order to concurrently connect with multiple corded or tethered styli, the method further comprises: generating a third preamble code in accordance with a second PN code in a third time period; generating a fourth preamble code in accordance with the second PN code in a fourth time period; transmitting the third preamble code to a third signal circuit of a second stylus in the third time period; and transmitting the fourth preamble code to a fourth signal circuit of the second stylus in the fourth time period, wherein the PN code and the second PN code are orthogonal to each other, wherein part of the third time period is overlapped with part of the first time period or part of the second time period.

One object of the present invention is to provide a touch system comprising: a touch panel; a first stylus; and a touch sensitive processing apparatus. The touch sensitive processing apparatus for receiving electrical signals carrying pressure information transmitted from the first stylus, comprising: a sensing circuit, configured for receiving the electrical signals via electrodes of the touch panel; and a processor, coupled to the sensing circuit, configured for: despreading a first preamble code of the received electrical signals in accordance with a PN code in a first time period; despreading a second preamble code of the received electrical signals in accordance with the PN code in a second time period; and calculating the pressure information according to a first signal strength ratio of a first part of the received electrical signal and a second part of the received electrical signal, wherein the first part comprises the first preamble code and the second part comprises the second preamble code.

In one embodiment, the first stylus comprising: a first component with variable impedance reflecting a pressure, wherein the first component is configured for receiving first signals encoded by the PN code in the first time period; a second component with fixed impedance, wherein the second component is configured for receiving second signals encoded by the PN code in the second time period; and a conductive tip section configured for: receiving the first signals from the first component in the first time period; receiving the second signals from the second component in the second time period; transmitting electrical signals which is composed of the first signals in the first time period; and transmitting electrical signals which is composed of the second signals in the second time period.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
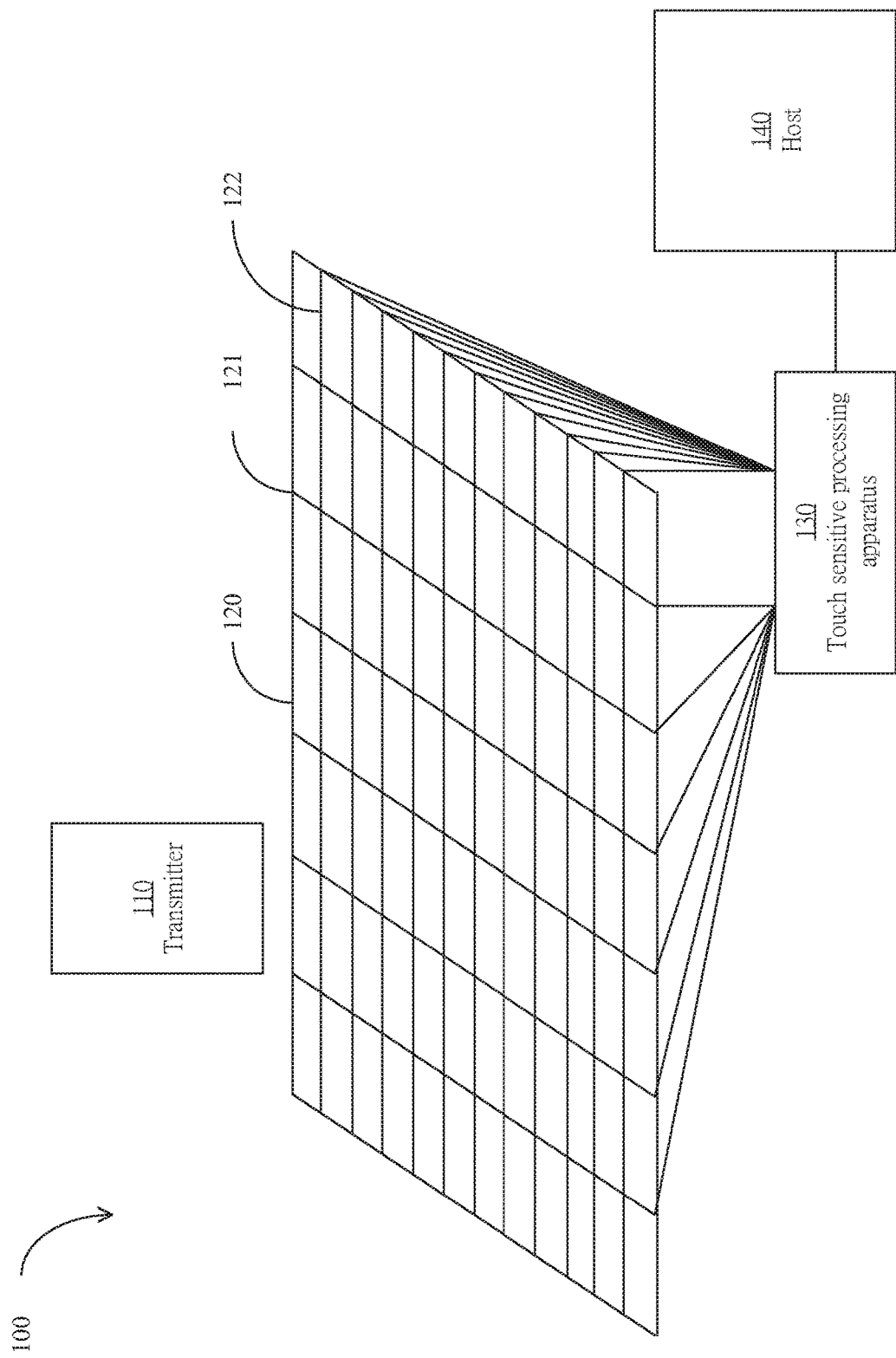
FIG. 1 illustrates a block diagram of a touch sensitive system 100 in accordance with an embodiment of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Please refer to FIG. 1, which illustrates a block diagram of a touch sensitive system 100 in accordance with an embodiment of the present invention. The touch sensitive system 100 comprises at least one transmitter 110, a touch panel 120, a touch sensitive processing apparatus 130, and a host 140. The transmitter 110 may be an active stylus which emits electric signal in one embodiment of the present invention. However, the implementations of the transmitter 110 are not restricted to that. The touch sensitive system 100 may comprises a plurality of transmitters 110. The touch panel 120 is formed on a substrate. The touch panel 120 may be a touch sensitive screen. The present application does not limit implementations of the touch panel 120.

In one embodiment, the touch sensitive area of the touch panel 120 includes a plurality of first electrodes 121 and a plurality of second electrodes 122. Multiple capacitive coupling sensing points are located where the intersections of these two kinds of electrodes. The first and second electrodes 121 and 122 are connected to the touch sensitive processing apparatus 130, respectively. In a mutual capacitance detecting mode, the first electrodes 121 may be called as driving electrodes, the second electrodes 122 may be called as sensing electrodes. The touch sensitive processing apparatus 130 provides driving voltage (voltage of driving signal) to those first electrodes 121 and measures signal variation occurs to the second electrodes 122 to detecting foreign conductive object approximating or touching the touch panel 120. Ordinary people skilled in the art could understand the touch sensitive processing apparatus 130 could use self-capacitance mode or mutual-capacitance mode to detecting approximating or touching event and object. No description is elaborated further. In addition to self-capacitance mode or mutual-capacitance mode, the touch sensitive processing apparatus 130 could further detect the electric signal emitted from the transmitter 110 to calculate a position of the transmitter 110 in relative to the touch panel 120. In one embodiment, signal variations occurs to the first electrodes 121 and the second electrodes 122 are measured, respectively, to detect the electric signal and the position of the transmitter 110 in relative to the touch panel 120. Since frequency of the electric signal emitted from the transmitter 110 is not identical or harmonic to frequency of driving signals in self-capacitance mode or mutual-capacitance mode, the touch sensitive processing apparatus 130 could distinguish the electric signals from the transmitter 110 and the driving signals during self-capacitance mode or mutual-capacitance mode. In another embodiment, the touch panel 120 may be surface capacitance touch sensitive panel which has four electrodes attaching to four corners or four sides. The touch sensitive processing apparatus 130 detects the position of the transmitter 110 in relative to the touch panel 110 by measuring signal variations of these four electrodes.

A host 140 is also shown in FIG. 1. It could be a central processing unit, a master processor in an embedded system, or any other form of computer. In one embodiment, the touch sensitive system 110 could be a tablet computer. The host 140 could be a CPU which runs an operating system of the tablet computer. For example, the tablet computer relies on Android operating system and the host 140 is an ARM processor which runs Android operating system. The present application does not limit the format of information transmitted between the host 140 and the touch sensitive processing apparatus 130. It only requires that the information is related to approximating or touching event occurs to the touch panel 120.

Since electric signals are emitted, the transmitter 110 or active stylus needs electric power to supply the energy of electric signals. In one embodiment, power source of the transmitter 110 may be battery or a rechargeable battery. Alternatively, power source of the transmitter 110 may be capacitor, especially a ultra-capacitor or a super-capacitor, such as one of EDLC (Electrical Double Layered Capacitor), pseudo-capacitor, and hybrid capacitor. The charging time of ultra-capacitor is counted in seconds and the discharging time is counted in hours. In other words, active stylus endures long requiring short charging time.

In one embodiment, the touch panel 120 periodically emits a beacon signal. When the tip of the transmitter 110 or active stylus contacts the touch panel 120, the transmitter 110 could detect the beacon signal via the tip. In response to the detection, the transmitter 110 begins to emit the electric signal for a while to the touch panel 120. Consequently, the transmitter 110 may stop emitting the electric signal if no beacon signal is detected. Thus the operating time of the transmitter could be extended accordingly.

The beacon signal could be emitted via the first electrodes 121 and/or the second electrodes 122. In one embodiment, in case driving signals are transmitted from the first electrodes for mutual capacitance detection, frequency of the driving signals is not identical or harmonic to frequency of the beacon signal. Therefore it is possible to transmit the driving signals and the beacon signals simultaneously. In other words, mutual-capacitance detection and the electric signal detection could be performed simultaneously. Alternatively, it takes turn to transmit the driving signals and the beacon signals. Thus mutual-capacitance detection and the electric signal detection are done in time-sharing fashion. In such case, frequency of the driving signals may or may not be identical to frequency of the beacon signals.

In one embodiment, in order to make the transmitter 110 detecting the beacon signals further away above the touch panel 120, the touch sensitive processing apparatus 130 commands all of the first and the second electrodes 121 and 122 of the touch panel 120 emitting the driving signals simultaneously, such that the total signal strength emitted from the touch panel 120 could be maximized.

Figure 2:
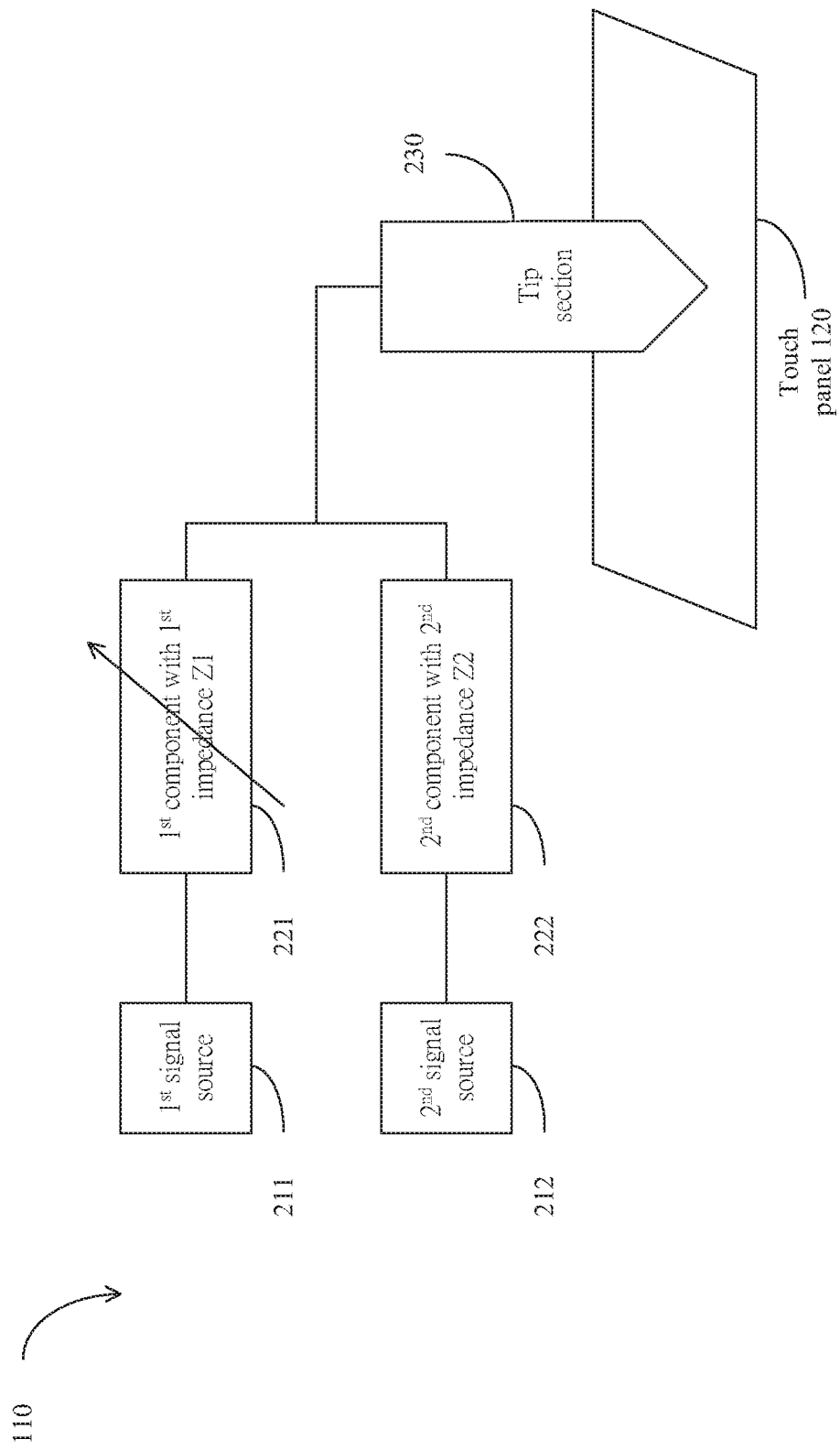
FIG. 2 depicts a block diagram of a transmitter 110 in accordance with an embodiment of the present invention.

Please refer to FIG. 2, which depicts a block diagram of a transmitter 110 in accordance with an embodiment of the present invention. The transmitter 110 comprises a first signal source 211, a second signal source 212, a first component 221 with a first impedance Z1, a second component 222 with a second impedance Z2, and a tip section 230. A first signal emitted from the first signal source 211 transmits to the touch panel 120 via the first component 221 and the tip section 230. Similarly, a second signal emitted from the second signal source 212 transmits to the touch panel 120 via the second component 222 and the tip section 230.

In one embodiment, the first signal includes a signal with a first frequency f1, the second signal includes a signal with a second frequency f2. The first signal with frequency f1 and the second signal with frequency f2 may be square-wave signals, sinuous signals, or PWM (pulse width modulation) signals. In one embodiment, the first frequency f1 is not identical or harmonic to frequency of the beacon signal and frequency of the driving signal. The second frequency f2 does not equal to the first frequency f1. Furthermore, the second frequency f2 is not identical or harmonic to frequency of the beacon signal and frequency of the driving signal.

These signals with two frequencies get mixed and fed into the tip section 230 via the first component 221 with the first impedance Z1 and the second component 222 with the second impedance Z2, respectively. The first and second components 221 and 222 could be any combination of resistor, inductor, and capacitor (e.g. solid state capacitor). In the embodiment as shown in FIG. 2, the second impedance Z2 is fixed or constant; the first impedance Z1 is variable or adjustable corresponding to a sensing variation of a sensor.

In another embodiment, the first and second impedances Z1 and Z2 both are variable or adjustable. A ratio of these two impedances is corresponding to a sensing variation of a sensor. In one embodiment, the sensor may be a contractible and flexible tip. The first impedance Z1 changes corresponding to the stroke or the pressure level of the flexible tip. In some examples, the first impedance Z1 is linearly proportional to the variation of the sensing value of the sensor. In alternative examples, the first impedance Z1 is non-linearly proportional to the variation of the sensing value of the sensor.

The first and second components 221 and 222 may not be the same kind of electric component. For example, the first component 221 is a resistor and the second component 222 is a capacitor, and vice versa. In another example, the first component 221 is a resistor and the second component 222 is an inductor, and vice versa. Alternatively, the first component 221 is an inductor and the second component 222 is a capacitor, and vice versa. At least one of the first impedance Z1 and the second impedance Z2 is variable or adjustable. For example, it may be resistor with variable resistance, capacitor with variable capacitance, or inductor with variable inductance. In case of one of the first impedance Z1 and the second impedance Z2 is fixed or constant; the component may be one of the following: resistor with fixed resistance, capacitor with fixed capacitance, or inductor with fixed inductance.

In one embodiment, the first component 221 may be a FSR, force sensing resistor, with a variable and determinable resistance corresponding to an applied force, and the second component 222 may be a resistor with fixed resistance. In alternative embodiment, the first component may be a resistor with variable resistance. Hence, while other conditions are the same, a ratio of a first strength M1 of signal component with the first frequency f1 and a second strength M2 of signal component with the second frequency f2 in the electric signals emitted from the tip section 230 is proportional to an inverse ratio of the first and the second impedances Z1 and Z2. In other words, M1/M2=k (Z2/Z1).

When the transmitter 110 hovers above the touch panel 120, since the tip section 230 is not pressed or moved, the ratio between strength M1 of signal component with the first frequency f1 and strength M2 of signal component with the second frequency f2 is a constant or a predetermined value. Or alternatively, a ratio of (M1−M2)/(M1+M2) or another ratio of (M2−M1)/(M1+M2) is also a constant or a predetermined value. In addition, the pressure level may be represented as M1/(M1+M2) or M2/(M1+M2). Except for those four ratios mentioned above, ordinary people skilled in the art could use any other ratio involving strengths M1 and M2. In other words, when the detected ratio is the constant or the predetermined value, it is concluded that the sensor did not sense any variation. In one embodiment, it means that the transmitter 110 does not contact the touch panel 120.

When the transmitter 110 contacts the touch panel 120, the tip section 230 is pressed to move. The first impedance Z1 of the first component 221 changes according to the movement or the pressure of the tip section 230 such that the ratio of M1 and M2 is varied accordingly from the constant or the predetermined value. The touch panel 120 could generate corresponding sensing (pressure) value according to the ratio. The fore-mentioned constant or predetermined value may not be a number but a range with a tolerable error.

It is noticeable that the relation between the ratio and the sensing value may not be linear. Furthermore, the sensing value may not be linearly proportional to the movement or the pressure of the sensor. The sensing value is just a value sensed by the touch panel 120. The present application does not limit the correspondence of the sensing value. For example, the touch panel 120 could generate the sensing value according to the ratio by looking into a look-up table or by calculations.

Figure 3:
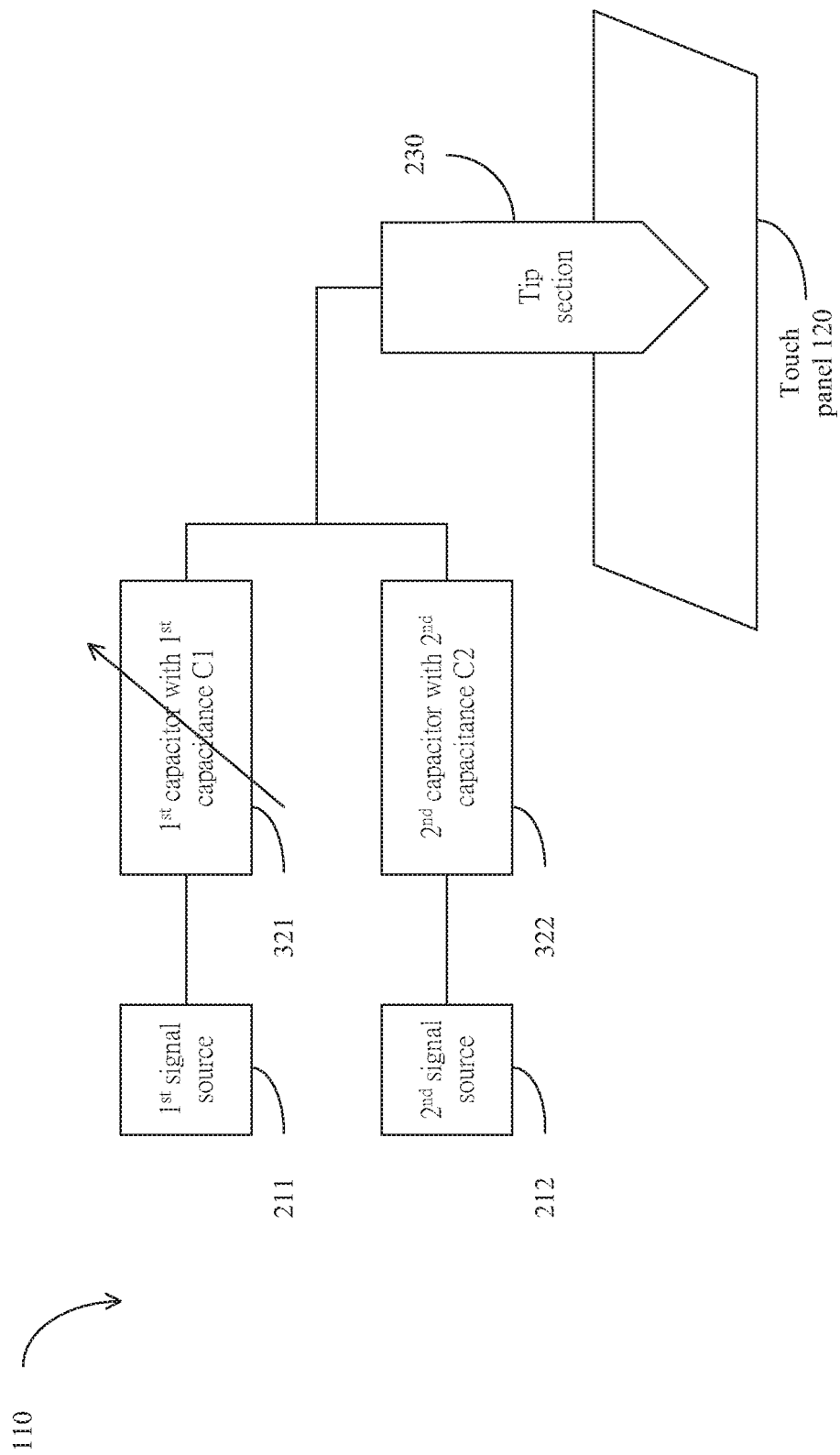
FIG. 3 shows a block diagram of a transmitter 110 in accordance with an embodiment of the present invention.

Please refer to FIG. 3, which shows a block diagram of a transmitter 110 in accordance with an embodiment of the present invention. Similar to the embodiment shown in FIG. 2, the transmitter 110 comprises the first signal source 211, the second signal source 212, a first capacitor 321 with a first capacitance C1, a second capacitor 322 with a second capacitance C2, and the tip section 230.

The two signal sources 211 and 212 may be a first PWM signal source PWM1 and a second PWM signal source PWM2, respectively. These two signal sources 211 and 212 may emit signals with the same frequency or not. The transmitter 110 comprises the second capacitor 322 with fixed second capacitance C2 and the first capacitor 321 with a variable first capacitance C1, which are connected to the signal sources PWM2 212 and PWM1 211, respectively. Since the first capacitance C1 changes according to the pressure level of the tip section 230, the embodiment shown in FIG. 3 may comprises a capacitive force sensor or a FSC, force sensing capacitor. In one embodiment, the capacitive force sensor may be implemented by PCB (printed circuit board) or any other material. The structure of the FSC would be described in paragraphs below.

The strength ratio of these two signal sources is inversely proportional to resistances of these two capacitors 321 and 322. When the tip section 230 of the stylus does not touch, or the force sensor does not sense any force, resistance of the first capacitor 321 remains the same. The resistance ratio of these two capacitors 321 and 322 keeps unchanged. When the transmitter 110 hovers above the touch panel 120 and the emitted electric signals are detected, the strength ratio of these two signal sources is constant or fixed.

However, if the tip section 230 of the transmitter 110 is touched or the force sensor does sense force, the resistance of the first capacitor 321 changes accordingly such that the resistance ratio of these two capacitors 321 and 322 also changes accordingly. When the transmitter 110 contacts the touch panel 120 and the emitted electric signals are detected, the strength ratio of these two signal sources is varied according to the force sensed by the force sensor.

Figure 4A:
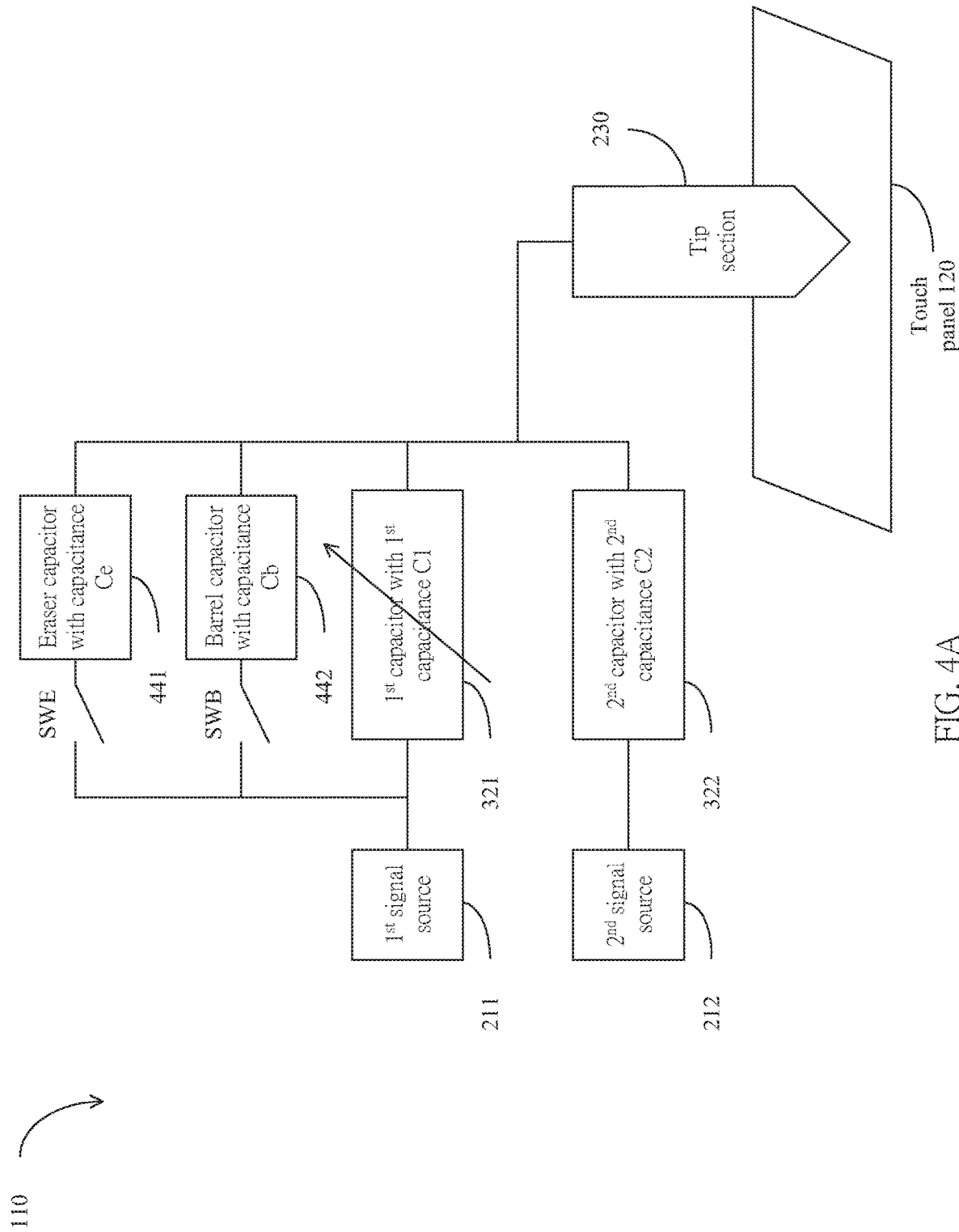
FIG. 4A depicts a block diagram of a transmitter 110 in accordance with an embodiment of the present invention.

Please refer to FIG. 4A, which depicts a block diagram of a transmitter 110 in accordance with an embodiment of the present invention. Similar to the embodiment as shown in FIG. 3, the transmitter 110 comprises the first signal source 211, the second signal source 212, the first capacitor 321 with the first capacitance C1, the second capacitor 322 with the second capacitance C2, and the tip section 230. The transmitter 110 may comprise multiple sensors to detect multiple states. In one embodiment, the tip section 230 comprises a force sensor for detecting the pressure level of the tip and reflecting the pressure level to the emitted electric signal. In another embodiment, the transmitter 110 may comprise multiple buttons, such as eraser button and barrel button. Alternatively, the transmitter 110 may include a switch to reflect whether the tip is touched by the touch panel or anything else. Persons having ordinary skill in the art could understand that the transmitter 110 may include more buttons and other forms of sensors but not limited to those mentioned.

In the embodiment shown in FIG. 4A, the first capacitor 321 connects to an eraser capacitor 441 and a barrel capacitor 442 in parallel, which are connected in series to the eraser button and the barrel button, or switch SWE and switch SWB, respectively. When the corresponding button is pressed or the corresponding switch is shorted, the capacitor 441 or 442 is connected to the first capacitor 321 in parallel, such that it changes the capacitance of the PWM1 signal path and the resistance ratio between the PWM1 signal path and the PWM2 signal path is changed accordingly. Thus the strength ratio of these two signal sources is varied in consequence.

Since the capacitance C1 and resistance of the first capacitor 321 is variable, in case it is connected in parallel with the eraser capacitor 441 and the barrel capacitor 442, the resistance ratio of the connected circuit and the second capacitor 322 resides in a range. In the embodiment as shown in FIG. 4A, assuming the signal strength ratio of PWM1 versus PWM2 falls into a first range in response to the variable range of the first capacitor 321. In case the first capacitor 321 is connected with the barrel capacitor 442 in parallel, i.e., the barrel button is pressed, the signal strength ratio of PWM1 versus PWM2 falls into a second range. In case the first capacitor 321 is connected with the eraser capacitor 441 in parallel, i.e., the eraser button is pressed, the signal strength ratio of PWM1 versus PWM2 falls into a third range. Further, in case the first capacitor 321 is connected with the barrel capacitor 442 and the eraser capacitor 441 in parallel, i.e., the barrel button and the eraser button are pressed, the signal strength ratio of PWM1 versus PWM2 falls into a fourth range. In the implementation, the capacitance and resistance of the barrel capacitor 442 and the eraser capacitor 441 could be adjusted such that the first, second, third, and four ranges are not overlapped. Because the ranges are not overlapped, it is able to determine which button is pressed according to which range the signal strength ratio falls into. In consequence, the pressure level of the force sensor could be concluded according to the signal strength ratio.

Figure 4B:
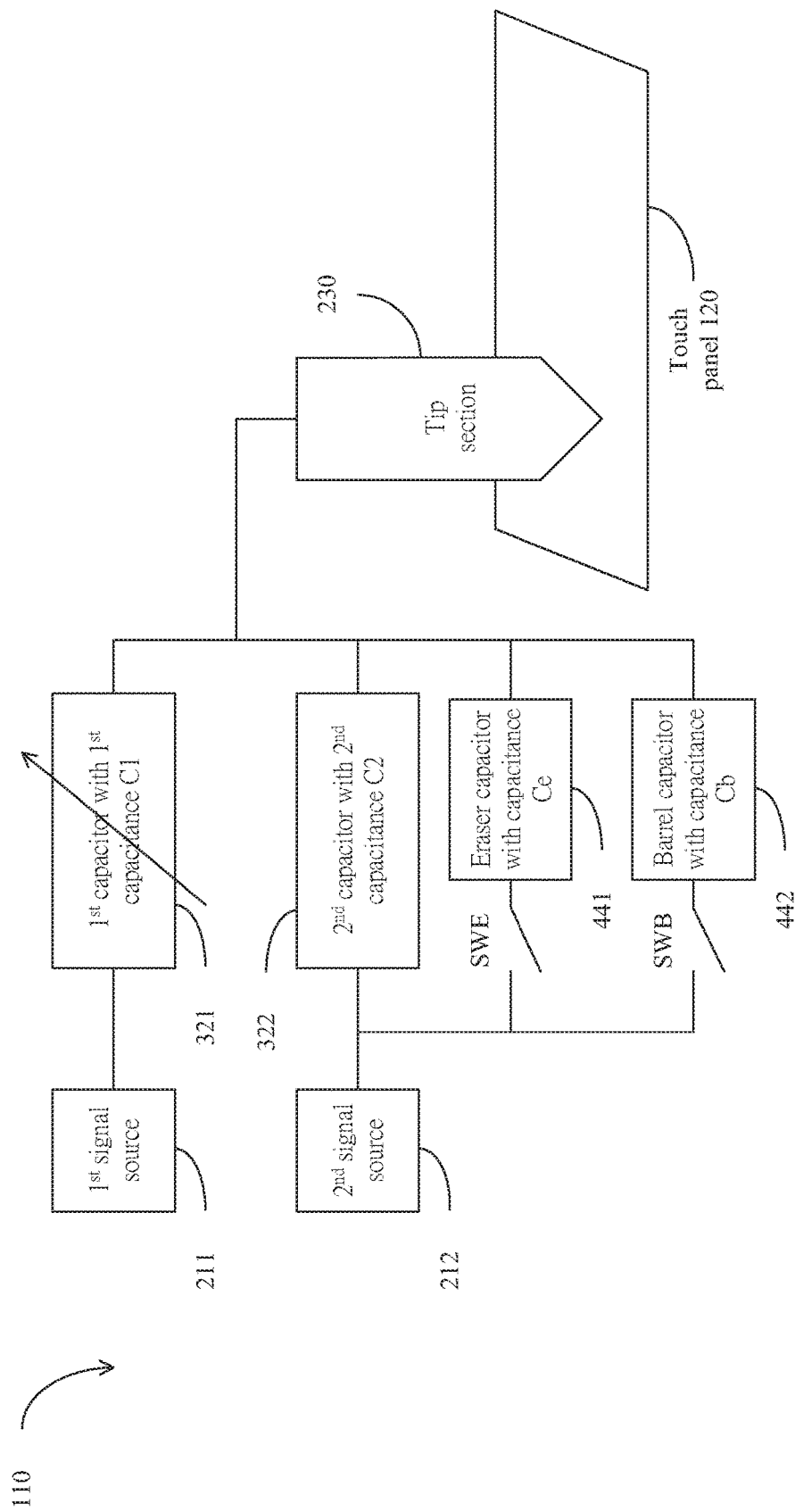
FIG. 4B depicts a block diagram of a transmitter 110 in accordance with an embodiment of the present invention.

Please refer to FIG. 4B, which depicts a block diagram of a transmitter 110 in accordance with an embodiment of the present invention. Comparing with the embodiment shown in FIG. 4A, the second capacitor 322 is configured to connected with the eraser capacitor 441 and the barrel capacitor 442, which are connected in series to the eraser button and the barrel button, or switch SWE and switch SWB, respectively. When the corresponding button is pressed or the corresponding switch is shorted, the capacitor 441 or 442 is connected to the second capacitor 322 in parallel, the resistance ratio between the PWM1 signal path and the PWM2 signal path is changed accordingly. Thus the strength ratio of these two signal sources is varied in consequence.

Since the capacitance C1 and resistance of the first capacitor 321 is variable, in case the second capacitor 322 is connected in parallel with the eraser capacitor 441 and the barrel capacitor 442, the resistance ratio of the connected circuit and the first capacitor 321 resides in a range. In the embodiment shown in FIG. 4B, assuming the signal strength ratio of PWM1 versus PWM2 falls into a first range in response to the variable range of the first capacitor 321. In case the second capacitor 322 is connected with the barrel capacitor 442 in parallel, i.e., the barrel button is pressed, the signal strength ratio of PWM1 versus PWM2 falls into a fifth range. In case the second capacitor 322 is connected with the eraser capacitor 441 in parallel, i.e., the eraser button is pressed, the signal strength ratio of PWM1 versus PWM2 falls into a sixth range. Further, in case the second capacitor 322 is connected with the barrel capacitor 442 and the eraser capacitor 441 in parallel, i.e., the barrel button and the eraser button are pressed, the signal strength ratio of PWM1 versus PWM2 falls into a seventh range.

Utilizing the same spirit embodied in FIG. 4A, the capacitance and resistance of the barrel capacitor 442 and the eraser capacitor 441 could be adjusted such that the first, fifth, sixth, and seventh ranges are not overlapped. Because the ranges are not overlapped, it is able to determine which button is pressed according to which range the signal strength falls into. In consequence, the pressure level of the force sensor could be concluded according to the signal strength ratio.

Figure 5:
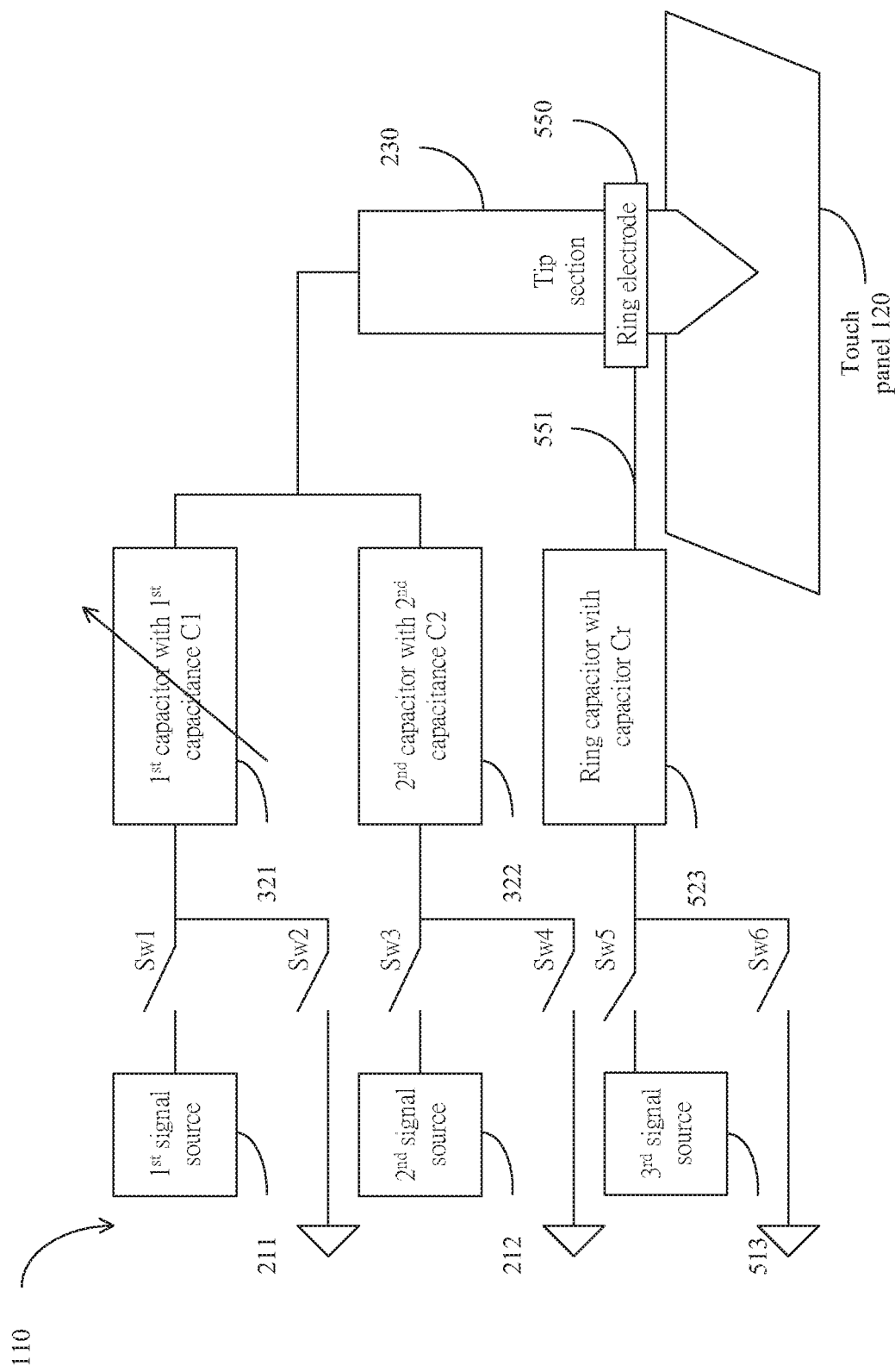
FIG. 5 depicts a block diagram of a transmitter 110 in accordance with an embodiment of the present invention.

Please refer to FIG. 5, which depicts a block diagram of a transmitter 110 in accordance with an embodiment of the present invention. The embodiment as shown in FIG. 5 may be variation of embodiments shown in FIGS. 2, 3, 4A, and 4B. Reversely, the variation of the embodiment shown in FIG. 5 apply to the embodiments shown in FIGS. 2, 3, 4A, and 4B.

Comparing with the embodiment shown in FIG. 2, the embodiment shown in FIG. 5 further comprises a ring electrode 550 and a ring wire 551. The ring wire 551 as shown in FIG. 5 connects to a third signal source 513 via a ring capacitor 523 with a fixed capacitance Cr. The tip section 230 is surrounded by the ring electrode 550 which is coupled to the ring wire 551 and the printed circuit board in the aft. Although it is called "ring" electrode 550 in the present application, the ring electrode 550 may comprise multiple electrodes in some embodiments. The present invention does not limit the number of the ring electrode 550. For convenience, they are collectively called ring electrode 550. The ring electrode 550 is electrically insulated to the tip section. They are not electrically coupled.

Six switches Sw1 through Sw6 are shown in FIG. 5. The tip section 230 radiates signals from the first signal source 211 if the switch Sw1 is shorted and switch Sw2 is opened. Otherwise, it could be done if the switch Sw1 is opened or in case the switches Sw1 and Sw2 are shorted. Similarly, the tip section 230 radiates signals from the second signal source 212 if the switch Sw3 is shorted and switch Sw4 is opened. Otherwise, it could be done if the switch Sw3 is opened or in case the switches Sw3 and Sw4 are shorted. The ring electrode 550 radiates signals from the third signal source 513 if the switch Sw5 is shorted and switch Sw6 is opened. Otherwise, it could be done if the switch Sw5 is opened or in case the switches Sw5 and Sw6 are shorted.

The first signal source 211 and the second signal source 212 may emit signals with different frequencies or signals with different frequency groups. Analogously, the third signal source 513 may emit signals with frequency or frequency group different to those from the first signal source 211 and the second signal source 212. Similarly, the first signal source 211 and the second signal source 212 may transmit PWM signals. The frequency of signals transmitted from these two signal sources 211 and 212 may be identical or not. Comparably, the third signal source 513 may transmit PWM signals. The frequency of signals transmitted from these three signal sources 211, 212 and 513 may be identical or not.

Figure 6:
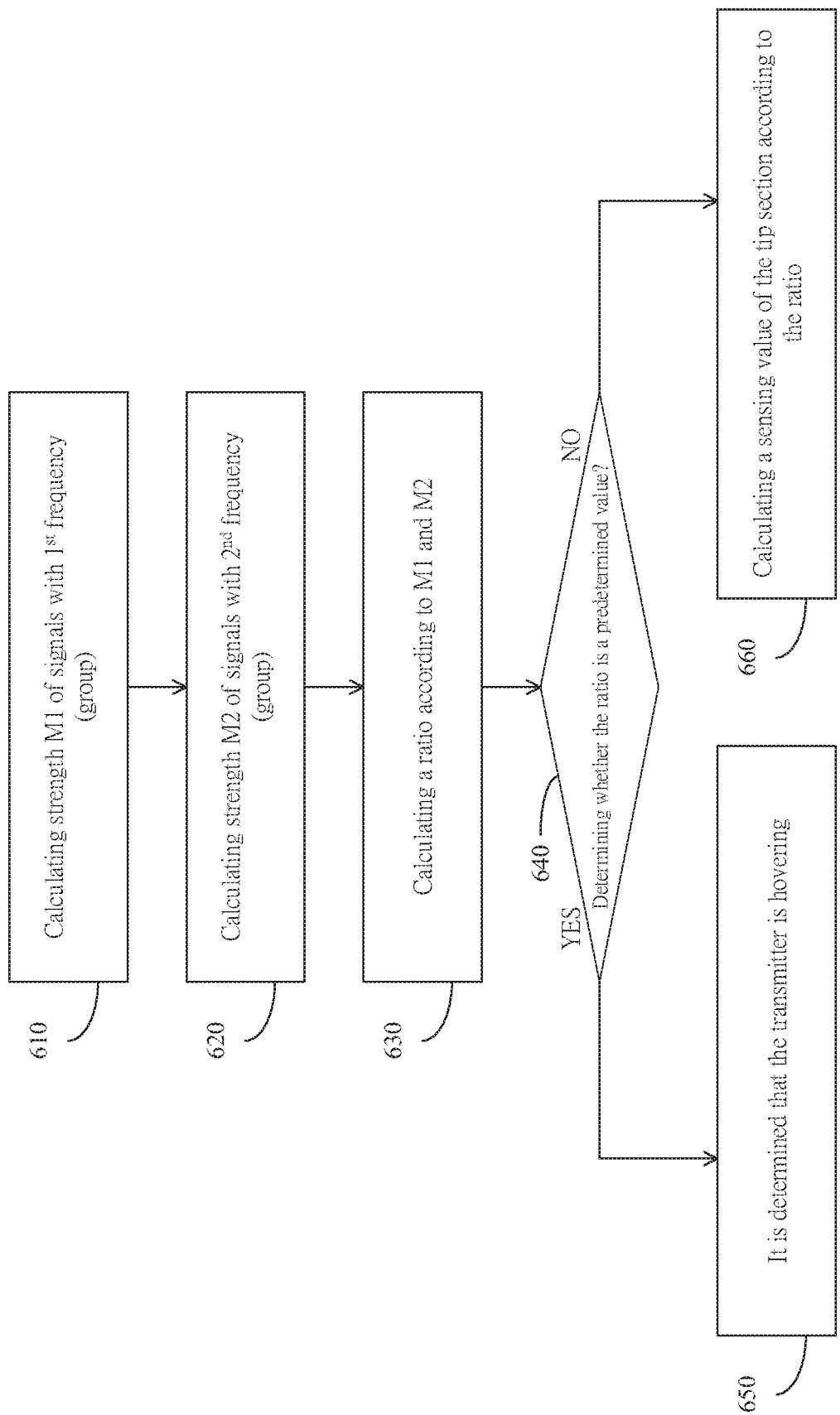
FIG. 6 depicts a flow chart diagram of determining the sensing value of the tip of transmitter or active stylus performed by a processing apparatus in accordance with an embodiment of the present invention.

Please refer to FIG. 6, which depicts a flow chart diagram of determining the sensing value of the tip of transmitter or active stylus performed by a processing apparatus in accordance with an embodiment of the present invention. The method could be executed by the touch sensitive processing apparatus 130 as shown in FIG. 1. The touch sensitive processing apparatus 130 connects multiple first electrodes 121 and second electrodes 122 of the touch panel 120 for detecting the electric signals emitted by the tip section 230 of the transmitter 110. The touch sensitive processing apparatus 130 is able to determine a position the transmitter 100 in relative to the touch panel 120 according to signal strengths received by individual first electrode 121 and second electrode 122. In addition, method shown in FIG. 6 is configured to determine the force sensing value of the transmitter 110. In one instance, the force sensing value is the pressure level of the tip section 230.

The embodiment shown in FIG. 6 may be corresponding to the embodiments shown in FIG. 2 through FIG. 5. The first two steps 610 and 620 are calculating signal strength M1 and M2 of the first signal source 211 and the second signal source 212, respectively. These two steps 610 and 620 could be done simultaneously or in any order. In case the signal from the first signal source 211 with first frequency f1 and the signal from the second signal source 212 with second frequency f2, the signal strength M1 is the strength of signal with f1 and the signal strength M2 is the strength of signal with f2. In case the signal from the first signal source 211 with first frequency group F1 and the signal from the second signal source 212 with second frequency group F2, the signal strength M1 is sum of strength of signals with each frequency of group F1 and the signal strength M2 is sum of strength of signals with each frequency in group F2. As mentioned above, the frequency in this embodiment could be PWM frequency.

Then in step 630, calculating a ratio according to M1 and M2. Five examples of the ratio are already enumerated above, such as M1/M2, (M1−M2)/(M1+M2), (M2−M1)/(M1+M2), M1/(M1+M2), and M2/(M1+M2). Persons having ordinary skill in the art could use any other ratio involving M1 and M2 in addition to those examples. Next, step 640 is performed for determining whether the ratio is a predetermined value or falls into a predetermined range. If the result is true, the flow goes to step 650. It is determined that the transmitter 110 is hovering above the touch panel 120. Otherwise, the flow executes step 660 for calculating a sensing value of the tip section 230 according to the ratio. The sensing value may or may not be relevant to the pressure level or moving distance of the tip section 230. The calculations of the sensing value could be done by looking into a lookup table, linear interpolation, and/or quadratic curve interpolation. It depends on the relation between the ratio and the sensing value.

When the method shown in FIG. 6 applies to the embodiments shown in FIGS. 4A and 4B, additional steps could be performed in step 660. For example, when it applies to the embodiment shown in FIG. 4A, the flow may further determine which one of the first, second, third, and fourth ranges the ratio calculated in step 630 falls into. Hence, it is able to determine whether the barrel button and/or the eraser button are pressed or not in addition to the sensing value of the tip section 230. Analogously, when it applies to the embodiment shown in FIG. 4B, the flow may further determine which one of the first, fifth, sixth, and seventh ranges the ratio calculated in step 630 falls into. Hence, it is able to determine whether the barrel button and/or the eraser button are pressed or not in addition to the sensing value of the tip section 230.

In one embodiment of the present application, the controller or circuit inside the transmitter 110 does not need to determine the pressure level of the tip section 230. It simply requires that one or both the first impedance Z1 of the first component 221 and the second impedance Z2 of the second component 222 change according to the pressure level of the tip section 230 such that one of the signal strength of first frequency f1 or first frequency group F1 and the signal strength of second frequency f2 or second frequency group F2 change in consequence. Therefore the pressure level of the tip section 230 could be calculated according to a ratio between the strength M1 of signals with first frequency f1 or first frequency group F1 and the strength M2 of signals with second frequency f2 or second frequency F2 is demodulated from the electric signals received by the touch panel 120.

Figure 7A:
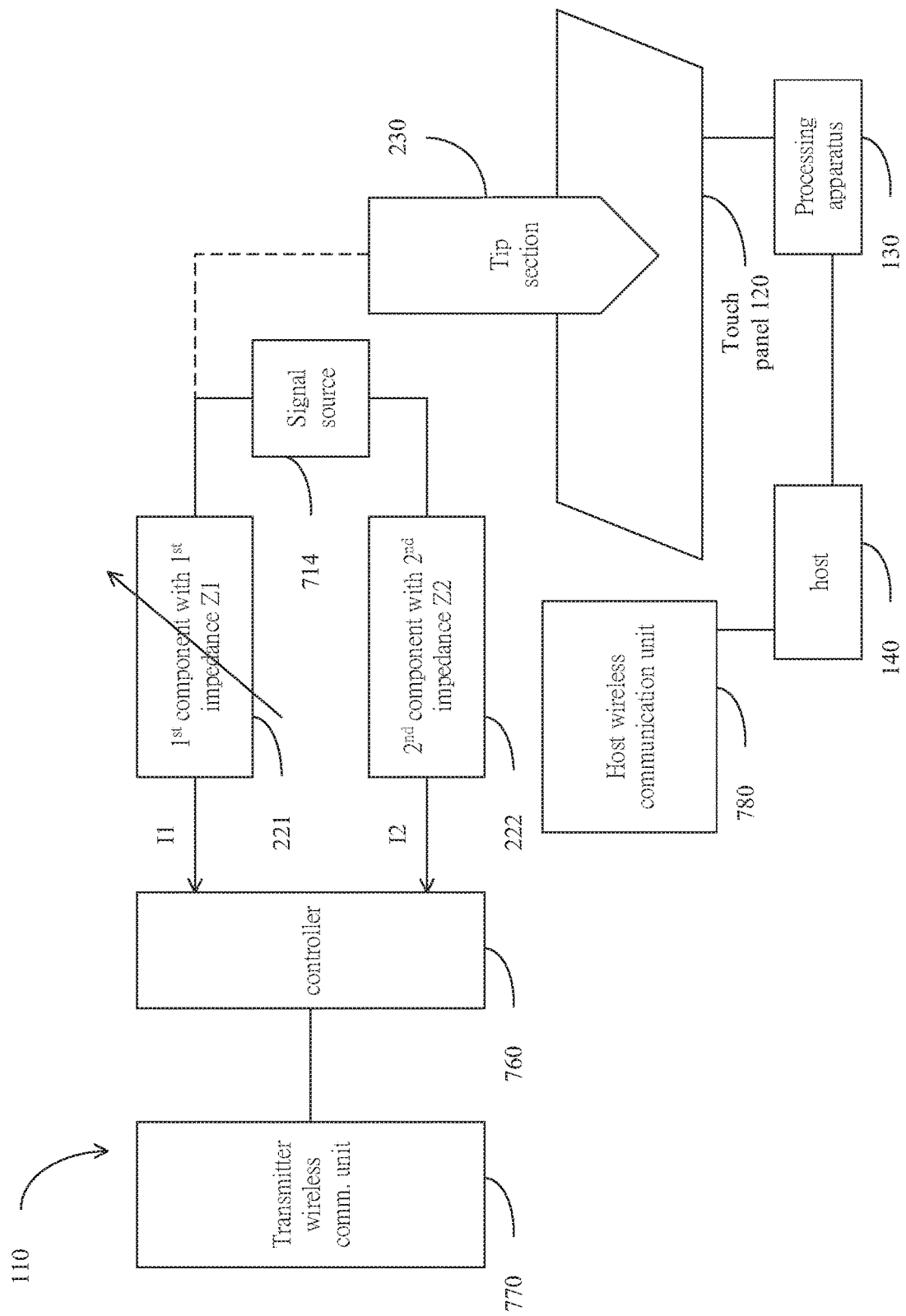
FIG. 7A illustrates a block diagram of a transmitter 110 in accordance with an embodiment of the present invention.

Please refer to FIG. 7A, which illustrates a block diagram of a transmitter 110 in accordance with an embodiment of the present invention. Comparing with embodiments shown in FIG. 2 through FIG. 5, the transmitter 110 shown in FIG. 7A also comprises a first component 221 with a first impedance Z1, a second component 222 with a second impedance Z2, and a tip section 230. The first component 221 and the second component 222 may be any combination of resistor, inductor, and capacitor. In the embodiment as shown in FIG. 7A, the second impedance Z2 may be fixed and the first impedance Z1 is variable or adjustable corresponding to a variation of a sensor, such as pressure level of the tip section 230. The first component 221 and the second component 222 as shown in FIG. 7A could adopt those components with same numerals shown in FIG. 2 through FIG. 5. No duplicated description is elaborated here.

Comparing with the previous embodiments, the difference resides in the embodiment shown in FIG. 7A is including a single signal source 714 which is configured to transmit electric signals to the first component 221 and the second component 222 and a controller 760 which is configured to measure a first current value I1 and a second current value I2 outputted from the first component 221 and the second component 222, respectively. The controller 760 is further configured to calculated a ratio which may be one of the followings: I1/(I1+I2), I2/(I1+I2), I1/I2, (I1−I2)/(I1+I2), (I2−I1)/(I1+I2) and etc. Persons having ordinary skill in the art can calculated any other ratio involving the current values I1 and I2.

The calculated ratio could be used to conclude the pressure level of the tip section 230. The controller 760 can transmit information derived from the first current value I1 and the second current value I2 via a transmitter wireless communication unit 770. The host 140 may receive the information via a host wireless communication unit 780 to get the pressure level of the tip section 230.

Figure 7B:
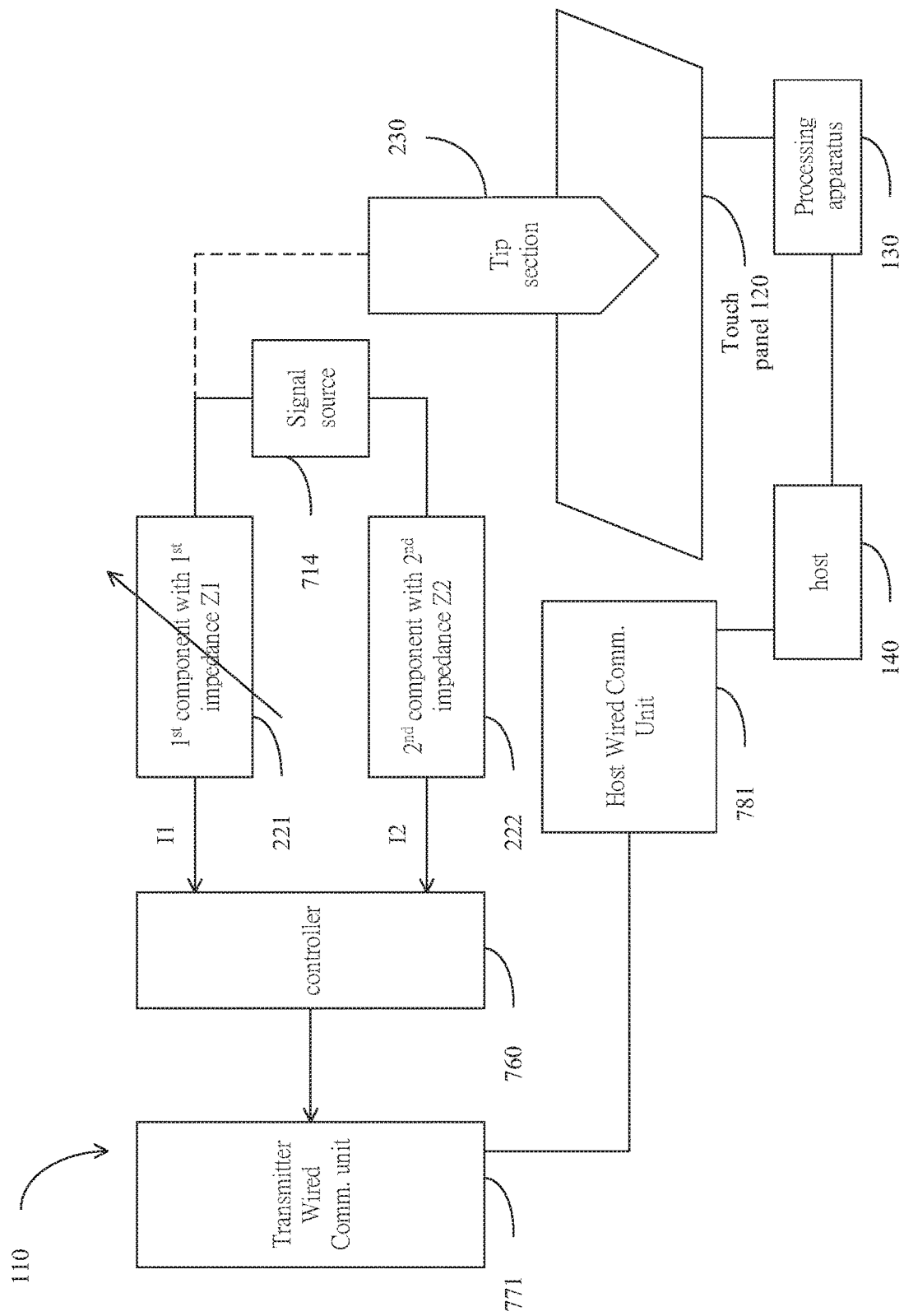
FIG. 7B illustrates a block diagram of a transmitter 110 in accordance with an embodiment of the present invention.

Please refer to FIG. 7B, which illustrates a block diagram of a transmitter 110 in accordance with an embodiment of the present invention. The difference to the embodiment shown in FIG. 7A resides that the controller 760 may transmit information derived from the first current value I1 and the second current value I2 via a transmitter wired communication unit 771. The host 140 may receive the information via a host wired communication unit 781 to get the pressure level of the tip section 230.

Figure 7C:
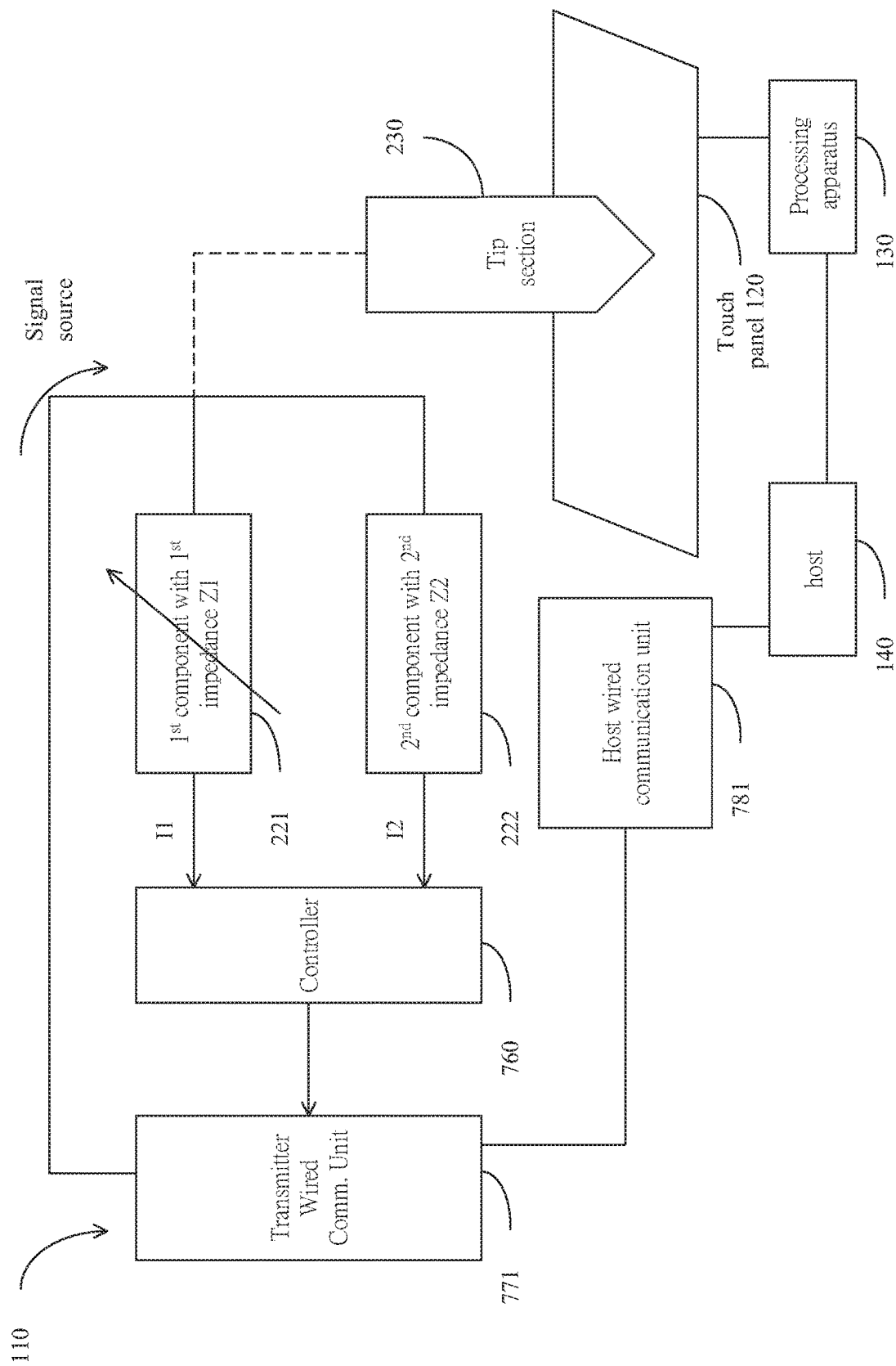
FIG. 7C illustrates a block diagram of a transmitter 110 in accordance with an embodiment of the present invention.

Please refer to FIG. 7C, which illustrates a block diagram of a transmitter 110 in accordance with an embodiment of the present invention. The difference to the embodiment shown in FIG. 7B resides that the transmitter 110 no longer has the single signal source 714. Instead, the transmitter 110 uses the electric signal from the transmitter wired communication unit 771 as the signal source. Since the transmitter wired communication unit 771 is connected to the host wired communication unit 781, the electric signal is supplied by the power of the host 140.

Figure 7D:
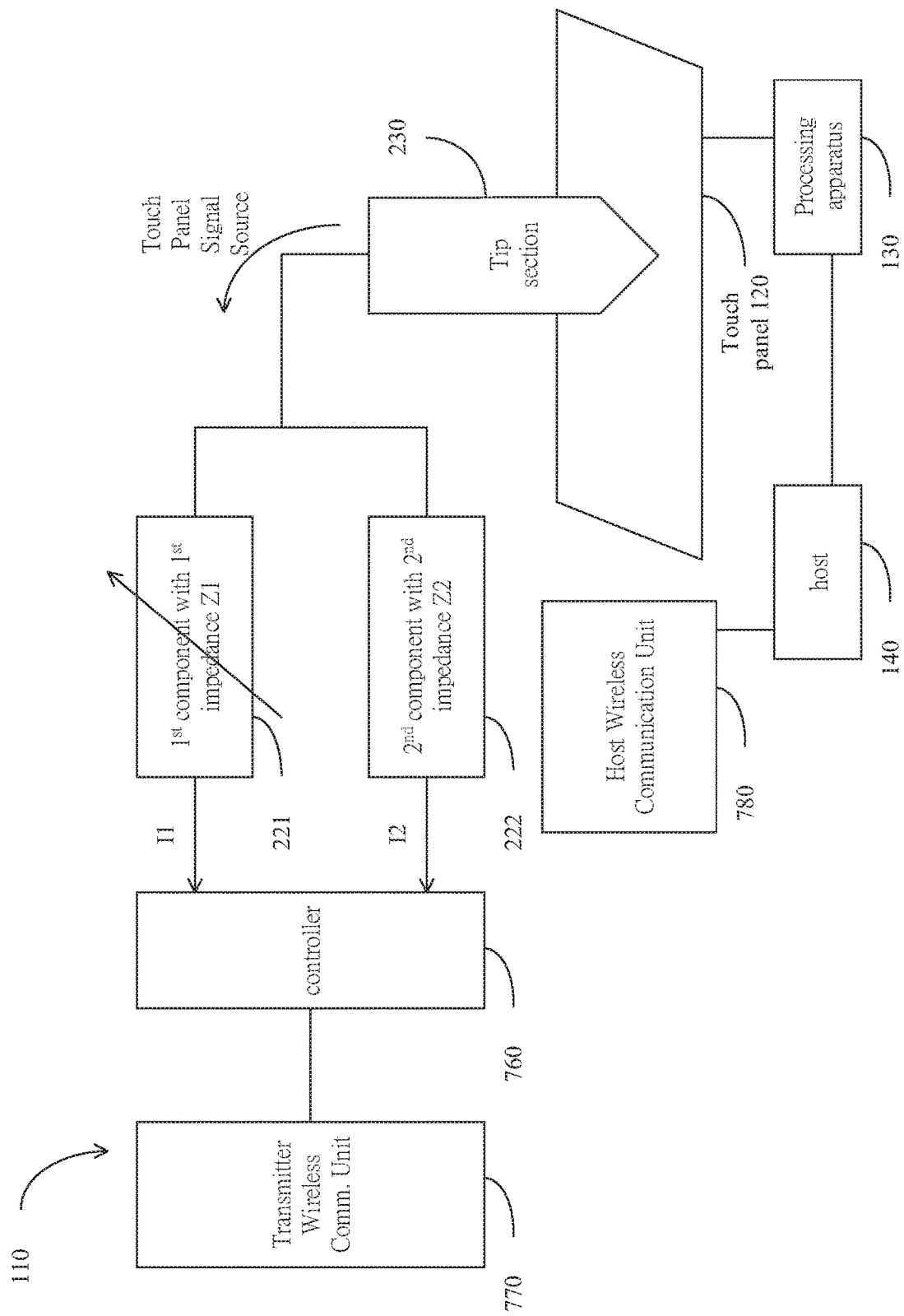
FIG. 7D illustrates a block diagram of a transmitter 110 in accordance with an embodiment of the present invention.

Please refer to FIG. 7D, which illustrates a block diagram of a transmitter 110 in accordance with an embodiment of the present invention. The difference to the embodiment shown in FIG. 7A resides that the transmitter 110 no longer has the single signal source 714. Instead, the transmitter 110 uses received signal from the first electrodes 121 and/or the second electrodes 122 of the touch panel 120 when the tip section 230 approximating or touching the touch panel 120.

It is worthy mentioned that the embodiments shown in FIG. 7A through 7D could use the variation shown in FIG. 3. The first component 221 may be the fore-mentioned first capacitor 321. The second component 222 may be the fore-mentioned second capacitor 322. Similarly, the embodiments shown in FIG. 7A through 7D could use the variations shown in FIGS. 4A and 4B. The first component 221 may be connected with component corresponding to other switch in parallel, or the second component 222 may be connected with components corresponding to other switch in parallel, such that the controller 760 could conclude the state of the switch according to which range where the calculated ratio falls into.

Figure 8:
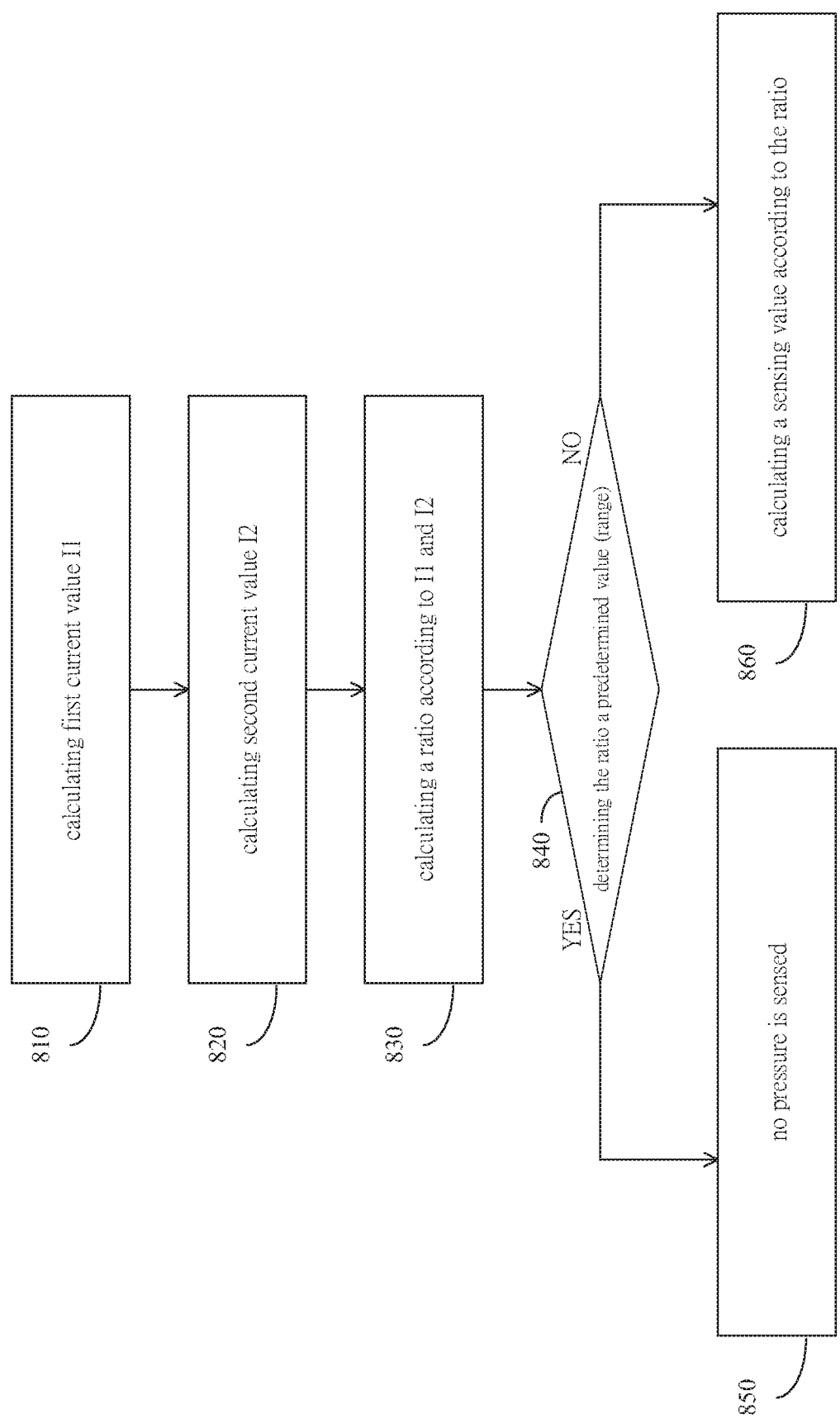
FIG. 8 shows a flow chart of determining a sensing value of the tip section of the transmitter in accordance with an embodiment of the present invention.

Please refer to FIG. 8, which shows a flow chart of determining a sensing value of the tip section of the transmitter performed by a touch sensitive processing apparatus in accordance with an embodiment of the present invention. The embodiment shown in FIG. 8 is quite similar to the embodiment shown in FIG. 6, which is configured to calculate the sensing value according to a ratio between a signal strength M1 of a first frequency (group) and a signal strength M2 of a second frequency (group). The embodiment shown in FIG. 8 is configured to apply to implementation with a single signal source, which is configured to calculate the ratio between a first current value I1 through the first component 221 and a second current value I2 through the second component 222.

The method may be executed by the controller 760 of the embodiments shown in FIG. 7A through 7D. The first two steps 810 and 820 are configured for calculating a first current value I1 through the first component 221 and a second current value I2 through the second component 222, respectively. These two steps 810 and 820 may be performed simultaneously, or in any order. Next, in step 830, calculating a ratio of I1 and I2. Several examples of the ratio are already enumerated above, such as I1/(I1+I2), I2/(I1+I2), I1/I2, I2/I1, (I1−I2)/(I1+I2), (I2−I1)/(I1+I2), and etc. Next, in step 840, determining whether the ratio is a predetermined value or falls into a predetermined range. If the result is true, the flow goes to step 850, it is determined that the transmitter is hovering above the touch panel 120. Otherwise, the flow goes to step 860, calculating a sensing value of the tip section according to the ratio. The sensing value may or may not be relevant to the pressure level or moving distance of the tip section 230. The calculations of the sensing value could be done by looking into a lookup table, linear interpolation, and/or quadratic curve interpolation. It depends on the relation between the ratio and the sensing value.

When the method shown in FIG. 8 applies to the embodiments shown in FIGS. 4A and 4B, additional steps could be performed in step 860. For example, when it applies to the embodiment shown in FIG. 4A, the flow may further determine which one of the first, second, third, and fourth ranges the ratio calculated in step 830 falls into. Hence, it is able to determine whether the barrel button and/or the eraser button are pressed or not in addition to the sensing value of the tip section 230. Analogously, when it applies to the embodiment shown in FIG. 4B, the flow may further determine which one of the first, fifth, sixth, and seventh ranges the ratio calculated in step 830 falls into. Hence, it is able to determine whether the barrel button and/or the eraser button are pressed or not in addition to the sensing value of the tip section 230.

Figure 9A:
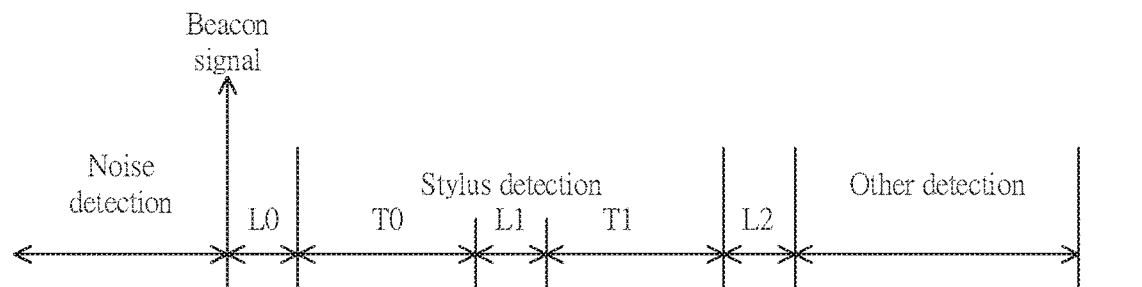
FIG. 9A shows a timing sequence of signal modulation in accordance with an embodiment of the present invention.

Please refer to FIG. 9A, which shows a timing sequence of signal modulation in accordance with an embodiment of the present invention. The embodiment shown in FIG. 9A may apply to the transmitter 110 as shown in FIG. 2 through FIG. 5. The horizontal axis of FIG. 9A is a time axis by order from left to right. As shown in FIG. 9A, an optional noise detection period is included prior to a beacon signal is emitted by the touch panel 120. The noise detected during the period may come from touch panel, the electronics, and/or background environment. The touch panel 120 and the touch sensitive processing apparatus 130 may detect one or more frequencies of noise signals. Noise detection would be described later.

Figure 29:
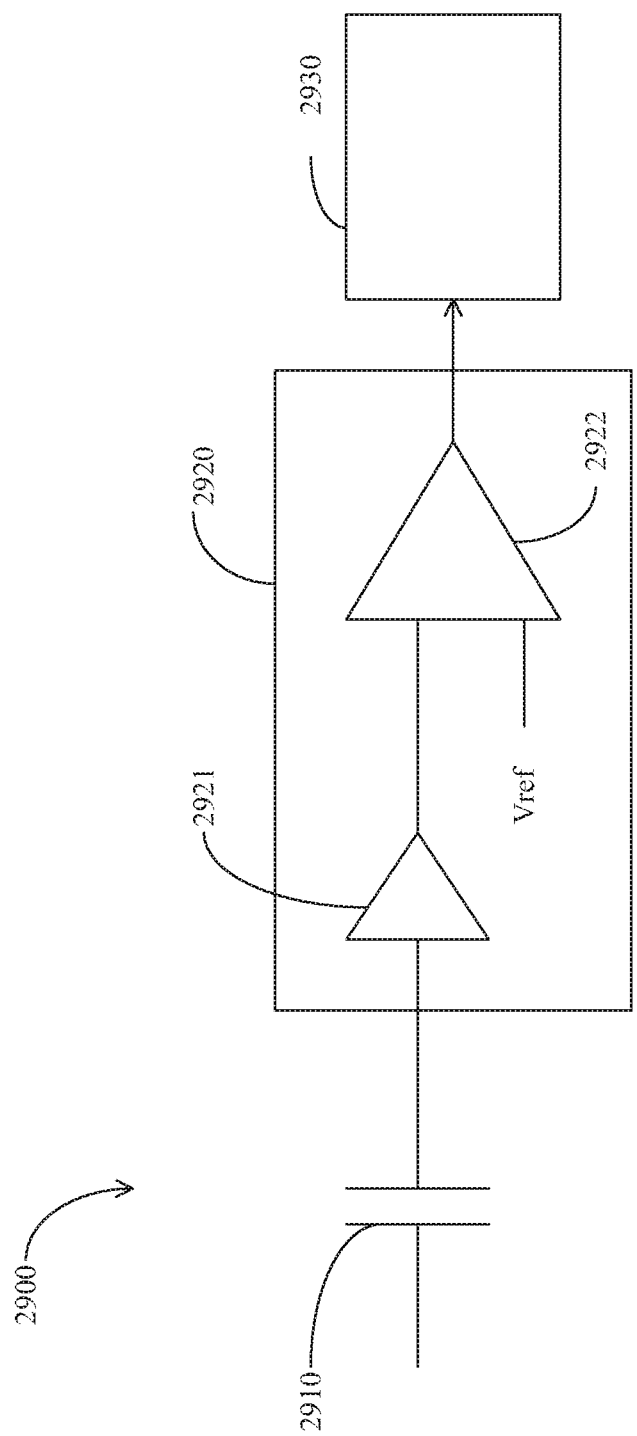
FIG. 29 illustrates a block diagram of a system for detecting beacon signal in accordance with an embodiment of the present invention.

In one embodiment, the touch panel 120 transmits beacon signals. The transmitter 110 comprises a demodulator for detecting the beacon signal. Please refer to FIG. 29, which illustrates a block diagram of a system for detecting beacon signal in accordance with an embodiment of the present invention. The system 2900 comprises a receiving electrode 2910, a detecting module 2920, and a demodulator 2930. In one embodiment, the receiving electrode 2910 may be the ring electrode 550, the tip section 230, or any other electrodes. The receiving electrode 2910 forwards the received signal to the detecting module 2920.

The detecting module comprises an analogous front end 2911 and a comparator 2912. Persons having ordinary skill in the art could understand what analogous front end 2911 does which is not elaborated here. In this embodiment, the analogous 2911 outputs a voltage signal representing the signal strength. The comparator 2912 is configured to compare a reference voltage Vref and a voltage signal representing the signal strength. If the voltage signal is higher than the reference voltage, it means that the received signal is strong enough. Thus, the comparator 2912 outputs an activation signal or an enable signal to the demodulator 2930 which is configured to demodulate the received signal to determine whether the received signal contains the frequency of the beacon signal. If the voltage signal is lower than the reference voltage, the comparator 2912 may output a disable signal to the demodulator 2930. Therefore the demodulator 2930 stops demodulating the received signal.

When the transmitter 110 did not receive the beacon signal for a while, it could be switched to a sleep mode for shutting the demodulator 2930 down to reduce power consumption. However, since the power consumption of the detecting module 2920 is not significant, it could continue detecting whether the signal strength of the received signal is over a predetermined value in the sleep mode. Once it is more than the predetermined value, the transmitter 110 may switch from the sleep mode to an energy saving mode which consume more power for activating the demodulator 2930. In the same time, the rest of the transmitter 110 may still rest in the power down state. If the demodulator 2930 determines that the received signal does not contain the beacon signal, the demodulator 2930 may be shut down after some time and the transmitter 110 switches from the energy saving mode back to the sleep mode which consume less power. Instead, if the demodulator 2930 determines that the received signal does contain the beacon signal, the demodulator 2930 can wake up the rest parts of the transmitter 110 such that the transmitter switches from the energy saving mode to normal working mode.

Now, back to embodiment of FIG. 9A, after a delay period enduring L0 length, the transmitter 110 emits electric signal during T0 and T1 periods. There may exist a delay period enduring L1 length between the T0 and T1 periods. The length of T0 period may or may not equal to the length of T1 period. The T0 and T1 periods are collectively called a signal frame. The touch sensitive processing apparatus 130 detects the electric signals emitted from the transmitter 110 during T0 and T1 periods. Next, after another optional delay time enduring L2 length, the touch sensitive processing apparatus 130 may perform optional other detection, e.g., fore-mentioned capacitance detection mode for detecting passive stylus or finger.

The present invention does not limit the lengths of delay times L0, L1, and L2, which may be zero or any other duration. The lengths of delay times L0, L1, and L2 may or may not be relevant. In one embodiment, among those periods shown in FIG. 9A, only the T0 and T1 periods of the signal frame are mandatory, other periods are optional.

TABLE 1

| State | Signal Source | Period | Barrel button pressed | Eraser button pressed | Other state |
|---|---|---|---|---|---|
| hovering | 1$^{st}$ signal source | T0 | F0 | F1 | F0 |
|  |  | T1 | F1 | F2 | F2 |
|  | 2$^{nd}$ signal source | T0 | F0 | F1 | F0 |
|  |  | T1 | F1 | F2 | F2 |

Please refer to Table 1, which shows a modulation table of electric signals emitted by the transmitter 110 in accordance with an embodiment of the present invention. As shown in Table 1, the state of the transmitter 110 is hovering, i.e., no pressure is measured by the force sensor. Since the tip section 230 of the transmitter 110 does not contact the touch panel 120, the first and second signal sources 211 and 212 emit the same frequency group Fx simultaneously in the same period in order to enhancing the signal strength in the embodiment shown in Table 1. For example, in case the barrel button is pressed, these two signal sources both emits frequency group F0 during the T0 period and frequency F1 during the T1 period. If the touch sensitive processing apparatus 130 detects signals with frequency group F0 during the T0 period and signals with frequency group F1 during the T1 period, it is determined that the barrel button of the hovering transmitter 110 is pressed.

The frequency group Fx comprises at least one frequency. Frequencies classified in the same frequency group are interchangeable. For example, frequency group F0 comprises f0 and f3 frequencies; frequency group F1 comprises f1 and f4 frequencies; and frequency group F2 comprises f2 and f5 frequencies. No matter which one of f0 and f3 frequencies is detected, the touch sensitive processing apparatus 130 takes that frequency group F0 is received.

In another embodiment, it is not required to have both signal sources 211 and 212 of the transmitter 110 emitting signals with the same frequency group. Table 1 is just an example of the present embodiment. Besides, the transmitter 110 may comprises more buttons or sensors. The present invention does not limit to two buttons.

TABLE 2

| State | Signal Source | Period | Barrel button pressed | Eraser button pressed | Other state |
|---|---|---|---|---|---|
| Touching | 2$^{nd}$ signal source | T0 | F0 | F1 | F0 |
| | | T1 | GND | GND | GND |
| | 1$^{st}$ signal source | T0 | GND | GND | GND |
| | | T1 | F1 | F2 | F2 |

Please refer to Table 2, which shows a modulation table of electric signals emitted by the transmitter 110 in accordance with an embodiment of the present invention. As shown in Table 2, the state of the tip section 230 of the transmitter 110 is touching, i.e., pressure is measured by the force sensor.

With regard to the embodiment shown in FIG. 4A, the following describes what happened if the barrel button is pressed. During the T0 period, the first signal source output is grounded and the second signal source emits signals with frequency group F0. During the T1 period, the second signal source output is grounded and the first signal source emits signals with frequency group F1. Furthermore, since the impedance of the first capacitor 321 is changed in the touching state, the pressure level of the tip section 230 could be calculated according to the signal strengths with regard to frequency groups F0 and F1 during the T0 and T1 periods, respectively. Besides, because the touch sensitive processing apparatus 130 detects frequency group F0 during the T0 period and detects frequency group F1 during the T1 period, it is determined that the barrel button is pressed.

With regard to the embodiment shown in FIG. 4A, the following describes what happened if the barrel button is pressed. During the T0 period, the first signal source output is grounded and the second signal source emits signals with frequency group F0. The second capacitor 322 is connected with the barrel capacitor 442 in parallel. Although the electric signals emitted from the transmitter 110 during the T0 period only contains signals with frequency group F0 from the 2$^{nd}$ signal source, the signal strength is different from the one which the barrel button is not pressed. During the T1 period, the second signal source output is grounded and the first signal source emits signals with frequency group F1. Furthermore, since the impedance of the first capacitor 321 is changed in the touching state, the pressure level of the tip section 230 could be calculated according to the signal strengths with regard to frequency groups F0 and F1 during the T0 and T1 periods, respectively. Besides, because the touch sensitive processing apparatus 130 detects frequency group F0 during the T0 period and detects frequency group F1 during the T1 period, it is determined that the barrel button is pressed.

TABLE 3

| State | Signal Source | Period | Barrel button pressed | Eraser button pressed | Other state |
|---|---|---|---|---|---|
| hovering | 2$^{nd}$ signal source | T0 | F0 | F1 | F2 |
| | | T1 | F0 | F1 | F2 |
| | 1$^{st}$ signal source | T0 | F0 | F1 | F2 |
| | | T1 | F0 | F1 | F2 |

Please refer to Table 3, which shows a modulation table of electric signals emitted by the transmitter 110 in accordance with an embodiment of the present invention. In this embodiment, according to the received frequency group, it is able to know which button is pressed.

TABLE 4

| State | Signal Source | Period | Barrel button pressed | Eraser button pressed | Other state |
|---|---|---|---|---|---|
| Touching | 2$^{nd}$ signal source | T0 | F0 | F1 | F2 |
| | | T1 | GND | GND | GND |
| | 1$^{st}$ signal source | T0 | GND | GND | GND |
| | | T1 | F0 | F1 | F2 |

Please refer to Table 3, which shows a modulation table of electric signals emitted by the transmitter 110 in accordance with an embodiment of the present invention. In this embodiment, according to the received frequency group, it is able to know which button is pressed. The pressure level of the tip section could be calculated according to a received signal strength ratio between the T0 and T1 periods.

Figure 9B:
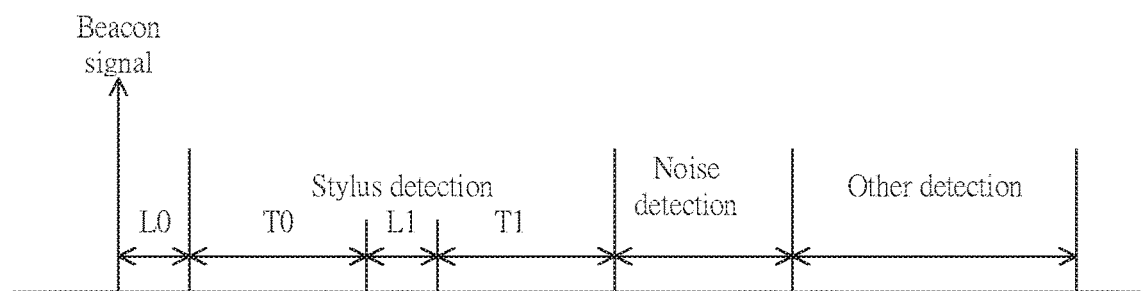
FIG. 9B shows a timing sequence of signal modulation in accordance with an embodiment of the present invention.

Please refer to FIG. 9B, which shows a timing sequence of signal modulation in accordance with an embodiment of the present invention. The embodiment is a variation of the embodiment shown in FIG. 9A. The difference resides between these two embodiments shown in FIGS. 9A and 9B is that a noise detection taking place after the T1 period. After that, other detection is performed.

Figure 9C:
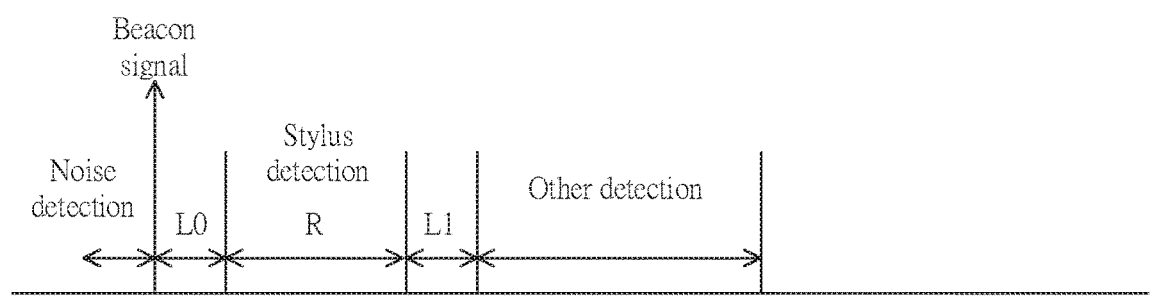
FIG. 9C shows a timing sequence of signal modulation in accordance with an embodiment of the present invention.

Please refer to FIG. 9C, which shows a timing sequence of signal modulation in accordance with an embodiment of the present invention. The modulation shown in FIG. 9C may apply to the transmitter 110 shown in FIG. 5. One additional function of the ring electrode 550 is to enhancing emitted signal strength of active stylus. Thus the detection range of the hovering active stylus could be increased consequently.

The modulation shows in FIG. 9C is when the transmitter 110 is hovering. In this state, the time period which the transmitter 110 emits signals contains the R time period, merely. During this R period, both the ring electrode 550 and the tip section 230 transmit electric signals together. In one embodiment, the electric signals may come from the same signal source with the same frequency and modulations. For example, both the ring electrode 550 and the tip section 230 transmit signals from the signal source 513. In another instance, both the ring electrode 550 and the tip section 230 may simultaneously transmit signals from the first, the second, and the third signal sources in turns, such that it utilizes the maximum power of each signal sources. The touch sensitive processing apparatus 130 can conclude the position the transmitter 110 is hovering above the touch panel 120 by detecting the electric signals emitted from the ring electrode 550 during the R period. If the electric signals from the ring electrode 550 and the tip section 230 comes from the same signal source or have the same frequency group, the signal strength would be maximized. In consequence, the detecting range of the hovering transmitter 110 by the touch panel 120 would be maximized. Alternatively, the transmitter 110 transmits electric signals via only the ring electrode 550 during the R period.

Figure 9D:
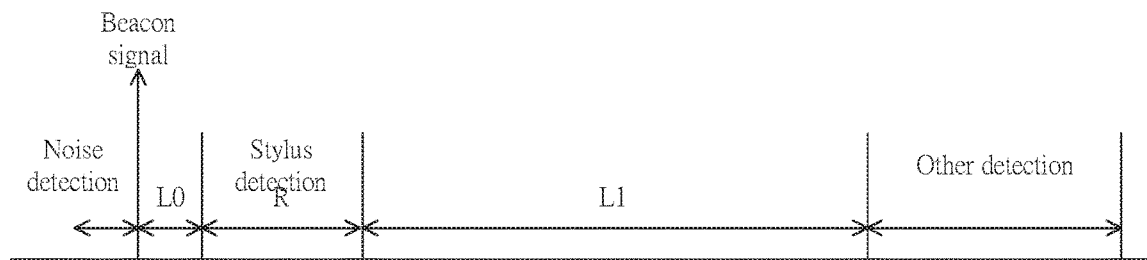
FIG. 9D shows a timing sequence of signal modulation in accordance with an embodiment of the present invention.

Please refer to FIG. 9D, which shows a timing sequence of signal modulation in accordance with an embodiment of the present invention. The modulation shown in FIG. 9D may apply to the transmitter 110 shown in FIG. 5. In the embodiment shown in FIG. 9C, a delay time or blank period L1 is included after the R period. The touch panel 120 performs other detection after the period L1. Comparing with the embodiment shown in FIG. 9C, the period L1 in the embodiment shown in FIG. 9D is extended. Comparing with the embodiment shown in FIG. 9E, the period L1 in the embodiment shown in FIG. 9D equals to the sum of L1, T0, L2, T1, and T3 periods. Thus, if no further electric signal could be detected by the touch sensitive processing apparatus 130 shown in FIG. 9D, it is determined that the transmitter 110 is in the state of hovering.

Figure 9E:
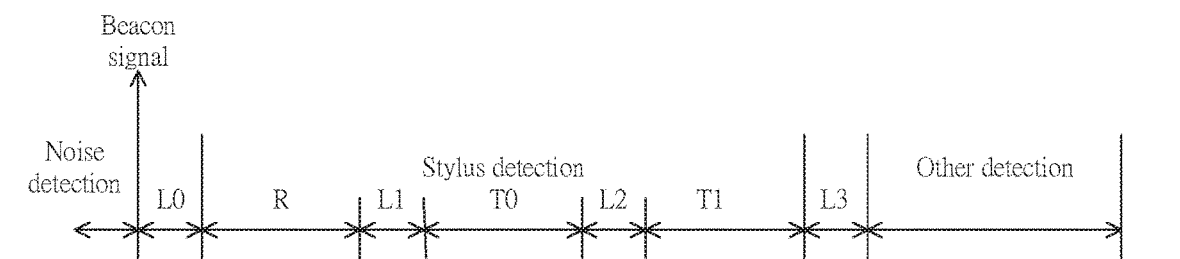
FIG. 9E shows a timing sequence of signal modulation in accordance with an embodiment of the present invention.

Please refer to FIG. 9E, which shows a timing sequence of signal modulation in accordance with an embodiment of the present invention. The modulation shown in FIG. 9E may apply to the transmitter 110 shown in FIG. 5. The embodiment shown in FIG. 9E is equivalent to add an R period prior to the time frame of the embodiment shown in FIG. 9A. In this embodiment, no matter whether the tip section 230 is touched or not, the transmitter 110 always transmits electric signal from the tip section during the T0 and T1 periods such that some logic design for controlling could be omitted. However, comparing with the embodiments shown in FIGS. 9C and 9D, the embodiment shown in FIG. 9E would waste power consumed during the T0 and T1 periods. On the other hand, the touch sensitive processing apparatus 130 no longer needs to perform detection during the R period as long as the electric signals from the tip section 230 could be detected during the T0 and T1 periods. It could be determined that whether the tip section 230 is pressed or not and further determined that the transmitter 110 is in the state of hovering or not.

Figure 9F:
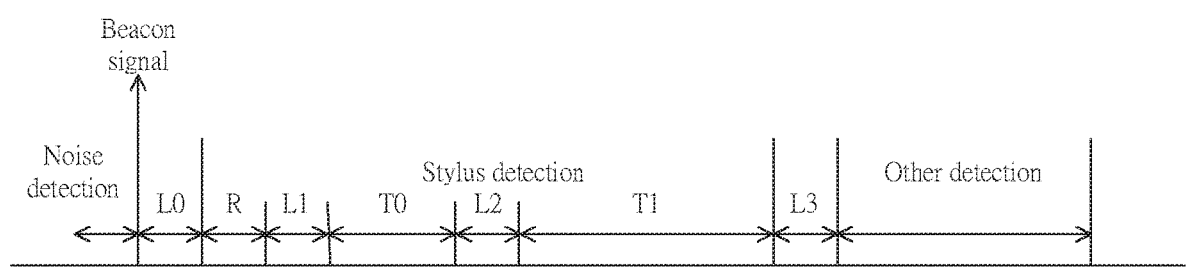
FIG. 9F shows a timing sequence of signal modulation in accordance with an embodiment of the present invention.

Please refer to FIG. 9F, which shows a timing sequence of signal modulation in accordance with an embodiment of the present invention. The modulation shown in FIG. 9F may apply to the transmitter 110 shown in FIG. 5. In the embodiment shown in FIG. 9E, no proportional relation is defined over lengths of the R, T0, and T1 periods. Instead, in the embodiment shown in FIG. 9F, the ratios between lengths of the R, T0, and T1 periods is 1:2:4. Assuming that the touch sensitive processing apparatus 130 could perform N sampling during one time unit, where N is a positive integer. Hence, touch sensitive processing apparatus 130 could perform N, 2N, and 4N samplings during the R, T0, and T1 periods, respectively. The present invention does not limit the ratios between the lengths of these three periods. In one instance, the period with the most powerful electric signal endures the shortest time; the period with the weakest electric signal endures the longest time. For examples, the ratios may be 1:3:2, 1:2:3, or etc. The design of ratios depends on the implementation. Although the paragraphs above enumerate modulations in two periods T0 and T1 merely, the present invention does not limit to that. More periods is applicable to the present invention.

In one embodiment, the transmitter 110 could transmit stronger electric signals in the state of hovering and transmit weaker electric signals in the state of touching. Consequently, it increases the chance for the touch sensitive processing apparatus 130 detects the transmitter 110 hovering above the touch panel 120. When the transmitter 110 contacts the touch panel 120, it further reduces the power consumption of the transmitter 110.

For examples, in the embodiments shown in FIGS. 9C and 9D, when the tip section 230 is not touched, the electric signal emitted during the R period is stronger than the electric signal emitted during the L1 period which corresponding to the T0 and T1 periods.

The signal modulation represents that the transmitter 110 is in the state of hovering. In such state, the signal frame the transmitter 110 emits electric signal contains only one R period. During this R period, both the ring electrode 550 and the tip section 230 transmit the electric signals concurrently. In one embodiment, the electric signals may be come from the same signal source and having the same frequency and/or modulation. In one instance, both the ring electrode 550 and the tip section 230 transmit signals from the third signal source 513. Alternatively, the ring electrode 550 and the tip section 230 may transmit signals from the first, second, and third signal sources 211, 212, and 513. Hence the electric signal emitted during the R period is the sum of output powers of these three signal sources.

In the Table 1 embodiment shown in FIG. 9A, when the transmitter 110 in the state of hovering, output power come from the first signal source 211 and the second signal source 212. In the Table 2, when the transmitter 110 in the state of touching, output power come from one of first signal source 211 and the second signal source 212 during the T0 and T1 periods. Hence, the transmitter 110 emits stronger electric signal if the tip section is not touched and emits weaker electric signal if the tip section is pressed.

Similarly, in the Table 3, the transmitter 110 utilizes output power from both the first signal source 211 and the second signal source 212 in the state of hovering. Instead, in the Table 4, the transmitter 110 makes use of one of the first signal source 211 and the second signal source 212 during the T0 and T1 periods. Hence, the transmitter 110 emits stronger electric signal if the tip section is not touched and emits weaker electric signal if the tip section is pressed.

Figure 10:
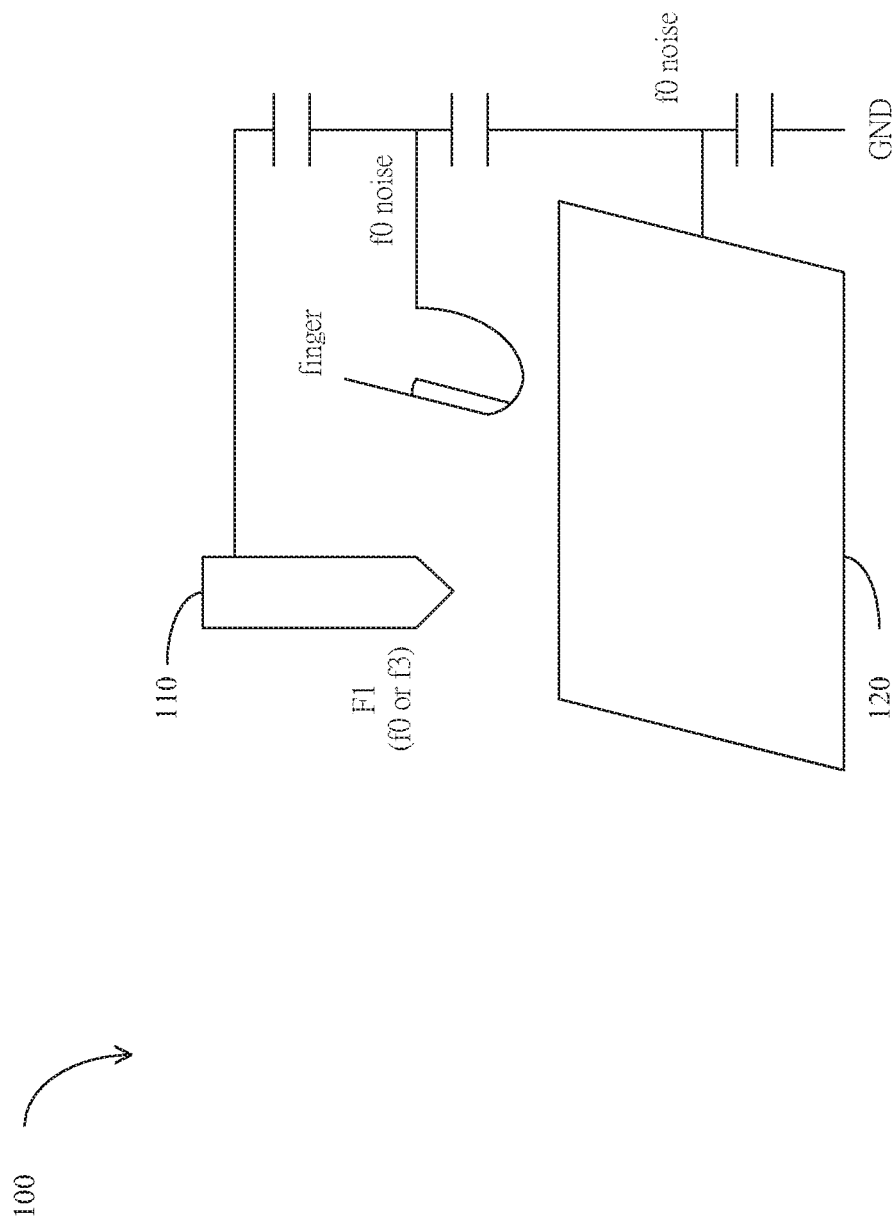
FIG. 10 shows noise propagation path in accordance with an embodiment of the present invention.

The reason for adding noise detection period in the embodiments shown in FIG. 9A through 9F is described below. Please refer to FIG. 10, which shows noise propagation path in accordance with an embodiment of the present invention. As shown in FIG. 10, the electronics 100 including the touch panel 120 emits noise signals with frequency f0, which is a member of frequency group F0. It is assumed that the frequency group F0 contains another member frequency f3. When user holds the electronics 100, the noise with frequency f0 would propagate to the touch panel 120 via the user's finger. If no noise detection is performed, the touch panel 120 may take the noise with frequency f0 from the finger as the electric signal emitted by the transmitter 110. Hence, if the noise with frequency f0 could be detected in advanced, it could be filtered out from the signal frame.

In case the transmitter 110 is capable to change frequency, it can automatically transmit signal with another member frequency f3 of the frequency group F0 if the noise with frequency f0 is detected. Consequently, during the periods of signal frame, the touch sensitive processing apparatus 130 detects signal with frequency f3 from the transmitter 110 and noise signal with frequency f0 from the finger. This confuses the touch sensitive processing apparatus 130. Therefore it can perform a noise detection after the T1 period or the signal frame as the embodiment shown in FIG. 9B. At this moment, since the transmitter 110 ceases transmitting signals with frequency f3 while the noise signal with frequency f0 from the finger and the touch panel 120 stands still, it could be determined by the touch sensitive processing apparatus 130 that the signal with frequency f3 detected during the time frame is the signal came from the transmitter 110.

It is mentioned in the description related to FIG. 2 that the signal strength ratio is changed according to impedance variation of the first component 221. Please refer to FIG. 11, which depicts a structure diagram of a first capacitor 221 in accordance with an embodiment of the present invention. By changing the impedance of the first capacitor 221 to adjust the signal strength ratio of multiple frequencies. Traditional capacitor is formed by two plates of conducting metal. The capacitance C is proportional to the permittivity and the plate areas and inversely proportional to the distance between these two plates.

One aspect of the embodiment is to use a mechanic structure for transforming a displacement along the axis of the transmitter 110 to another displacement vertical or angled to the axis. By creating the displacement, the capacitance and first impedance Z1 of the first capacitor 221 are changed accordingly while keeps the capacitance and second impedance Z2 of the second capacitor 222 intact, such that the ratio between the signal strength M1 with first frequency (group) and the signal strength M2 with second frequency (group).

Figure 11:
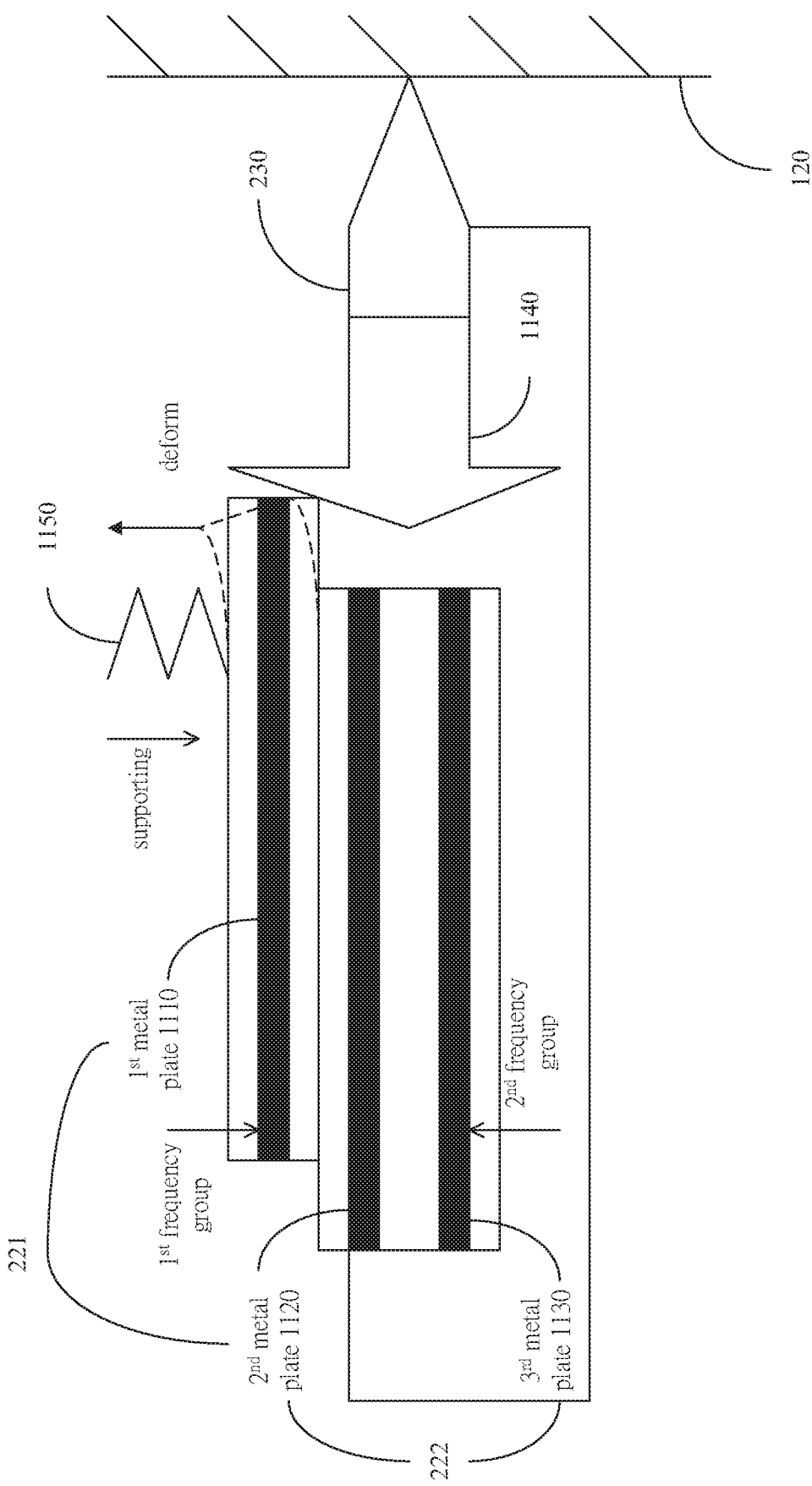
FIG. 11 depicts a structure diagram of a first capacitor 221 in accordance with an embodiment of the present invention.

There exist three non-contacting metal plates shown in FIG. 11. The first capacitor 221 is formed by a first metal plate 1110 and a second metal plate 1120. The second capacitor 222 is formed by the second metal plate 1120 and a third metal plate 1130. In one instance, the first metal plate 1110 is formed on a flexible circuit board or printed circuit board which covers with insulating paint or dielectric plate. The second metal plate 1120 and the third metal plate 1130 are formed in the double sides of the same circuit board or printed circuit board which also covers with insulating paint or dielectric plate. The second metal plate 1120 is coupled to the fore-end tip section 230 through wiring. The tip is attached to a lifting element 1140 (e.g. the ramp means). A movement of the tip can directly or indirectly deform whole or part of the first metal plate 1110 (and flexible circuit board or PCB) such that a displacement vertical to along the axis of the transmitter 110 or stylus is created accordingly.

The first metal plate 1110 is supplied with electric signal with first frequency (group) and the third metal plate 1130 is supplied with electric signal with second frequency (group). Therefore current induced in the second metal plate 1120 generates signals with the first frequency (group) and the second frequency (group) which is sent to the touch panel 120 via the fore-end tip section 230. When the tip section 230 is not pressed, the first metal plate 1110 and its circuit board do not have a displacement vertical to the axis of the transmitter 110. However, when the tip section 230 is pressed, the ramp means 1140 transforms the force parallel to the axis to the direction vertical to the axis such that the circuit board of the first metal plate 1110 deforms and moves. Furthermore, the permittivity of the first capacitor 221 changes accordingly, so do the capacitance C1 and impedance Z1 of the first capacitor 221. When the tip section 230 is pressed, the circuit board of the second metal plate 1120 and the third metal plate 1130 moves as a whole. Therefore the capacitance C2 and impedance Z2 of the second capacitor 222 remains the same.

Since the circuit board of the first metal plate 1110 deforms upward, the embodiment may include at least one supporting element 1150 to provide support downward for helping the circuit board of the first metal plate 1110 recover to the original shape after the pressure to the tip section 230 is dismissed. When the circuit board is not deformed, the supporting force provided by the supporting element may be zero.

In one example of the present embodiment, the capacitances of the first capacitor 221 and the second capacitor 222 may equals. If so, the permittivity, distance, and area of these two capacitors are the same. However, the present invention does not limit to the condition. It only requires that the touch sensitive processing apparatus 130 is known about the impedance ratio between these two capacitors of the transmitter 110.

In this embodiment, expensive force sensing resistor is replaced by cheaper circuit board or PCB. Besides, if the capacitances of the first capacitor 221 and the second capacitor 222 are designed to be equal, permittivity of these two capacitors 221 and 222 would be varied in the same rate due to environmental change. Hence the default ratio could be maintained consequently. Besides, it does not require any active controlling component to adjust the ratio of these two impedances Z1 and Z2. The transmitter 110 could provide electric signal passively. So many resources could be saved.

Figure 12:
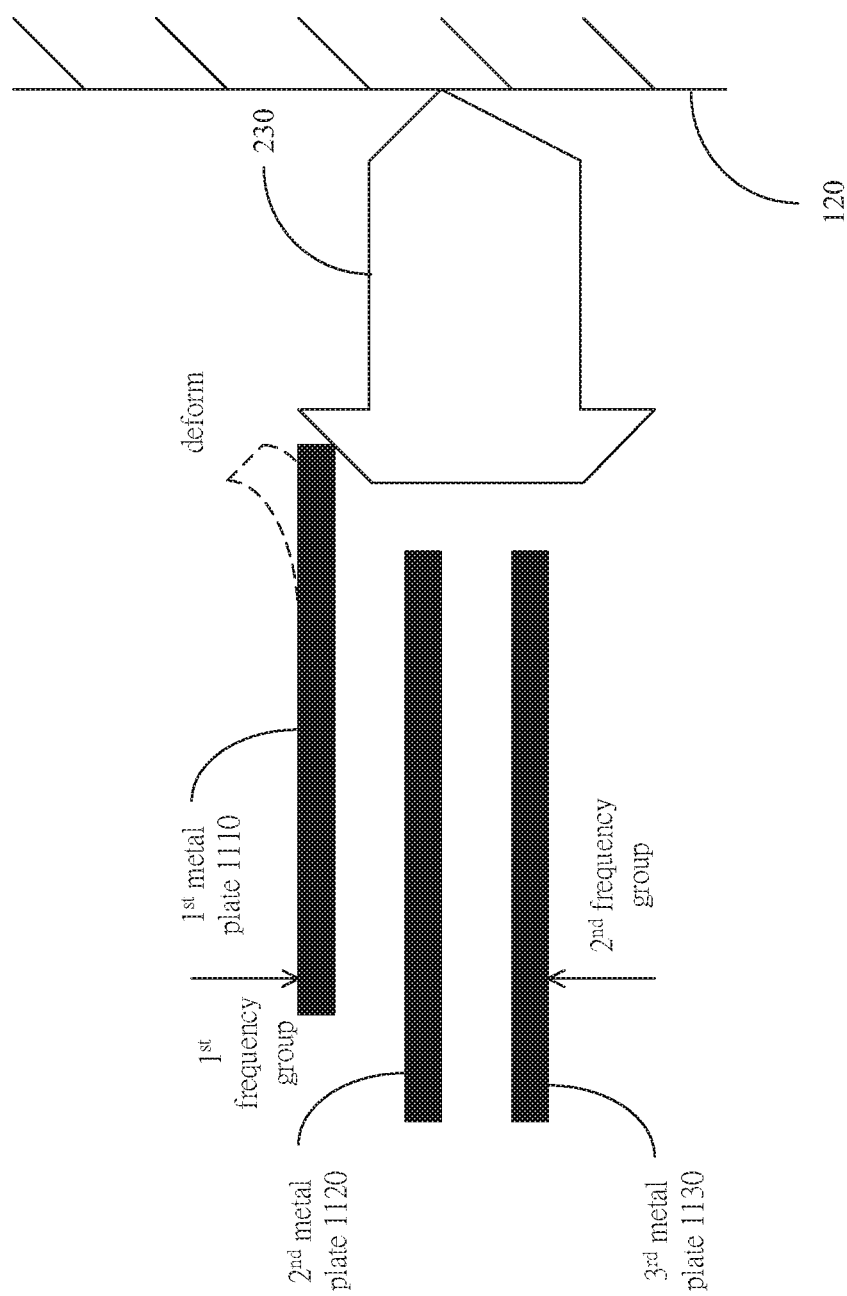
FIG. 12 shows a diagram of reduced embodiment shown in FIG. 11.

Please refer to FIG. 12, which shows a diagram of reduced embodiment shown in FIG. 11. The circuit board, supporting element 1150, and the wiring between the second metal plate 1120 and the tip section 230 are omitted. The description of embodiment shown in FIG. 12 can reference those for FIG. 11.

Figure 13:
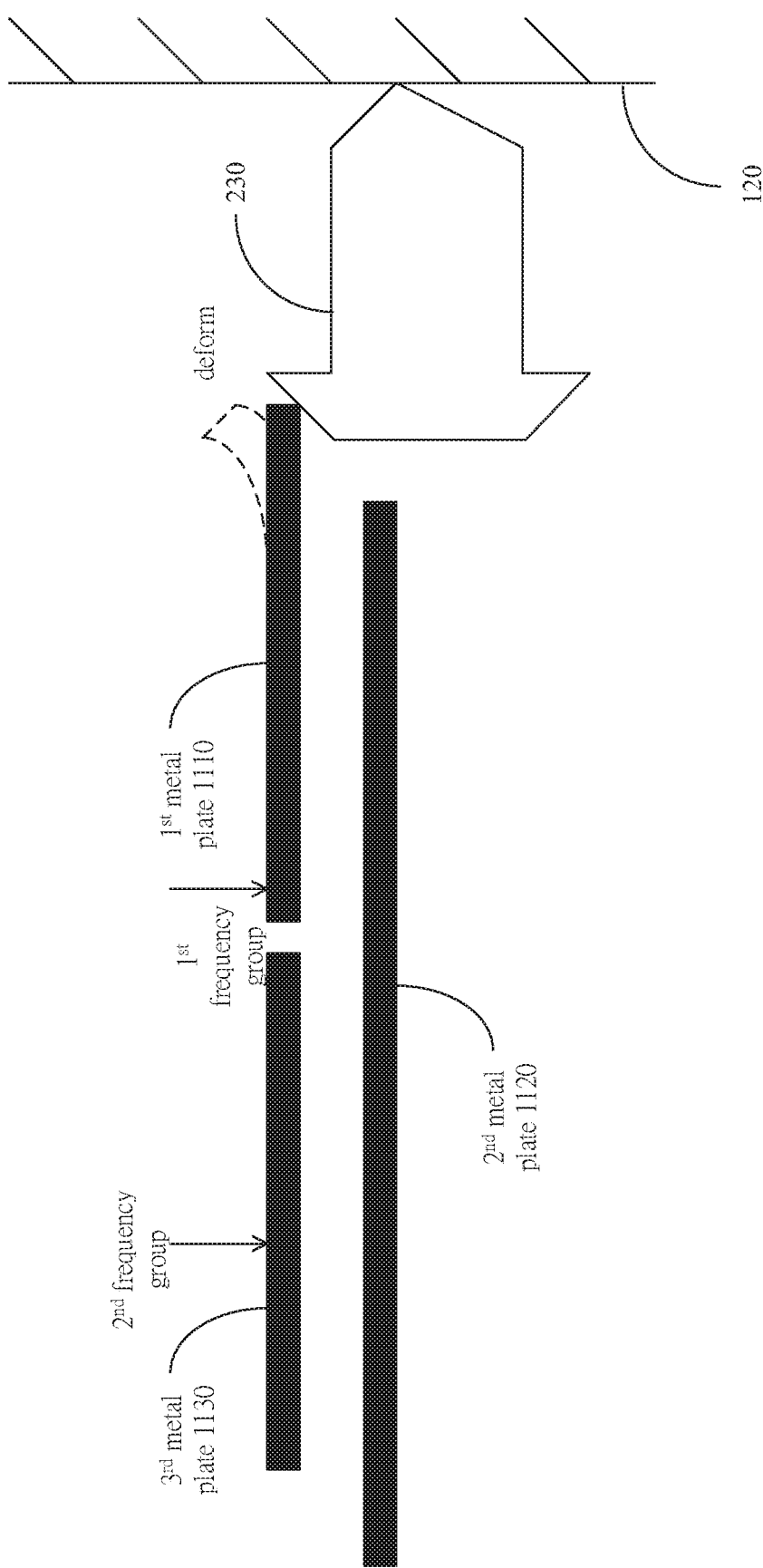
FIG. 13 is a variation of the embodiment shown in FIG. 12.

Please refer to FIG. 13, which is a variation of the embodiment shown in FIG. 12. The third metal plate 1130 is moved to the aft of the first metal plate 1110 and they are not electrically coupled. When the tip section 230 is pressed, only the first metal plate 1110 and its circuit board deform. In some examples, the first metal plate 1110 and the third metal plate 1130 may be formed on the same circuit board.

Figure 14:
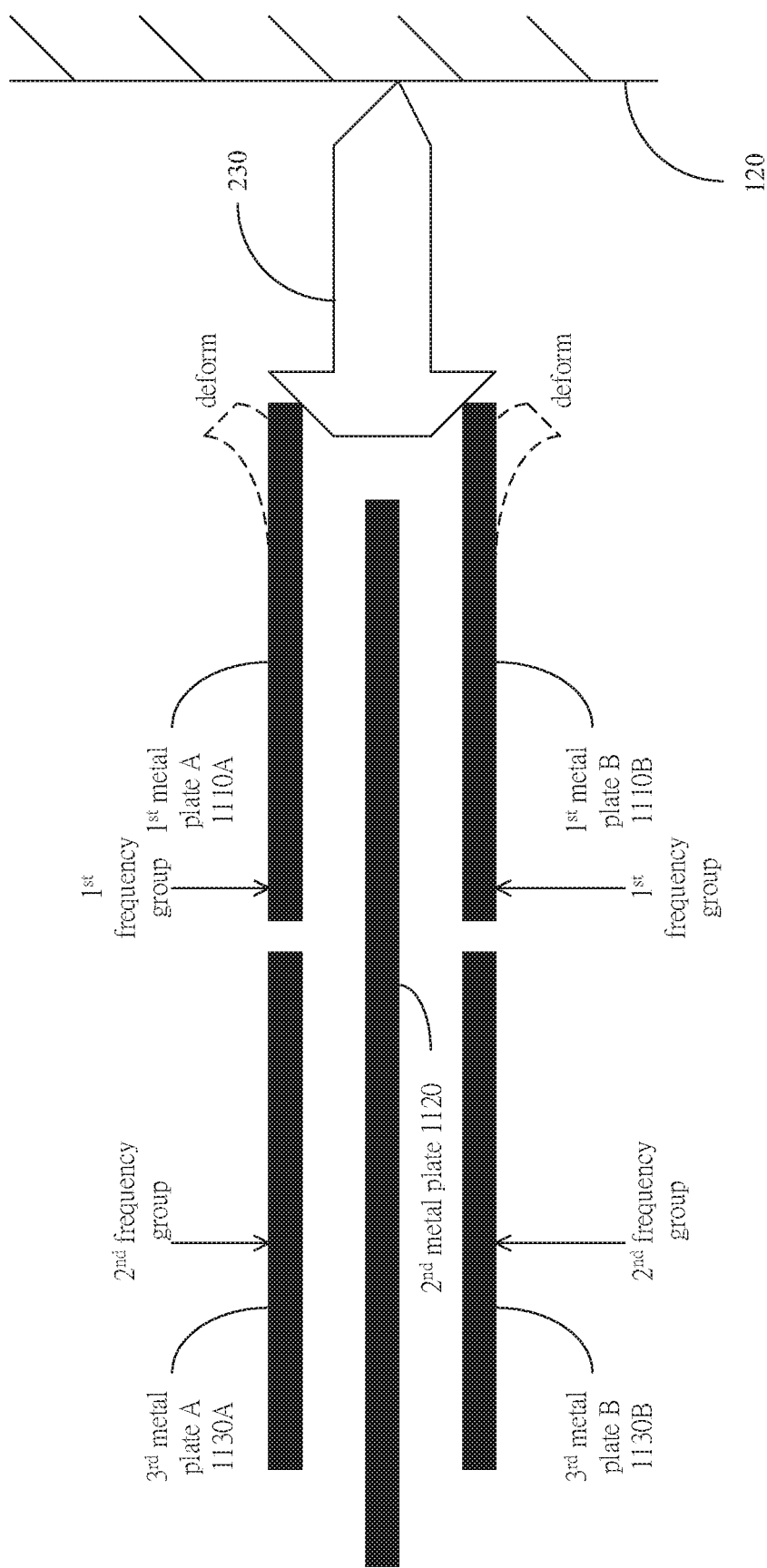
FIG. 14 is a variation of the embodiment shown in FIG. 13.

Please refer to FIG. 14, which is a variation of the embodiment shown in FIG. 13. The first metal plate 1110 and the third metal plate 1130 comprise two plates A and B, respectively. They are feed into signals with first frequency (group) and second frequency (group), respectively. When the tip section 230 is pressed, the first metal plate A 1110A, the first metal plate B 1110B, and their circuit board deforms, but the third metal plate A 1130A, the third metal plate B 1130B, and their circuit board do not deform. Comparing with the embodiment shown in FIG. 13, since there are two deforming metal plates 1110A and 1110B, the impedance variation would be larger and more obvious than the variation of the embodiment shown in FIG. 13.

Figure 15:
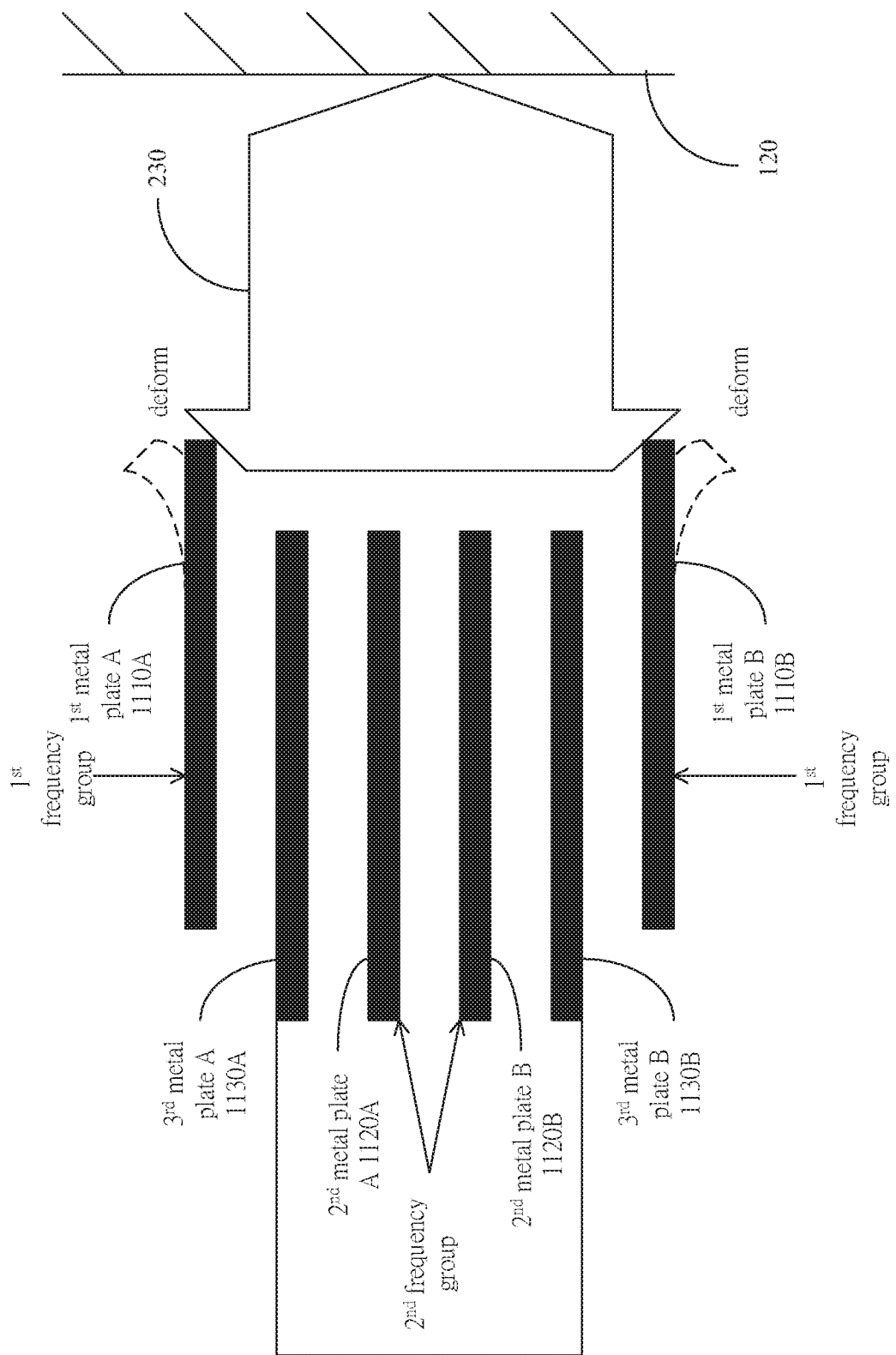
FIG. 15 is a variation of the embodiment shown in FIG. 14.

Please refer to FIG. 15, which is a variation of the embodiment shown in FIG. 14. The second metal plate 1120 also comprise two plate A 1120A and plate B 1120B, which are coupled to the tip section 230 through wiring. A first capacitor A 221A is formed by the first metal plate A 1110A and the second metal A 1120A. A second capacitor A 222A is formed by the second metal plate A 1120A and the third metal plate A 1130A. A first capacitor B 221B is formed by the first metal plate B 1110B and the second metal B 1120B. A second capacitor B 222B is formed by the second metal plate B 1120B and the third metal plate B 1130B. When the tip section is pressed, the first metal plate A 1110A, the first metal plate B 1110B, and their circuit boards deform. However, the third metal plate A 1130A, the third metal plate B 1130B, and their circuit boards remains the same. Comparing with the embodiment shown in FIG. 13, since there are two deforming metal plates 1110A and 1110B, the impedance variation would be larger and more obvious than the variation of the embodiment shown in FIG. 13.

Figure 16A:
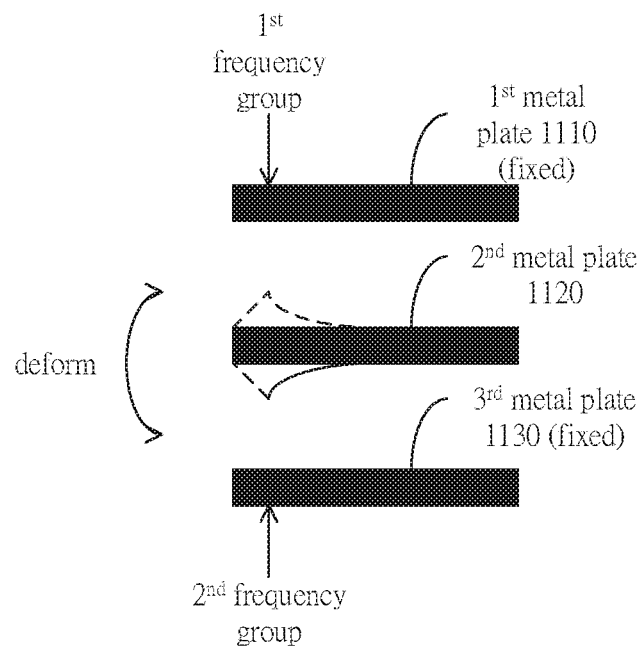
FIG. 16A shows a structure in accordance with an embodiment of the present invention.

Please refer to FIG. 16A, which shows a structure in accordance with an embodiment of the present invention. In the embodiment shown in FIG. 16A, there are a first metal plate 1110, a second metal plate 1120, and a third metal plate 1130 from top to bottom. The first metal plate 1110 and the third metal plate 1130 are fixed and fed in signals with first frequency (group) and second frequency (group), respectively. Current induced from the second metal plate 1120 generates electric signals mixed with first frequency (group) and second frequency (group).

A first capacitor 221 is formed by the first metal plate 1110 and the second metal plate 1120. A second capacitor 222 is formed by the second metal plate 1120 and the third metal plate 1130. When the second metal plate 1120 is not deformed, the impedances of the first capacitor 221 and the second capacitor 222 are fixed in the same environment. Hence a strength ratio of signal with first frequency (group) and signal with second frequency (group) contained in the electric signal could be calculated. If the ratio is a predetermined value or falls into a predetermined range, it is concluded that the second metal plate 1120 is not deformed.

If the second metal plate 1120 deforms, the impedances and capacitances of the first capacitor 221 and the second capacitor 222 change accordingly. In consequence, a strength ratio could be calculated according to these two signal strength values. Based on the variation of the ratio, the deforming and displacement of the second metal plate 1120 could be calculated. Steps shown in the embodiment of FIG. 6 could be applicable here.

Figure 16B:
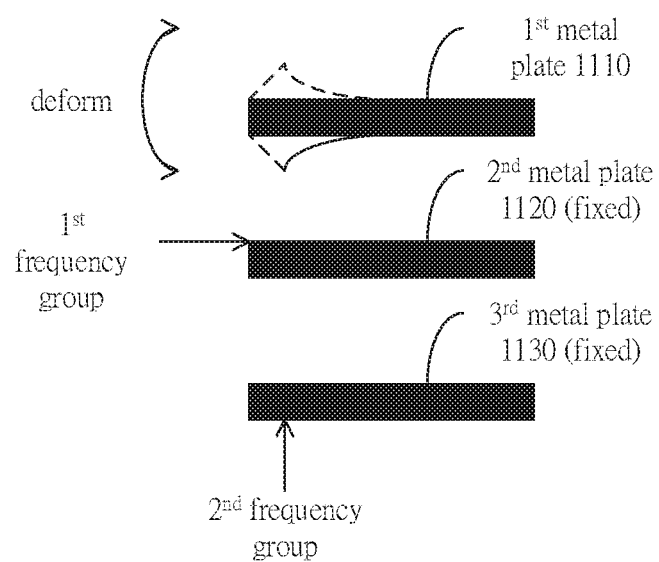
FIG. 16B is a variation of the embodiment shown in FIG. 16A.

Please refer to FIG. 16B, which is a variation of the embodiment shown in FIG. 16A. The second metal plate 1120 and the third metal plate 1130 are fixed and fed in signals with first frequency (group) and second frequency (group), respectively. Current induced from the first metal plate 1110 generates electric signals mixed with first frequency (group) and second frequency (group).

A first capacitor 221 is formed by the first metal plate 1110 and the second metal plate 1120. A second capacitor 222 is formed by the first metal plate 1110 and the third metal plate 1130. When the first metal plate 1110 is not deformed, the impedances of the first capacitor 221 and the second capacitor 222 are fixed in the same environment. Hence a strength ratio of signal with first frequency (group) and signal with second frequency (group) contained in the electric signal could be calculated. If the ratio is a predetermined value or falls into a predetermined range, it is concluded that the first metal plate 1110 is not deformed.

If the first metal plate 1110 deforms, the impedances and capacitances of the first capacitor 221 and the second capacitor 222 change accordingly. In consequence, a strength ratio could be calculated according to these two signal strength values. Based on the variation of the ratio, the deforming and displacement of the first metal plate 1110 could be calculated. Steps shown in the embodiment of FIG. 6 could be applicable here. The impedance may be changed according to variations of temperature and humanity. However, both impedances of the first capacitor 221 and the second capacitor 222 change together according to the environmental variations of temperature and humanity. Therefore, influence on the ratio caused by temperature and humanity could be reduced or eliminated.

Figure 17A:
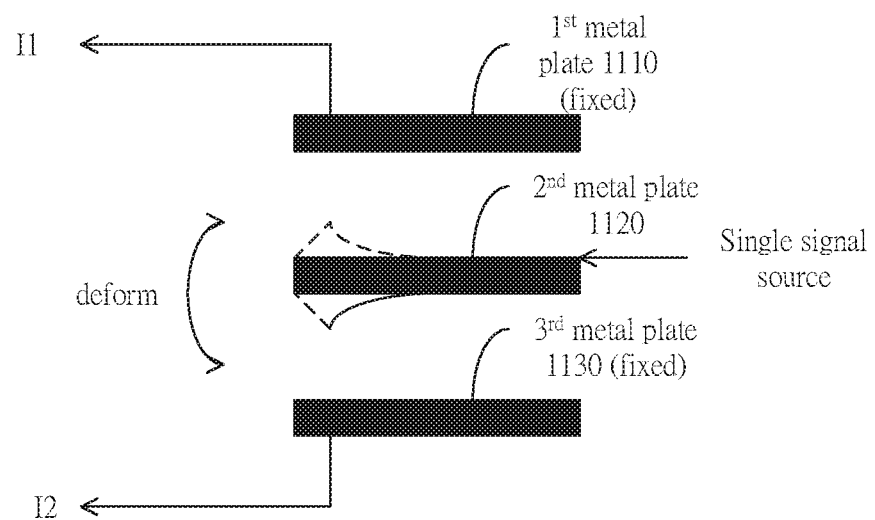
FIGS. 17A and 17B show structural diagrams of the first capacitor and the second capacitor in accordance with an embodiment of the present invention.
Figure 17B:
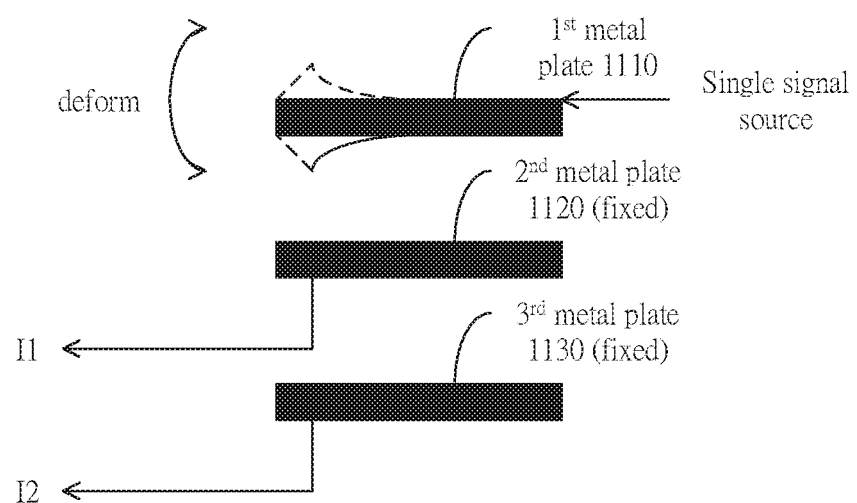

Please refer to FIGS. 17A and 17B, which show structural diagrams of the first capacitor and the second capacitor in accordance with an embodiment of the present invention. In the embodiment shown in FIGS. 16A and 16B, signals with first frequency (group) and second frequency (group) are fed. However, in the embodiment shown in FIGS. 17A and 17B, a driving signal with the same frequency is fed. In other words, the embodiments can be applicable to those embodiments shown in FIGS. 7A through 7D. The driving signal fed in could be the signal source 714 of the embodiments shown in FIGS. 7A and 7B. The electric signal from the transmitter wired communication unit 771 of the embodiment shown in FIG. 7C could be the signal source. Moreover, the electric signal received from the first electrodes 121 and/or the second electrodes 122 of the touch panel when the tip section 230 shown in FIG. 7D approximates or touches could be used as the signal source.

The structure of three metal plates as shown in FIG. 17A is identical to the structure of three metal plates as shown in FIG. 16A. A driving signal with a frequency may feed into the deformable second metal plate 1120. Due to capacitive effect between the second metal plate 1120, the first metal plate 1110 outputs the induced current with a current value I1. Analogously, Due to capacitive effect between the second metal plate 1120, the third metal plate 1130 outputs the induced current with a current value I2.

A first capacitor 221 is formed by the first metal plate 1110 and the second metal plate 1120. A second capacitor 222 is formed by the second metal plate 1120 and the third metal plate 1130. When the second metal plate 1120 is not deformed, the impedances of the first capacitor 221 and the second capacitor 222 are fixed. Hence, the current values I1 and I2 are analyzed and a ratio is calculated according to these two current values. When the ratio is a predetermined value or falls into a predetermined range, it is determined that the second metal plate 1120 is not deformed.

When the second metal plate 1120 is deformed, the impedances and capacitance of the first capacitor 221 and the second capacitor 222 are changed. Hence, a ratio is calculated according to these two current values. Based on the variation of the ratio, the deforming and displacement of the second metal plate 1120 could be deduced in consequence. The embodiment shown in FIG. 8 could be applicable here.

Please refer to FIG. 17B, which is a variation of the embodiment shown in FIG. 17A. The second metal plate 1120 and the third metal plate 1130 are fixed. The driving signal with a frequency is fed into the deformable first metal plate 1110. Due to capacitive effect between the first metal plate 1110, the second metal plate 1120 outputs the induced current with a current value I1. Analogously, Due to capacitive effect between the first metal plate 1110, the third metal plate 1130 outputs the induced current with a current value I2.

A first capacitor 221 is formed by the first metal plate 1110 and the second metal plate 1120. A second capacitor 222 is formed by the first metal plate 1110 and the third metal plate 1130. When the first metal plate 1110 is not deformed, the impedances of the first capacitor 221 and the second capacitor 222 are fixed. Hence, the current values I1 and I2 are analyzed and a ratio is calculated according to these two current values. When the ratio is a predetermined value or falls into a predetermined range, it is determined that the first metal plate 1110 is not deformed.

When the first metal plate 1110 is deformed, the impedances and capacitance of the first capacitor 221 and the second capacitor 222 are changed. Hence, a ratio is calculated according to these two current values. Based on the variation of the ratio, the deforming and displacement of the first metal plate 1110 could be deduced in consequence. The embodiment shown in FIG. 8 could be applicable here.

Figure 18:
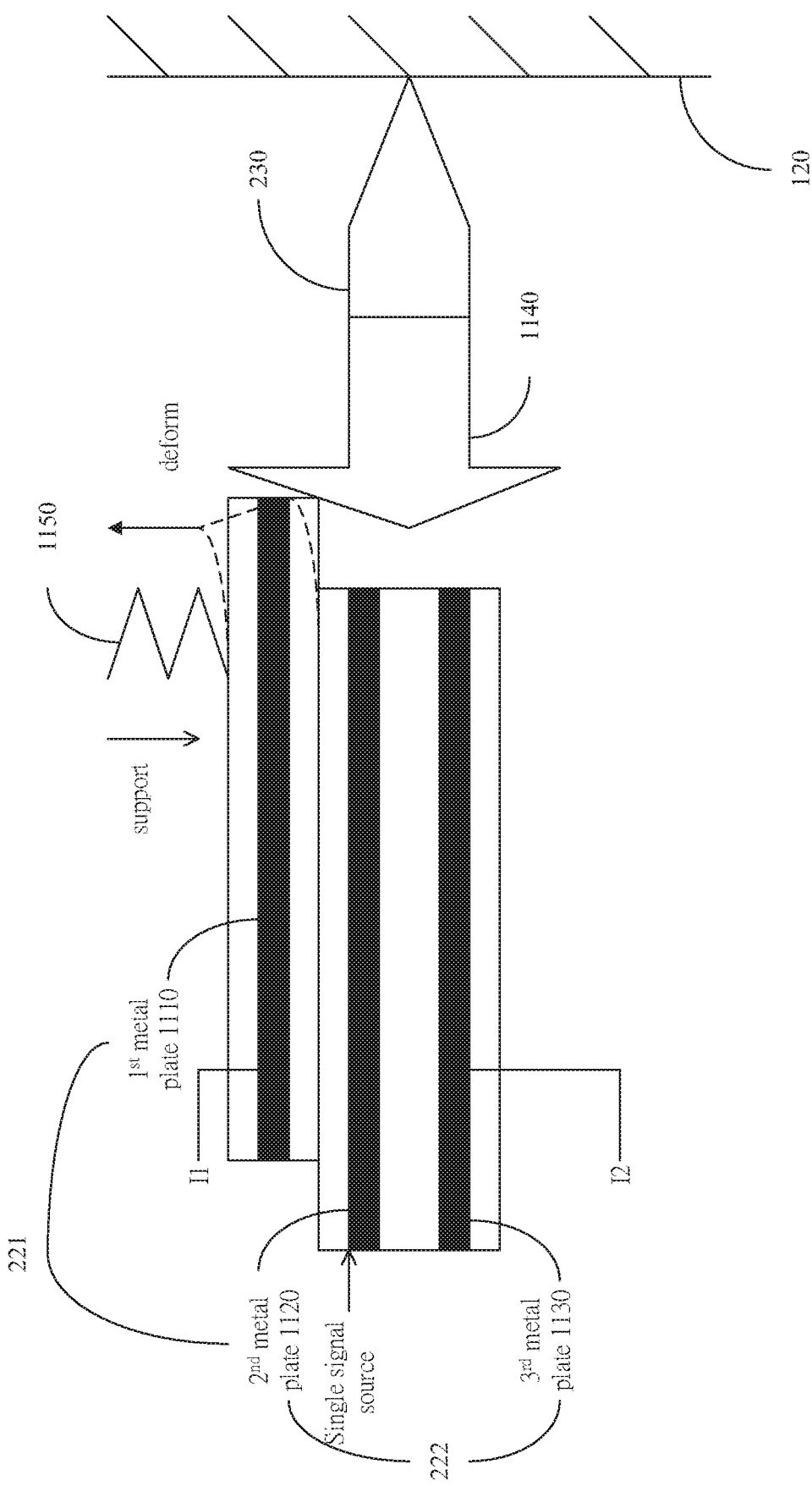
FIG. 18 is a variation of the embodiment shown in FIG. 11.

Please refer to FIG. 18, which is a variation of the embodiment shown in FIG. 11. The embodiment shown in FIG. 11 requires feeding signals with two different frequencies. Instead, in the embodiment shown in FIG. 18 as well as those shown in FIGS. 17A and 17B, it is required to feed driving signal with a frequency or some kind of signal, merely. No matter how many frequencies contained in the signal fed in.

A first capacitor 221 is formed by the first metal plate 1110 and the second metal plate 1120. A second capacitor 222 is formed by the second metal plate 1120 and the third metal plate 1130. Since the distance and permittivity between the second metal plate 1120 and the third metal plate 1130, the capacitance and impedance of the second capacitor 222 is fixed. When the first metal plate 1110 is not deformed, the impedances of the first capacitor 221 and the second capacitor 222 are fixed. Hence, a ratio of analyzed current value I1 and I2 could be calculated. When the ratio is a predetermined value or falls into a predetermined range, it is determined that the first metal plate 1110 is not deformed. Moreover, the deforming of the first metal plate 1110 changes its own capacitance and impedance. Thus when it is deformed due to external force, the current value I1 is changed accordingly. In consequence, the ratio involving the current values I1 and I2 also changes. Based on the variation of the ratio, the deforming and displacement of the first metal plate 1110 could be deduced in consequence. The embodiment shown in FIG. 8 could be applicable here.

In alternative embodiment of the present invention, the controller or circuit of the transmitter 110 may feed driving signal with a frequency into the second metal plate 1120 and calculate the current values I1 and I2 through the first capacitor 221 and the second capacitor 222, respectively. By using the ratio of these two current values, a sensing value of pressure level of the tip section is deduced accordingly. In other words, utilizing the mechanism including the first impedance Z1 and the second impedance Z2, the present invention provides a design of FSC, force sensing capacitor, which may replace traditional force sensing components, such as FSR (force sensing resistor), for detecting pressure level. The FSC provided by the present invention has characteristics such as low cost and immune to influence of temperature and humanity. As shown in the figures above, FSC utilizing flexible PCB is disclosed by present invention. One aspect of the present application is to provide novel forms of FSC.

Figure 19A:
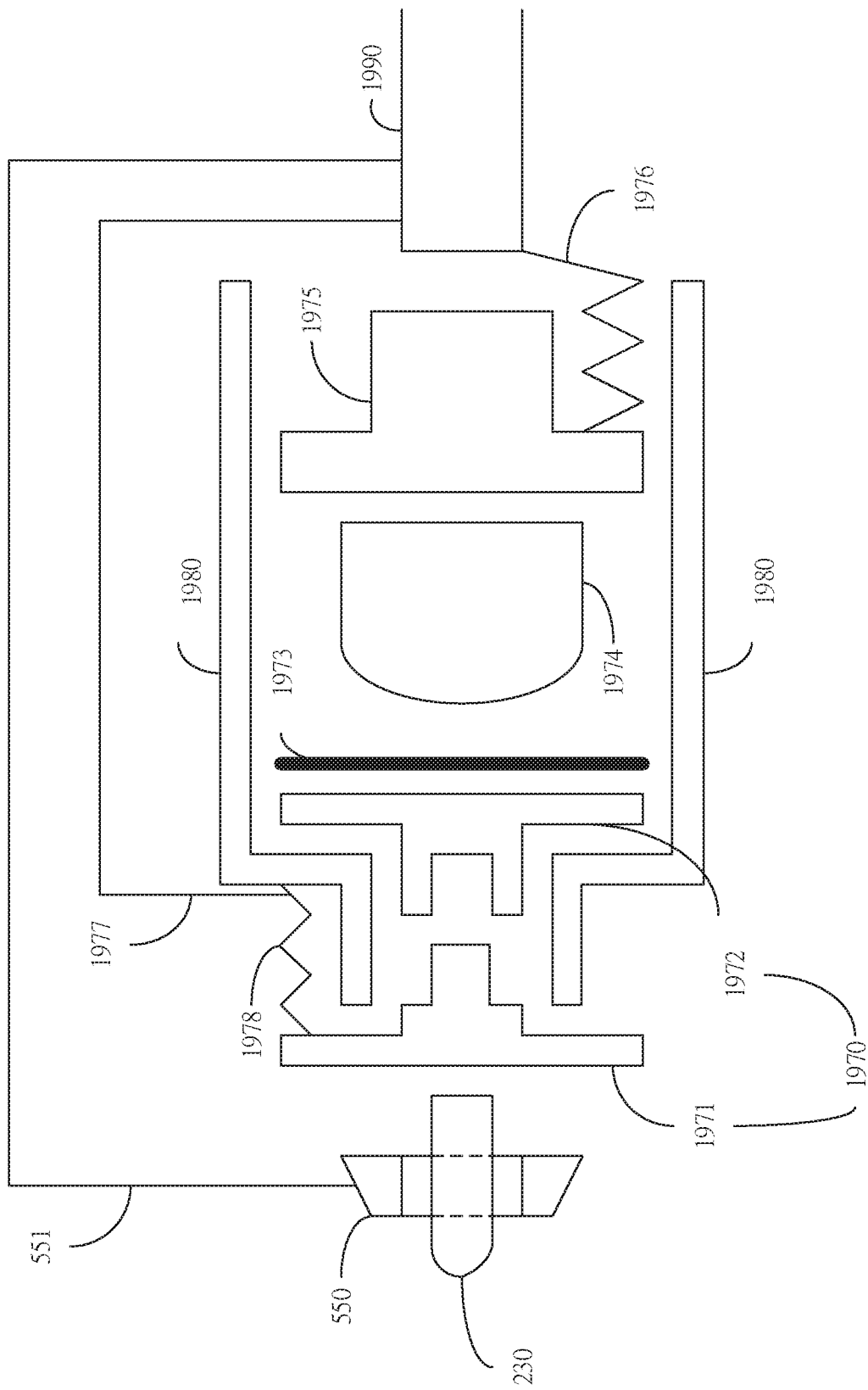
FIG. 19A depicts a profiling diagram of the FSC structure used in the transmitter 110 in accordance with an embodiment of the present invention.

Please refer to FIG. 19A, which depicts a profiling diagram of the FSC structure used in the transmitter 110 in accordance with an embodiment of the present invention. Please be noted that scales of FIGS. 19A through 19E are changed to highlight some important parts. Besides, some fixed components are omitted for simplifying the figure. As shown in FIG. 19A, the most left component is a long rod tip or the tip section 230, which is a conductor. For convenience, the tip section is at the fore end of the transmitter 110 or active stylus. When the tip section contacts the fore moving part 1971, the tip section 230 is electrically coupled to the fore moving part 1971. The fore-moving part 1971 could be joined together with a rear moving part 1972 by protruding fasteners in the middle of the fore moving part 1971 and corresponding recessed fasteners in the middle of the rear moving part 1972. In one embodiment, the protruding and recessed fasteners comprise screw thread or whorl. Both the fore and rear moving parts 1971 and 1972 may be conductors or conductive elements, such as metal.

A shell component 1980, shown in FIG. 19A, circularly embraces the fore and rear moving parts 1971 and 1972. Only parts of the shell component 1980 are illustrated in FIG. 19A. A neck part with smaller diameter of the shell component 1980 is constructed nearby the tip section 230. A shoulder part with larger diameter next to the neck part of the shell component is used to be a bearing part. As shown in FIG. 19A, at least one elastic element 1978 is placed between the bearing part and the fore moving part 1971. The elastic element 1978, such as spring, elastic piece, or in any other forms, is supposed to provide force between the shell component 1980 and the fore moving part 1971 along the axis of the stylus. In some embodiments, the elastic element 1978 unlike the one shown in FIG. 19A is surrounded the moving part 1970 and the neck part of the shell component 1980.

In another embodiment, the elastic element 1978 may provide force to both the shell component 1980 and the rear moving part 1972 along the axis of the stylus. Because a whole moving part 1970 composed of the fore and the rear moving parts 1971 and 1972 by fasteners, no matter which one of the fore and the rear moving part 1971 and 1972 is pressed, the whole moving part 1970 is pushed to the tip and the tip section 230 is also pushed forward accordingly.

In case the tip section 230 is pressed toward the right hand side of FIG. 19A or toward the rear, the force provided by the elastic element 1978 is compromised and the elastic element 1978 would be compressed such that a portion of the moving part 1970 touches the bearing part of the shell component 1980. Hence, the design provided by the present application creates a stroke that moving part 1970 moves inside the neck part of the shell component 1980 along the axis of the stylus. Accordingly, the tip section 230 touching the moving part 1970 also moves the same distance of the stroke along the axis. The distance of the stroke could be varied according to different designs, e.g., 1 mm or 0.5 mm. The present invention does not limit the distance of the stroke.

In the rear of the rear moving part 1972, a dielectric film 1973 is formed. In the rear of the dielectric film 1973, a compressible conductor 1974 is arranged. In one embodiment, the compressible conductor 1974 may be a conductive rubber or an elastic element formed by conductors. A sandwich structure comprising the moving part 1970, the dielectric film 1973, and the compressible conductor 1974 makes a capacitor or a FSC. The FSC provided by the present invention may be applicable to the first capacitor 221 shown in FIG. 2 through FIG. 5. In short, the FSC disclosed in the present application could be used in the embodiments.

The compressible conductor 1974 is attached to a conductor base 1975 which is further attached to an inner face of the shell component 1980 by fasteners. In case the moving part 1970 moves toward rear side or right hand side, the compressible conductor 1974 is compressed by the rear moving part 1972 because the conductor base 1975 is fixed. Thus the capacitance of the FSC is changed accordingly.

Because of the restriction of stylus shape, circuits and battery module may be placed in the rear of the conductor base 1975. As shown in FIG. 19A, those components are represented by a PCB 1990. As a first plate of the FSC, the moving part 1970 is connected to the PCB through a moving part wire 1977. As a second plate of the FSC, the conductor base 1975 is connected to the PCB 1990 through a base wire 1976.

The base wire 1976 may be another elastic element. In some embodiments, the base wire 1976, unlike the one shown in FIG. 19A, is surrounded the conductor base 1975. In other embodiments, the conductor base 1975 is not conductive. Hence the base wire 1976 is electrically coupling to the compressible conductor 1974 through the conductor base 1975.

In one embodiment, the manufacturing method of the dielectric film 1973 is submerging the right hand side surface of the rear moving part 1972 in a dielectric liquid. After the liquid stayed on the surface dried, a dielectric film 1973 is naturally formed on the right hand side surface of the rear moving part 1972.

Figure 20:
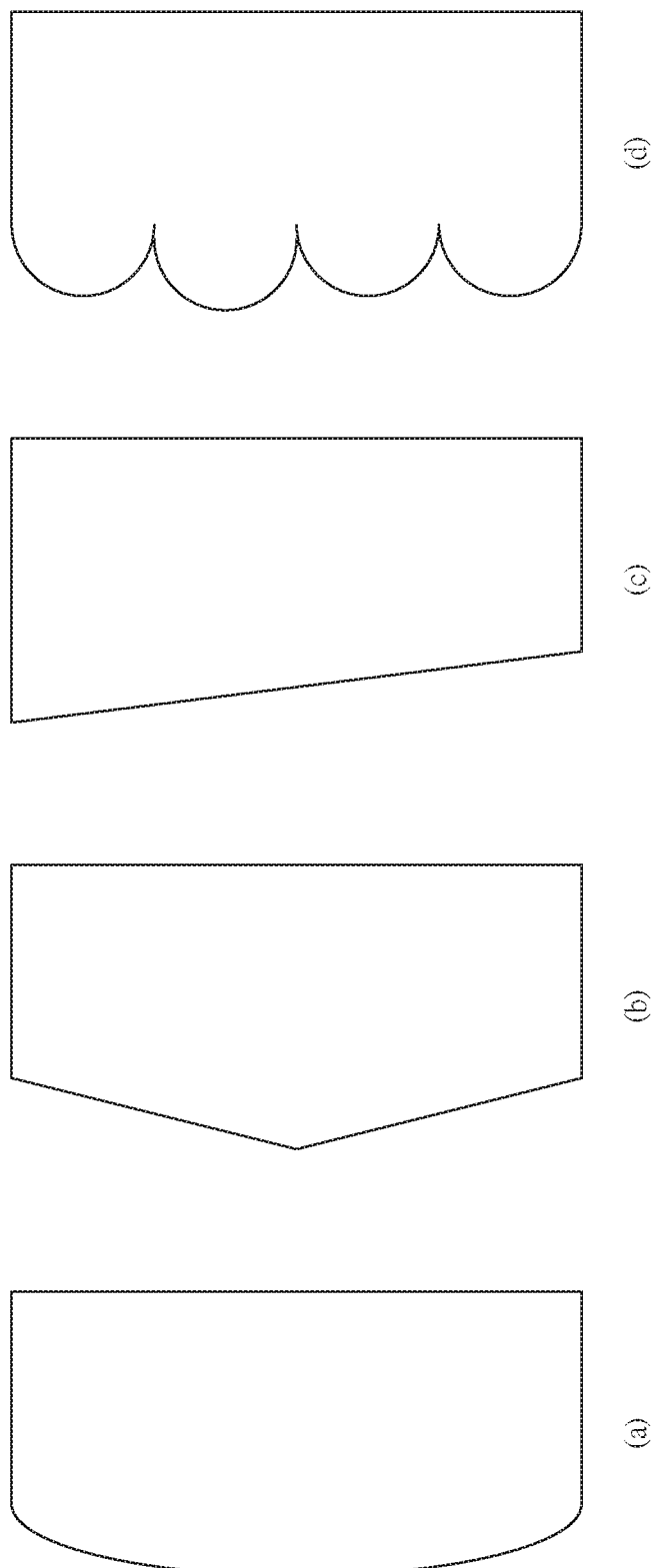
FIG. 20 shows a profiling diagram of contact surface of the compressible conductor 1974 facing the dielectric film 1973.

Please refer to FIG. 20, which shows a profiling diagram of contact surface of the compressible conductor 1974 facing the dielectric film 1973. The figure depicts four embodiments of the contact surface of the compressible conductor 1974 facing the dielectric film 1973. The embodiment (a) shows a surface having a central bulge. The embodiment (c) shows a sloped surface. The embodiment (b) shows a conical surface. And the embodiment (d) illustrates a surface with multiple protruding bulges. The present application does not limit to the surfaces shown in those embodiments.

Although the surface attaching the dielectric film 1973 of the moving part 1970 is a plane surface, the present invention does not limit to that. The surface may be constructed as the surfaces shown in FIG. 20, such as having a central bulge, having multiple bulges, sloped, or conical. In other words, both the surfaces of the compressible conductor 1974 and the dielectric film 1973 are not planes in some embodiments.

Figure 19B:
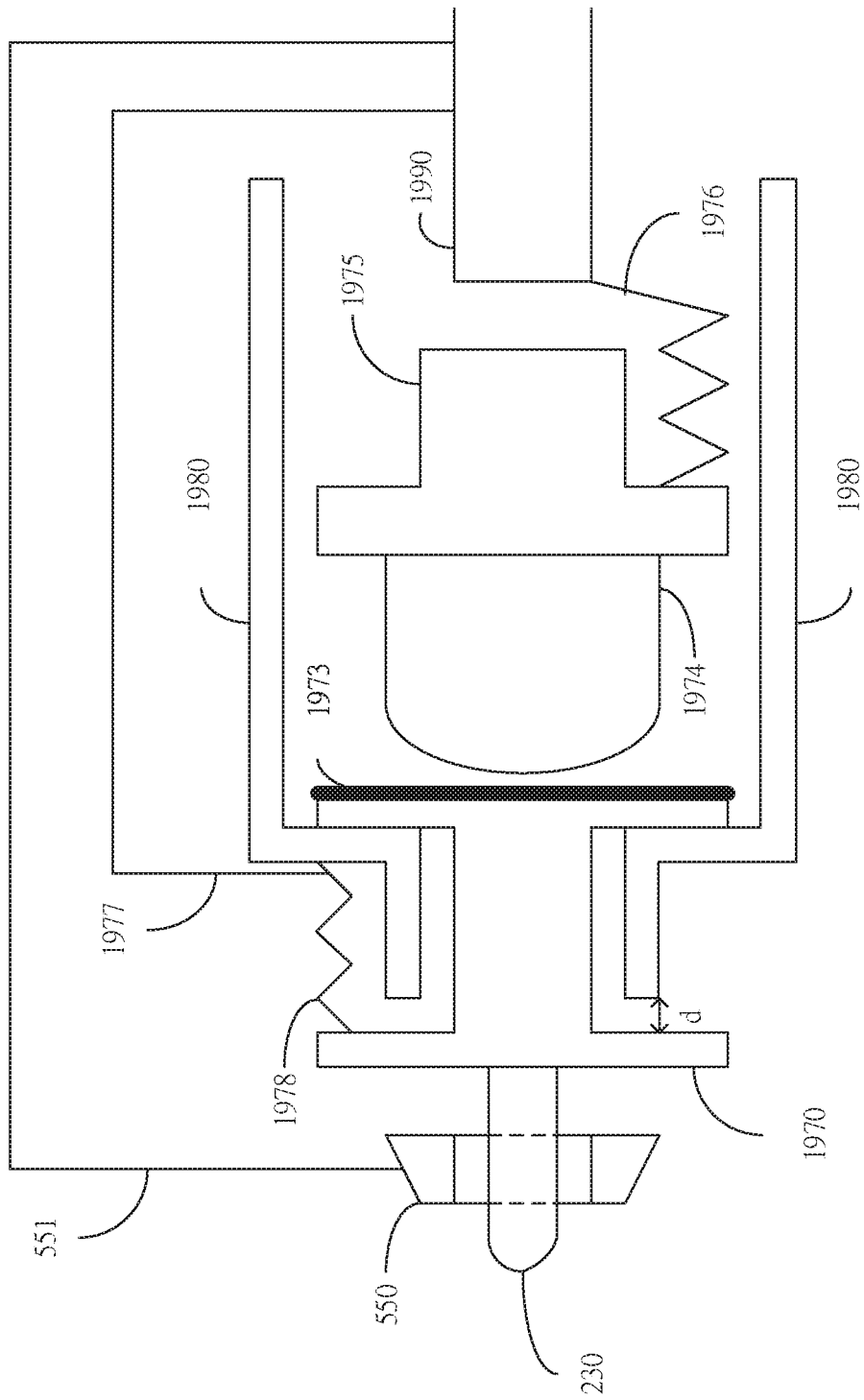
FIG. 19B shows an assembled profiling diagram of the structure shown in FIG. 19A.

Please refer to FIG. 19B, which shows an assembled profiling diagram of the structure shown in FIG. 19A. In the assembled structure, a single whole moving part 1970 is formed by the fore and the rear moving part 1971 and 1972. The moving part 1970 and the bearing of the shell component 1980 are connected by the elastic element 1978. The elastic force provide by the elastic element 1978 pushes the moving part 1970 toward and touches the tip section 230 until portion of the bearing of the shell component 1980 is touched by the rear moving part 1972. A stroke d of the moving part 1970 is relative to the shell component 1980. In this situation, the compressible conductor 1974 is not deformed or compressed. It is assumed that a first capacitance value provided by the FSC.

Figure 19C:
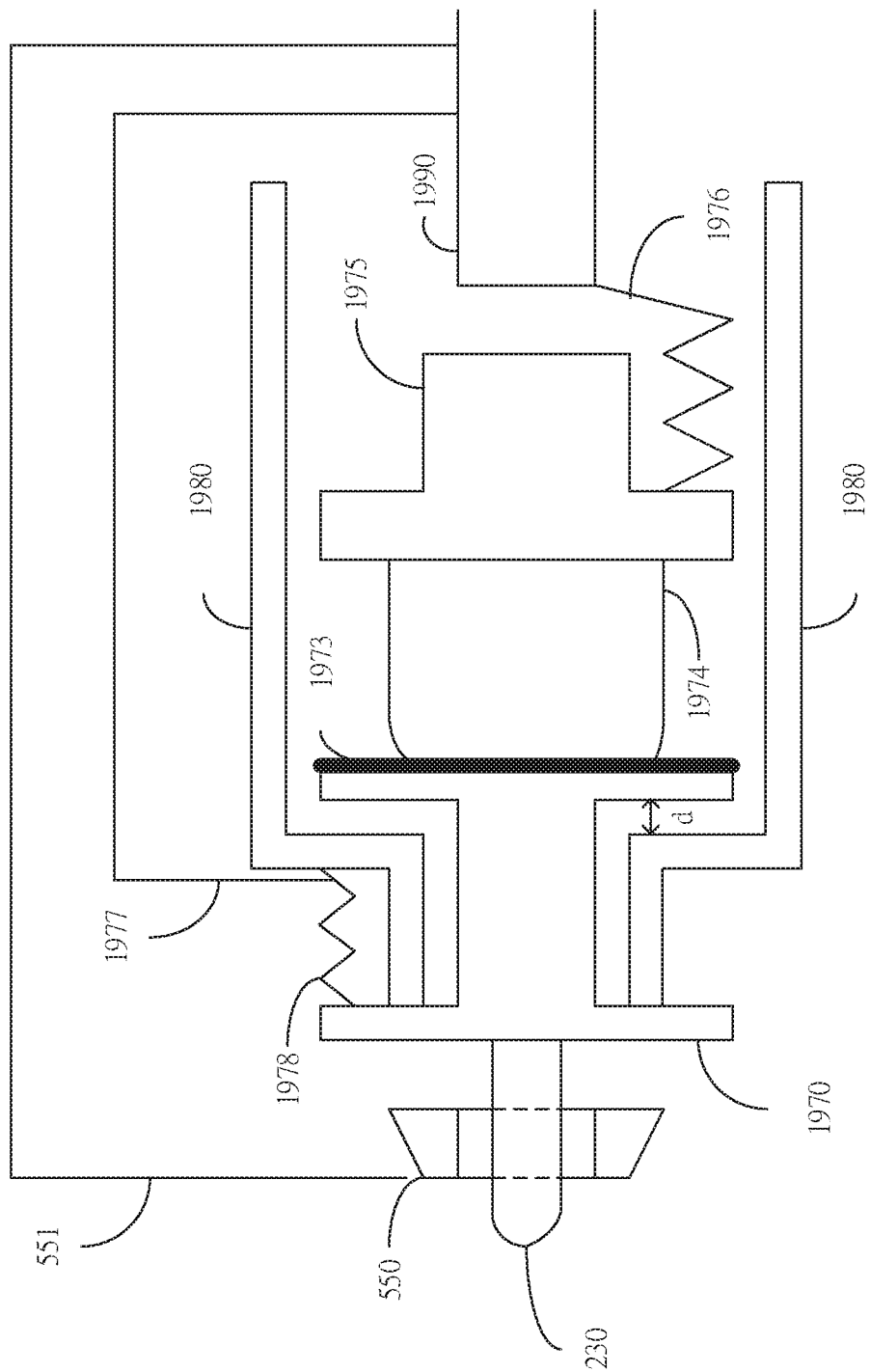
FIG. 19C shows another assembled profiling diagram of the structure shown in FIG. 19A.

Please refer to FIG. 19C, which shows another assembled profiling diagram of the structure shown in FIG. 19A. Comparing with FIG. 19B, the tip section 230 is pressed toward the rear side. Influenced by the movement of the tip section 230, the moving part 1970 overcomes the force provided by the elastic element 1978 and moves the whole distance of the stroke d until the fore moving part 1971 touches the bearing of the shell component 1980. In this situation, the compressible conductor 1974 is compressed by the moving part 1970 and the dielectric film 1973 and deformed. It is assumed that a second capacitance value provided by the FSC is different to the first capacitance value.

Between the positions shown in FIGS. 19B and 19C, countless positions the moving part 1970 can stay. In other words, there exist countless compressible levels of the compressible conductors 1974. Or the area of contact surface between the compressible conductor 1974 and the dielectric film 1973 could be varied indefinitely. Each of the positions, the compressed levels, or the areas can be corresponding to a particular capacitance value of the FSC.

Figure 19D:
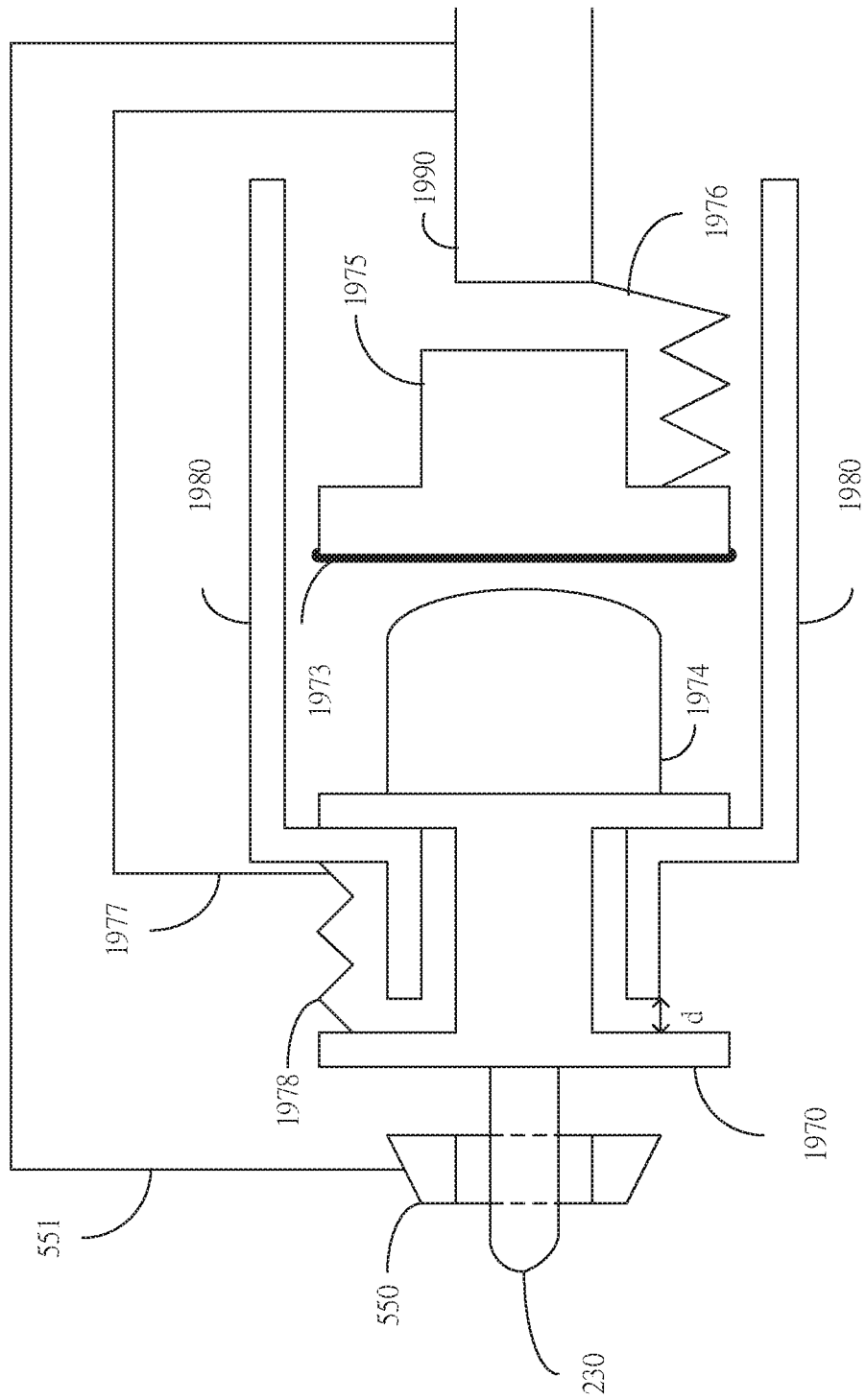
FIG. 19D depicts a profiling diagram of the FSC structure used in the transmitter 110 in accordance with an embodiment of the present invention.

Please refer to FIG. 19D, which depicts a profiling diagram of the FSC structure used in the transmitter 110 in accordance with an embodiment of the present invention. Comparing to FIG. 19B, the difference is that the compressible conductor 1974 and the dielectric film 1973 exchange their positions. Nevertheless, in case the moving part 1970 moves to the rear side, the compressible conductor 1974 is compressible by the dielectric film 1973 and deformed. The capacitance value of the FSC is changed accordingly.

Figure 19E:
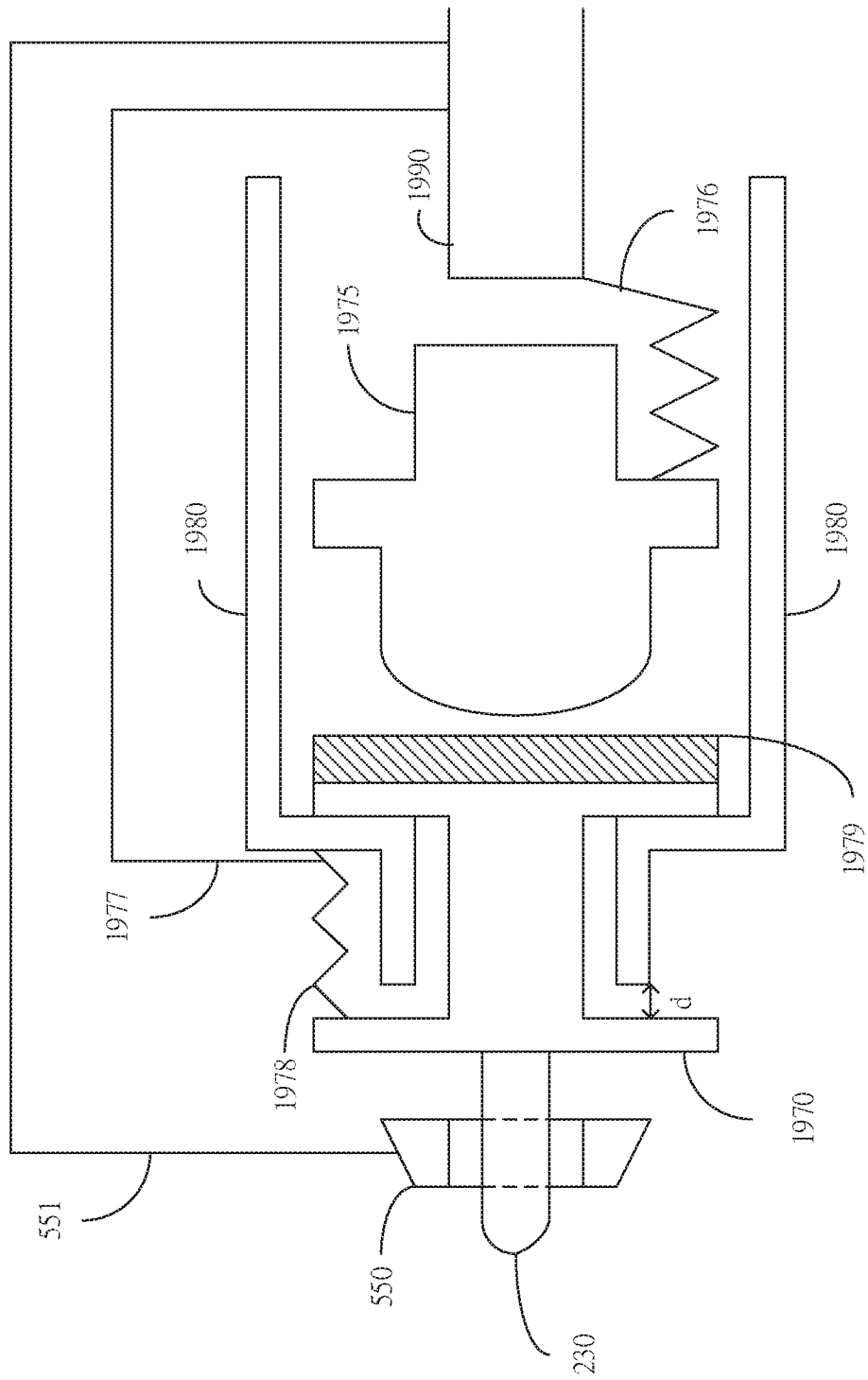
FIG. 19E depicts a profiling diagram of the FSC structure used in the transmitter 110 in accordance with an embodiment of the present invention.

Please refer to FIG. 19E, which depicts a profiling diagram of the FSC structure used in the transmitter 110 in accordance with an embodiment of the present invention. Comparing with FIG. 19B, the differences include that a compressible dielectric material 1979 rather than the dielectric film 1973 is place in the right hand side of the rear moving part 1972. The compressible dielectric material 1979 may be dielectric rubber, plastic, foam or etc. The conductor attached to the conductor base 1975 is replaced by an incompressible conductor such as metal or graphite. When pressed by the moving part 1970, the thickness of the compressible dielectric material 1979 decreases, the distance between the moving part 1970 and the conductor also decreases consequently. Hence the capacitance of the FSC is changed accordingly. However, the cost of the incompressible conductor shown in FIG. 19E is more expensive than the compressible conductor shown in FIG. 19A.

In a variation of the embodiment shown in FIG. 19E, the contact surface of the conductor facing the compressible dielectric material 1979 may adopt those shown in FIG. 20. In another variation, the contact surface of the compressible dielectric material 1979 facing the conductor may adopt those shown in FIG. 20.

Similar to the embodiment shown in FIG. 19D, the positions of the compressible dielectric material 1979 and the conductor may be exchanged such that the compressible dielectric material 1979 is attached to the conductor base 1975 and the conductor is attached to the rear of the moving part 1970. When the moving part 1970 moves to the rear side, the conductor causes the compressible dielectric material 1979 deformed such that the capacitance of the FSC is changed accordingly.

Figure 21:
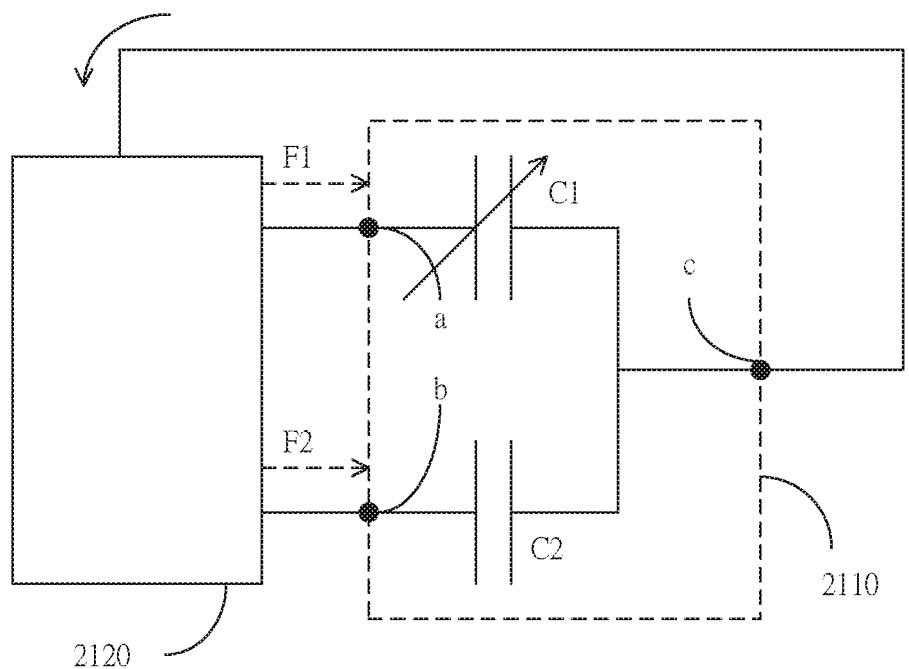
FIG. 21 illustrates a pressure sensor according to an embodiment of the present invention.

Please refer to FIG. 21, which illustrates a pressure sensor according to an embodiment of the present invention. As shown in the figure, the pressure sensor 2110 has two input terminals a and b and an output terminal c, which are all connected to a control unit 2120. The control unit 2120 feeds signals with first frequency (group) F1 and second frequency (group) F2 into the input terminals a and b, respectively, and receives the output signal of the pressure sensor 2120. The control unit 2120 may embody the method disclosed in FIG. 6.

When external pressure makes capacitance change of a capacitor C1, the control unit 2120 could deduce the pressure according to the capacitance change. Hence, the pressure sensor 2110 could be widely adapted to pressure measure devices such as weight sensor. In one application, the pressure sensor 2120 could be used in another form of stylus. After the pressure on the tip of the stylus is deduced, the control unit 2120 drives a signal transmitter for transmitting an electric signal with a predetermined frequency f0 to a touch panel.

It is mentioned that the transmitter 110 may transmit the electric signal at some time after receiving the beacon signals emitted from the touch panel 120, such that the touch panel 120 could detect the position of the transmitter 110 as well as the sensor states of the transmitter 110. If no beacon signal is received during a first period, the transmitter 110 may enter a power saving mode. In this mode, the transmitter 110 detects the beacon signal every detection period. Once the beacon signal is detected, the transmitter 110 recovers back to normal working mode. The detection period is longer than the transmission period of the beacon signal.

Moreover, if no beacon signal is received during a second period in the power saving mode, the transmitter 110 may enter a sleep mode to turn off circuits and most parts until being waked up. In one embodiment of the present invention, in the sleep mode, the receiving circuit of the beacon signal and the transmitter of the electric signal of the transmitter 110 are turned off. A button or a switch of the transmitter 110 could be used to wake itself up by user. In another embodiment of the present application, examples shown in FIGS. 23A, 23B, 24A and 24B could be used to wake up the transmitter 110. After the tip section 230 touches object, the voltage level of a connection port or GPIO1 is raised to high from low such that the transmitter 110 begins to transmit electric signals.

In the present application, one function of the ring electrode 550 is to receive the beacon signal in additional to the tip section 230. Since the surface area and volume of the ring electrode 550 is larger than the top of the tip section 230, it can receive the beacon signal distant away from the touch panel. Or the touch panel 120 may transmit weaker beacon signal to save power consumption. If no beacon signal is received for a while, active stylus may enter deeper sleep mode to save more power. When in this sleep mode, user may recover the transmitter 110 back to the normal working mode by pressing the tip section 230. Examples shown in FIGS. 23A, 23B, 24A and 24B could be used to wake up the transmitter 110. After the tip section 230 touches object, the voltage level of a connection port or GPIO1 is raised to high from low such that the transmitter 110 begins to transmit electric signals.

When multiple transmitters 110 operate on one touch panel 120, the touch panel 120 could transmit different beacon signals for corresponding transmitter 110 to emit its electric signal. The transmitter 110 may adjust the signal frequency or modulation of the first signal source 211, the second signal source 212, and the third signal source 513 such that the touch panel 120 could distinguish the source transmitter 110 of the received electric signals. Analogously, the different beacon signals may have different frequencies or different modulations.

Figure 22:
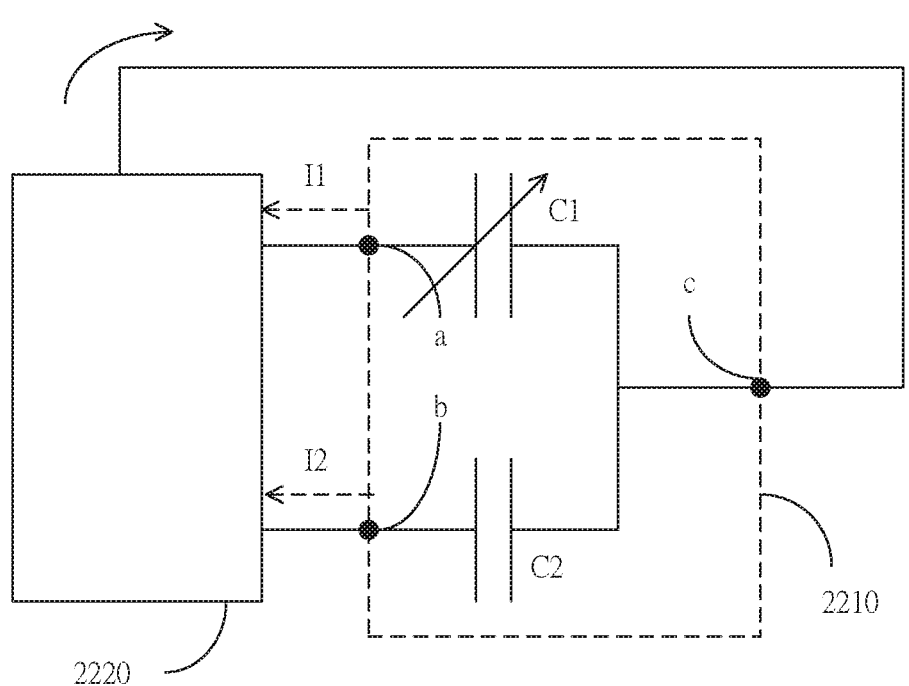
FIG. 22 illustrates a pressure sensor according to an embodiment of the present invention.

Please refer to FIG. 22, which illustrates a pressure sensor according to an embodiment of the present invention. In this embodiment, the control unit 2220 may feed driving signal with a frequency to an input terminal c of the pressure sensor 2210 and receive currents with current values I1 and I2 corresponding to a first capacitor C1 and a second capacitor C2, respectively. A ratio of these two current values is calculated by the control unit 2220. Therefore a pressure level could be deduced accordingly. The control unit 2220 may embody the method shown in FIG. 8. In one application, the driving signal with the frequency is fed externally into the input terminal c of the pressure sensor 2220.

Figure 23A:
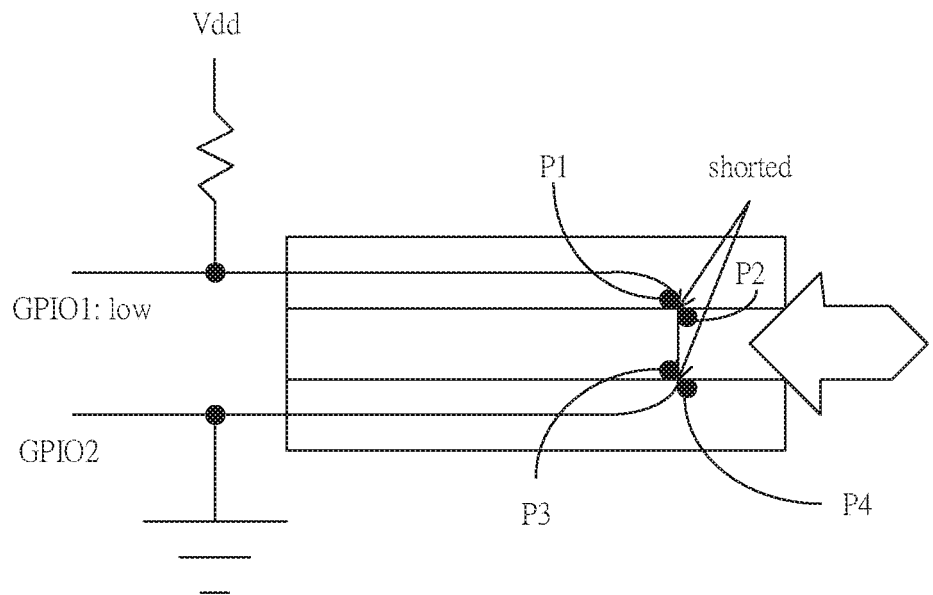
FIGS. 23A and 23B depict profiling diagrams of a switch structure in accordance with an embodiment of the present invention.
Figure 23B:
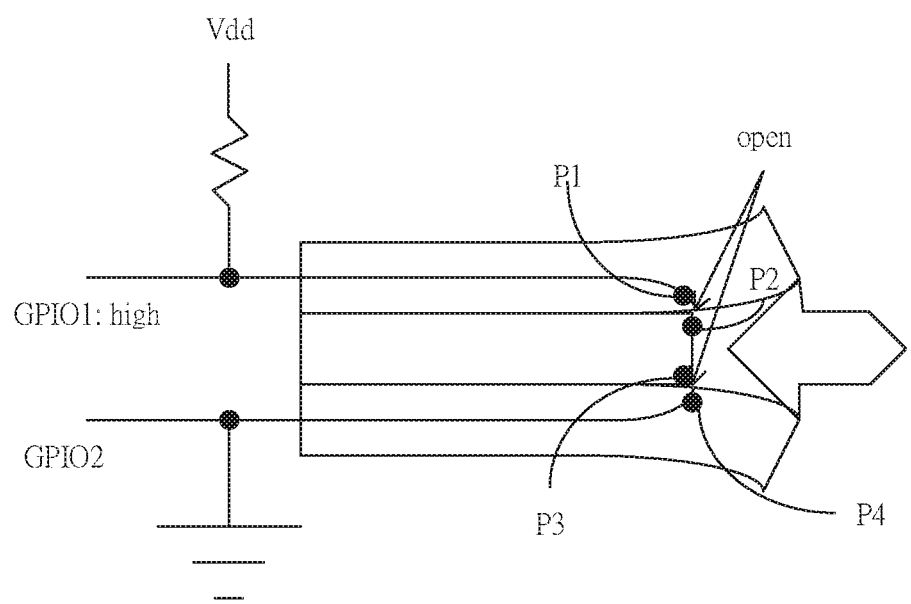

Please refer to FIGS. 23A and 23B, which depict profiling diagrams of a switch structure in accordance with an embodiment of the present invention. In the embodiment shown in FIG. 23A, there are three circuit boards. As seen in previous figures, there is a ramp at the right hand side. Before the ramp pushes to left, a first contact point p1 of the upper circuit board is coupled to a voltage source Vdd and a first connection port (GPIO1). If no displacement vertical to the axis of the stylus, the first contact point p1 is contacted with a second contact point p2 on the middle circuit board. There is also a third contact point p3 on the middle circuit board coupled to the second contact point p2. A fourth contact point p4 of the lower circuit board is coupled to a ground level and a second connection port (GPIO2). Besides, the fourth contact point p4 is electrically coupled to the third contact point p3. There is a resistor between the power source Vdd and the first connection port (GPIO1). If the circuit between the upper and the middle circuit boards is shorted, i.e., the first contact point p1 contacts with the second contact point p2, and the circuit between the middle and lower circuit boards is shorted, i.e., the third contact point p3 contacts with the fourth contact point p4, the voltage level of the first connection port (GPIO1) is low or ground.

Please refer to FIG. 23B, after the ramp is pressed, the movement of the ramp deforms the contacting parts of the upper and the lower circuit boards. Due to the deformations, the circuit between the upper and the middle circuit boards is open, i.e., the first contact point p1 separates with the second contact point p2, and the circuit between the middle and lower circuit boards is open, i.e., the third contact point p3 separates with the fourth contact point p4, the voltage level of the first connection port (GPIO1) is high or as high as Vdd.

In response to the voltage level of the first connection port (GPIO1) from low to high, the transmitter 110 in sleep mode is waked up. Already seen in previous figures, supporting elements corresponding to the upper and the lower circuit boards help to recover these two circuit boards' position, respectively, if the pressure of the ramp disappears. At this moment, the voltage level of the first connection turns to low from high. The first and the second connection ports may be pins of processor in the transmitter 110.

Figure 24A:
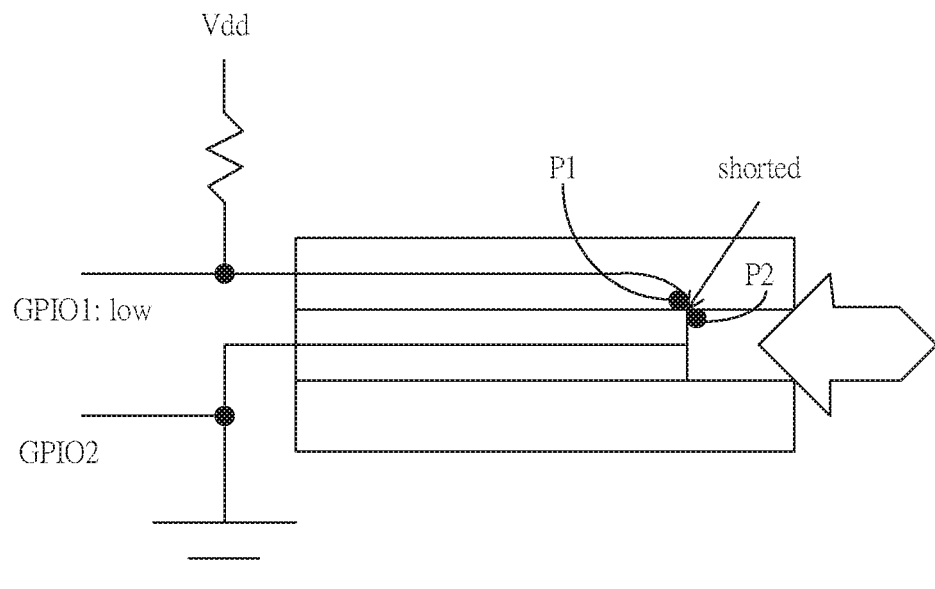
FIGS. 24A and 24B depict profiling diagrams of a switch structure in accordance with an embodiment of the present invention.
Figure 24B:
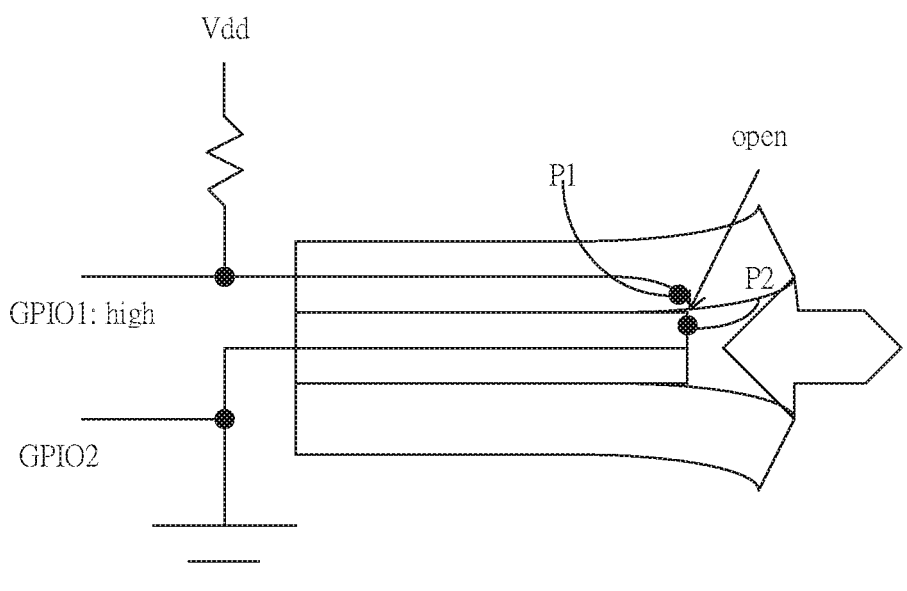

Please refer to FIGS. 24A and 24B, which depict profiling diagrams of a switch structure in accordance with an embodiment of the present invention. The embodiment shown in FIGS. 23A and 23B has two potential openings. No matter which opening is open, it turns the voltage level of the first connection to high from low. However, the embodiment shown in FIGS. 24A and 24B, only one potential opening is presented. The circuit along the middle circuit board connects to ground. In case the circuit between the upper and the middle circuit board is shorted, the voltage level of the first connection port is low or ground. Instead, if the circuit between the upper and the middle circuit board is open, the voltage level of the first connection port is high or as high as Vdd. In the embodiment shown in FIGS. 24A and 24B, the second contact point p2 is electrically coupled to the second connection port (GPIO2).

Figure 25:
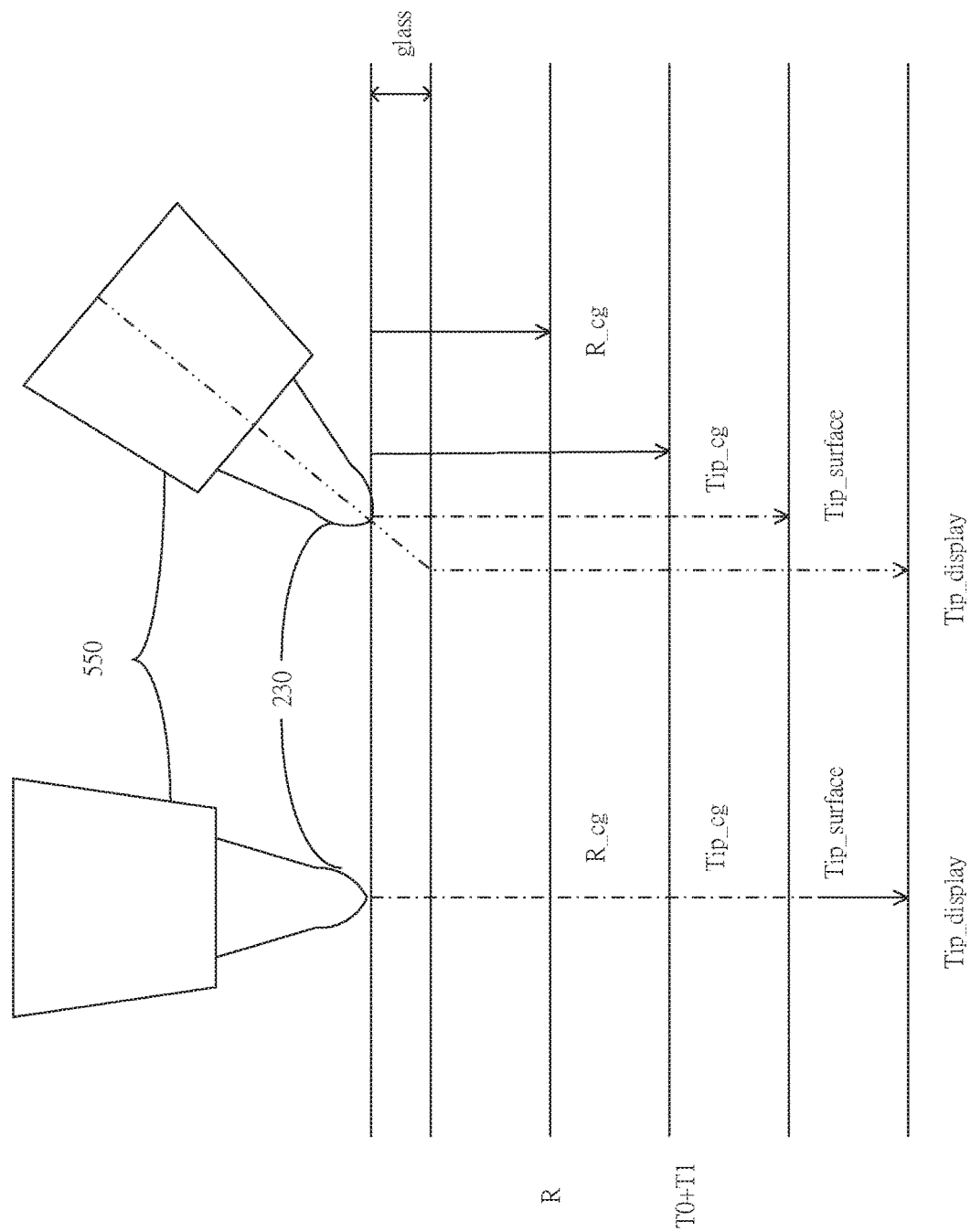
FIG. 25 shows a diagram for calculating the tip position.

Please refer to FIG. 25, which shows a diagram for calculating the tip position. There are two transmitters 110 shown in FIG. 25, both include the ring electrode 550 and the tip section 230. The left-hand side transmitter 110 is perpendicular to the touch panel 120, the angle is approaching or equals to 90 degree. The angle between the right-hand side transmitter 110 and the touch panel 120 is less than 90 degree. Moreover, a transparent surface layer of the touch panel 120 has a thickness. Normally, the transparent surface layer is a reinforced glass. A display layer is underneath the transparent surface layer.

Since the transmitters 110 emits electric signals via the ring electrode 550 and/or the tip section 230 during the time period R, the touch sensitive processing apparatus 130 could calculate a centroid position R_cg of the electric signals which is corresponding to a centroid position of the ring electrode 550 and/or the tip section 230 projecting to the touch panel 120. After that, during the time periods T0 and T1, transmitter 110 emits electric signals only via the tip section 230. Similarly, the touch sensitive processing apparatus 130 could calculate a centroid position Tip_cg of the electric signals which is corresponding to a centroid position of the tip section 230 projecting to the touch panel 120.

For the left-hand side transmitter 110 shown in FIG. 25, since it is perpendicular to the touch panel 120, the position R_cg equals or is approaching to the position Tip_cg. Thus, a position Tip_surface where top of the tip section 230 touches the transparent surface layer of the touch panel 120 equals or is approaching to the positions R_cg and Tip_cg. Moreover, a position Tip_display where the top of the tip section 230 projecting on the display layer of the touch panel 120 equals or is approaching to the positions, R_cg, Tip_cg, and Tip_surface.

For the right-hand side transmitter 110 shown in FIG. 25, there exist an inclination angle between the transmitter 110 and the touch panel 120. More distant between the positions R_cg and Tip_cg, the inclination angle is larger. Depends on the implementations of the transmitter 110, the inclination angle or positions Tip_surface or Tip_display could be found by the touch sensitive processing apparatus 130 via calculating or checking a look-up table according to the positions R_cg and Tip_cg.

Figure 26:
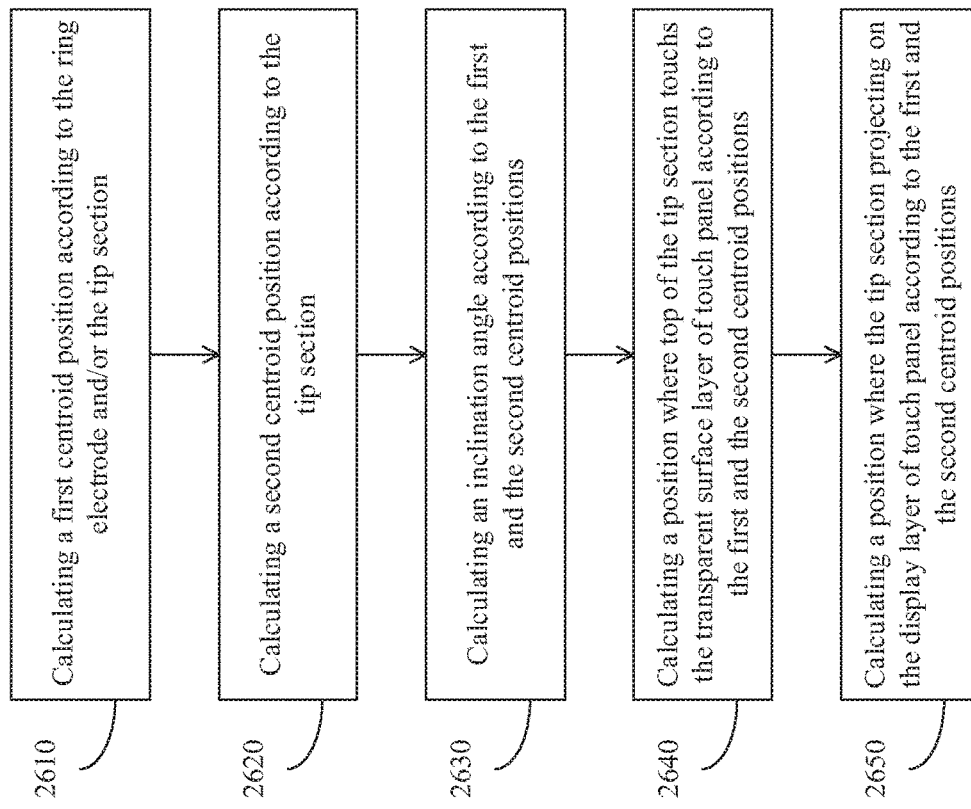
FIG. 26 depicts a flow chart diagram for calculating the inclination angle in accordance with the present invention.

Please refer to FIG. 26, which depicts a flow chart diagram for calculating the inclination angle in accordance with the present invention. The embodiment is applicable to the transmitter 110 having a ring electrode 550 shown in FIG. 5. It is also applicable to the signal modulations shown in FIGS. 9E and 9F. The method could be performed by the touch sensitive processing apparatus 130 shown in FIG. 1. The embodiment shown in FIG. 25 could be reference, too.

In step 2610, calculating a first centroid position R_cg according to the ring electrode 550 and/or the tip section 230 projecting to the touch panel 120. In step 2620, calculating a second centroid position Tip_cg according to the tip section 230 projecting to the touch panel 120. The present invention does not limit the executing order of these two steps 2610 and 2620. Next, in optional step 2630, calculating an inclination angle according to the first and the second centroid positions R_cg and Tip_cg. In optional step 2640, calculating a position Tip_surface where top of the tip section 230 touches the transparent surface layer of the touch panel 120 according to the first and the second centroid positions R_cg and Tip_cg. In optional step 2650, calculating a position Tip_display where the tip section 230 projecting on the display layer of the touch panel 120 according to the first and the second centroid positions R_cg and Tip_cg. Not all but at least one of steps 2630, 2640, and 2650 has to be performed in the embodiment. And the present invention does not limit the executing order of these three steps 2630, 2640, and 2650.

Figure 27:
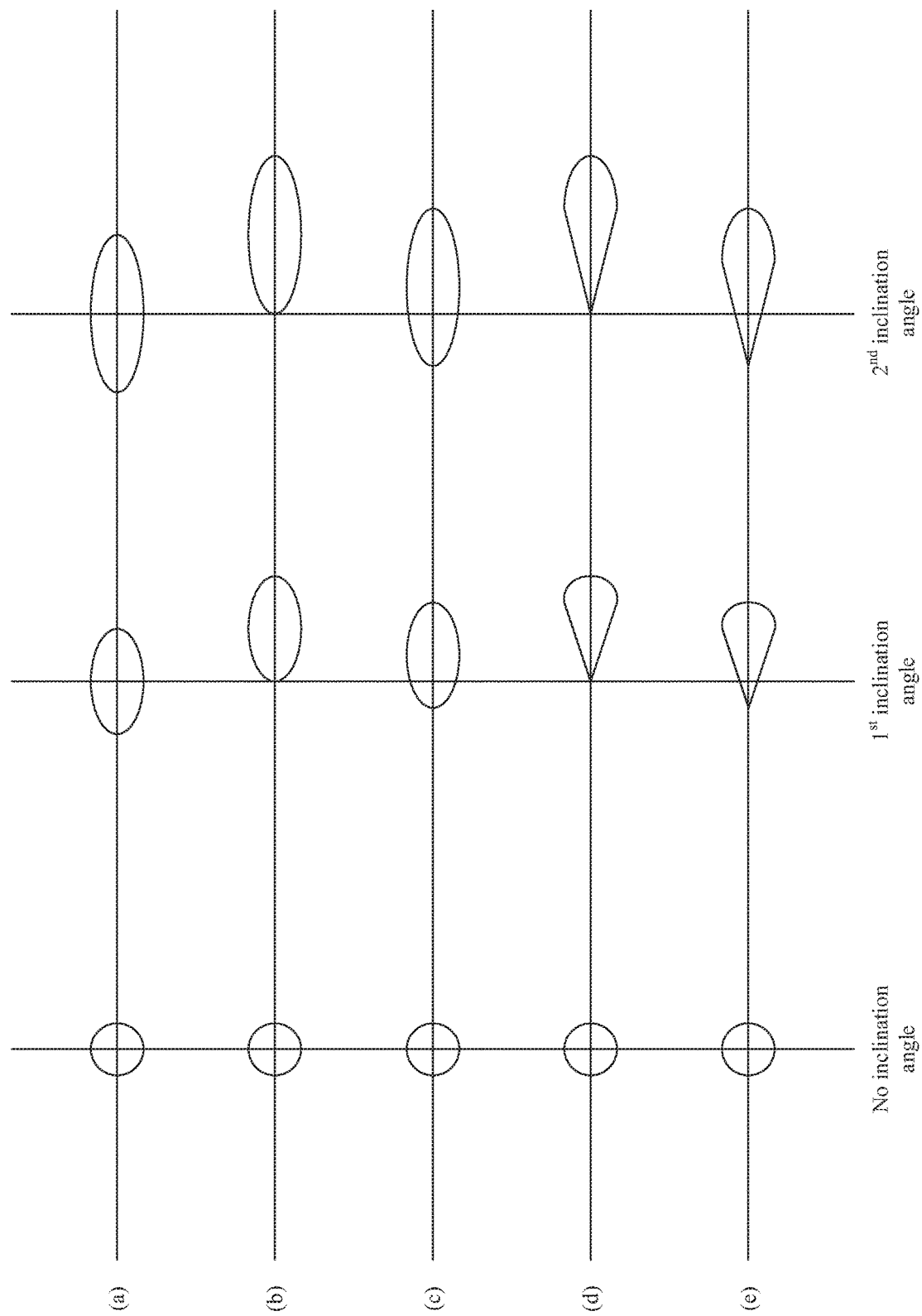
FIG. 27 shows embodiments of how display interface reflects strobe according to the inclination angle and/or pressure of the tip section.

Please refer to FIG. 27, which shows embodiments of how display interface reflects strobe according to the inclination angle and/or pressure of the tip section. There exists 5 rows of embodiments (a) through (e) shown in FIG. 27. Each row comprises three examples corresponding to three inclination angles. The examples of the most left column are corresponding to which the active stylus is perpendicular to the touch sensitive panel. The examples of the most right column are corresponding to an inclination angle larger than another inclination angle corresponding to the examples of the middle column. The so-called stroke in the present invention usually refers to a rendering area on the display by image processing software.

Please be noted that in the embodiment, it is not required to utilize the embodiment using the ring electrode to calculate the inclination angle and positions Tip_surface and Tip_display. In one embodiment, other forms of sensor may be installed on the active stylus to measure the inclination angle. For example, IMU, inertial measurement unit, gyroscope, and accelerometer made by microelectronics technology are configured to measure the inclination angle and report it and/or derived data to computer system comprising the touch sensitive panel via wired or wireless communication. Therefore the computer system could implement the embodiments shown in FIG. 27. The fore-mentioned wired or wireless communication may follow industrial or proprietary standards such as Bluetooth or Wireless USB etc.

Now assuming that active stylus touches the touch panel using the same pressure level in those embodiments shown in FIG. 27. In some embodiments, each intersection point of vertical and horizontal lines represents the positions Tip_surface corresponding to where top of the tip touches the transparent surface layer of the touch sensitive panel. In other embodiments, each intersection point of vertical and horizontal lines represents the positions Tip_cg corresponding to where the centroid of the tip. Of course, they may represent the locations Tip_display where the tip projecting the display layer of the touch sensitive panel. For convenience, those three positions are collectively named as a representative point, Tip. In other words, the representative point Tip may be one of the points, Tip_display, Tip_surface, or Tip_cg.

In the embodiment (a), in response to the increase of the inclination angle, the stroke shape changes from circle to ellipse. In other words, the distance between two focal points of the ellipse is corresponding to the inclination angle. The inclination angle increases with the distance between two focal points of the ellipse. Center of the ellipse is corresponding to the representative point Tip.

The difference between the embodiments (b) and (a) is that one intersection point of the semi-major axis and the ellipse is corresponding to the representative point Tip. The difference between the embodiments (c) and (a) is that one of the focal point of the ellipse is corresponding to the representative point Tip. The difference between the embodiments (d), (e), and (a) is that the stroke shape changes from ellipse to tear drop. Top of the tear drop of the embodiment (d) is corresponding to the representative point Tip. Somewhere from the top toward the end of the tear drop of the embodiment (e) is corresponding to the representative point Tip.

Although shown in FIG. 27, two stroke shapes and different points corresponding to the intersection point are enumerated. The present invention does not limit the stroke shape and the types of the representative point. In addition, in one embodiment, pressure of the tip may control the size of the shape. For example, the pressure may be corresponding to radius of circle or the distance between the focal points of the ellipse. In summarized, human-machine interface can change display content according to pressure of the tip and/or inclination angle of the active stylus.

In additional to change the stroke shape, the pressure of the tip and/or inclination angle of the stylus may be corresponding to different commands. For example of 3 dimensional design software, color temperature, strength, or scope of illuminating source could be changed according to the inclination angle. Or in case an object is selected by touch of the tip, orientation of the selected object could be changed according to direction of the inclination angle. Moreover, direction of the selected object could be rotated according to the inclination angle.

It is worthy noted that relation of the inclination angle and corresponding value is not limited as linearly in the present invention. In some embodiments, the relation may be non-linear and could be found in a lookup table or calculated in the quadratic function.

Figure 28:
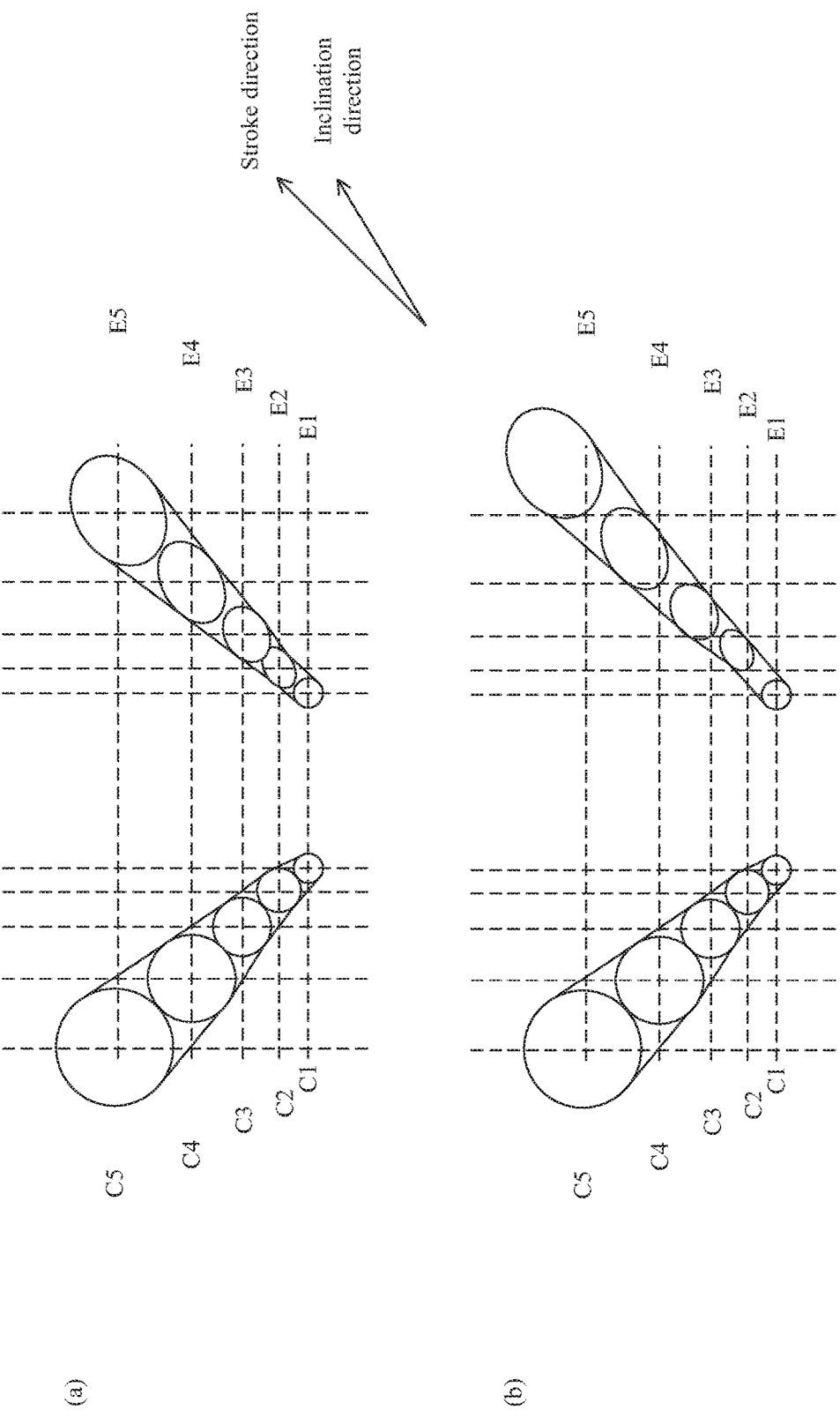
FIG. 28 depicts other embodiments of how display interface reflects strobe according to the inclination angle and/or pressure of the tip.

Please refer to FIG. 28, which depicts other embodiments of how display interface reflects strobe according to the inclination angle and/or pressure of the tip. It depicts two embodiments (a) and (b) which include left and right strokes, respectively. The inclination angle of the left hand side stroke is zero. The stroke includes five circles C1 through C5 with increasing radius. The inclination angle of the right hand side stroke is a non-zero constant. The stroke includes five ellipses E1 through E5 with increasing major and minor radius. Sizes of the ellipses E1 through E5 depends on pressure values of the tip which are as the same as corresponding circles C1 through C5. In addition, semi-major axes of these ellipses E1 through E5 are 30 degree off horizontal according to direction of the inclination angle. The direction of the inclination angle and the stroke direction are different. In this figure, these two directions are off a 15-degree angle.

The embodiment (a) shown in FIG. 28 is corresponding to the embodiment (a) shown in FIG. 27, i.e., center of the ellipse is corresponding to the representative point Tip. Analogously, The embodiment (b) shown in FIG. 28 is corresponding to the embodiment (b) shown in FIG. 27, i.e., the intersection point between the semi-major axis and the ellipse is corresponding to the representative point Tip. Could be seen in these two embodiments shown in FIG. 28, under the same pressure level, the stroke shapes are different according to different inclination angles. In consequence, strokes of some soft and flexible tips such as brush pen and quill pen could be simulated according to the pressure level and inclination angle.

One aspect of the present application is to provide a transmitter which comprises: a first component for receiving signal with a first frequency group, wherein a first impedance of the first component changes according to a pressure; a second component for receiving signal with a second frequency group, wherein the second component has a second impedance; and a tip section for receiving outputs of the first component and the second component and transmitting an electric signal, wherein the tip section is used to receive the pressure.

In one embodiment, the second impedance is not changed according to the pressure. Alternatively, the second impedance is changed according to the pressure, too.

In one embodiment, the transmitter further comprises a third switch and a third component serially connected to the third switch, wherein the first component is connected with the third switch and the third component in parallel. The transmitter may further comprise a fourth switch and a fourth component serially connected to the fourth switch, wherein the first component is connected with the fourth switch and the fourth component in parallel.

Alternatively, the transmitter further comprises a third switch and a third component serially connected to the third switch, wherein the second component is connected with the third switch and the third component in parallel. The transmitter may further comprise a fourth switch and a fourth component serially connected to the fourth switch, wherein the second component is connected with the fourth switch and the fourth component in parallel.

In one embodiment, the first frequency group comprises one or more first frequency, the second frequency group comprises one or more second frequency. The first frequency is different from the second frequency.

In one embodiment, the first impedance equals to the second impedance if the pressure is absent. In one embodiment, the tip section does not touch anything if the pressure is absent.

In one embodiment, a ratio of a first signal strength M1 corresponding to signal with the first frequency group and a second signal strength M2 corresponding to signal with the second frequency group is related to the pressure. The ratio is one of the followings: M1/M2, M2/M1, M1/(M1+M2), M2/(M1+M2), (M1−M2)/(M1+M2), and (M2−M1)/(M1+M2).

In one embodiment, if the ratio equals or falls into a first range, the pressure is absent. If the ratio equals or falls into a second range, the third switch is shorted and the first component is connected with the third component in parallel. If the ratio equals or falls into a third range, the fourth switch is shorted and the first component is connected with the fourth component in parallel. If the ratio equals or falls into a fourth range, the third switch and the fourth switch are shorted and the first component is connected with the third component and the fourth component in parallel. Alternatively, if the ratio equals or falls into a fifth range, the third switch is shorted and the second component is connected with the third component in parallel. If the ratio equals or falls into a sixth range, the fourth switch is shorted and the second component is connected with the fourth component in parallel. If the ratio equals or falls into a seventh range, the third switch and the fourth switch are shorted and the second component is connected with the third component and the fourth component in parallel.

In one embodiment, the first component is a force sensitive capacitor. The second component is a capacitor.

In one embodiment, the transmitter further comprises a ring electrode surrounding the tip section. The ring electrode is not electrically coupled to the tip section. In one embodiment, the ring electrode comprises one or more separate electrodes.

One aspect of the present application is to provide a transmitting method for a transmitter, which comprises a first component, a second component, and a tip section. The tip section is used to receive the outputs of the first and the second components. The method comprises changing a first impedance of the first component according to a pressure on the tip section; providing signal with a first frequency group to the first component; providing signal with a second frequency group to the second component; and transmitting an electric signal from the tip section.

One aspect of the present application is to provide a method for determining a pressure received by a transmitter, comprises: receiving an electric signal transmitted from the transmitter; calculating a first signal strength M1 corresponding to signal with a first frequency group contained in the electric signal; calculating a second signal strength M2 corresponding to signal with a second frequency group contained in the electric signal; calculating the pressure based on a ratio of the first signal strength M1 and the second signal strength M2.

In one embodiment, the step of calculating the pressure may comprises one of the followings: looking into a lookup table, linear interpolation, and quadratic curve interpolation In one embodiment, the method further comprises determining the state of the third switch according to the ratio. Alternatively, the method further comprises determining the state of the fourth switch according to the ratio.

One aspect of the present application is to provide a touch sensitive processing apparatus for determining a pressure received by a transmitter, comprises: an interface configured to connects to a plurality of first electrodes and a plurality of second electrodes of a touch panel, wherein multiple sensing points are located where the intersections of the first and second electrodes; at least one demodulator for calculating a first signal strength M1 and a second signal strength M2 corresponding to signal with a first frequency group and signal with a second frequency group contained in the electric signal, respectively; and a calculating unit for calculating the pressure based on a ratio of the first signal strength M1 and the second signal strength M2.

In one embodiment, the calculating unit further determining the state of the third switch according to the ratio. Alternatively, the calculating unit further determining the state of the fourth switch according to the ratio.

One aspect of the present application is to provide a touch sensitive system for determining a pressure received by a transmitter, comprises: the transmitter, the touch panel; and a touch sensitive processing apparatus, the transmitter comprises: a first component for receiving signal with a first frequency group, wherein a first impedance of the first component changes according to a pressure; a second component for receiving signal with a second frequency group, wherein the second component has a second impedance; and a tip section for receiving outputs of the first component and the second component and transmitting an electric signal, wherein the tip section is used to receive the pressure. The touch panel comprises a plurality of first electrodes and a plurality of second electrodes, wherein multiple sensing points are located where the intersections of the first and second electrodes. The touch sensitive processing apparatus comprises: an interface configured to connects to the plurality of first electrodes and the plurality of second electrodes of the touch panel; at least one demodulator for calculating a first signal strength M1 and a second signal strength M2 corresponding to signal with a first frequency group and signal with a second frequency group contained in the electric signal, respectively; and a calculating unit for calculating the pressure based on a ratio of the first signal strength M1 and the second signal strength M2.

One aspect of the present application is to provide a transmitter, comprises: a first component for receiving a signal source, wherein a first impedance of the first component changes according to a pressure; a second component for receiving the signal source, wherein the second component has a second impedance; and a control unit for calculating a first current value I1 and a second current value I2 from the first component and the second component, respectively, and calculating the pressure according to a ratio of the first current value I1 and the second current value I2; and a communication unit for transmitting the pressure value.

In one embodiment, the second impedance is not changed according to the pressure. Alternatively, the second impedance is changed according to the pressure, too.

In one embodiment, the communication unit comprises a wireless communication unit for transmitting the pressure value. Alternatively, the communication unit comprises a wired communication unit for transmitting the pressure value.

In one embodiment, the signal source is the wired communication unit. In one embodiment, the signal source is a signal received from the tip section.

In one embodiment, the ratio is corresponding to the pressure. The ratio may be one of the followings: I1/I2, I2/I1, I1/(I1+I2), I2/(I1+I2), (I1−I2)/(I1+I2), and (I2−I1)/(I1+I2).

In one embodiment, the first impedance equals to the second impedance if the pressure is absent.

In one embodiment, the transmitter further comprises a third switch and a third component serially connected to the third switch, wherein the first component is connected with the third switch and the third component in parallel. The transmitter may further comprise a fourth switch and a fourth component serially connected to the fourth switch, wherein the first component is connected with the fourth switch and the fourth component in parallel. In one embodiment, if the ratio equals or falls into a first range, the pressure is absent. If the ratio equals or falls into a second range, the third switch is shorted and the first component is connected with the third component in parallel. If the ratio equals or falls into a third range, the fourth switch is shorted and the first component is connected with the fourth component in parallel. If the ratio equals or falls into a fourth range, the third switch and the fourth switch are shorted and the first component is connected with the third component and the fourth component in parallel.

Alternatively, the transmitter further comprises a third switch and a third component serially connected to the third switch, wherein the second component is connected with the third switch and the third component in parallel. The transmitter may further comprise a fourth switch and a fourth component serially connected to the fourth switch, wherein the second component is connected with the fourth switch and the fourth component in parallel. Alternatively, if the ratio equals or falls into a fifth range, the third switch is shorted and the second component is connected with the third component in parallel. If the ratio equals or falls into a sixth range, the fourth switch is shorted and the second component is connected with the fourth component in parallel. If the ratio equals or falls into a seventh range, the third switch and the fourth switch are shorted and the second component is connected with the third component and the fourth component in parallel.

In one embodiment, the control unit further determining the state of the third switch according to the ratio. Alternatively, the control unit further determining the state of the fourth switch according to the ratio.

In one embodiment, the communication unit further transmitting the state of the third switch. Alternatively, the communication unit further transmitting the state of the fourth switch.

One aspect of the present application is to provide a transmitting method for a transmitter, which comprises a first component, a second component, and a tip section. The tip section is used to receive the outputs of the first and the second components. The method comprises changing a first impedance of the first component according to a pressure on the tip section; providing a signal source to the first component and the second component; and calculating the pressure according to a ratio of the first current value I1 and the second current value I2; and transmitting the pressure value.

One aspect of the present application is to provide a touch sensitive system for determining a pressure received by a transmitter, comprises: the transmitter; and a host. The transmitter comprises: a first component for receiving a signal source, wherein a first impedance of the first component changes according to a pressure; a second component for receiving the signal source, wherein the second component has a second impedance; and a control unit for calculating a first current value I1 and a second current value I2 from the first component and the second component, respectively, and calculating the pressure according to a ratio of the first current value I1 and the second current value I2; and a communication unit for transmitting the pressure value to the host. The host comprises a host communication unit for receiving the pressure value.

In one embodiment, the touch sensitive system further comprises a touch panel and a touch sensitive processing apparatus, wherein the touch sensitive processing apparatus coupled to the touch panel is configured to detect a position the transmitter is relative to the touch panel and to send the position to the host.

In one embodiment, the control unit further determining the state of the third switch according to the ratio. Alternatively, the control unit further determining the state of the fourth switch according to the ratio. In one embodiment, the communication unit further transmitting the state of the third switch to the host. Alternatively, the communication unit further transmitting the state of the fourth switch to the host. In one embodiment, the host communication unit is configured to receive the state of the third switch. Alternatively, the host communication unit is configured to receive the state of the fourth switch.

One aspect of the present application is to provide a force sensor, comprises a first input terminal for receiving signal with a first frequency group; a second input terminal for receiving signal with a second frequency group; and an output terminal for transmitting an electric signal, wherein a ratio of a first signal strength M1 and a second signal strength M2 corresponding to signal with a first frequency group and signal with a second frequency group contained in the electric signal, respectively, is corresponding to a pressure.

In one embodiment, the ratio is one of the followings: M1/M2, M2/M1, M1/(M1+M2), M2/(M1+M2), (M1−M2)/(M1+M2), and (M2−M1)/(M1+M2).

In one embodiment, the force sensor further comprises a third switch. In one embodiment, if the ratio equals or falls into a first range, the pressure is absent. If the ratio equals or falls into a second range, the third switch is shorted.

Alternatively, the force sensor further comprises a fourth switch. In one embodiment, if the ratio equals or falls into a third range, the fourth switch is shorted. If the ratio equals or falls into a fourth range, the third switch and the fourth switch are shorted.

One aspect of the present application is to provide a force sensor, comprises a first output terminal for outputting signal with a first current value I1; and a second output terminal for outputting signal with a second current value I2, wherein a ratio of the first current value I1 and the second current value I2 is corresponding to a pressure.

In one embodiment, the ratio may be one of the followings: I1/I2, I2/I1, I1/(I1+I2), I2/(I1+I2), (I1−I2)/(I1+I2), and (I2−I1)/(I1+I2).

In one embodiment, the force sensor further comprises a third switch. In one embodiment, if the ratio equals or falls into a first range, the pressure is absent. If the ratio equals or falls into a second range, the third switch is shorted.

Alternatively, the force sensor further comprises a fourth switch. In one embodiment, if the ratio equals or falls into a third range, the fourth switch is shorted. If the ratio equals or falls into a fourth range, the third switch and the fourth switch are shorted.

One aspect of the present application is to provide a force sensor, comprises: a first circuit board containing a first metal plate for receiving signal with a first frequency group; a second circuit board in parallel with the first circuit board, containing a second metal plate and a third metal plate which are intact, wherein the third metal plate for receiving signal with a second frequency group, whether the second metal plate for outputting an electric signal, wherein the second metal plate is in the middle of the first and the third metal plates; and a ramp means for bending the first circuit board upward.

One aspect of the present application is to provide a force sensor, comprises: a first circuit board containing a first metal plate for outputting signal with a first current value I1; a second circuit board in parallel with the first circuit board, containing a second metal plate and a third metal plate which are intact to each other, wherein the third metal plate for outputting signal with a second current value I2, whether the second metal plate for receiving a signal source, wherein the second metal plate is in the middle of the first and the third metal plates; and a ramp means for bending the first circuit board upward.

In one embodiment, part of the first metal plate is located in the bent part of the first circuit board.

In one embodiment, the force sensor further comprises a supporting element for supporting the first circuit board.

In one embodiment, the first metal plate, the second metal plate, and the third metal plate are in parallel. Alternatively, the distance between the first and the second metal plate equals to the distance between the second metal plate and the third metal plate.

In one embodiment, a first capacitor is formed by the first and the second metal plates; a second capacitor is formed by the second and the third metal plates. Alternatively, the impedance of the first capacitor equals to the impedance of the second capacitor if the first circuit board is not bending.

In one embodiment, both the first and the second circuit boards are printed circuit boards.

One aspect of the application is to provide a force sensor, comprises a first circuit board containing a first metal plate and a third metal plate which are intact to each other for receiving signal with a first frequency group and signal with a second frequency group, respectively; a second circuit board in parallel with the first circuit board containing a second metal plate for outputting an electric signal; and a ramp means for bending the first circuit board upward.

One aspect of the application is to provide a force sensor, comprises a first circuit board containing a first metal plate and a third metal plate which are intact to each other for outputting signal with a first current value and signal with a second current value, respectively, a second circuit board in parallel with the first circuit board containing a second metal plate for receiving a signal source 1; and a ramp means for bending the first circuit board upward.

In one embodiment, the force sensor further comprises a supporting element for supporting the first circuit board.

In one embodiment, the first metal plate is in parallel with the second metal plate; the second metal plate is in parallel with the third metal plate. Alternatively, the distance between the first and the second metal plate equals to the distance between the second metal plate and the third metal plate.

In one embodiment, a first capacitor is formed by the first and the second metal plates; a second capacitor is formed by the second and the third metal plates. Alternatively, the impedance of the first capacitor equals to the impedance of the second capacitor if the first circuit board is not bending.

In one embodiment, both the first and the second circuit boards are printed circuit boards.

One aspect of the application is to provide a force sensor, comprises a first circuit board containing a first metal plate and a third metal plate which are intact to each other for receiving signal with a first frequency group and signal with a second frequency group, respectively; a second circuit board in parallel with the first circuit board containing a second metal plate for outputting an electric signal; a third circuit board containing a fourth metal plate and a fifth metal plate which are intact to each other for receiving signal with the first frequency group and signal with the second frequency group, respectively; and a ramp means for bending the first circuit board upward and bending the third circuit board downward.

In one embodiment, the force sensor further comprises a first supporting element for supporting the first circuit board.

In one embodiment, the force sensor further comprises a second supporting element for supporting the third circuit board.

In one embodiment, the first metal plate is in parallel with the second metal plate; the second metal plate is in parallel with the third metal plate; the fourth metal plate is in parallel with the second metal plate; the fifth metal plate is in parallel with the second metal plate. Alternatively, the distance between the first and the second metal plate equals to the distance between the second metal plate and the third metal plate. The distance between the fourth and the second metal plate equals to the distance between the second metal plate and the fifth metal plate.

In one embodiment, the first metal plate is on top of the fourth metal plate. Alternatively, the third metal plate is on top of the fifth metal plate.

In one embodiment, area of the first metal plate equals to area of the fourth metal plate. Alternatively, area of the third metal plate equals to area of the fifth metal plate.

In one embodiment, a first capacitor is formed by the first and the second metal plates; a second capacitor is formed by the second and the third metal plates; a third capacitor is formed by the fourth and the second metal plates; a fourth capacitor is formed by the second and the fifth metal plates. Alternatively, the impedance of the first capacitor equals to the impedance of the second capacitor if the first circuit board is not bending. Alternatively, the impedance of the third capacitor equals to the impedance of the fourth capacitor if the third circuit board is not bending. Alternatively, the impedance of the first capacitor equals to the impedance of the third capacitor, the impedance of the second capacitor equals to the impedance of the fourth capacitor.

In one embodiment, the first, the second, and the third circuit boards are all printed circuit boards.

One aspect of the application is to provide a force sensor, comprises a first circuit board containing a first metal plate for receiving signal with a first frequency group; a second circuit board in parallel with the first circuit board containing a second metal plate, a third metal plate, a fourth metal plate and a fifth metal plate which are intact and parallel to each other, wherein the third metal plate and the fourth metal plate for receiving signal with a second frequency group, wherein the second metal plate is coupled to the fifth metal plate for outputting an electric signal; a third circuit board containing a sixth metal plate for receiving signal with the first frequency board, wherein the second circuit board is placed in between the first and the third circuit boards; and a ramp means for bending the first circuit board upward and bending the third circuit board downward.

In one embodiment, the force sensor further comprises a first supporting element for supporting the first circuit board. In one embodiment, the force sensor further comprises a second supporting element for supporting the third circuit board.

In one embodiment, the first metal plate is in parallel with the second metal plate; the second metal plate is in parallel with the third metal plate; the third metal plate is in parallel with the fourth metal plate; the fourth metal plate is in parallel with the fifth metal plate; and the fifth metal plate is in parallel with the six metal plate. Alternatively, the distance between the first and the second metal plate equals to the distance between the second metal plate and the third metal plate. The distance between the fourth and the fifth metal plate equals to the distance between the fifth metal plate and the sixth metal plate.

In one embodiment, the first metal plate is on top of the sixth metal plate.

In one embodiment, area of the first metal plate equals to area of the sixth metal plate. Alternatively, area of the second metal plate is on top of the fifth metal plate. Alternatively, area of the third metal plate is on top of the fourth metal plate.

In one embodiment, a first capacitor is formed by the first and the second metal plates; a second capacitor is formed by the second and the third metal plates; a third capacitor is formed by the fourth and the fifth metal plates; a fourth capacitor is formed by the fifth and the sixth metal plates. Alternatively, the impedance of the first capacitor equals to the impedance of the second capacitor if the first circuit board is not bending. Alternatively, the impedance of the third capacitor equals to the impedance of the fourth capacitor if the third circuit board is not bending. Alternatively, the impedance of the first capacitor equals to the impedance of the fourth capacitor, the impedance of the second capacitor equals to the impedance of the third capacitor.

In one embodiment, the first, the second, and the third circuit boards are all printed circuit boards.

One aspect of the application is to provide a force sensor, comprises: a first metal plate, a second metal plate, and third metal plate which are intact and sequentially parallel to each other, wherein the first metal plate for receiving signal with a first frequency group, the third metal plate for receiving signal with a second frequency group, the second metal plate for outputting an electric signal, wherein one end of the second metal plate is bendable.

One aspect of the application is to provide a force sensor, comprises: a first metal plate, a second metal plate, and third metal plate which are intact and sequentially parallel to each other, wherein the first metal plate for outputting signal with a first current value, the third metal plate for outputting signal with a second current value, and the second metal plate for receiving a signal source, wherein one end of the second metal plate is bendable.

In one embodiment, the distance between the first metal plate and the second metal plate equals to the distance between the second metal plate and the third metal plate.

In one embodiment, a first capacitor is formed by the first and the second metal plates; a second capacitor is formed by the second and the third metal plates. Alternatively, the impedance of the first capacitor equals to the impedance of the second capacitor if the first circuit board is not bending.

One aspect of the application is to provide a force sensor, comprises: a first metal plate, a second metal plate, and third metal plate which are intact and sequentially parallel to each other, wherein the first metal plate for outputting an electric signal, the second metal plate for receiving signal with a first frequency group, the third metal plate for receiving signal with a second frequency group, wherein one end of the first metal plate is bendable.

One aspect of the application is to provide a force sensor, comprises: a first metal plate, a second metal plate, and third metal plate which are intact and sequentially parallel to each other, wherein the first metal plate for receiving a signal source, the second metal plate for outputting signal with a first current value, the third metal plate for outputting signal with a second current value, wherein one end of the first metal plate is bendable.

In one embodiment, the distance between the first metal plate and the second metal plate equals to the distance between the second metal plate and the third metal plate.

In one embodiment, a first capacitor is formed by the first and the second metal plates; a second capacitor is formed by the second and the third metal plates. Alternatively, the impedance of the first capacitor equals to the impedance of the second capacitor if the first circuit board is not bending.

One aspect of the application is to provide a transmitter, comprises a moving part for moving a stroke along an axis of the transmitter; an dielectric material placing in the rear of the moving part; and a conductor placing in the rear of the dielectric material, wherein a force sensitive capacitor is formed by the moving part, the dielectric, and the conductor.

In one embodiment, the transmitter further comprises a tip section placing in the fore of the moving part. In one embodiment, the tip section is a conductor coupling to the moving part. Alternatively, the tip section is configured to transmit an electric signal.

In one embodiment, the transmitter further comprises an elastic element and a shell component, wherein the elastic element is configured to provide elastic force between the moving part and the shell component such that the moving part is pushed to the fore end of the stroke by the elastic force.

In one embodiment, the dielectric material is a dielectric film. The conductor comprises a compressible conductor and a conductor base. Alternatively, the dielectric material is compressible dielectric material.

In one embodiment, a contact surface of the dielectric material facing the conductor comprises one of the following: a sloped surface, a surface with multiple bulges, a conical surface, and a surface with central bulge. Alternatively, a contact surface of the conductor facing the dielectric material comprises one of the following: a sloped surface, a surface with multiple bulges, a conical surface, and a surface with central bulge.

In one embodiment, the dielectric material and the conductor reside in an internal chamber of the shell component. Alternatively, the internal chamber is an empty cylinder.

In one embodiment, the moving part comprises a fore moving part and a rear moving part. The fore moving part contacts with the tip section and electrically couples to the tip section.

In one embodiment, the transmitter further comprises a circuit board which connects to the conductor via a base wire and connects to the moving part via a moving part wire. Alternatively, the moving part wire is coupled to the elastic element.

In one embodiment, the elastic element does not surround the moving part. Alternatively, the base wire does not surround the conductor.

One aspect of the application is to provide a circuit switch, comprises: a first circuit board, a second circuit board, a third circuit board which are intact and sequentially parallel to each other, and a dual ramp means, wherein a first end of the first circuit board and a first end of the third circuit board contacts with the two ramps of the dual ramp means, respectively, a first end of the second circuit board does not contact with the dual ramp means, the first end of the second circuit board comprises a circuit, a second point and a third point of the circuit contacts with and electrically couples to a first point of the first circuit board and a fourth point of the third circuit board, respectively.

In one embodiment, when the dual ramp means moves toward the second circuit board, the first circuit board and the third circuit board pressed by the dual ramp means and bent upward and downward, respectively, whereby the electrically coupling between the first point and the second point is open and the electrically coupling between the third point and the fourth point is open, the voltage level of the first connection port is high.

In one embodiment, the first point is connected with a first connection point and a high voltage in parallel, the fourth point is connected with a low voltage, the voltage level of the first connection point is low if the first point and the second point are shorted and the third point and the fourth point are shorted, the voltage level of the first connection point is high if the electrically coupling between the first point and the second point is open or the electrically coupling between the third point and the fourth point is open.

In one embodiment, the dual ramp means connects with a tip section.

In one embodiment, the circuit is placed at the edge of the first end of the second circuit board.

One aspect of the application is to provide a circuit switch, comprises: a first circuit board, a second circuit board, a third circuit board which are intact and sequentially parallel to each other, and a dual ramp means, wherein a first end of the first circuit board and a first end of the third circuit board contacts with the two ramps of the dual ramp means, respectively, a first end of the second circuit board does not contact with the dual ramp means, the first end of the second circuit board comprises a circuit, a second point of the circuit contacts with and electrically couples to a first point of the first circuit board.

In one embodiment, when the dual ramp means moves toward the second circuit board, the first circuit board and the third circuit board pressed by the dual ramp means and bent upward and downward, respectively, whereby the electrically coupling between the first point and the second point is open.

In one embodiment, the first point is connected with a first connection point and a high voltage, the second point is connected with a low voltage, the voltage level of the first connection point is low if the first point and the second point are shorted, the voltage level of the first connection point is high if the electrically coupling between the first point and the second point is open.

In one embodiment, the dual ramp means connects with a tip section.

In one embodiment, the circuit is placed at the edge of the first end of the second circuit board.

One aspect of the application is to provide a stylus, comprises: a control unit, a tip section; and a circuit switch, which comprises: a first circuit board, a second circuit board, a third circuit board which are intact and sequentially parallel to each other, and a dual ramp means, wherein a first end of the first circuit board and a first end of the third circuit board contacts with the two ramps of the dual ramp means, respectively, a first end of the second circuit board does not contact with the dual ramp means, the first end of the second circuit board comprises a circuit, a second point and a third point of the circuit contacts with and electrically couples to a first point of the first circuit board and a fourth point of the third circuit board, respectively, wherein the first point connects with a first connection point of the control unit and a high voltage in parallel, the fourth point is connected with a low voltage, the voltage of the first connection port is low.

In one embodiment, when the dual ramp means moves toward the second circuit board, the first circuit board and the third circuit board pressed by the dual ramp means and bent upward and downward, respectively, whereby the electrically coupling between the first point and the second point is open and the electrically coupling between the third point and the fourth point is open, the voltage level of the first connection port is high.

In one embodiment, the control unit is waked up if the voltage level of the first connection port turns high from low.

One aspect of the application is to provide a stylus, comprises: a control unit, a tip section; and a circuit switch, which comprises: a first circuit board, a second circuit board, a third circuit board which are intact and sequentially parallel to each other, and a dual ramp means, wherein a first end of the first circuit board and a first end of the third circuit board contacts with the two ramps of the dual ramp means, respectively, a first end of the second circuit board does not contact with the dual ramp means, the first end of the second circuit board comprises a circuit, a second point of the circuit contacts with and electrically couples to a first point of the first circuit board, wherein the first point connects with a first connection point of the control unit and a high voltage in parallel, the second point is connected with a low voltage, the voltage of the first connection port is low.

In one embodiment, when the dual ramp means moves toward the second circuit board, the first circuit board and the third circuit board pressed by the dual ramp means and bent upward and downward, respectively, whereby the electrically coupling between the first point and the second point is open, the voltage level of the first connection port is high.

In one embodiment, the control unit is waked up if the voltage level of the first connection port turns high from low.

One aspect of the application is to provide a method for a transmitter, comprises: transmitting a first period electric signal during a first time period; and transmitting a second period electric signal during a second time period, wherein frequency group contained in the first period electric signal is different from frequency group contained in the second period electric signal.

One aspect of the application is to provide a transmitter, which is configured for transmitting a first period electric signal during a first time period; and transmitting a second period electric signal during a second time period, wherein frequency group contained in the first period electric signal is different from frequency group contained in the second period electric signal.

One aspect of the application is to provide a touch sensitive system, comprises a transmitter, a touch panel and a touch sensitive processing apparatus coupled to the touch panel, which is configured for detecting the transmitter according to a first period electric signal and a second period electric signal. The transmitter is configured for transmitting the first period electric signal during a first time period; and transmitting the second period electric signal during a second time period, wherein frequency group contained in the first period electric signal is different from frequency group contained in the second period electric signal.

In one embodiment, the frequency group contains one or more frequencies.

In one embodiment, the first time period is after a beacon signal detected by the transmitter. Alternatively, there exists a first delay time between the beacon signal detection and the first time period.

In one embodiment, there exists a second delay time between the first time period and the second time period.

In one embodiment, there exists a third delay time after the second time period.

In one embodiment, prior to the detection of the beacon signal, the transmitter detects an interference signal. Alternatively, the interference signal comprises signals which are coherent to the first period electric signal and the second electric signal.

Please refer to the Table 1, in one embodiment, if a tip section of the transmitter does not touch, a first signal source and a second signal source of the transmitter simultaneously transmit signals with the same frequency group.

Please refer to the Table 1, in one embodiment, if the tip section of the transmitter does not touch and a first switch of the transmitter is open, the first signal source and the second signal source simultaneously transmit signals with a first frequency group; if the tip section does not touch and the first switch is shorted, the first signal source and the second signal source simultaneously transmit signals with a second frequency group, the first frequency group is different to the second frequency group.

Please refer to the Table 1, in one embodiment, if the tip section of the transmitter does not touch and a second switch of the transmitter is open, the first signal source and the second signal source simultaneously transmit signals with the first frequency group; if the tip section does not touch and the first switch is shorted, the first signal source and the second signal source simultaneously transmit signals with a third frequency group, the first frequency group is different to the third frequency group.

Please refer to the Table 2, in one embodiment, if a tip section of the transmitter does touch, a first signal source and a second signal source of the transmitter transmit signals with different frequency groups during the second time period and the first time period.

Please refer to the Table 2, in one embodiment, if the tip section of the transmitter does touch and a first switch of the transmitter is open, the second signal source transmits signal with a first frequency group during the first time period; if a tip section of the transmitter does touch and the first switch of the transmitter is shorted, the second signal source transmits signal with a second frequency group during the first time period, the first frequency group is different to the second frequency group.

Please refer to the Table 2, in one embodiment, if the tip section of the transmitter does touch and a second switch of the transmitter is open, the first signal source transmits signal with a third frequency group during the second time period; if a tip section of the transmitter does touch and the second switch of the transmitter is shorted, the first signal source transmits signal with the second frequency group during the second time period, the third frequency group is different to the second frequency group.

In one embodiment, a ratio of a first signal strength M1 transmitted by the first signal source during the second time period and a second signal strength M2 transmitted by the second signal source during the first time period is corresponding to a pressure on the transmitter.

In one embodiment, a ring electrode transmits a zeroth period electric signal during a zeroth time period, the zeroth time period is after the transmitter detects the beacon signal. Alternatively, there exists a zeroth delay time between the detection of the beacon signal and the zeroth time period.

In one embodiment, the ring electrode does not transmit electric signal during the first time period and the second time period.

In one embodiment, frequency group contained in the zeroth period electric signal is different to frequency group contained the first period electric signal and the second period electric signal.

One aspect of the application is to provide a method for a transmitter, comprises: transmitting a first period electric signal during a first time period; and transmitting a second period electric signal during a second time period, wherein frequency group contained in the first period electric signal is as the same as frequency group contained in the second period electric signal.

One aspect of the application is to provide a transmitter, which is configured for transmitting a first period electric signal during a first time period; and transmitting a second period electric signal during a second time period, wherein frequency group contained in the first period electric signal is as the same as frequency group contained in the second period electric signal.

One aspect of the application is to provide a touch sensitive system, comprises a transmitter, a touch panel and a touch sensitive processing apparatus coupled to the touch panel, which is configured for detecting the transmitter according to a first period electric signal and a second period electric signal. The transmitter is configured for transmitting the first period electric signal during a first time period; and transmitting the second period electric signal during a second time period, wherein frequency group contained in the first period electric signal is as the same as frequency group contained in the second period electric signal.

In one embodiment, the frequency group contains one or more frequencies.

In one embodiment, the first time period is after a beacon signal detected by the transmitter. Alternatively, there exists a first delay time between the beacon signal detection and the first time period.

In one embodiment, there exists a second delay time between the first time period and the second time period.

In one embodiment, there exists a third delay time after the second time period.

In one embodiment, prior to the detection of the beacon signal, the transmitter detects an interference signal. Alternatively, the interference signal comprises signals which are coherent to the first period electric signal and the second electric signal.

Please refer to the Table 3, in one embodiment, if a tip section of the transmitter does not touch, a first signal source and a second signal source of the transmitter simultaneously transmit signals with the same frequency group.

Please refer to the Table 3, in one embodiment, if the tip section of the transmitter does not touch and a first switch of the transmitter is open, the first signal source and the second signal source simultaneously transmit signals with a first frequency group; if the tip section does not touch and the first switch is shorted, the first signal source and the second signal source simultaneously transmit signals with a second frequency group, the first frequency group is different to the second frequency group.

Please refer to the Table 3, in one embodiment, if the tip section of the transmitter does not touch and a second switch of the transmitter is open, the first signal source and the second signal source simultaneously transmit signals with the first frequency group; if the tip section does not touch and the first switch is shorted, the first signal source and the second signal source simultaneously transmit signals with a third frequency group, the first frequency group is different to the third frequency group.

Please refer to the Table 4, in one embodiment, if a tip section of the transmitter does touch, a first signal source and a second signal source of the transmitter transmit signals with the same frequency groups during the second time period and the first time period, respectively.

Please refer to the Table 4, in one embodiment, if a tip section of the transmitter does touch and a first switch of the transmitter is open, the second signal source transmits signal with a first frequency group during the first time period; if a tip section of the transmitter does touch and the first switch of the transmitter is shorted, the second signal source transmits signal with a second frequency group during the first time period, the first frequency group is different to the second frequency group.

Please refer to the Table 4, in one embodiment, if the tip section of the transmitter does touch and a second switch of the transmitter is open, the first signal source transmits signal with a third frequency group during the second time period; if a tip section of the transmitter does touch and the second switch of the transmitter is shorted, the first signal source transmits signal with the second frequency group during the second time period, the third frequency group is different to the second frequency group.

In one embodiment, a ring electrode transmits a zeroth period electric signal during a zeroth time period, the zeroth time period is after the transmitter detects the beacon signal. Alternatively, there exists a zeroth delay time between the detection of the beacon signal and the zeroth time period.

In one embodiment, the ring electrode does not transmit electric signal during the first time period and the second time period.

In one embodiment, frequency group contained in the zeroth period electric signal is different to frequency group contained the first period electric signal and the second period electric signal.

In one embodiment, a ratio of a first signal strength M1 transmitted by the first signal source during the second time period and a second signal strength M2 transmitted by the second signal source during the first time period is corresponding to a pressure on the transmitter.

One aspect of the application is to provide a method for detecting a transmitter, comprises: detecting a first period electric signal emitted from the transmitter during a first time period; and detecting a second period electric signal emitted from the transmitter from a second time period, wherein frequency group contained in the first period electric signal is different from frequency group contained in the second period electric signal.

One aspect of the application is to provide a touch sensitive processing apparatus for detecting a transmitter, coupled to a touch panel which comprises a plurality of first electrodes and a plurality of second electrodes as well as multiple sensing points located where the intersections, the touch sensitive processing apparatus is configured for detecting a first period electric signal emitted from the transmitter during a first time period; and detecting a second period electric signal emitted from the transmitter from a second time period, wherein frequency group contained in the first period electric signal is different from frequency group contained in the second period electric signal.

One aspect of the application is to provide a touch sensitive system comprises a transmitter, a touch panel, and a touch sensitive processing apparatus, coupled to the touch panel, configured for detecting a first period electric signal emitted from the transmitter during a first time period; and detecting a second period electric signal emitted from the transmitter from a second time period, wherein frequency group contained in the first period electric signal is different from frequency group contained in the second period electric signal.

In one embodiment, the frequency group contains one or more frequencies.

In one embodiment, the first time period is after a beacon signal detected by the transmitter. Alternatively, there exists a first delay time between the beacon signal detection and the first time period.

In one embodiment, there exists a second delay time between the first time period and the second time period.

In one embodiment, there exists a third delay time after the second time period.

In one embodiment, prior to the detection of the beacon signal, the transmitter detects an interference signal. In one embodiment, an interference signal is detected after the first time period. In one embodiment, an interference signal is detected after the second time period. Alternatively, the interference signal comprises signals which are coherent to the first period electric signal and the second electric signal.

Please refer to the Table 1, in one embodiment, if the transmitter simultaneously transmit signals with the same frequency group, it is determined that a tip section of the transmitter does not touch.

Please refer to the Table 1, in one embodiment, if the transmitter transmits signals with a first frequency group during a first time period, it is determined that the tip section does not touch and a first switch of the transmitter is open; if the transmitter transmits signals with a second frequency group during the first time period, it is determined that the tip section does not touch and the first switch of the transmitter is shorted, wherein the first frequency group is different to the second frequency group.

Please refer to the Table 1, in one embodiment, if the transmitter transmits signals with a first frequency group during a second time period, it is determined that the tip section does not touch and a second switch of the transmitter is open; if the transmitter transmits signals with a third frequency group during the second time period, it is determined that the tip section does not touch and the first switch of the transmitter is shorted, wherein the first frequency group is different to the third frequency group.

Please refer to the Table 2, in one embodiment, if the transmitter transmits signals with different frequency groups during the first time period and the second time period, it is determined that a tip section of the transmitter does touch.

Please refer to the Table 2, in one embodiment, if the transmitter transmits signal with a first frequency group during the first time period, it is determined that the tip section does touch and a first switch of the transmitter is open; if the transmitter transmits signal with a second frequency group during the first time period, it is determined that the tip section does touch and the first switch of the transmitter is shorted, wherein the first frequency group is different to the third frequency group.

Please refer to the Table 2, in one embodiment, if the transmitter transmits signal with a third frequency group during the second time period, it is determined that the tip section does touch and a second switch of the transmitter is open; if the transmitter transmits signal with a second frequency group during the second time period, it is determined that the tip section does touch and the second switch of the transmitter is shorted, wherein the first frequency group is different to the third frequency group.

In one embodiment, a ratio of a first signal strength M1 transmitted by the first signal source during the second time period and a second signal strength M2 transmitted by the second signal source during the first time period is calculated; and a pressure on the transmitter according to the ratio is calculated.

In one embodiment, detecting a zeroth period electric signal transmitted by the transmitter during a zeroth time period, the zeroth time period is after the transmitter detects the beacon signal. Alternatively, there exists a zeroth delay time between the detection of the beacon signal and the zeroth time period.

In one embodiment, frequency group contained in the zeroth period electric signal is different to frequency group contained the first period electric signal and the second period electric signal.

One aspect of the application is to provide a method for detecting a transmitter, comprises: detecting a first period electric signal emitted from the transmitter during a first time period; and detecting a second period electric signal emitted from the transmitter from a second time period, wherein frequency group contained in the first period electric signal is as the same as frequency group contained in the second period electric signal.

One aspect of the application is to provide a touch sensitive processing apparatus for detecting a transmitter, coupled to a touch panel which comprises a plurality of first electrodes and a plurality of second electrodes as well as multiple sensing points located where the intersections, the touch sensitive processing apparatus is configured for detecting a first period electric signal emitted from the transmitter during a first time period; and detecting a second period electric signal emitted from the transmitter from a second time period, wherein frequency group contained in the first period electric signal is as the same as frequency group contained in the second period electric signal.

One aspect of the application is to provide a touch sensitive system comprises a transmitter, a touch panel, and a touch sensitive processing apparatus, coupled to the touch panel, configured for detecting a first period electric signal emitted from the transmitter during a first time period; and detecting a second period electric signal emitted from the transmitter from a second time period, wherein frequency group contained in the first period electric signal is as the same as frequency group contained in the second period electric signal.

In one embodiment, the frequency group contains one or more frequencies.

In one embodiment, the first time period is after a beacon signal detected by the transmitter. Alternatively, there exists a first delay time between the beacon signal detection and the first time period.

In one embodiment, there exists a second delay time between the first time period and the second time period.

In one embodiment, there exists a third delay time after the second time period.

In one embodiment, prior to the detection of the beacon signal, the transmitter detects an interference signal. In one embodiment, an interference signal is detected after the first time period. In one embodiment, an interference signal is detected after the second time period. Alternatively, the interference signal comprises signals which are coherent to the first period electric signal and the second electric signal.

Please refer to the Table 3, in one embodiment, if the first period electric signals with the same frequency group and the second period electric signals with the same frequency group, it is determined that a tip section of the transmitter does not touch.

Please refer to the Table 3, in one embodiment, if the transmitter transmits signals with a first frequency group, it is determined that the tip section does not touch and a first switch of the transmitter is open; if the transmitter transmits signals with a second frequency group, it is determined that the tip section does not touch and the first switch of the transmitter is shorted, wherein the first frequency group is different to the second frequency group.

Please refer to the Table 3, in one embodiment, if the transmitter transmits signals with a first frequency group, it is determined that the tip section does not touch and a second switch of the transmitter is open; if the transmitter transmits signals with a third frequency group, it is determined that the tip section does not touch and the first switch of the transmitter is shorted, wherein the first frequency group is different to the third frequency group.

Please refer to the Table 4, in one embodiment, if the first period electric signals with the same frequency group and the second period electric signals with the same frequency group and a ratio of a signal strength M1 of the first period electric signal and a signal strength M2 of the second period electric signal does not fall into a first range, it is determined that a tip section of the transmitter does not touch.

Please refer to the Table 4, in one embodiment, if the transmitter transmits signal with a first frequency group during the first time period and the ratio does not fall into a first range, it is determined that the tip section does touch and a first switch of the transmitter is open; if the transmitter transmits signal with a second frequency group during the first time period and the ratio does not fall into the first range, it is determined that the tip section does touch and the first switch of the transmitter is shorted, wherein the first frequency group is different to the third frequency group.

Please refer to the Table 4, in one embodiment, if the transmitter transmits signal with a third frequency group during the second time period and the ratio does not fall into a first range, it is determined that the tip section does touch and a first switch of the transmitter is open; if the transmitter transmits signal with a second frequency group during the second time period and the ratio does not fall into the first range, it is determined that the tip section does touch and the second switch of the transmitter is shorted, wherein the first frequency group is different to the third frequency group.

In one embodiment, a ratio of a first signal strength M1 transmitted by the first signal source during the second time period and a second signal strength M2 transmitted by the second signal source during the first time period is calculated; and a pressure on the transmitter according to the ratio is calculated.

In one embodiment, detecting a zeroth period electric signal transmitted by the transmitter during a zeroth time period, the zeroth time period is after the transmitter detects the beacon signal. Alternatively, there exists a zeroth delay time between the detection of the beacon signal and the zeroth time period.

In one embodiment, frequency group contained in the zeroth period electric signal is as the same as frequency group contained the first period electric signal and the second period electric signal.

One aspect of the present application is to provide a transmitter, comprises: a tip section and a ring electrode surrounding the tip section, wherein the tip section is not electric coupling to the ring electrode.

In one embodiment, the ring electrode comprises multiple disconnected electrodes.

In one embodiment, the transmitter transmits electric signals via the ring electrode and the tip section during a zeroth time period. In another embodiment, the transmitter transmits electric signals via the tip section during a first time period. Alternatively, the first time period is after the zeroth time period.

In one embodiment, electric signals emitted from the ring electrode and the tip section contains the same frequency group. Alternatively, electric signal emitted from the ring electrode contains frequency group different to the frequency group contained in the electric signal emitted from the tip electrode.

One aspect of the present application is to provide a method for detecting a position of a transmitter, wherein the transmitter comprises a tip section and a ring electrode surrounding the tip section, wherein the tip section is not electric coupling to the ring electrode, the method comprises detecting electric signals emitted from the ring electrode and the tip section during a zeroth time period; and detecting electric signals emitted from the tip section during a first time period.

One aspect of the present application is to provide a touch sensitive processing apparatus for detecting a position of a transmitter, wherein the transmitter comprises a tip section and a ring electrode surrounding the tip section, wherein the tip section is not electric coupling to the ring electrode, the touch sensitive processing apparatus is coupled to a touch panel which comprises a plurality of first electrodes and a plurality of second electrodes and multiple sensing points located where the intersections, the touch sensitive processing apparatus is configured for detecting electric signals emitted from the ring electrode and the tip section during a zeroth time period; and detecting electric signals emitted from the tip section during a first time period.

One aspect of the present application is to provide a touch sensitive system, comprises a transmitter, a touch panel, and a touch sensitive processing apparatus coupled to the touch panel. The transmitter comprises a tip section and a ring electrode surrounding the tip section, wherein the tip section is not electric coupling to the ring electrode. The touch sensitive processing apparatus is coupled to a touch panel which comprises a plurality of first electrodes and a plurality of second electrodes and multiple sensing points located where the intersections, the touch sensitive processing apparatus is configured for detecting electric signals emitted from the ring electrode and the tip section during a zeroth time period; and detecting electric signals emitted from the tip section during a first time period.

In one embodiment, electric signal emitted from the ring electrode and the tip section contains the same frequency group. Alternatively, electric signal emitted from the ring electrode contains frequency group different to the frequency group contained in the electric signal emitted from the tip electrode.

In one embodiment, the method further comprises calculating a first centroid position of the transmitter according to the electric signal detected during the zeroth time period. Alternatively, the method further comprises calculating a second centroid position of the transmitter according to the electric signal detected during the first time period.

In one embodiment, the method further comprises calculating a surface position where the transmitter touches the touch panel according to the first centroid position and the second centroid position, wherein the surface position is the position where the axis of the tip section projecting to a surface layer of the touch panel.

In one embodiment, the method further comprises calculating a display position where the transmitter touches the touch panel according to the first centroid position and the second centroid position, wherein the display position is the position where the axis of the tip section projecting to a display layer of the touch panel.

In one embodiment, the method further comprises calculating an inclination angle of the transmitter touches the touch panel according to the first centroid position and the second centroid position.

One aspect of the present application is to provide a method for calculating a surface position where a transmitter touches a touch panel, the method comprises: receiving a first centroid position of the transmitter, wherein the first centroid is calculated according to electric signals emitted from a ring electrode and a tip section of the transmitter, receiving a second centroid position of the transmitter, wherein the first centroid is calculated according to electric signals emitted from the a tip section of the transmitter; and calculating the surface position where the transmitter touches the touch panel according to the first centroid position and the second centroid position, wherein the surface position is the position where the axis of the tip section projecting to a surface layer of the touch panel.

One aspect of the present application is to provide a method for calculating a display position where a transmitter touches a touch panel, the method comprises: receiving a first centroid position of the transmitter, wherein the first centroid position is calculated according to electric signals emitted from a ring electrode and a tip section of the transmitter, receiving a second centroid position of the transmitter, wherein the second centroid position is calculated according to electric signals emitted from the a tip section of the transmitter; and calculating the display position where the transmitter touches the touch panel according to the first centroid position and the second centroid position, wherein the display position is the position where the axis of the tip section projecting to a display layer of the touch panel.

One aspect of the present application is to provide a method for calculating an inclination angle of a transmitter touches a touch panel, the method comprises: receiving a first centroid position of the transmitter, wherein the first centroid position is calculated according to electric signals emitted from a ring electrode and a tip section of the transmitter, receiving a second centroid position of the transmitter, wherein the second centroid position is calculated according to electric signals emitted from the a tip section of the transmitter; and calculating the inclination angle according to the first centroid position and the second centroid position.

In one embodiment, the first centroid position is calculated during a zeroth time period. In one embodiment, the second centroid position is calculated during a first time period. Alternatively, the first time period is after the zeroth time period. In one embodiment, electric signal emitted from the ring electrode contains frequency group different to the frequency group contained in the electric signal emitted from the tip electrode.

One aspect of the present application is to provide a display method, comprises: receiving a position of a transmitter; receiving an inclination angle of the transmitter; determining a display area according to the position and the inclination angle.

In one embodiment, the position is one of the followings: a first centroid position, a second centroid position, a surface position; and a display position. The first centroid position is calculated according to electric signals emitted from a ring electrode and a tip section of the transmitter. The second centroid position is calculated according to electric signals emitted from the tip section of the transmitter. The surface position is the position where the axis of the tip section projecting to a surface layer of the touch panel. The display position is the position where the axis of the tip section projecting to a display layer of the touch panel. In one embodiment, electric signal emitted from the ring electrode contains frequency group different to the frequency group contained in the electric signal emitted from the tip electrode.

In one embodiment, the display area comprises an ellipse. Alternatively, the position is located one of the followings: a center of the ellipse, one of two focal points of the ellipse; and one of intersections of the semi-major axis and the ellipse. In one embodiment, the semi-major axis is corresponding to the direction of the inclination angle.

In one embodiment, the display area comprises a tear drop shape. Alternatively, the position is located one of the followings: a center of the tear drop shape, a top of the tear drop shape; and an end of the tear drop shape. In one embodiment, the direction of the tear drop shape is corresponding to the direction of the inclination angle.

In one embodiment, the direction of the display area is corresponding to the direction of the inclination angle. Alternatively, the size of the display area is corresponding to the inclination angle. Alternatively, the color of the display area is corresponding to one of the followings: the inclination angle; and the direction of the inclination angle.

In one embodiment, it further comprises receiving a pressure of the transmitter; the size of the display area is corresponding to the pressure.

One aspect of the present application is to provide a method for controlling the transmitter, comprises: transmitting a first electric signal with a first signal strength if a force sensor of the transmitter does not sense any force; transmitting a second electric signal with a second signal strength if the force sensor does sense force, wherein the first signal strength is larger than the second signal strength.

In one embodiment, the force sensor comprises a tip section of the transmitter.

In one embodiment, the transmitter further comprises a ring electrode. The first electric signal is transmitted via the tip section and the ring electrode, the second electric signal is transmitted via the tip section.

One aspect of the application is to provide a transmitter, comprises a force sensor and a control unit, which is configured to transmitting a first electric signal with a first signal strength if a force sensor of the transmitter does not sense any force; transmitting a second electric signal with a second signal strength if the force sensor does sense force, wherein the first signal strength is larger than the second signal strength.

Code Division Multiple Access (CDMA) is a wireless spread spectrum telecommunication technology adopted in the third generation of mobile telecommunication service. In wireless telecommunication techniques, spread spectrum means the bandwidth consumed by the carrier signal itself exceeds the bandwidth of the contents carried by the carrier signal. Using a carrier signal with bigger bandwidth allows for better tolerance to interfering noise signals during transmission. Direct Sequence Spread Spectrum (DSSS) is one of spread spectrum techniques. DSSS modulation technique employs a bit sequence code called a pseudo noise (PN). The bit sequence code or PN code includes pulse waves each with a short period, which period may be called a chip. The period of a chip is shorter than that of a data or signal code (thereinafter data code). In other words, the bandwidth consumed by a PN code is larger than that consumed by a data code. Therefore, modulating a data code of a smaller bandwidth into a PN code of a larger bandwidth means the bandwidth of the carrier signal after modulation matches or is similar to that of the PN code.

During the process of modulation with a carrier signal, a main step is to multiply a data code and a PN code, which PN code is usually a pseudo random sequence usually including a combination of 1 and −1. One characteristic of PN code is that multiplying a sequence of PN code by the same PN code returns the same PN code, because 1×1=1 and −1×−1=1. This multiplication with the same PN code is called despreading. Accordingly, when the receiving end also knows the sequence of PN code used in the modulation process, it can perform a process of despreading to obtain the data or content code carried by the carrier signal.

Figure 30:
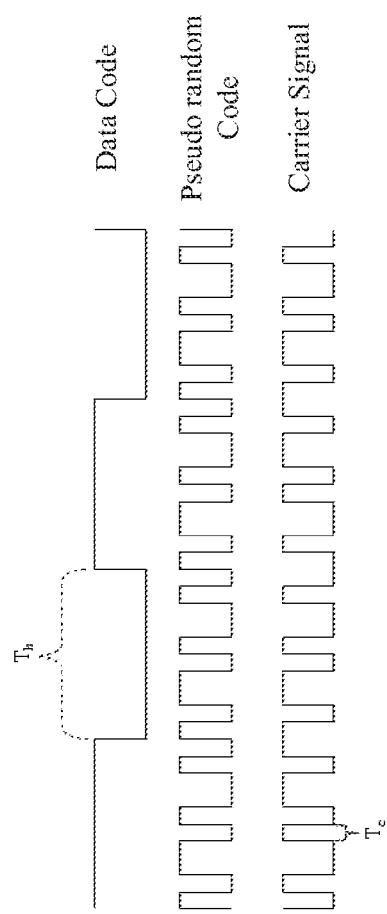
FIG. 30 depicts some waveforms of a spread spectrum technique.

Referring to FIG. 30, some waveforms of a spread spectrum technique are illustrated. The waveform on the top portion of FIG. 30 is a data code, the waveform on the middle portion of FIG. 30 is a pseudo random sequence or a so-called PN code, and the waveform on the bottom portion of FIG. 30 is a carrier signal. According to FIG. 30 it can be known that when the electric potential of the data code is high, the waveforms of the carrier signal and the PN code are opposite to each other. When the electric potential of the data code is low, the waveforms of the carrier signal and the PN code are the same. In other words, the receiving end can compare the waveforms of the carrier signal and the PN code, and when the two waveforms are opposite to each other, the receiving end can infer that the electric potential of the data code is high at this time. Conversely, when the waveforms of the carrier signal and the PN code are the same, the receiving end can infer that the electric potential of the data code is low at this time. Accordingly, the receiving end can infer the state of the electric potential of the data code as long as the PN code used is known.

Figure 31:
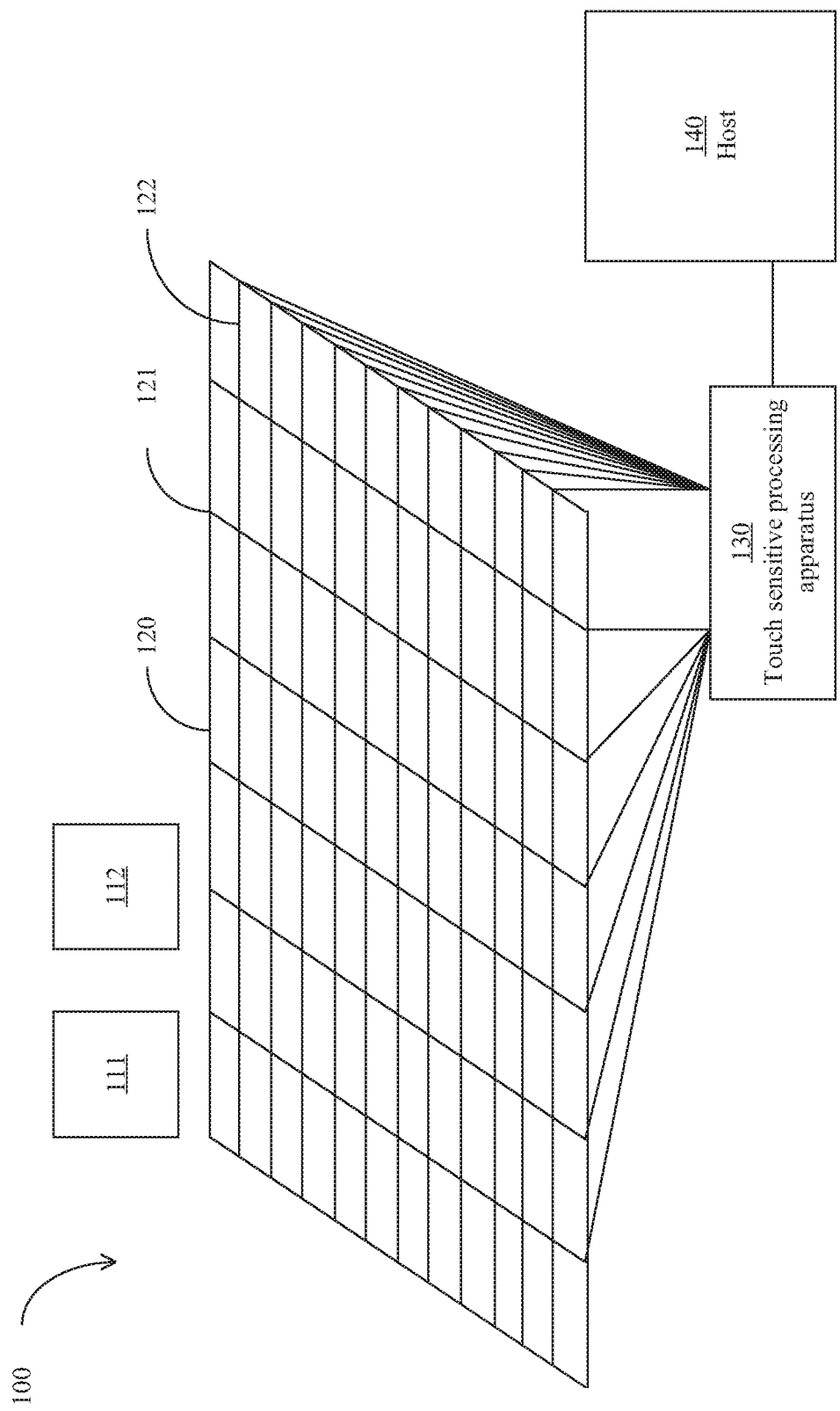
FIG. 31 shows a variant of the embodiment as shown in FIG. 1.

Referring to FIG. 31, which shows a variant of the embodiment as shown in FIG. 1. The touch sensitive system 100 further includes a first stylus 111 and/or a second stylus 112. In one embodiment, these styli 111 and 112 are active.

In some embodiments, the active stylus 111 or 112 may be commanded to code the sensing values from each sensor thereon to the data codes mentioned above. The so-called sensing value of a sensor may include but not limited to the following: a pressure value on a tip section of stylus; sensing value presenting whether a button being pressed or not; sensing value of attitude of a gyroscope; sensing value of acceleration of an accelerometer; sensing value of battery power; serial number of stylus; and wireless signal intensity received by stylus. Then, the active stylus 111 or 112 codes the data code(s) mentioned above to carrier signal(s) by the process of spread spectrum according to certain a PN code. After that, the active stylus 111 or 112 emits the electrical signals including the carrier signals by the tip section thereof. After receiving the electrical signals, the touch sensitive processing apparatus of the touch sensitive screen at least obtains the following message: the proximate position of the active stylus 111 or 112 on the touch sensitive screen; the PN code form used by the active stylus 111 or 112, as well as the content of the aforementioned data code.

In the above-described process, the touch sensitive processing apparatus 130 at the receiving end must synchronize or align the received carrier signal and PN code, in order to obtain the correct (state of the) data code. However, when the active stylus 111 or 112 emits electrical signal, the touch sensitive processing apparatus 130 can not necessarily immediately synchronize the received carrier signal and PN code, which results in difficulties in obtaining/inferring the data code.

The receiving end can usually postpone the multiplication of a received known carrier signal or a local oscillator (LO) signal produced by the receiving end, and a known PN code, for a period of time, and then perform the multiplication, which postponing of multiplication may be called a correlation. When two signals are not synchronous, the calculated value of their correlation will not exceed a threshold value. Conversely, when the two signals are synchronous, the calculated value of their correlation will exceed the threshold value. And when the two signals are not synchronous, the receiving end can repetitively adjust the postponing period until the two signals are synchronous or aligned.

In one embodiment of the present invention, electrical signal or the carrier signal emitted by the active stylus may comprise a signal frame including a preamble code followed by a data code section. The data code section may be used for transmitting a sensing state of a sensor on the stylus. For example, sensing values e.g. resulting from sensing whether a button on the stylus has been pressed down, or associated with the pressure value sensed by the tip section of the stylus, can be transmitted.

In a variant of this embodiment, the active stylus 111 or 112 can emit a complete signal frame described above at intervals, to inform of the state of the sensor thereof. In another variant of this embodiment, different active styluses may have different preamble codes and/or PN codes, enabling the touch sensitive processing apparatus 130 to identify and/or distinguish at least two active styluses simultaneously approaching or touching the touch sensitive screen 120. For example, the first active stylus 111 emits a first preamble code modulated by a first PN code, the second active stylus 112 emits a second preamble code modulated by a second PN code. And then, the touch sensitive processing apparatus 130 demodulates or performs despreading to the received signal by the first PN code and the second PN code respectively, it can determine the first preamble code and/or the second preamble code having been received.

When the touch sensitive processing apparatus 130 knows the electrical signal having two preamble codes, it can determine the first active stylus 111 and the second active stylus 112 approximate the touch sensitive screen 120 according to the first PN code and the second PN code which are correspondingly associated to the first active stylus 111 and the second active stylus 112. Since the touch sensitive processing apparatus 130 knows the timing of the first PN code and the second PN code, it can make the first and the second PN codes respectively synchronize the signal frames emitted by the first active stylus 111 and the second active stylus 112, and then decodes the data code section behind the signal frame.

In one embodiment of the present invention, in order to reach the synchronous state soon, some or all of the second electrodes 122 are connected to the same line or channel, called synchronization line or synchronization channel, and the touch sensitive processing apparatus is responsible for detecting on the synchronization line or synchronization channel and performing synchronization with respect to the known preamble code.

Persons having ordinary skill in the art can appreciate that when the touch sensitive processing apparatus 130 has known the PN code and the intendedly transmitted preamble code, the touch sensitive processing apparatus 130 can synchronize with the carrier signal by using well known technique(s), or find the phase shift between the carrier signal and the local oscillator signal. When ascertaining the phase shift between the two signals, any of the first electrodes 121 receiving the electrical signal is caused to decode the following data code section, in order to obtain the sensor state transmitted by the active stylus 111 or 112.

In one embodiment of the present invention, the aforementioned decoding step may be performed to decode the following data code section with respect to the carrier signal received by one of the first electrodes 121, wherein the received carrier signal used for decoding has the largest signal amount among all carrier signals received by all the first electrodes 121 and/or second electrodes 122.

In another embodiment of the present invention, the aforementioned decoding step may be performed to decode the following data code section with respect to the carrier signals received by some of the first electrodes 121, to obtain data codes which should match or be similar to each other. If the data codes obtained do not match, the data codes obtained for the most instances may be regarded as the right one.

In addition, among the carrier signals received by the multiple first electrodes 121, after adjustment using the phase shift, the carrier signal that is the most correlated with the local oscillator signal should have the smallest noise and is usually received by one of the first electrodes 121 that is closest to the active stylus 111 or 112. Accordingly, the position of the active stylus 111 or 112 relative to each of the first electrodes 121 may be calculated based on deviations of multiple instances of correlation involving the carrier signal received by each first electrode 121 and adjusted by using the phase shift mentioned above. In other words, the coordinate(s) of the position of the active stylus 111 on the second axis can be calculated as well.

Figure 32:
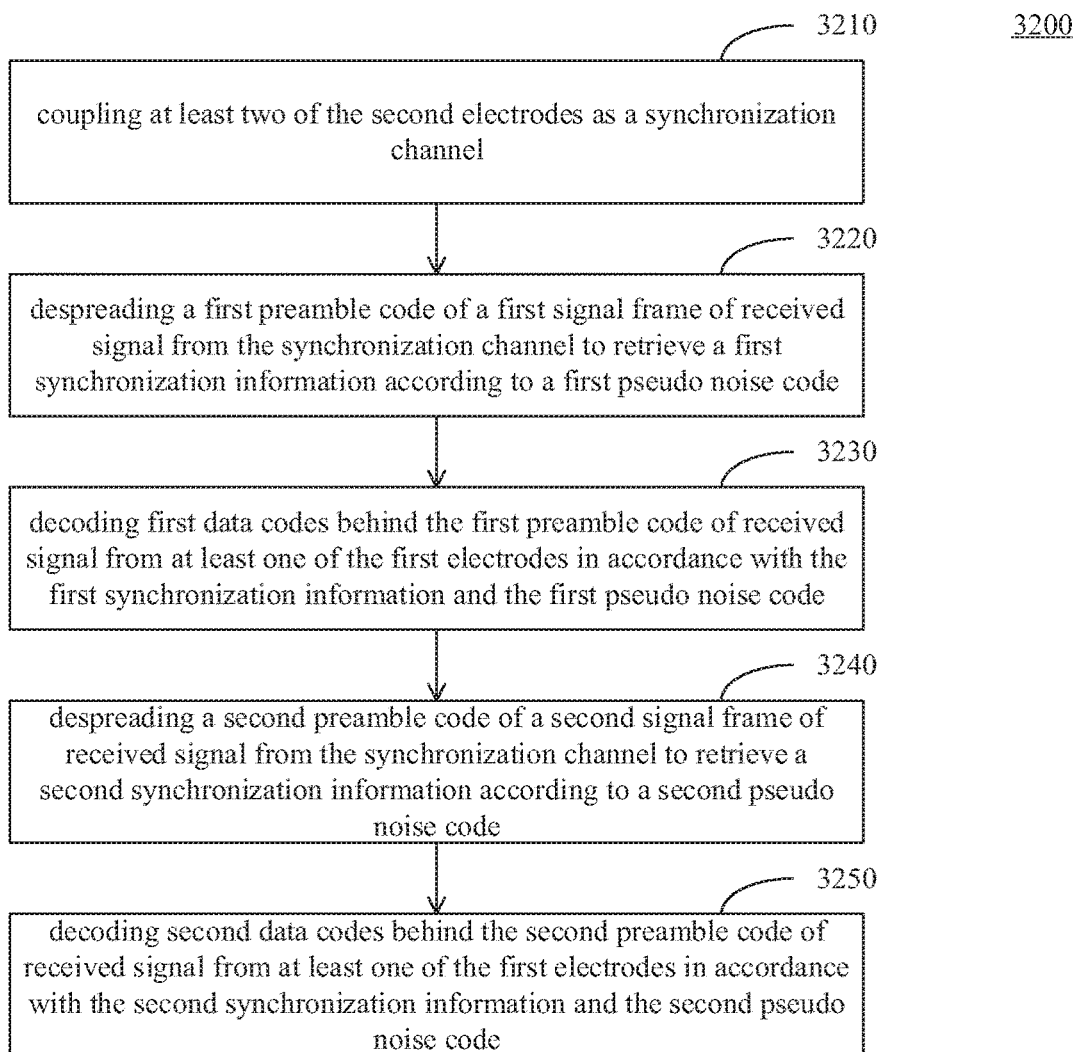
FIG. 32 shows a flowchart of despreading method according to an embodiment of the present invention.

Referring to FIG. 32, a flowchart of despreading method 3200 according to an embodiment of the present invention is illustrated. The touch sensitive processing apparatus 130 shown in FIG. 31 could perform the steps of the flowchart shown in FIG. 32, whatever by software, hardware, or the combination of software and hardware. It should be noted that the step numbers in FIG. 32 do not affect the steps performed in order except that there is a causal relationship between the steps. Moreover, other steps which do not relate to the present invention may be inserted between the steps as well.

At step 3210, coupling at least two of the second electrodes as a synchronization channel. The touch sensitive processing apparatus 130 may use analog switch or digital adder to implement this step. In a variant, the synchronization channel couples all of the second electrodes.

At step 3220, despreading a first preamble code of a first signal frame of received signal from the synchronization channel to retrieve a first synchronization information according to a first pseudo noise code.

At step 3230, decoding first data codes behind the first preamble code of received signal from at least one of the first electrodes in accordance with the first synchronization information and the first pseudo noise code.

In a variation, an electrical signal used for decoding the first data codes is from one of the multiple first electrodes which receive a largest electrical signal amount or a strongest electrical signal. In another variation, an electrical signal used for decoding the first data codes is from some of the multiple first electrodes. In still another variation, the despreading method further includes: calculating multiple deviations of signal correlations of the multiple first electrodes according to the first synchronization information; and calculating a position of the first active stylus on the second axis according to the multiple deviations.

At step 3240, despreading a second preamble code of a second signal frame of received signal from the synchronization channel to retrieve a second synchronization information according to a second pseudo noise code.

At step 3250, decoding second data codes behind the second preamble code of received signal from at least one of the first electrodes in accordance with the second synchronization information and the second pseudo noise code.

In a variation, an electrical signal used for decoding the second data codes is from one of the multiple first electrodes which receives a largest electrical signal amount or a strongest electrical signal. In another variation, an electrical signal used for decoding the second data codes is from some of the multiple first electrodes. In still another variation, the despreading method further includes: calculating multiple deviations of signal correlations of the multiple first electrodes according to the second synchronization information; and calculating a position of the second active stylus on the second axis according to the multiple deviations.

One of the advantages of this invention is that the touch sensitive processing apparatus 130 can rapidly synchronize the electrical signals modulated by DSSS in one signal frame and then decode the data code section emitted by the active stylus/styli 111 and/or 112. Another advantage of this invention is that when several active styli, such as 111 and 112, operate at the same time, all of them are allowed to emit electrical signals simultaneously. For example, as long as they use different pseudo noise codes, even if they emit electrical signals simultaneously, the touch sensitive processing apparatus 130 is still able to distinguish the signal frames and data codes emitted from them in the received signals.

In an embodiment, this invention provides a despreading method being applicable to a touch sensitive screen which includes multiple first electrodes being parallel to a first axis and multiple second electrodes being parallel to a second axis. The despreading method includes the following steps: coupling at least two of the second electrodes as a synchronization channel; despreading a first preamble code of a first signal frame of received signal from the synchronization channel to retrieve a first synchronization information according to a first pseudo noise code; and decoding a first data codes behind the first preamble code of received signal from at least one of the first electrodes in accordance with the first synchronization information and the first pseudo noise code.

In certain embodiments, the first signal frame is from a first active stylus approaching the touch sensitive screen, the first data codes include at least one type of following information: a pressure on a tip section of stylus; sensing value presenting whether a button being pressed or not; sensing value of attitude of a gyroscope; sensing value of acceleration of an accelerometer; sensing value of battery power; serial number of stylus; and wireless signal intensity received by stylus.

In certain embodiments, the synchronization channel couples all of the multiple second electrodes.

In certain embodiments, an electrical signal used for decoding the first data codes is from one of the multiple first electrodes which receives a largest electrical signal amount or a strongest electrical signal.

In certain embodiments, an electrical signal used for decoding the first data codes is from some of the multiple first electrodes. The despreading method further includes the following steps: calculating multiple deviations of signal correlations of the multiple first electrodes according to the first synchronization information; and calculating a position of the first active stylus (emitting the first signal frame) on the second axis according to the multiple deviations.

In certain embodiments, the despreading method further includes the following steps: despreading a second preamble code of a second signal frame of received signal from the synchronization channel to retrieve a second synchronization information according to a second pseudo noise code; and decoding a second data codes behind the second preamble code of received signal from at least one of the multiple first electrodes in accordance with the second synchronization information and the second pseudo noise code, wherein the second signal frame is from a second active stylus approaching the touch sensitive screen.

In certain embodiments, the first signal frame and the second signal frame have at least some parts concurrently appearing in the signal received by the multiple first electrodes.

In an embodiment, this invention provides a touch sensitive system for despreading. The touch sensitive system includes a touch sensitive screen including multiple first electrodes being parallel to a first axis and multiple second electrodes being parallel to a second axis, and a touch sensitive processing apparatus connected to the multiple first electrodes and the multiple second electrodes. The touch sensitive processing apparatus is configured to perform the following steps including: coupling at least two of the multiple second electrodes as a synchronization channel; despreading a first preamble code of a first signal frame of received signal from the synchronization channel to retrieve a first synchronization information according to a first pseudo noise code; and decoding a first data codes behind the first preamble code of received signal from at least one of the multiple first electrodes in accordance with the first synchronization information and the first pseudo noise code.

In an embodiment, this invention provides a touch sensitive processing apparatus for despreading. The touch sensitive processing apparatus is connected to multiple first electrodes on a touch sensitive screen which are parallel to a first axis and multiple second electrodes on the touch sensitive screen which are parallel to a second axis. The touch sensitive processing apparatus is configured to perform the following steps including: coupling at least two of the multiple second electrodes as a synchronization channel; despreading a first preamble code of a first signal frame of received signal from the synchronization channel to retrieve a first synchronization information according to a first pseudo noise code; and decoding a first data codes behind the first preamble code of received signal from at least one of the multiple first electrodes in accordance with the first synchronization information and the first pseudo noise code.

In certain embodiments, the first signal frame is from a first active stylus approaching the touch sensitive screen, the first data codes include at least one type of following information: a pressure on a tip section of stylus; sensing value presenting whether a button being pressed or not; sensing value of attitude of a gyroscope; sensing value of acceleration of an accelerometer; sensing value of battery power; serial number of stylus; and wireless signal intensity received by stylus.

In certain embodiments, the synchronization channel couples all of the multiple second electrodes.

In certain embodiments, an electrical signal used for decoding the first data codes is from one of the multiple first electrodes which receives a largest electrical signal amount.

In certain embodiments, an electrical signal used for decoding the first data codes is from some of the multiple first electrodes. The touch sensitive processing apparatus is configured to further perform the following steps including: calculating multiple deviations of signal correlations of the multiple first electrodes according to the first synchronization information; and calculating a position of the first active stylus (emitting the first signal frame) on the second axis according to the multiple deviations.

In certain embodiments, the touch sensitive processing apparatus is configured to further perform the following steps including: despreading a second preamble code of a second signal frame of received signal from the synchronization channel to retrieve a second synchronization information according to a second pseudo noise code; and decoding a second data codes behind the second preamble code of received signal from at least one of the multiple first electrodes in accordance with the second synchronization information and the second pseudo noise code, wherein the second signal frame is from a second active stylus approaching the touch sensitive screen.

In certain embodiments, the first signal frame and the second signal frame have at least some parts concurrently appearing in the signal received by the multiple first electrodes.

Figure 33:
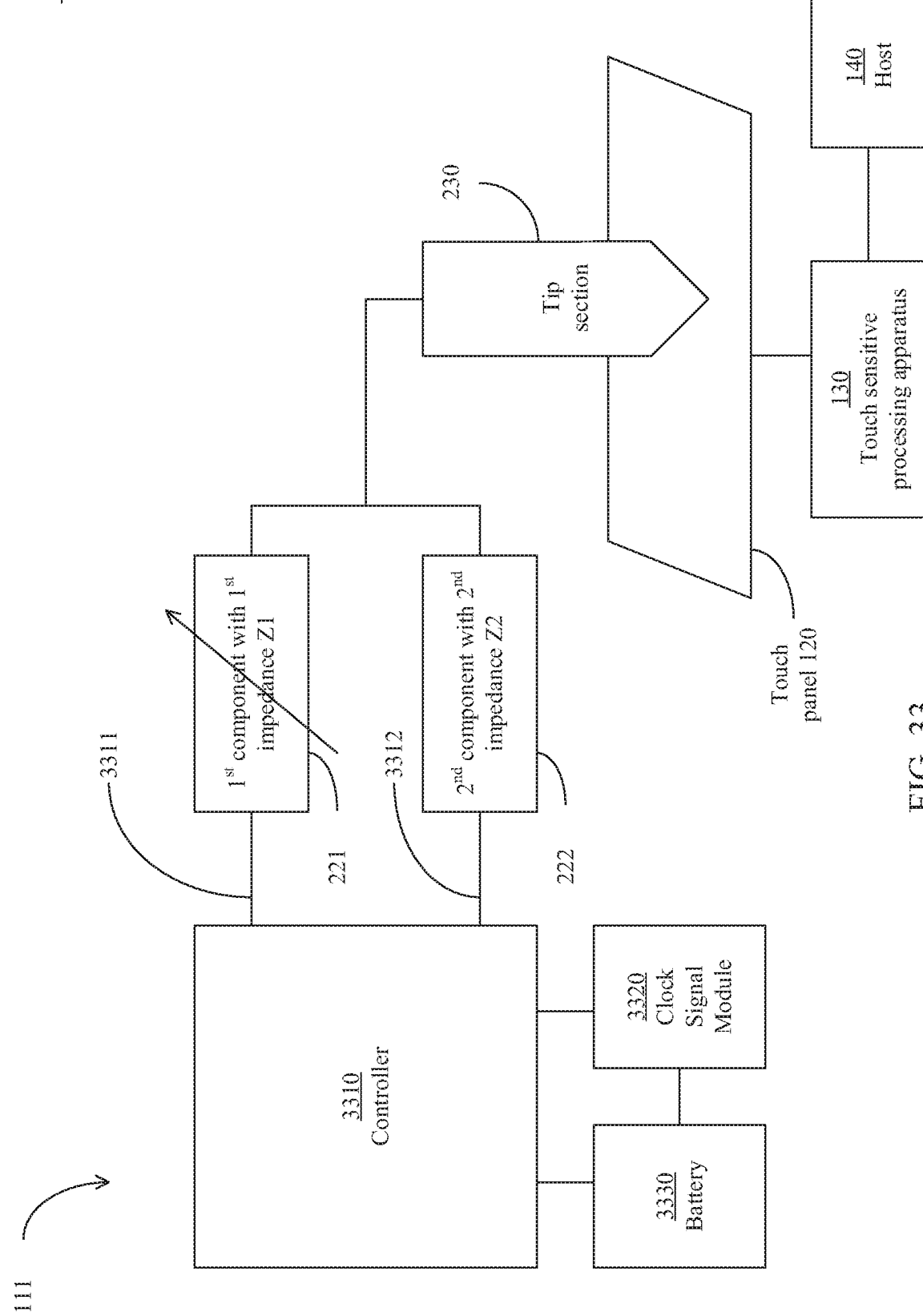
FIG. 33 depicts a diagram of an embodiment of an active stylus in accordance with the present invention.

Please refer to FIG. 33, which depicts a diagram of an embodiment of an active stylus 111 in accordance with the present invention. The active stylus 111 may comprise a controller 3310, a clock signal module 3320, a battery 3330, the first component 221 with a first impedance Z1, the second component 222 with a second impedance Z2, and a tip section 230. The controller 3310 is configured for simultaneously generating two different pseudo random number coded signals 3311 and 3312 to the first component 221 and the second component 222, respectively. The controller 3310 may comprise analog and digital circuits, signal processor, generic computing processor, volatile or non-volatile memory for storing instructions and data for the processor (s). The signal processor and/or processor may run on one or more instruction sets such as ARM instruction set, Intel 8051 instruction set, and etc.

The battery 3330 may be rechargeable or non-rechargeable. The controller 3310 may include charging circuits for the rechargeable battery 3330. Electrical power stored in the battery 3330 is supplied to the controller 3310 and the clock signal source 3320 for operations. The clock signal module 3320 may be any kind of oscillator(s) which outputs one or more clock signals to the controller 3310. For example, the oscillator may be crystal oscillator, XO, TCXO, OCXO, or VCXO. The controller 3310 may comprises frequency divider or frequency multiplier to generate clock signals for data and for carrier. As shown in FIG. 30, frequency of data codes is slower than the carrier signal. The clock signal module 3320 are configured to provide one or more clock signals for the encoding process described.

Multiple pseudo random number (PN) codes are stored in the controller 3310. A first PN code is corresponding to the signal 3311 and a second PN code is corresponding to the signal 3312. All of these applicable PN codes are orthogonal to each other. It means that any two of the PN codes are orthogonal.

In one embodiment, mapping relationship between the signal 3311 and the PN code may be configurable and stored in the controller 3310. For example, there may be 10 PN codes stored in five active styli 111. Each of the styli 111 is configured to use a set of two PN codes. Hence, five sets of PN codes emitted from the styli 111 simultaneously can be distinguished by the touch sensitive processing apparatus 130. The position of each of the styli 111 can be found according to the electrical signal emitted from the tip section 230.

For providing configuration interface of the mapping relationship, the stylus 111 may include physical human-machine interface for input and/or output. In one example, the stylus 111 may include visual and/or audio indicator for showing the set of PN codes that the controller 3310 use. The visual or audio indicator is connected and controlled by the controller 3310.

The visual indicator may include multiple light bulbs, LED, or equivalents, where each of the light is corresponding to each set of the PN codes. Alternatively, the visual indicator may include one LED which flashes one or multiple times in a short period to show the configured mapped set of the PN codes. Or the visual indicator may present different colors to show which set of the PN codes is configured.

Similarly, the audio indicator may include a beeper which may be used to prompt user by number of beeps in a short period. Or a speaker may be used to output voices and/or sounds to advertise the configured mapped set of the PN codes.

An input button, a switch or a knob of the stylus 111 may be used to configure the set of PN codes. The state of the button, the switch or the knob may be used to indicate which set of the PN codes is configured.

Apart from the physical human-machine interface, the stylus 111 may comprise a communication unit for receiving the configuration setting from remote machine to the controller 3310. The communication unit may be compatible to wired or wireless industrial standards such as Bluetooth, USB, Wireless USB, UWB, and etc. Persons having ordinary skill in the art are able to understand similar communication units are widely used in modern consumer electronics such as smartphone, mobile computer, and etc. For example, the transmitter wireless communication unit 770 as shown in FIGS. 7A-7D may be used here.

A remote machine may be used to connect to the communication unit for reading and/or configuring the set of the PN codes. A configuration program may be run on the remote machine to read or to set the PN codes of the connected stylus 111. In one embodiment, the remote machine may connect to multiple styli 111 simultaneously for ensuring that each one of the connected styli 111 use different set of PN codes. Once the remote machine detects that sets of the PN codes used by connected styli 111 are conflicted, the remote machine may automatically assign different sets of the PN codes to the conflicted styli 111.

In some embodiments, the set of PN codes used by the stylus 111 is fixed or hard-coded before shipping out of factory. The stylus 111 may be painted in a particular color or a visual identification may be shown on the stylus 111. Users may check colors or visual identifications of their styli 111. If they hold different colored styli 111, the touch sensitive processing apparatus 130 is able to identify each of the styli 111.

The stylus 111 may comprise one or more human interfaces or sensors such as buttons, knobs, attitude sensors, gyroscopes, accelerometers, electrical signal receiver, and etc. The status of these human interfaces and sensors can be collected periodically by the controller 3310. The status or any other information such as a unique identification code of the stylus 111 to be sent to the touch sensitive processing apparatus 130 may be treated as data codes shown in FIG. 30. The data codes to be sent and the first PN code may be modulated by the controller 3310. A person having ordinary skill in the art can understand that CDMA or direct sequence spread spectrum technique is widely used in the 3G telecommunication. The controller 3310 comprises hardwired circuits and/or embedded processor for modulation. Traditionally, a multiplier is used to generate the carrier signal according to the data code and the PN code. If there is no need to send any data code, the signals 3311 and 3312 received by the tip section 230 may be the first PN code and the second PN code, respectively.

The data codes may be modulated according to the first PN code to generate the signal 3311. The data codes may be also modulated according to the second PN code to generate the signal 3312. In other words, the data codes may be transmitted via one or both of the signals 3311 and 3312. The touch sensitive processing apparatus 130 may despread or decode the data codes emitted from the tip section 230 according to one or both the first and the second PN codes. If the data codes decoded according to the first PN code is consistent with the data codes decoded according to the second PN code, the data codes are trustworthy. Otherwise, the two different data codes may be discarded or disregarded.

The active stylus 111 may further comprise a receiver for synchronization with the touch sensitive processing apparatus 130. As described in the previous paragraphs, a beacon signal may be emitted via electrodes of the touch panel 120 by the touch sensitive processing apparatus 130 for synchronization. The tip section 230 may be served as a receiving antenna for receiving the beacon signal. Beacon signals as shown in FIGS. 9A-9F may be adopted to this embodiment.

The controller 3310 may connect to the tip section 230 for receiving the beacon signal. In order to correctly receive and identify the beacon signal, the controller 3310 may include circuits such as integrator, sampler, amplifier, analog to digital converter, adder, and any other circuits for receiving the beacon signal. The received signal may be further processed by the processor to retrieve the synchronization signal and/or message carried by the beacon signal from interference. Once the beacon signal is received, the controller 3310 may transmit the signals 3311 and 3312 to the tip section 230 after a predetermined turnaround period which is known to the touch sensitive processing apparatus 130. Or the beacon signal may include a time period parameter to indicate length of the turnaround period.

If there are multiple styli 111 operating in the touch sensitive system 100, the beacon signal with no turnaround time period would cause all of the styli 111 transmitting electrical signals in the same time. However, since the electrical signals transmitted by these styli 111 are encoded by different PN codes, the touch sensitive processing apparatus 130 can distinguish each of the styli 111.

In one embodiment, the beacon signal may further include an identification corresponding to one of the styli 111 and a turnaround time period. If one of the styli 111 receives the beacon signal including its identification, the stylus 111 would transmit the electrical signal via the tip section 230 at the designated turnaround time period indicated in the beacon signal. In order to prevent or alleviate interference in the touch sensitive system 100, the touch sensitive processing apparatus 130 may emit a beacon signal with multiple combinations of stylus identifications and designated turnaround time periods or time slots.

Alternatively, the touch sensitive processing apparatus 130 may transmit multiple beacon signals for the styli 111. The beacon signals are modulated differently. For example, the modulation of these beacon signals may be varied in frequency, phase, amplitude and etc. Therefore each of the styli 111 can listen to its designated beacon signal.

In one embodiment, the touch sensitive system 100 may utilize multiple modulations of beacon signal for multiple groups of styli 111. In each modulation of beacon signal, multiple combinations of stylus identifications and designated turnaround timer periods or time slots may be included. The touch sensitive processing apparatus 130 may control refresh rates of each modulation of beacon signal. If one of the styli 111 goes idle, the beacon signal sent to the idle stylus 111 may be delayed or omitted. If one of the styli 111 goes wildly, the touch sensitive processing apparatus 130 may send more beacon signal to the stylus 111 than the rest of the styli 111 in order to get the positions and/or the data codes more frequently and precisely. Persons having ordinary skill in the art can understand that the touch sensitive processing apparatus 130 may adjust the refresh/update rate of each stylus 111 by controlling the transmission of the corresponding beacon signal.

Alternatively, the beacon signal may be emitted by the host 140. For example, the touch sensitive processing apparatus 130 may use a wireless communication unit equipped by the host 140 to transmit the beacon signal. Based on nature of the wireless communication protocols, the beacon signal may be broadcasted or unicasted to each of the styli 111. For example, Bluetooth protocol defines a broadcast mechanism to send advertising message. The beacon signal may be carried out by the broadcast mechanism of Bluetooth protocol. Any stylus 111 receiving the advertising message serving as the beacon signal is synchronized accordingly. Otherwise, the beacon signal may be unicasted wirelessly from the host 140 to the stylus 111. Persons having ordinary skill in the art can understand the synchronization between the stylus 111 and the touch sensitive processing apparatus 130 is done by the beacon signal which may be transmitted via the touch panel 120 or via wired or wireless communication channel in between.

Although the synchronization may be achieved by the beacon signal, the touch sensitive processing apparatus 130 may synchronize the electrical signal by itself. The controller 3310 may transmit signal with a preamble code via one or both of the first component 221 and the second component 222. The preamble code may be encoded by one or both the first PN code and the second PN code. Eventually the electrical signal emitted via the tip section 230 includes the preamble code and/or data codes. Once the touch sensitive processing apparatus 130 receives electrical signal via the touch panel 120, the received electrical signal would be amplified, sampled, converted into digital forms and stored in the memory. Hence, circuits or processor embedded in the touch sensitive processing apparatus 130 may compare the stored signal with the preamble code corresponding to the stylus 111. In case the stored signal is fully or partial matched with the preamble code, the touch sensitive processing apparatus 130 is able to calculate the receiving timing of the stored preamble code. Consequently, timing of a next transmission from the stylus 111 can be calculated by the touch sensitive processing apparatus 130 according to the stored preamble code. In some examples, the match of the preamble code is fast enough that the data codes in the same transmission can be decoded; especially in case the preamble code is sufficiently enduring. A sliding window mechanism on the memory storing the received signal may be applied to find the preamble code.

When the preamble code is found, the touch sensitive processing apparatus 130 can calculate a position that the stylus 111 touching or approaching the touch panel 120 according to the received signals. If two or more styli 111 use different sets of the PN codes, the preamble codes of these styli 111 are different and orthogonal. Even the preamble codes are received simultaneously, the touch sensitive processing apparatus 130 are able to find out the positions of the styli 111 touching or approaching the touch panel 120.

Figure 34:
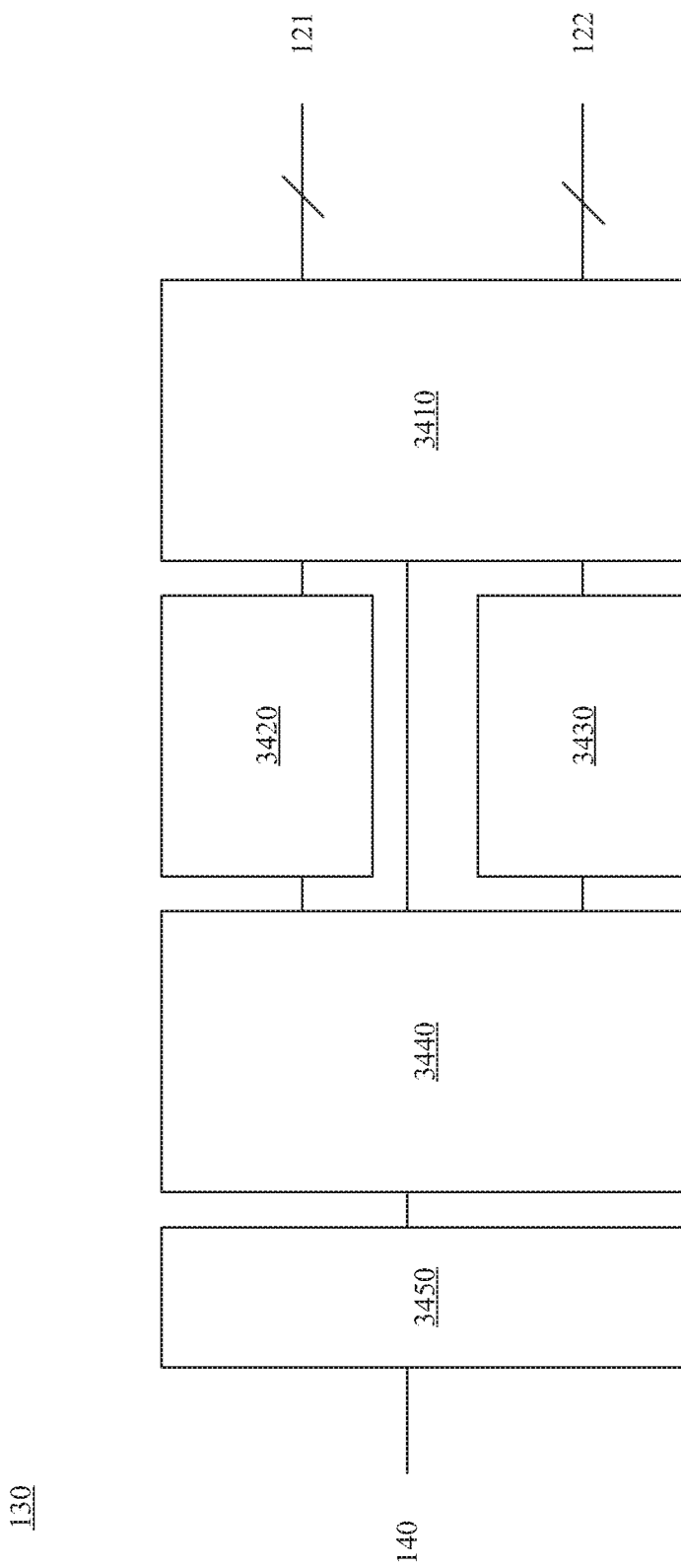
FIG. 34 shows a block diagram of a touch sensitive processing apparatus 130 according to an embodiment of the present invention.

Referring to FIG. 34, it shows a block diagram of a touch sensitive processing apparatus 130 according to an embodiment of the present invention. The touch sensitive processing apparatus 130 may include an embedded processor 3440, which is used for connecting and controlling an interconnection network 3410, a driving circuit 3420, a sensing circuit 3430, and a host interface 3450. The driving circuit 3420 may respectively connect each first electrode 121 and each second electrode 122 via the interconnection network 3410 to use these electrodes to emit a driving signal. The sensing circuit 3430 may respectively connect each first electrode 121 and each second electrode 122 via the interconnection network 3410 to use these electrodes to sense signal(s). The embedded processor 3440 can communicate with the host 140 through the host interface 3450. The embedded processor 3440 may perform a program module stored in non-volatile memory to detect the abovementioned approximate object(s) and event(s).

The interconnection network 3410 is dynamically configurable by the embedded processor 3440. The driving circuit 3420 may be connected to one or more of the first electrodes 121 and/or the second electrodes 122 via the interconnection network 3410. Similarly, the sensing circuit 3430 may be connected to one or more of the first electrodes 121 and/or the second electrodes 122 via the interconnection network 3410. In one embodiment, the driving circuit 3420 and the sensing circuit 3430 are collectively called "analog frontend" circuits which may comprises any combination of amplifiers, filters, samplers, integrator, digital-to-analog converter, analog-to-digital converter, adder, multiplier, variable resistors, and etc. Apart from the analog circuits including the driving circuit 3420 and the sensing circuit 3430, the embedded processor 3440 may deal with digital parts of signal processing. The host interface 3450 is used to connect the embedded processor 3440 and the host 140. Typically, the host interface 3450 may be compatible to industrial standards such as USB, I2C, PCI, PCI-Express, SCSI, and etc. Persons with ordinary skill in the art can understand the host interface 3450 is very common in modern electronics.

Figure 35:
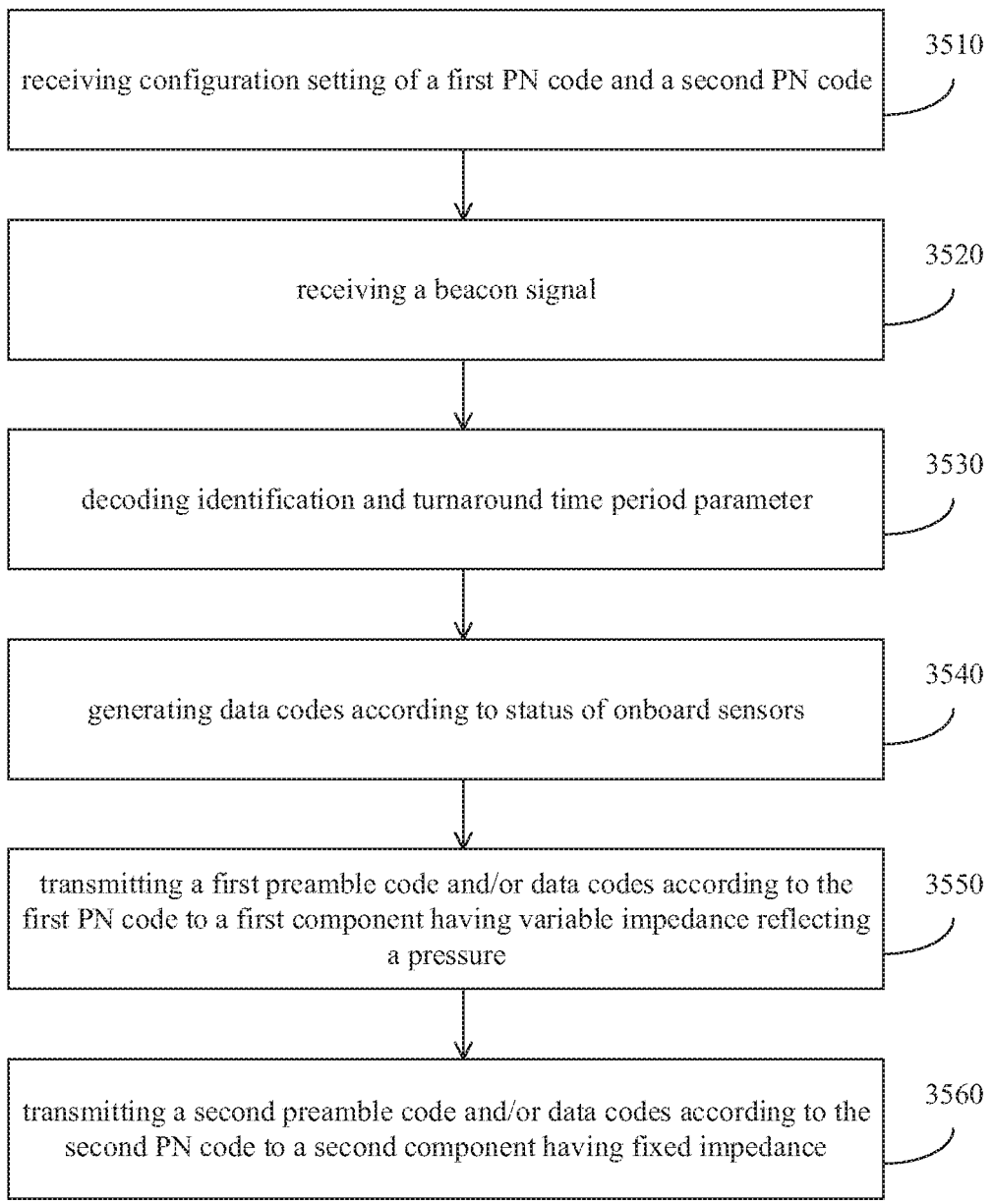
FIG. 35 illustrates a flowchart diagram practiced by the controller as shown in FIG. 33 in accordance to an embodiment of the present invention.

Please refer to FIG. 35, which illustrates a flowchart diagram practiced by the controller 3310 as shown in FIG. 33 in accordance to an embodiment of the present invention. The flow may be also applicable to the stylus 111 as shown in FIG. 33. Unless a causal relationship is noted, the present invention does not limit execution sequences of any two of the steps as shown in FIG. 35.

Optional step 3510: receiving configuration setting of a first PN code and a second PN code. The configuration mechanism is already described.

Optional step 3520: receiving a beacon signal. The touch sensitive processing apparatus 130 may transmit the beacon signal via at least one of the first electrodes 121 or the second electrodes 122 of the touch panel 120 to the stylus 111. Alternatively, the touch sensitive processing apparatus 130 may ask a communication unit of the host 140 to transmit the beacon signal to a corresponding communication unit of the stylus 111.

Optional Step 3530: decoding identification and turnaround time period parameter. If the optional step 3520 is performed and a beacon signal is received, the beacon signal may comprise identification and/or turnaround time period parameter for a specified stylus 111 or a specified group of styli 111. Thus, the identification of stylus 111 and/or the turnaround time period specified in the beacon signal is decoded.

Optional Step 3540: generating data codes according to status of onboard sensors. If the stylus 111 comprises one or more onboard sensors such as button, switch, knob, battery volume and etc. in additional to the pressure sensor connected to the first component 221, data codes may be generated to reflect the status of onboard sensors and/or other information such as the identification of the stylus 111, and/or model and vendor name of the stylus 111.

Step 3550: transmitting a first preamble code and/or data codes according to the first PN code to a first component having variable impedance reflecting a pressure. The transmitted signal may be the first preamble code, the data codes, or both of them. Since they are all encoded by the first PN code, the touch sensitive processing apparatus 130 is able to detect and decode the transmitted signals via the tip section 230 and the electrodes 121 and/or 122 in theory.

Step 3560: transmitting a second preamble code and/or data codes according to the second PN code to a second component having fixed impedance. The steps 3550 and 3560 may be performed simultaneously. The transmitted signal may be the second preamble code, the data codes, or both of them. Since they are all encoded by the second PN code, the touch sensitive processing apparatus 130 is able to detect and decode the transmitted signals via the tip section 230 and the electrodes 121 and/or 122 in theory.

Figure 36A:
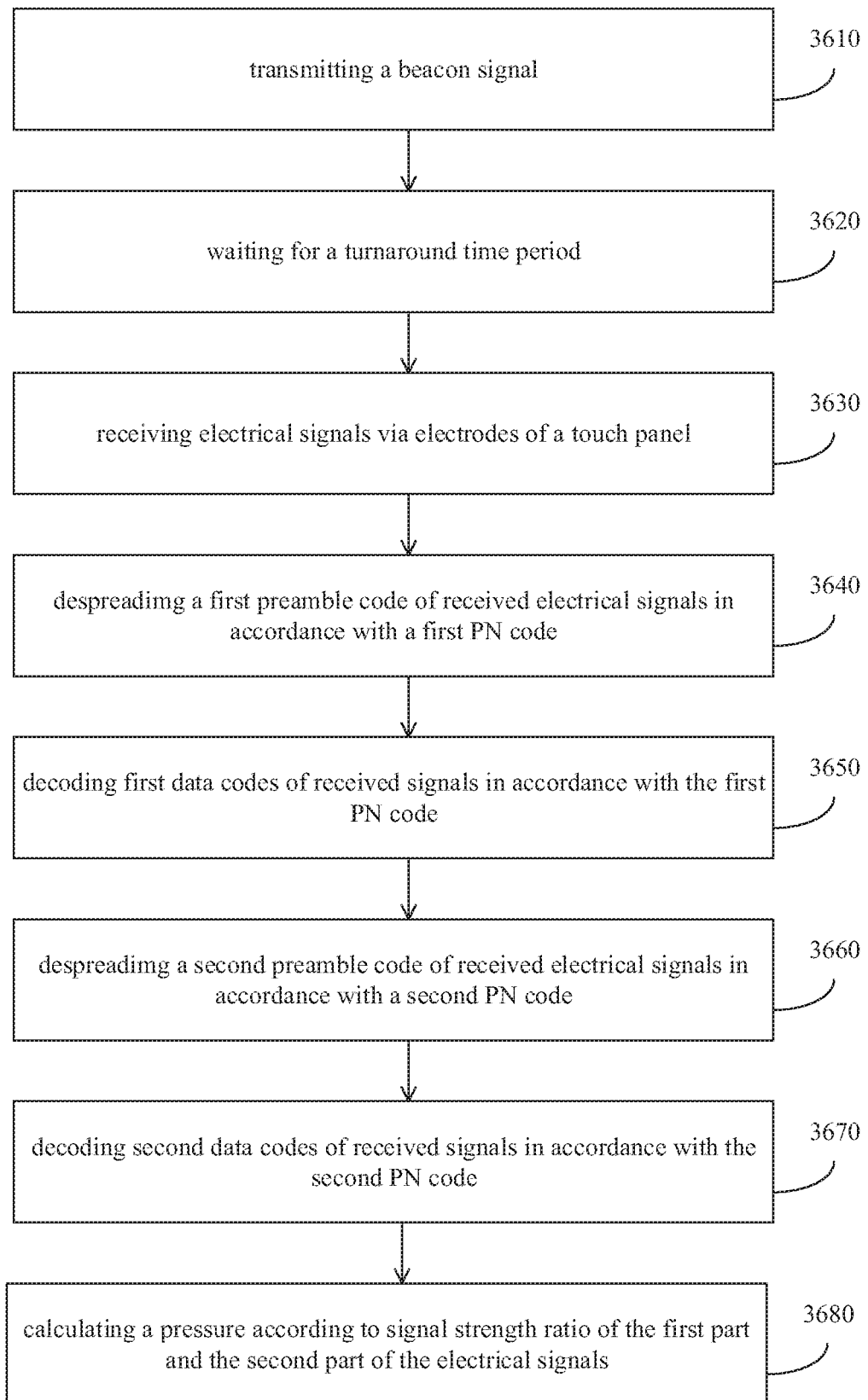
FIG. 36A illustrates a flowchart diagram practiced by the embedded processor in accordance to an embodiment of the present invention.

Please refer to FIG. 36A, which illustrates a flowchart diagram practiced by the embedded processor 3440 in accordance to an embodiment of the present invention. The flow is applicable to the touch sensitive processing apparatus 130 as shown in FIGS. 33 and 34. Unless a causal relationship is noted, the present invention does not limit execution sequences of any two of the steps as shown in FIG. 36A. If a beacon signal is used as a synchronization signal in the system 100, the flow begins with the step 3610.

Optional step 3610: transmitting a beacon signal. This step is corresponding to the step 3520 as shown in FIG. 35. The touch sensitive processing apparatus 130 may transmit the beacon signal via at least one of the first electrodes 121 or the second electrodes 122 of the touch panel 120 to the stylus 111. Alternatively, the touch sensitive processing apparatus 130 may ask a communication unit of the host 140 to transmit the beacon signal to a corresponding communication unit of the stylus 111. Optionally, the beacon signal may comprise one or more identifications and/or turnaround time period parameters for one ore more specified styli 111 or a specified group of styli 111.

Optional step 3620: waiting for a turnaround time period. If the transmitted beacon signal indicates the turnaround time period, the embedded processor 3440 or the touch sensitive processing apparatus 130 may wait or sleep in this period. Alternatively, the embedded processor 3440 may perform other functions such as capacitive sensing for external conductive objects touching or approaching the touch panel 120 in this turnaround time period.

Step 3630: receiving electrical signals via electrodes of a touch panel. The stylus 111 transmits electrical signals via the tip section 230 to at least one of the electrodes 121 and 122 of the touch panel 120. The electrical signals are received by the sensing circuit 3430 of the touch sensitive processing apparatus 130 via the electrodes near the tip section 230.

Optional step 3640: despreading a first preamble code of received electrical signals in accordance with a first PN code. If the electrical signals transmitted by the stylus 111 comprise the first preamble code, the embedded processor 3440 of the touch sensitive processing apparatus 130 is able to despread the first preamble code in accordance with the first PN code. In some embodiments, the system 100 does not utilize the beacon signal to synchronize the timing of transmitting electrical signals, i.e., the steps 3610 and 3620 are omitted, the embedded processor 3440 may be required to use sliding window technique to acquire the first preamble code in the received electrical signals because the embedded processor 3440 has no idea when the electrical signals would be transmitted by the stylus 111.

Optional step 3650: decoding first data codes of received signals in accordance with the first PN code. If the electrical signals transmitted by the stylus 111 comprise the first data codes, the embedded processor 3440 of the touch sensitive processing apparatus 130 is able to decode the first data codes in accordance with the first PN code. Embodiments of the present application may include one or both of the steps 3640 and 3650.

Optional step 3660: despreading a second preamble code of received electrical signals in accordance with a second PN code. If the electrical signals transmitted by the stylus 111 comprise the second preamble code, the embedded processor 3440 of the touch sensitive processing apparatus 130 is able to despread the second preamble code in accordance with the first PN code. In some embodiments, the system 100 does not utilize the beacon signal to synchronize the timing of transmitting electrical signals, i.e., the steps 3610 and 3620 are omitted, the embedded processor 3440 may be required to use sliding window technique to acquire the second preamble code in the received electrical signals because the embedded processor 3440 has no idea when the electrical signals would be transmitted by the stylus 111.

Optional step 3670: decoding second data codes of received signals in accordance with the second PN code. If the electrical signals transmitted by the stylus 111 comprise the second data codes, the embedded processor 3440 of the touch sensitive processing apparatus 130 is able to decode the second data codes in accordance with the second PN code. Embodiments of the present application may include one or both of the steps 3660 and 3670.

In order to save design complexity, the controller 3310 may encode the data codes reflecting status of onboard sensors in one of the signals 3311 and 3312. Thus, it just needs to perform one of the steps 3650 and 3670 accordingly as well as the steps 3640 and 3660.

In order to increase transmission reliability, the controller 3310 may encode the data codes in both of the signals 3311 and 3312. The steps 3650 and 3670 may be performed accordingly to retrieve the first data codes and the second data codes. In one embodiment, the flow may further include a comparison step for comparing the first data codes and the second data codes. If these two data codes are inconsistent, the flow may drop out these two data codes because errors apparently happened in the transmission. However, in order to save design complexity, the flow may just include one of the steps 3650 and 3670 although the stylus 111 encode the data codes in both the signals 3311 and 3312.

In the embodiments lacking of beacon signals, if the timing of electrical signals transmitted by the stylus 111 is found at steps 3640 or 3650, the step 3660 and/or the step 3670 may be performed according to the found timing. In other words, the synchronization is built. Reversely, if the timing of electrical signals is found at steps 3660 or 3670, the step 3640 and/or the step 3650 may be performed according to the found timing. In other words, in order to synchronize with the stylus 111, the embedded processor 3440 just need to execute one sliding window algorithm to acquire one of the first and second preamble codes and the first and the second data codes. Otherwise, the steps 3640-3670 may be performed simultaneously or independently in an embodiment although sliding windows algorithms may be executed more than once.

Step 3680: calculating a pressure according to signal strength ratio of a first part corresponding to the first PN code and a second part corresponding to the second PN code. The first part corresponding to the first PN code may be one or both of the first preamble code and the first data codes. Similarly, the second part corresponding to the second PN code may be one or both of the second preamble code and the second data codes. If the electrical signals comprise the first preamble code and the second preamble code, the step 3680 may be calculating the pressure reflecting to a pressure sensor of the stylus according to signal strength ratio of the first preamble code and the second preamble code. In case the electrical signals comprise the first data codes and the second data codes, the step 3680 may be calculating the pressure reflecting to a pressure sensor of the stylus according to signal strength ratio of the first data codes and the second data codes. In a variant, if the electrical signals comprise all four codes, the step 3680 may be calculating the pressure reflecting to a pressure sensor of the stylus according to signal strength ratio between the first part and the second part. Assume that the signal strength of the first part is M1 and the signal strength of the second part is M2, the ratio of these two signal strengths may be M1/M2, M2/M1, (M1−M2)/(M1+M2), (M2−M1)/(M1+M2), M1/(M1+M2), M2/(M1+M2) and any other calculations involving these two parameters M1 and M2. In order words, if the calculated ratio is a constant or a predetermined value, it is concluded that the pressure sensor of the stylus 111 does not sense any pressure. If the pressure sensor is configured to receive a pressure on the tip section 230 of the stylus 111, it means that the tip section 230 of the stylus 111 does not touch anything including the touch panel 120.

When the tip section 230 of the stylus 111 contacts the touch panel 120, the tip section 230 is pressed to move. The first impedance Z1 of the first component 221 changes according to the movement or the pressure of the tip section 230 such that the ratio of M1 and M2 is varied accordingly from the constant or the predetermined value. The touch sensitive processing apparatus 130 could generate corresponding sensing (pressure) value according to the ratio. The afore-mentioned constant or predetermined value may not be a number but a range with a tolerable error.

By realizing well-known algorithm in the art, the touch sensitive processing apparatus 130 may calculate a position on the touch panel where the tip section 230 of the stylus 111 touching or approaching according to the electrical signals received by at least one of the first electrodes 121 and at least one of the second electrodes 122. Thus, the position, the pressure, status of the onboard sensors and/or any other information of the stylus 111 may be received by the touch sensitive processing apparatus 130. Consequently, the information received by the touch sensitive processing apparatus 130 may be forwarded to an operating system as well as application programs run on the host 140.

Figure 36B:
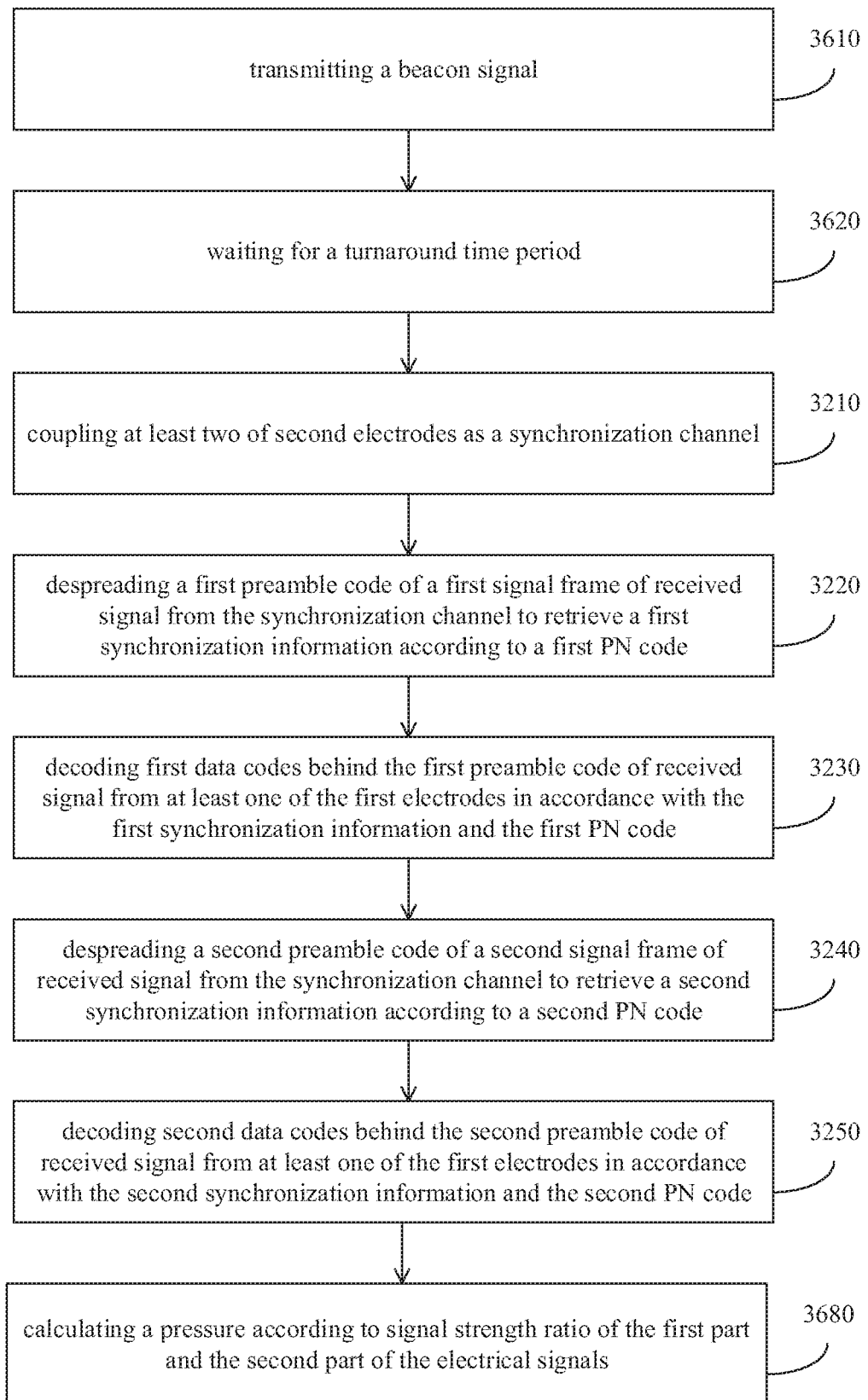
FIG. 36B illustrates another flowchart diagram practiced by the embedded processor in accordance to an embodiment of the present invention.

Please refer to FIG. 36B, which illustrates another flowchart diagram practiced by the embedded processor 3440 in accordance to an embodiment of the present invention. The flow is applicable to the touch sensitive processing apparatus 130 as shown in FIGS. 33 and 34. Unless a causal relationship is noted, the present invention does not limit execution sequences of any two of the steps as shown in FIG. 36B. If a beacon signal is used as a synchronization signal in the system 100, the flow begins with the step 3610.

The differences between the flowcharts as shown in FIGS. 36A and 36B are the steps 3630 through 3670 are replaced by the steps 3210 through 3250 as described in FIG. 32. One of the purposes of the flow 3200 is to accelerate the acquisition of preamble codes of one or more styli by coupling at least two of the second electrodes as a synchronization channel. In other words, the touch sensitive processing apparatus 130 is configured to synchronize the stylus without the beacon signal mechanism. Although the flow illustrated in FIG. 36B comprises optional steps 3610 and 3620, these two steps may also serve in a touch sensitive system 100 which comprises at least one stylus 111 which listens to the beacon signal while other stylus 111 does not synchronize the beacon signal. In other words, the touch sensitive processing apparatus 130 may be configured to operate with different styli 111 which may or may not have beacon signal receiver simultaneously. Although it demands more processing capability and more memory space for storing electrical signals to the touch sensitive processing apparatus 130, the interoperability of such touch system 100 is increased significantly.

By comparing the timing of transmitting the electrical signals and the turnaround time period indicated in the beacon signal, the touch sensitive processing apparatus 130 may detect one stylus 111 having no beacon signal synchronization capability because the timing is inconsistent with the indicated turnaround time period.

If the touch system 100 comprises a stylus 111 having beacon signal synchronization capability and another stylus 111 having no such capability, the touch sensitive processing apparatus 130 may adjust the timing of the beacon signal and/or the turnaround time period indicated in the beacon signal to have these two styli 111 transmitting their electrical signals simultaneously so as to minimize the time period spent in the receiving electrical signals from the styli 111 and to maximize the time period for detecting external conductive objects such as fingers. Alternatively, the touch sensitive processing apparatus 130 may adjust the timing of the beacon signal and/or the turnaround time period indicated in the beacon signal to have these two styli 111 transmitting their electrical signals in non-overlapping periods so as to minimize the interferences between the two electrical signals. Moreover, since the electrical signal emitted by the stylus can interfere with the reception of the beacon signal, the touch sensitive processing apparatus 130 may adjust the timing of the beacon signal and/or the turnaround time period indicated in the beacon signal to alleviate or to eliminate the interference between the beacon signal and the electrical signal transmitted from the stylus.

In the embodiments as shown in FIGS. 35, 36A and 36B, two PN codes is assigned to each of the stylus 111. Hence, the touch sensitive processing apparatus 130 is able to identify all styli 111 which transmit electrical signals simultaneously. However, unlike the touch sensitive processing apparatus 130, computing resources and internal space of the stylus 111 is quite limited. It may be desired to decrease computing complexity of the controller 3310. Hence, the controller 3310 of the stylus 111 as shown in FIG. 33 may transmit the same electrical signals 3311 and 3312 encoded by one PN code in two different time periods, respectively. As long as each stylus 111 in one touch system 100 has different PN code, the touch sensitive processing apparatus 130 is able to identify all styli 111 which may transmit electrical signals simultaneously. With regard to electrical signals from the same stylus 111 in two different time periods, the touch sensitive processing apparatus 130 is able to calculate a pressure according to signal strength ratio of these two time periods. Furthermore, the controller 3310 may collect status of the onboard sensors of the stylus 111 twice to generate two data codes before transmitting them through the tip section 230. By decreasing the number of PN codes from two to one, the design complexity of the controller 3310 is reduced consequently.

Figure 37A:
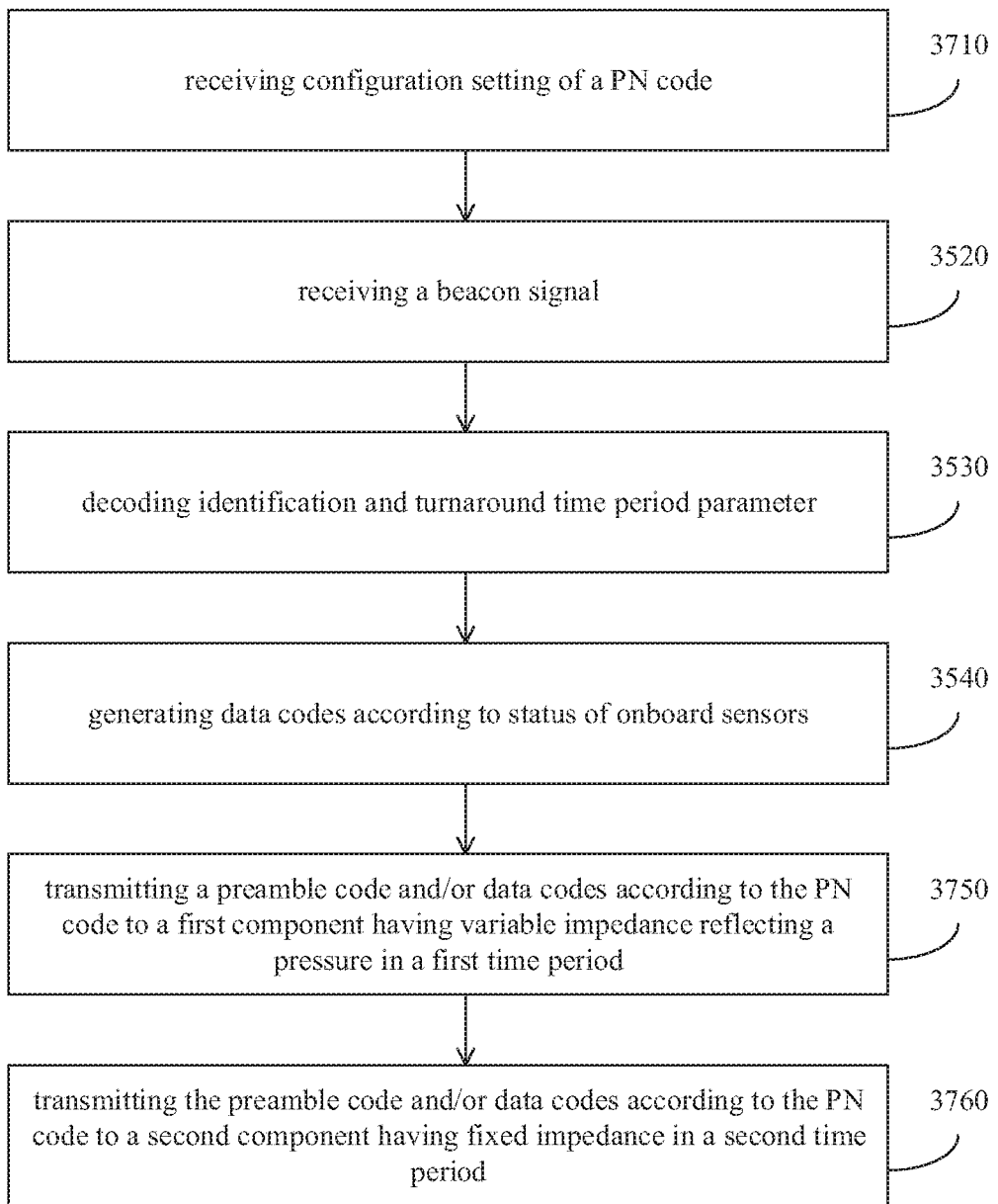
FIG. 37A illustrates a flowchart diagram practiced by the controller as shown in FIG. 33 in accordance to an embodiment of the present invention.

Please refer to FIG. 37A, which illustrates a flowchart diagram practiced by the controller 3310 as shown in FIG. 33 in accordance to an embodiment of the present invention. The flow may be also applicable to the stylus 111 as shown in FIG. 33. Unless a causal relationship is noted, the present invention does not limit execution sequences of any two of the steps as shown in FIG. 37A. Steps 3520, 3530 and 3540 are explained above in the paragraphs regarding to the flowchart as shown in FIG. 35.

Optional step 3710: receiving configuration setting of a PN code. The configuration mechanism is already described.

Step 3750: transmitting a preamble code and/or data codes according to the PN code to a first component having variable impedance reflecting a pressure in a first time period. The transmitted signal may be the preamble code, the data codes, or both of them. Since they are all encoded by the assigned PN code, the touch sensitive processing apparatus 130 is able to detect and decode the transmitted signals via the tip section 230 and the electrodes 121 and/or 122 in the first time period.

Step 3760: transmitting the preamble code and/or data codes according to the PN code to a second component having fixed impedance in a second time period. The transmitted signal may be the preamble code, the data codes, or both of them. Since they are all encoded by the assigned PN code, the touch sensitive processing apparatus 130 is able to detect and decode the transmitted signals via the tip section 230 and the electrodes 121 and/or 122 in the second time period.

In one embodiment, a turnaround time period between the first time period and the second time period may exist. During this turnaround timer period, the controller 3310 may switch signal output from the first component 221 to the second component 222.

Figure 37B:
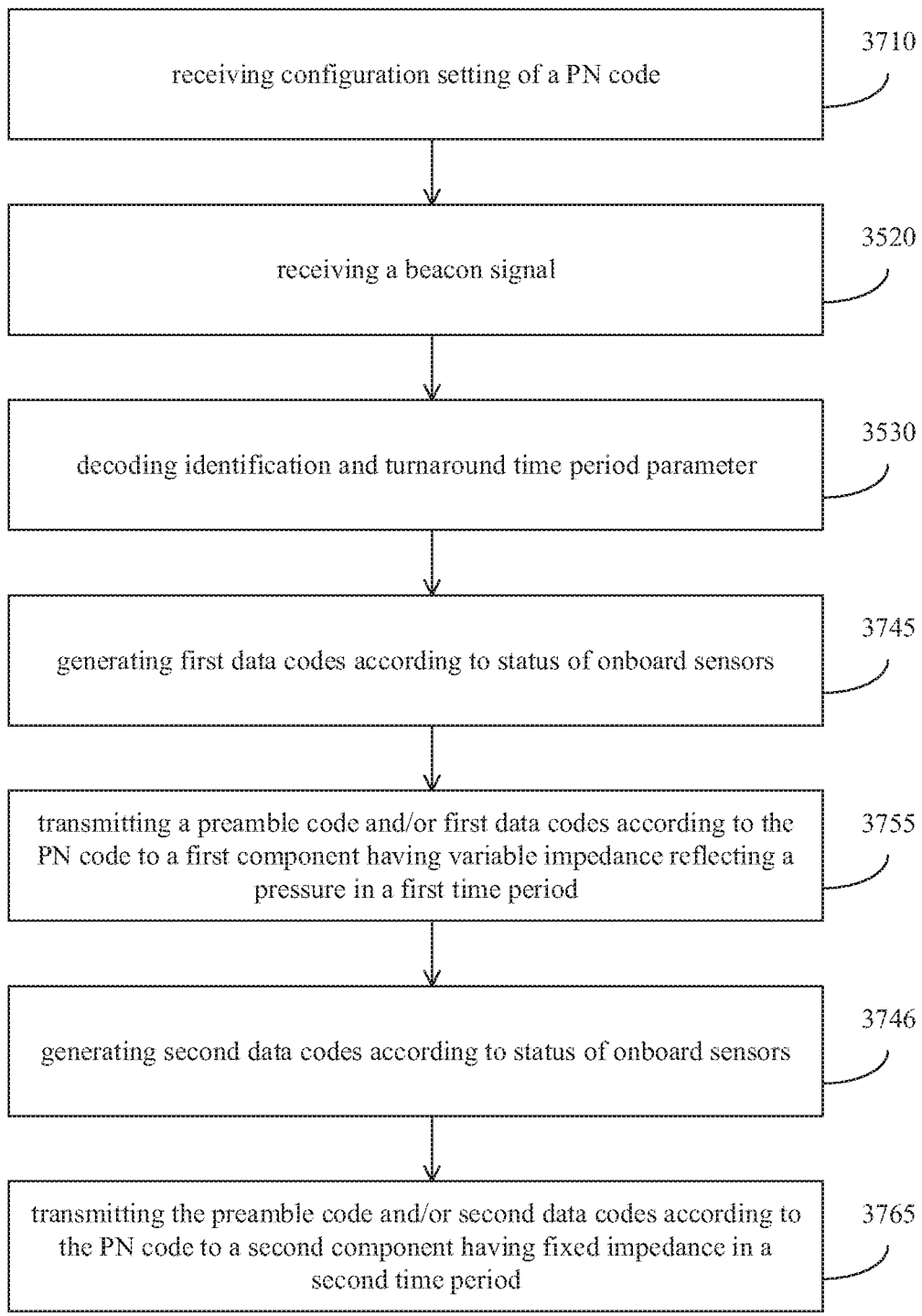
FIG. 37B illustrates another flowchart diagram practiced by the controller as shown in FIG. 33 in accordance to an embodiment of the present invention.

Please refer to FIG. 37B, which illustrates another flowchart diagram practiced by the controller 3310 as shown in FIG. 33 in accordance to an embodiment of the present invention. The flow may be also applicable to the stylus 111 as shown in FIG. 33. Unless a causal relationship is noted, the present invention does not limit execution sequences of any two of the steps as shown in FIG. 37B.

Optional step 3745: generating first data codes according to status of onboard sensors. If the stylus 111 comprises one or more onboard sensors such as button, switch, knob, battery volume and etc. in additional to the pressure sensor connected to the first component 221, data codes may be generated to reflect the status of onboard sensors and/or other information such as the identification of the stylus 111, and/or model and vendor name of the stylus 111.

Step 3755: transmitting a preamble code and/or first data codes according to the PN code to a first component having variable impedance reflecting a pressure in a first time period. The transmitted signal may be the preamble code, the first data codes, or both of them. Since they are all encoded by the assigned PN code, the touch sensitive processing apparatus 130 is able to detect and decode the transmitted signals via the tip section 230 and the electrodes 121 and/or 122 in the first time period. After step 3755, the flow may go to optional step 3746 for generating another data codes.

Optional step 3746: generating second data codes according to status of onboard sensors.

Step 3765: transmitting the preamble code and/or second data codes according to the PN code to a second component having fixed impedance in a second time period. The transmitted signal may be the preamble code, the second data codes, or both of them. Since they are all encoded by the assigned PN code, the touch sensitive processing apparatus 130 is able to detect and decode the transmitted signals via the tip section 230 and the electrodes 121 and/or 122 in the second time period.

Although in the flowchart as shown in FIG. 37A, the flow executes the step 3750 before the step 3760. Persons having ordinary skill in the art can understand that the sequence of steps 3750 and 3760 may be reversed. The flow may go to the step 3760 from the step 3540 in some embodiments. Then the flow may go to the step 3750 after the step 3760. Similarly, in the flowchart as shown in FIG. 37B, the flow may go to the steps 3746 and 3765 from the step 3530. Then the flow may go to the steps 3745 and 3755 after the step 3765. In short, the present invention does not require which one of the signals 3311 and 3312 is first sent out from the controller 3310.

Figure 38A:
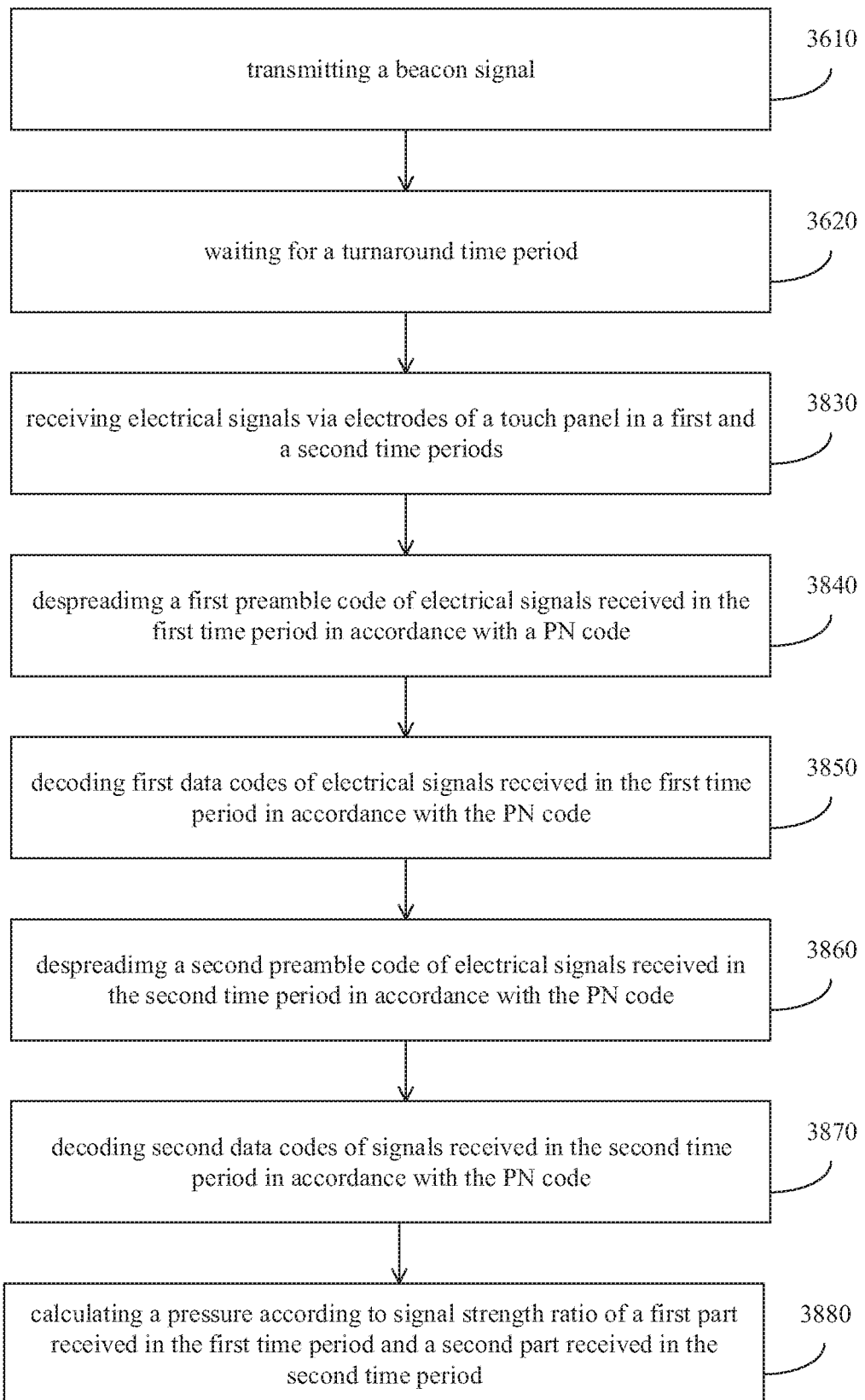
FIG. 38A illustrates a flowchart diagram practiced by the embedded processor in accordance to an embodiment of the present invention.

Please refer to FIG. 38A, which illustrates a flowchart diagram practiced by the embedded processor 3440 in accordance to an embodiment of the present invention. Adapting to the flowcharts embodied by one or more styli 111 as shown in FIGS. 37A and 37B, the flow is applicable to the touch sensitive processing apparatus 130 as shown in FIGS. 33 and 34. Unless a causal relationship is noted, the present invention does not limit execution sequences of any two of the steps as shown in FIG. 38A. If a beacon signal is used as a synchronization signal in the system 100, the flow begins with the step 3610. Two steps 3610 and 3620 are described in the paragraphs with regard to the embodiment as shown in FIG. 36A. The flow may go to step 3830 after step 3620 is executed.

Step 3830: receiving electrical signals via electrodes of a touch panel in a first and a second time periods. The step 3830 may be performed concurrently with any of the steps 3850 through 3870 during the second time period. The electrical signals are received by the sensing circuit 3430 of the touch sensitive processing apparatus 130 via the electrodes near the tip section 230. The electrical signals received in two different time periods are stored, respectively.

Optional step 3840: despreading a first preamble code of electrical signals received in the first time period in accordance with a PN code. If the electrical signals transmitted by the stylus 111 comprise the first preamble code, the embedded processor 3440 of the touch sensitive processing apparatus 130 is able to despread the first preamble code in accordance with the PN code. In some embodiments, the system 100 does not utilize the beacon signal to synchronize the timing of transmitting electrical signals, i.e., the steps 3610 and 3620 are omitted, the embedded processor 3440 may be required to use sliding window technique to acquire the preamble code in the received electrical signals because the embedded processor 3440 has no idea when the electrical signals would be transmitted by the stylus 111.

Optional step 3850: decoding first data codes of electrical signals received in the first time period in accordance with the PN code. If the electrical signals transmitted by the stylus 111 comprise the first data codes, the embedded processor 3440 of the touch sensitive processing apparatus 130 is able to decode the first data codes in accordance with the PN code corresponding to the stylus 111. Embodiments of the present application may include one or both of the steps 3840 and 3850.

Optional step 3860: despreading a second preamble code of electrical signals received in the second time period in accordance with a PN code. If the electrical signals transmitted by the stylus 111 comprise the second preamble code, the embedded processor 3440 of the touch sensitive processing apparatus 130 is able to despread the second preamble code in accordance with the PN code. Please be aware that since the first and the second preamble codes are encoded by the same PN code, they should be the same if their signal strengths are disregarded. In some embodiments, the system 100 does not utilize the beacon signal to synchronize the timing of transmitting electrical signals, i.e., the steps 3610 and 3620 are omitted, the embedded processor 3440 may be required to use sliding window technique to acquire the preamble code in the received electrical signals because the embedded processor 3440 has no idea when the electrical signals would be transmitted by the stylus 111.

Optional 3870: decoding second data codes of electrical signals received in the second time period in accordance with the PN code. If the electrical signals transmitted by the stylus 111 comprise the second data codes, the embedded processor 3440 of the touch sensitive processing apparatus 130 is able to decode the second data codes in accordance with the PN code corresponding to the stylus 111. Embodiments of the present application may include one or both of the steps 3860 and 3870.

As described in the embodiment as shown in FIG. 37B, the controller 3310 may generate two data codes for the two transmissions in the two time periods. If the first data codes are different from the data codes, it tells that the status of the onboard sensors was changed between the two generations. Apparently, the positions of the stylus 111 may also change between the two generations. Therefore the touch sensitive processing apparatus 130 may calculate a first position and a second position according to the electrical signals received during the first time period and the second time period accordingly. Or the touch sensitive processing apparatus 130 may calculate only one position according to either one of the electrical signals received during the first time period or received during the second time period.

Step 3880: calculating a pressure according to signal strength ratio of a first part received in the first time period and a second part received in the second time period. The first part of electrical signals received in the first time period may be one or both of the first preamble code and first data codes. Similarly, the second part of electrical signals received in the second time period may be one or both of the second preamble code and second data codes. If the electrical signals comprise the first preamble code and the second preamble code, the step 3880 may be calculating the pressure reflecting to a pressure sensor of the stylus according to signal strength ratio of the first preamble code and the second preamble code. In case the electrical signals comprise the first data codes and the second data codes, the step 3880 may be calculating the pressure reflecting to a pressure sensor of the stylus according to signal strength ratio of the first data codes and the second data codes. In a variant, if the electrical signals comprise all four codes, the step 3880 may be calculating the pressure reflecting to a pressure sensor of the stylus according to signal strength ratio between the first part received in the first time period and the second part received in the second time period. Assume that the signal strength of the first part is M1 and the signal strength of the second part is M2, the ratio of these two signal strengths may be M1/M2, M2/M1, (M1−M2)/(M1+M2), (M2−M1)/(M1+M2), M1/(M1+M2), M2/(M1+M2) and any other calculations involving these two parameters M1 and M2. In order words, if the calculated ratio is a constant or a predetermined value, it is concluded that the pressure sensor of the stylus 111 does not sense any pressure. If the pressure sensor is configured to receive a pressure on the tip section 230 of the stylus 111, it means that the tip section 230 of the stylus 111 does not touch anything including the touch panel 120.

Figure 38B:
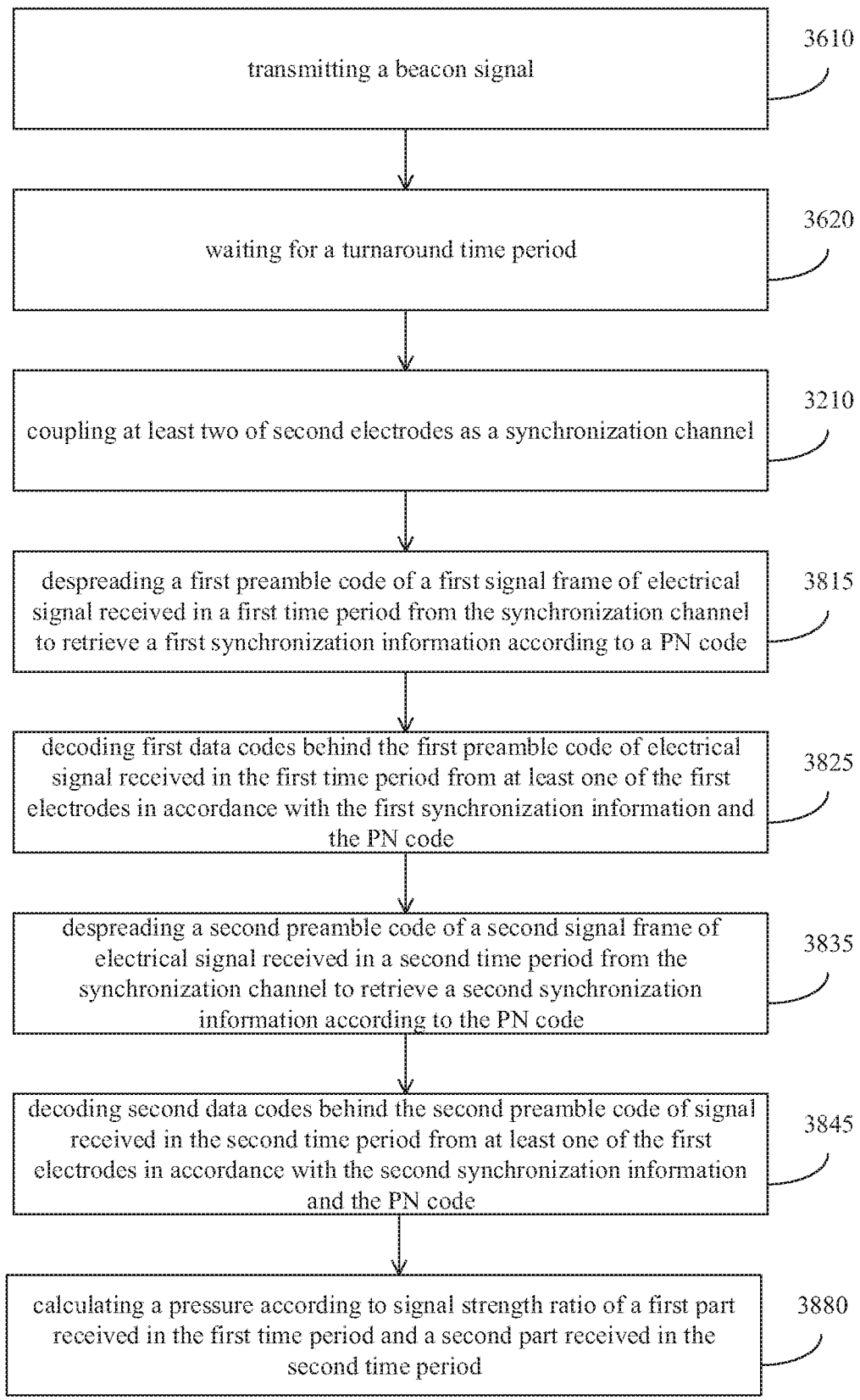
FIG. 38B illustrates a flowchart diagram practiced by the embedded processor in accordance to an embodiment of the present invention.

Please refer to FIG. 38B, which illustrates a flowchart diagram practiced by the embedded processor 3440 in accordance to an embodiment of the present invention. Adapting to the flowcharts embodied by one or more styli 111 as shown in FIGS. 37A and 37B, the flow is applicable to the touch sensitive processing apparatus 130 as shown in FIGS. 33 and 34. Unless a causal relationship is noted, the present invention does not limit execution sequences of any two of the steps as shown in FIG. 38B. If a beacon signal is used as a synchronization signal in the system 100, the flow begins with the step 3610. Two steps 3610 and 3620 are described in the paragraphs with regard to the embodiment as shown in FIG. 36B. The flow may go to step 3210 after step 3620 is executed.

Optional step 3815: despreading a first preamble code of a first signal frame of received in a first timer period from the synchronization channel to retrieve a first synchronization information according to a pseudo noise code.

Optional step 3825: decoding first data codes behind the first preamble code of electrical signal received in the first time period from at least one of the first electrodes in accordance with the first synchronization information and the PN code.

Optional step 3835: despreading a second preamble code of a second signal frame of received in a second timer period from the synchronization channel to retrieve a second synchronization information according to the PN code.

Optional step 3845: decoding second data codes behind the second preamble code of electrical signal received in the second time period from at least one of the first electrodes in accordance with the second synchronization information and the PN code.

In an embodiment, once the first synchronization information with regard to the first time period is known, the second synchronization information could be calculated accordingly.

In an embodiment, Please be aware that since the first and the second preamble codes are encoded by the same PN code, they should be the same if their signal strengths are disregarded. In some embodiments, the system 100 does not utilize the beacon signal to synchronize the timing of transmitting electrical signals, i.e., the steps 3610 and 3620 are omitted, the embedded processor 3440 may be required to use sliding window technique to acquire the preamble code in the received electrical signals because the embedded processor 3440 has no idea when the electrical signals would be transmitted by the stylus 111.

As described in the embodiment as shown in FIG. 37B, the controller 3310 may generate two data codes for the two transmissions in the two time periods. If the first data codes are different from the data codes, it tells that the status of the onboard sensors was changed between the two generations. Apparently, the positions of the stylus 111 may also change between the two generations. Therefore the touch sensitive processing apparatus 130 may calculate a first position and a second position according to the electrical signals received during the first time period and the second time period accordingly. Or the touch sensitive processing apparatus 130 may calculate only one position according to either one of the electrical signals received during the first time period or received during the second time period.

Step 3880: calculating a pressure according to signal strength ratio of a first part received in the first time period and a second part received in the second time period. The first part may be one or both of the first preamble code and the first data codes. Similarly, the second part may be one or both of the second preamble code and the second data codes.

If the electrical signals comprise the first preamble code and the second preamble code, the step 3880 may be calculating the pressure reflecting to a pressure sensor of the stylus according to signal strength ratio of the first preamble code and the second preamble code. In case the electrical signals comprise the first data codes and the second data codes, the step 3880 may be calculating the pressure reflecting to a pressure sensor of the stylus according to signal strength ratio of the first data codes and the second data codes. In a variant, if the electrical signals comprise all four codes, the step 3880 may be calculating the pressure reflecting to a pressure sensor of the stylus according to signal strength ratio between the first part received in the first time period and the second part received in the second time period. Assume that the signal strength of the first part is M1 and the signal strength of the second part is M2, the ratio of these two signal strengths may be M1/M2, M2/M1, (M1−M2)/(M1+M2), (M2−M1)/(M1+M2), M1/(M1+M2), M2/(M1+M2) and any other calculations involving these two parameters M1 and M2. In order words, if the calculated ratio is a constant or a predetermined value, it is concluded that the pressure sensor of the stylus 111 does not sense any pressure. If the pressure sensor is configured to receive a pressure on the tip section 230 of the stylus 111, it means that the tip section 230 of the stylus 111 does not touch anything including the touch panel 120.

In real word scenarios, it is not uncommon to get lost of a wireless stylus 111. Besides, it may need to recharge battery of the wireless stylus 111 quite often. In some scenarios, it is desired to have one or more corded styli which physically connect to the touch system. Utilizing the same mechanism of PN codes, the touch sensitive processing apparatus can select its own timing to transmit signals to corded stylus and to receive the signals from the touch panel 120. This mechanism is able to omit the synchronization mechanism between the wireless stylus 111 and the touch sensitive processing apparatus 130.

Figure 39A:
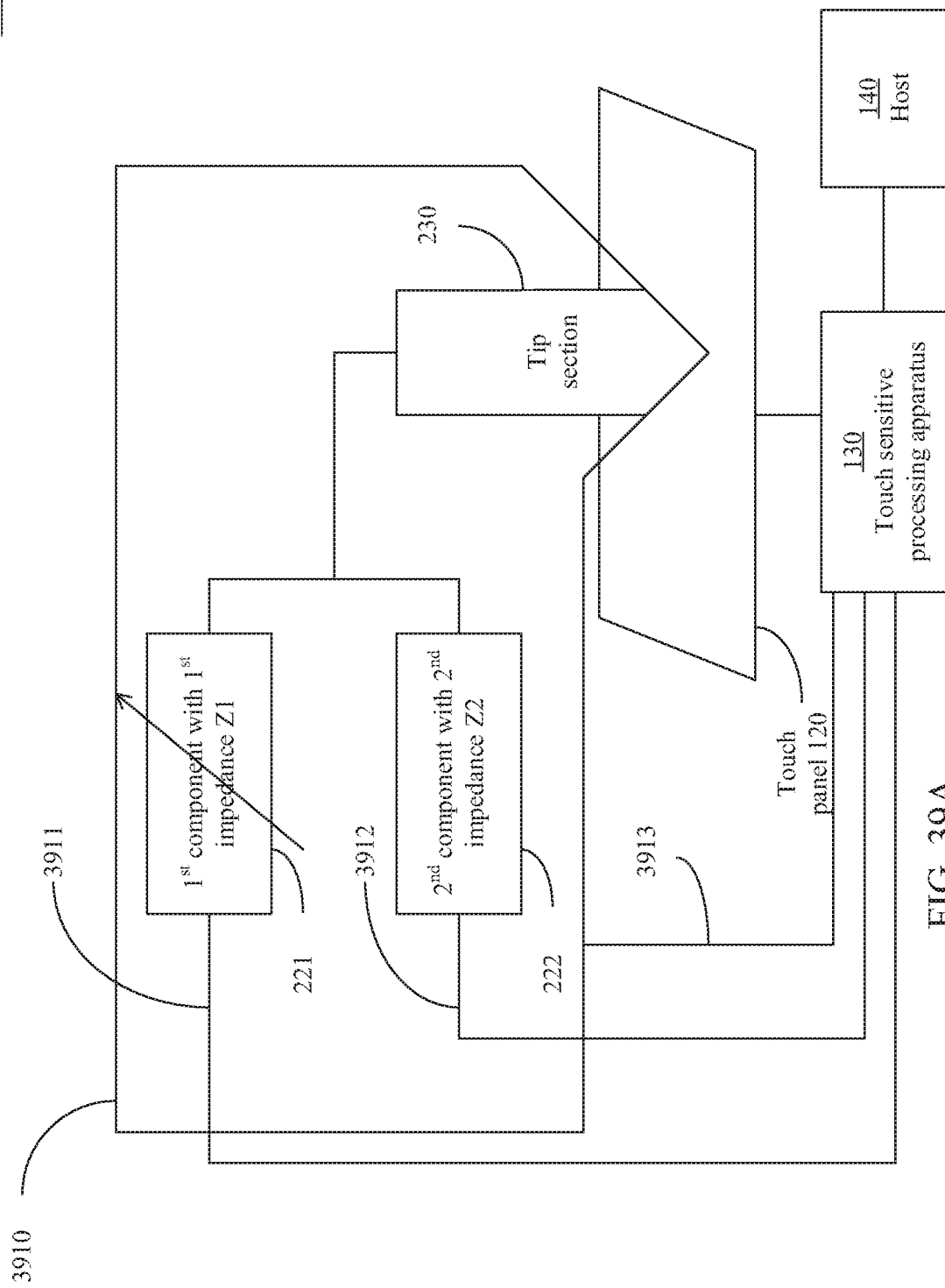
FIG. 39A illustrates a schematic diagram of a touch system in accordance with an embodiment of the present invention.

Please refer to FIG. 39A, which illustrates a schematic diagram of a touch system 3900 in accordance with an embodiment of the present invention. The touch system 3900 may comprises the touch panel 120, the touch sensitive processing apparatus 130, the host 140, and a corded stylus 3910. The corded stylus 3910 may comprises the first component 221 with variable first impedance Z1 which reflects to a pressure to the first component 221, the second component 222 with fixed second impedance Z2, the tip section 230 which is coupled to the outputs of the first component 221 and the second component 222, and a shell or a container which encapsulates the first component 221, the second component 222 and the tip section 230. A cord is used to connect the stylus 3910 and the touch sensitive processing apparatus 130. The cord may be a twisted and shielded cable which may include a first signal circuit 3911, a second signal circuit 3912, and a third circuit 3913. In one embodiment, the third line 3913 may be electrically coupled to the shell which may be grounded if a user holds the stylus 3910 by hand. In addition, the third line 3913 may be electrically coupled to a ground potential port of the touch sensitive processing apparatus 130.

Although there is only one corded stylus 3910 shown in FIG. 39A, there may be multiple corded styli 3910 connecting to the touch sensitive processing apparatus 130 in some embodiments of the present invention. Based on the proposed mechanism, the multiple corded styli 3910 can operate simultaneously. More importantly, a touch system of embodiments in accordance with the present invention may comprise wireless and corded styli. Persons having ordinary skill art can understand the touch sensitive processing apparatus 130 may use the synchronization mechanism to have the wireless stylus 111 transmit electrical signals at the same time while the touch sensitive processing apparatus 130 transmits electrical signals via the corded stylus 3910 if the electrical signals simultaneously transmitted from each of the wireless and corded styli are encoded by different sets of PN codes.

The corded stylus 3910 as shown in FIG. 39A does not include a switch or a button. However, a corded stylus 3910 may comprise one or more onboard sensors such as a switch or a button for receiving user's input. In one embodiment, each of the onboard sensors may connect to the touch sensitive processing apparatus 130 via one or more circuits included in the cord. Hence, the status of the onboard sensor may be detected by the touch sensitive processing apparatus 130 via the cord. For example, the touch sensitive processing apparatus 130 may detect whether an eraser button is pressed or not via one or more circuits connecting to the eraser button. However, just similar to the embodiments as shown in FIGS. 4A and 4B, the corded stylus 3910 may further comprise a switch and a corresponding component which is connected in parallel with the first or the second components. The touch sensitive processing apparatus 130 is able to tell the status of the switch of the stylus 3910 according to a ratio of signal strength between the two PN codes.

Figure 39B:
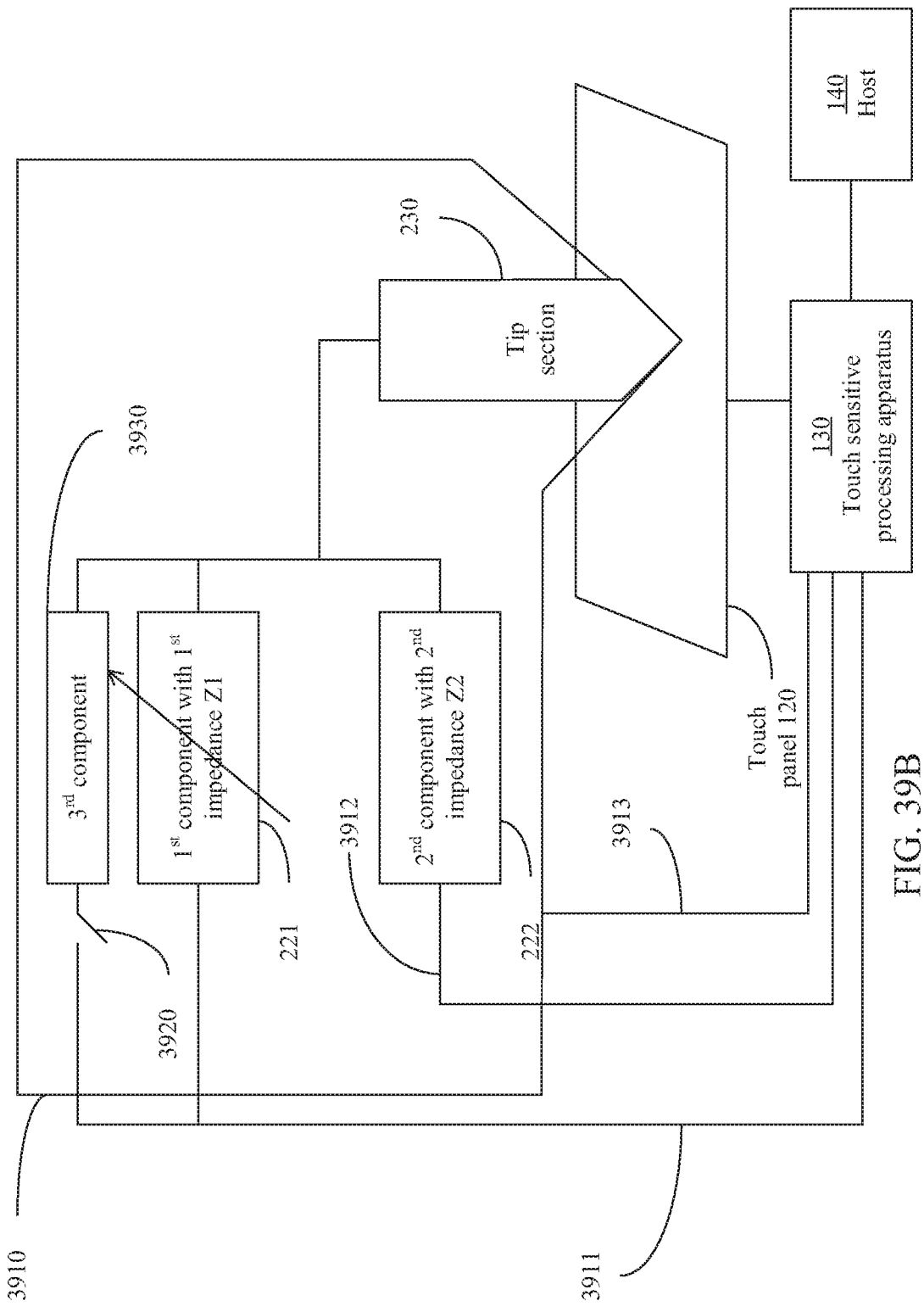
FIG. 39B illustrates a schematic diagram of a variant of the touch system in accordance with an embodiment of the present invention.

Please refer to FIG. 39B, which illustrates a schematic diagram of a variant of the touch system 3900 in accordance with an embodiment of the present invention. The stylus 3910 may further comprise a third switch 3920 and a third component 3930 which are connected in parallel to the first component 221. The third component 3930 may be a circuit such as a resistance and/or a capacitor with third impedance Z3. When the third switch 3920 is closed by a user of the stylus 3910, the signal driven by the signal circuit 3911 propagates through the first component 221 and the third component 3930 to the tip section 230. Reversely, when the third switch 3920 is opened by the user, the signal driven by the signal circuit 3911 propagates through the first component 221 to the tip section 230. The signal driven by the signal circuit 3912 propagates through the second component 222 to the tip section 230. After receiving the signals driven by the signal circuits 3911 and 3912 emitted from the tip section 230, the touch sensitive processing apparatus 130 is able to tell the status of the third switch 3920 of the stylus 3910 according to a ratio of signal strength between the two signals driven by the signal circuits 3911 and 3912. If the ratio is fallen into a first interval, the touch sensitive processing apparatus 130 determines that the third switch 3920 is being opened. If the ratio is fallen into a second interval, the touch sensitive processing apparatus 130 determines that the third switch 3920 is being closed. The third impedance characteristics of the third component 3930 may be configured such that the first interval is not interleaved with the second interval. Moreover, the touch sensitive processing apparatus 130 may be able to calculate the pressure on the first component 221 according to the ratio which may be fallen into the first interval or the second interval.

Please refer back to FIG. 4A. The active stylus 110 comprises two switches SWE and SWB, the eraser capacitor 441 corresponding to the switch SWE and the barrel capacitor 442 corresponding to the switch SWB. They are arranged in parallel with the first capacitor 321. Although the corded stylus 3910 as shown in FIG. 39B comprises only one third switch 3920 and one corresponding third component 3930, persons with ordinary skill in the art may understand that the corded stylus 3910 may have more than one set of third switch 3920 and corresponding third component 3930 which are arranged in parallel with the first component 221.

Figure 39C:
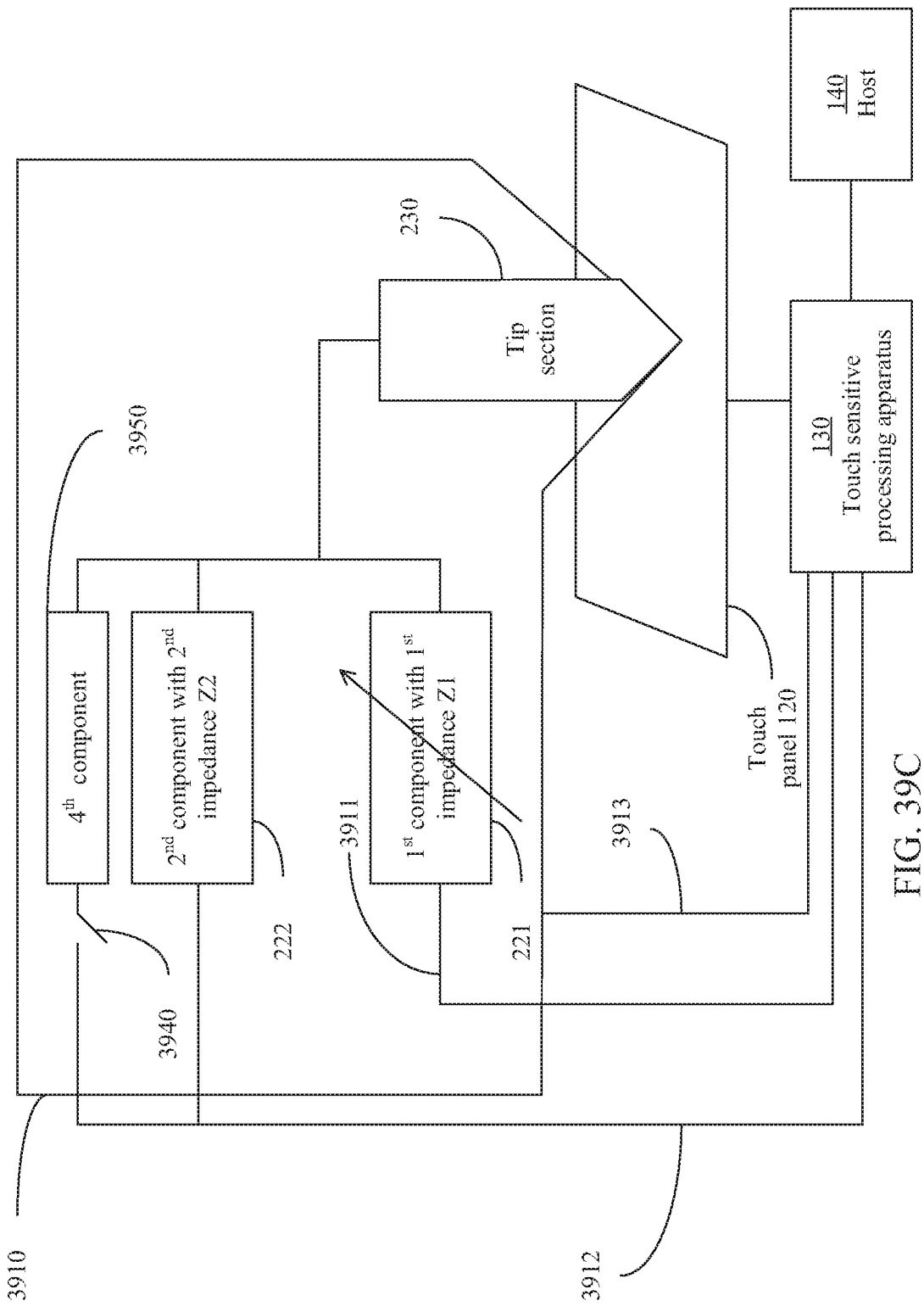
FIG. 39C illustrates a schematic diagram of a variant of the touch system in accordance with an embodiment of the present invention.

Please refer to FIG. 39C, which illustrates a schematic diagram of a variant of the touch system 3900 in accordance with an embodiment of the present invention. The stylus 3910 may further comprise a fourth switch 3940 and a fourth component 3950 which are connected in parallel to the second component 222. The fourth component 3950 may be a circuit such as a resistance and/or a capacitor with fourth impedance Z4. When the fourth switch 3940 is closed by a user of the stylus 3910, the signal driven by the signal circuit 3912 propagates through the second component 222 and the fourth component 3950 to the tip section 230. Reversely, when the fourth switch 3940 is opened by the user, the signal driven by the signal circuit 3912 propagates through the second component 222 to the tip section 230. The signal driven by the signal circuit 3911 propagates through the first component 221 to the tip section 230. After receiving the signals driven by the signal circuit 3911 and 3912 emitted from the tip section 230, the touch sensitive processing apparatus 130 is able to tell the status of the fourth switch 3940 of the stylus 3910 according to a ratio of signal strength between the two signals driven by the signal circuit 3911 and 3912. If the ratio is fallen into a third interval, the touch sensitive processing apparatus 130 determines that the fourth switch 3940 is being opened. If the ratio is fallen into a fourth interval, the touch sensitive processing apparatus 130 determines that the fourth switch 3940 is being closed. The fourth impedance characteristics of the fourth component 3950 may be configured such that the third interval is not interleaved with the fourth interval. Moreover, the touch sensitive processing apparatus 130 may be able to calculate the pressure on the first component 221 according to the ratio which may be fallen into the third interval or the fourth interval.

Please refer back to FIG. 4B. The active stylus 110 comprises two switches SWE and SWB, the eraser capacitor 441 corresponding to the switch SWE and the barrel capacitor 442 corresponding to the switch SWB. They are arranged in parallel with the second capacitor 322. Although the corded stylus 3910 as shown in FIG. 39C comprises only one fourth switch 3940 and one corresponding fourth component 3960, persons with ordinary skill in the art may understand that the corded stylus 3910 may have more than one set of fourth switch and corresponding fourth component which are arranged in parallel with the second component 222.

In one embodiment, the touch sensitive processing apparatus 130 may concurrently transmits the signals via the signal circuits 3911 and 3912 to the stylus 3910 which are encoded according to a first PN code and a second PN code, respectively. Therefore, the touch sensitive processing apparatus 130 may receive the signals driven by the signal circuits 3911 and 3912 from the touch panel 120 concurrently. In another embodiment, the touch sensitive processing apparatus 130 may transmits the signals via the signal circuits 3911 and 3912 to the stylus 3910 which are encoded according to one PN code in a time-sharing manner. Therefore, the touch sensitive processing apparatus 130 may receive the signals driven by the signal circuits 3911 and 3912 from the touch panel 120 in two time periods, respectively. In both embodiments, the touch sensitive processing apparatus 130 may be able to determine the status of the third switch 3920 or the fourth switch 3940 according to the ratio of the signals driven by the signal circuits 3911 and 3912. Moreover, the touch sensitive processing apparatus 130 may be able to calculate the pressure on the first component 221 according to the ratio of the signals driven by the signal circuits 3911 and 3912.

Figure 40:
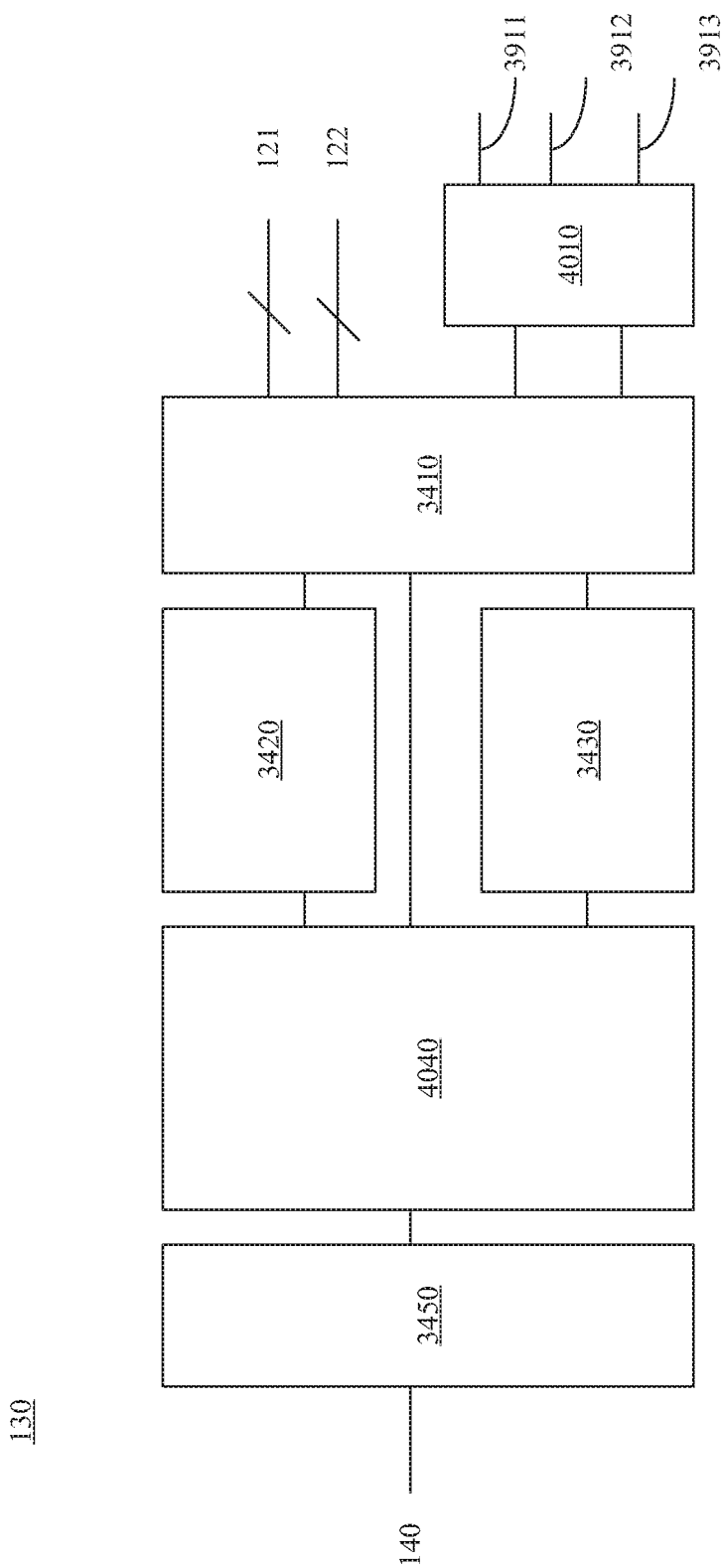
FIG. 40 depicts a schematic diagram of a touch sensitive processing apparatus in accordance with an embodiment of the invention.

Please refer to FIG. 40, which depicts a schematic diagram of a touch sensitive processing apparatus 130 in accordance with an embodiment of the invention. Comparing with the touch sensitive processing apparatus 130 as shown in FIG. 34, the touch sensitive processing apparatus 130 further comprise one or more stylus interface 4010 which is coupled to the interconnection network 3410. The stylus interface 4010 may be compatible to existing industrial standard or a proprietary interface which includes three circuits 3911, 3912 and 3913 corresponding to one of the stylus 3910. For one stylus 3910, there is one corresponding stylus interface 4010.

The touch sensitive processing apparatus 130 may further include an embedded processor 4040 which is configured to generate signals encoded by one or more pseudo-random number codes corresponding to each stylus 3910. The generated signals may be sent to the driving circuit 3420 for front-end analog processing. And the interconnection network 3410 is further configured by the embedded processor 4040 to selectively connect the driving circuit 3420 to at least one of the signal circuits 3911 and 3912. Therefore the signals encoded by PN code is transmitted to the tip section 230 of the corresponding stylus 3910 which connects to the stylus interface 4010.

Moreover, the interconnection network 3410 is further configured by the embedded processor 4040 to connect the sensing circuit 3430 and the electrodes of the touch panel 120. If the tip section 230 of the corresponding stylus 3910 is placed on or near the touch panel, the signals emitted by the tip section 230 would be received by the sensing circuit 3430 via the electrodes of the touch panel 120. After doing front-end analog processing and analog-to-digital conversion, the embedded processor 4040 receives the signals from the sensing circuit 3430. Person having ordinary skill in the art can understand that the embedded processor 4040 is able to calculate the received signal strengths corresponding to the signals sent to the signal circuits 3911 and 3912, respectively, according to the received signals. Thus, a ratio of the signal strength can be calculated accordingly. As explained in previous paragraphs, based on the received signals and the ratio, the embedded processor 4040 may be able to determine three parameters: the pressure received by the stylus 3910; the status of a switch of the stylus 3910; and a position where the tip section 230 of the stylus 3910 touching or approaching the touch panel 120.

Figure 41A:
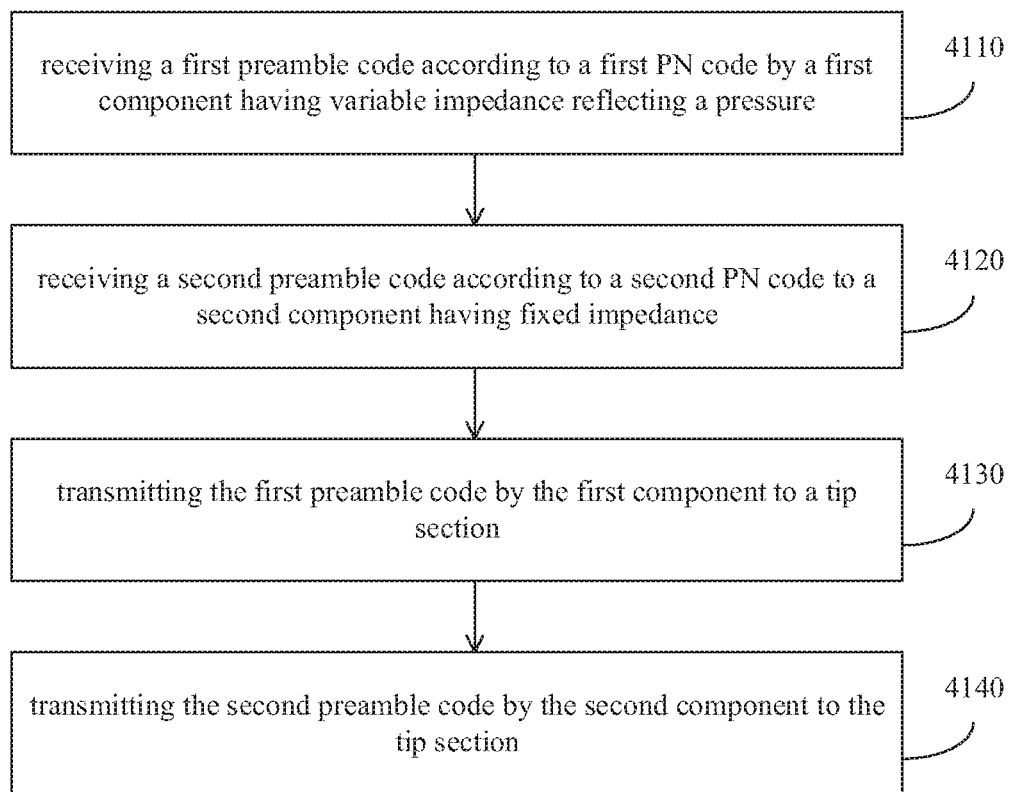
FIG. 41A illustrates a flowchart diagram of an operating method applicable to a corded stylus of an embodiment according to the invention.

Please refer to FIG. 41A, which illustrates a flowchart diagram of an operating method applicable to a corded stylus of an embodiment according to the invention. The flowchart is especially applicable to the corded stylus 3910 as shown in FIG. 39A. Unless a causal relationship is noted, the present invention does not limit execution sequences of any two of the steps as shown in FIG. 41A.

Step 4110: receiving a first preamble code according to a first PN code by a first component having variable impedance reflecting a pressure. As shown in FIG. 39A, the first component 221 of the stylus 3910 receives the first preamble code via the signal circuit 3911.

Step 4120: receiving a second preamble code according to a second PN code by a second component having fixed impedance. As shown in FIG. 39A, the second component 222 of the stylus 3910 receives the second preamble code via the signal circuit 3912. The steps 4110 and 4120 may be being performed concurrently or in a time-sharing manner.

Step 4130: transmitting the first preamble code by the first component to a tip section.

Step 4140: transmitting the second preamble code by the second component to the tip section. If the steps 4110 and 4120 are being performed concurrently, the steps 4130 and 4140 are also being performed concurrently. Or, all these four steps 4110 through 4140 are being performed concurrently.

If the touch sensitive processing apparatus 130 connects to multiple styli 3910, a set of two PN codes can be assigned to each stylus 3910. For example, a set including a first PN code and a second PN code is assigned to a first corded stylus 3910 and another set including a third PN code and a fourth PN code is assigned to a second corded stylus 3910. The flowchart diagram as shown in FIG. 41A is applicable to the first and the second corded styli 3910. In other words, two corded styli 3910 can operate on one touch panel 120 concurrently.

Figure 41B:
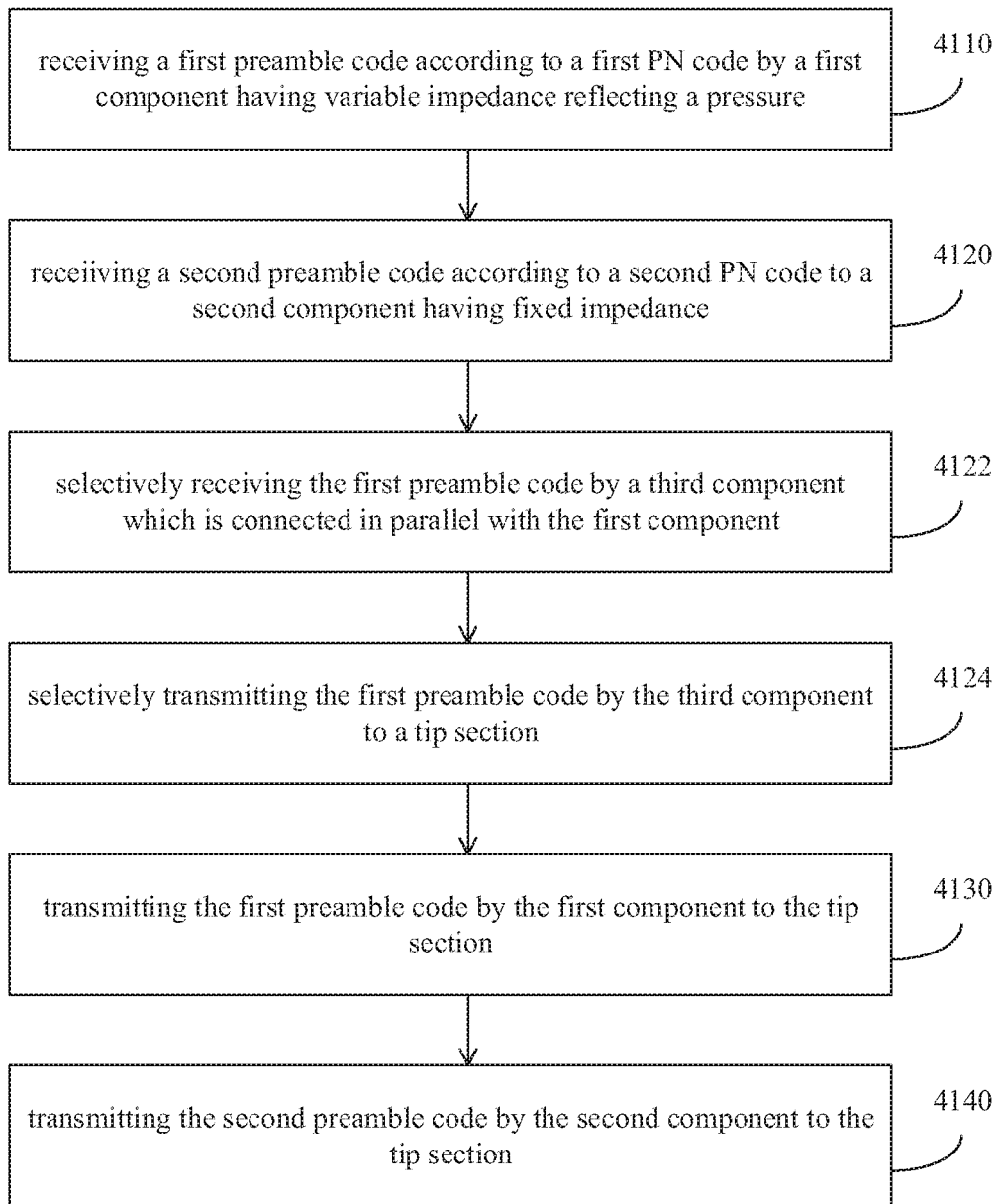
FIG. 41B illustrates a flowchart diagram of an operating method applicable to a corded stylus of an embodiment according to the invention.

Please refer to FIG. 41B, which illustrates a flowchart diagram of an operating method applicable to a corded stylus of an embodiment according to the invention. The flowchart is especially applicable to the corded stylus 3910 as shown in FIG. 39B. Unless a causal relationship is noted, the present invention does not limit execution sequences of any two of the steps as shown in FIG. 41B. Because the corded stylus 3910 as shown in FIG. 39B comprises the third switch 3920 and the third component 3930, the flowchart further comprises steps 4122 and 4124.

Step 4122: selectively receiving the first preamble code by a third component which is connected in parallel with the first component. The selectively receiving is carried out by the third switch 3920 as shown in FIG. 39B.

Step 4124: selectively transmitting the first preamble code by the third component to a tip section. The selective transmitting is also carried out by the third switch 3920 as shown in FIG. 39B. The steps 4110, 4120, 4122 and 4124 may be being performed concurrently.

Figure 41C:
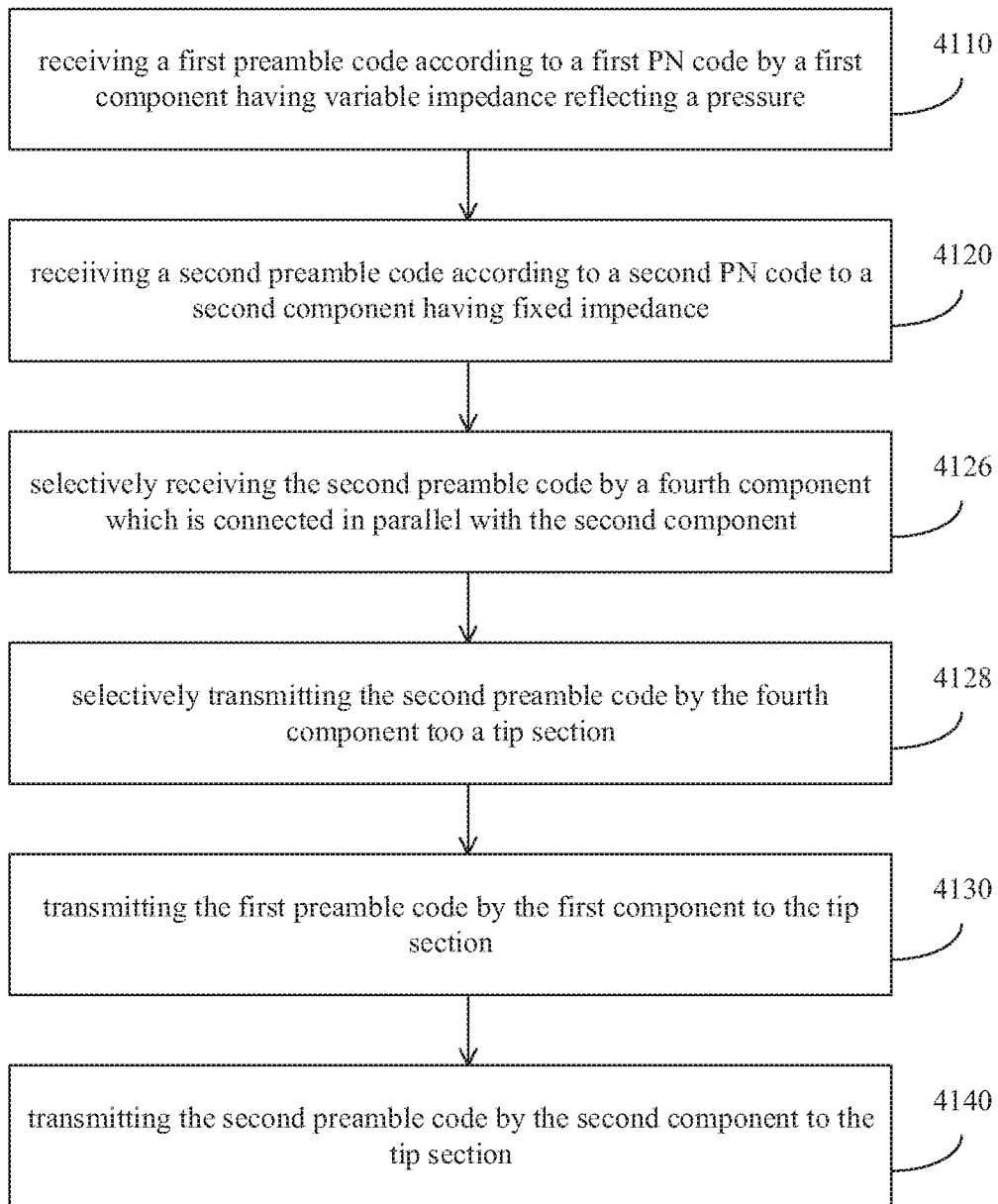
FIG. 41C illustrates a flowchart diagram of an operating method applicable to a corded stylus of an embodiment according to the invention

Please refer to FIG. 41C, which illustrates a flowchart diagram of an operating method applicable to a corded stylus of an embodiment according to the invention. The flowchart is especially applicable to the corded stylus 3910 as shown in FIG. 39C. Unless a causal relationship is noted, the present invention does not limit execution sequences of any two of the steps as shown in FIG. 41C. Because the corded stylus 3910 as shown in FIG. 39C comprises the fourth switch 3940 and the fourth component 3950, the flowchart further comprises steps 4126 and 4128.

Step 4126: selectively receiving the second preamble code by a fourth component which is connected in parallel with the second component. The selectively receiving is carried out by the fourth switch 3940 as shown in FIG. 39C.

Step 4128: selectively transmitting the second preamble code by the fourth component to a tip section. The selective transmitting is also carried out by the fourth switch 3940 as shown in FIG. 39C. The steps 4110, 4120, 4126 and 4128 may be being performed concurrently.

Figure 42:
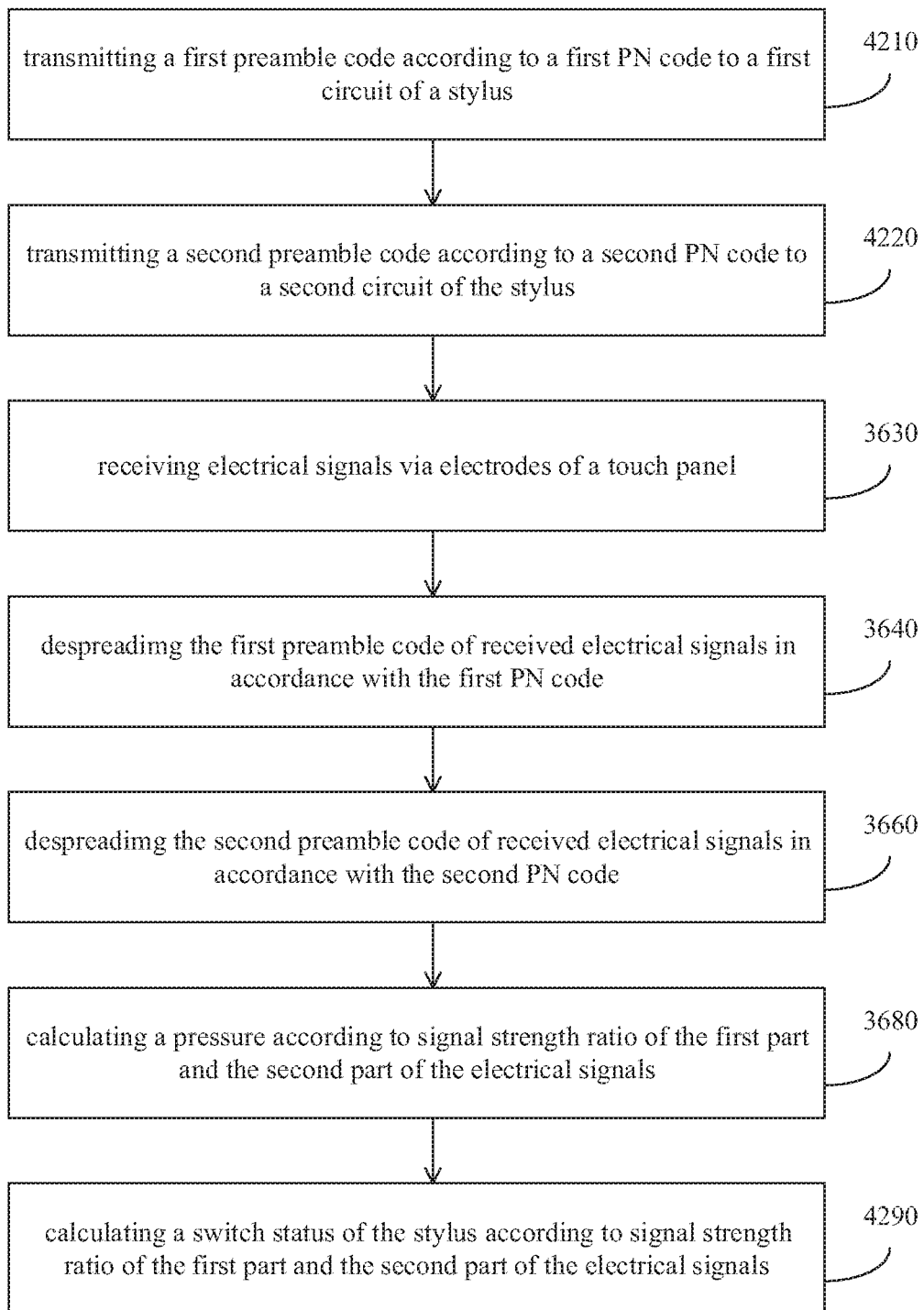
FIG. 42 depicts a flowchart diagram applicable to a touch sensitive processing apparatus according to an embodiment of the present invention.

Please refer to FIG. 42, which depicts a flowchart diagram applicable to a touch sensitive processing apparatus 130 according to an embodiment of the present invention. The flowchart may be applicable to the touch sensitive processing apparatus 130 as shown in FIG. 40 for controlling a corded stylus 3910 as shown in FIGS. 41A-41C. For instance, the flowchart may be implemented as instructions for being executed by the embedded processor 4040 of the touch sensitive processing apparatus 130. Unless a causal relationship is noted, the present invention does not limit execution sequences of any two of the steps as shown in FIG. 42. The steps 3630, 3640, 3660 and 3680 included in this flowchart are already explained in the embodiment as shown in FIGS. 36A and 36B.

Step 4210: transmitting a first preamble code according to a first PN code to a first circuit of a stylus. For example, the first preamble code is generated by the embedded processor 4040, processed by the driving circuit 3420, transmitted by the stylus interface 4010 to the signal circuit 3911.

Step 4220: transmitting a second preamble code according to a second PN code to a second circuit of the stylus. For example, the second preamble code is generated by the embedded processor 4040, processed by the driving circuit 3420, transmitted by the stylus interface 4010 to the signal circuit 3912. The steps 4210 and 4220 may be being executed concurrently.

Optional step 4290: calculating a switch status of the stylus according to signal strength ratio of the first part and the second part of the electrical signals.

Figure 43:
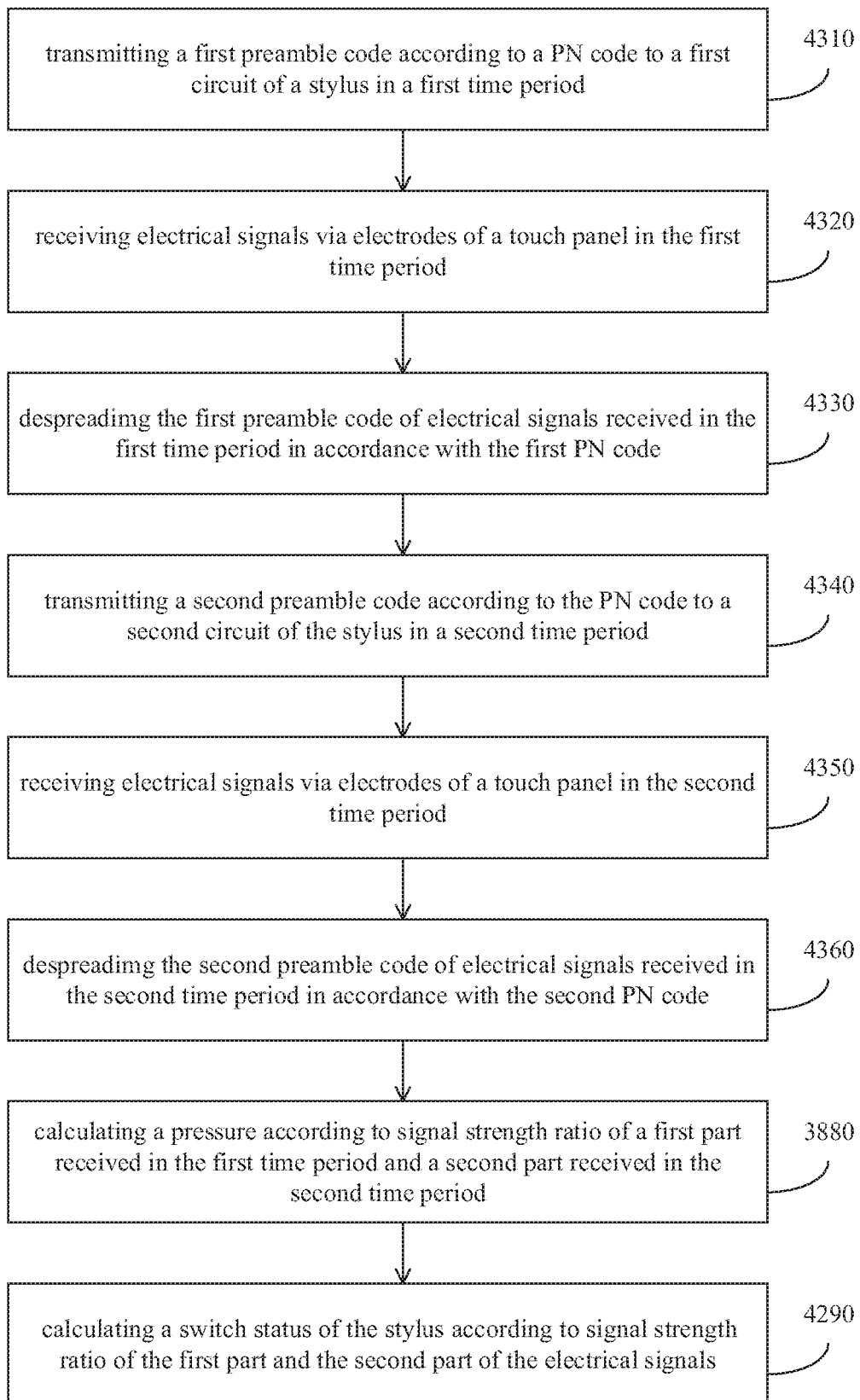
FIG. 43 depicts a flowchart diagram applicable to a touch sensitive processing apparatus according to an embodiment of the present invention.

Please refer to FIG. 43, which depicts a flowchart diagram applicable to a touch sensitive processing apparatus 130 according to an embodiment of the present invention. The flowchart may be applicable to the touch sensitive processing apparatus 130 as shown in FIG. 40 for controlling a corded stylus 3910 as shown in FIGS. 41A-41C. For instance, the flowchart may be implemented as instructions for being executed by the embedded processor 4040 of the touch sensitive processing apparatus 130. Unless a causal relationship is noted, the present invention does not limit execution sequences of any two of the steps as shown in FIG. 43. The step 3880 is already explained in the embodiment as shown in FIGS. 38A and 38B. Besides, the optional step 4290 is also explained in the embodiment as shown in FIG. 42.

Step 4310: transmitting a first preamble code according to a first PN code to a first circuit of a stylus in a first time period.

Step 4320: receiving electrical signals via electrodes of a touch panel in the first time period.

Step 4330: despreading the first preamble code of electrical signals received in the first time period in accordance with the first PN code.

Step 4340: transmitting a second preamble code according to a second PN code to a second circuit of the stylus in a second time period. The first time period may be completely separated from the second time period. Alternatively, part of the second time period may be concurrent with part of the first time period.

Step 4350: receiving electrical signals via electrodes of a touch panel in the second time period.

Step 4360: despreading the second preamble code of electrical signals received in the second time period in accordance with the second PN code.

Please refer to FIG. 44, which depicts a flowchart diagram applicable to a touch sensitive processing apparatus 130 according to an embodiment of the present invention. The flowchart may be applicable to the touch sensitive processing apparatus 130 as shown in FIG. 40 for controlling a corded stylus 3910 as shown in FIGS. 41A-41C. For instance, the flowchart may be implemented as instructions for being executed by the embedded processor 4040 of the touch sensitive processing apparatus 130. Unless a causal relationship is noted, the present invention does not limit execution sequences of any two of the steps as shown in FIG. 44. The steps 4320 and 4350 are explained in the embodiment as shown in FIG. 43. The step 3880 is already explained in the embodiment as shown in FIGS. 38A and 38B. Besides, the optional step 4290 is also explained in the embodiment as shown in FIG. 42.

Step 4410: transmitting a first preamble code according to a PN code to a first circuit of a stylus in a first time period.

Step 4430: despreading the first preamble code of electrical signals received in the first time period in accordance with the PN code.

Step 4440: transmitting a second preamble code according to the PN code to a second circuit of the stylus in a second time period.

Step 4460: despreading the second preamble code of electrical signals received in the second time period in accordance with the PN code.

One object of the present invention is to provide a stylus for transmitting electrical signals carrying pressure information, comprising: a first component with variable impedance reflecting a pressure, wherein the first component is configured for receiving first signals encoded by a first pseudo-random number (PN) code; a second component with fixed impedance, wherein the second component is configured for receiving second signals encoded by a second PN code; and a conductive tip section configured for: receiving, simultaneously, the first signals from the first component and the second signals from the second component; and transmitting electrical signals which is composed of the first signals and the second signals, wherein the first PN code is orthogonal to the second PN code.

In one embodiment, in order to provide the first PN code and the second PN code onboard the stylus, the stylus further comprises a controller, configured for: generating the first signals according to the first PN code; generating the second signals according the second PN code; transmitting the first signals to the first component; and transmitting the second signals to the second component.

In one embodiment, in order to transmit status of onboard sensor of the stylus, the stylus further comprises: at least one onboard sensor coupled to the controller. The controller is further configured for: generating data codes according to status of the at least one onboard sensor; generating first data codes according to the data codes and the first PN code; and transmitting the first data codes to the first component. The first component is further configured for receiving the first data codes from the controller. The conductive tip section is further configured for: receiving the first data codes from the first component; and transmitting the first data codes.

In one embodiment, in order to transmit status of onboard sensor of the stylus, the stylus further comprises: at least one onboard sensor coupled to the controller. The controller is further configured for: generating data codes according to status of the at least one onboard sensor; generating second data codes according to the data codes and the second PN code; and transmitting the second data codes to the second component. The second component is further configured for receiving the second data codes from the controller. The conductive tip section is further configured for: receiving the second data codes from the second component; and transmitting the second data codes.

In one embodiment, in order to synchronize with receiving procedure of a touch sensitive processing apparatus of a touch panel, the controller is further configured for: receiving a synchronization signal from an electronic device; and after the synchronization signal is received, executing the generating steps and the transmitting steps.

In one embodiment, in order to synchronize with receiving procedure of the touch sensitive processing apparatus of the touch panel where the stylus touches or approximates, the controller is coupled to the conductive tip section for receiving the synchronization signal which is being transmitted from electrodes of a touch panel of the electronic device.

In one embodiment, in order to prevent conflicts of PN codes when multiple styli operate with one touch panel, the stylus further comprises a human-machine interface for user's input of PN codes, wherein the controller is further configured for receiving a setting instruction from the human-machine interface for designating a set of the first PN code and the second PN code.

In one embodiment, in order to provide PN code setting information to user, the stylus further comprises at least one of following device coupled to the controller for indicating a set of the first PN code and the second PN code: a visual indicator; and an audio indicator.

In one embodiment, in order to provide a wire connection between the corded or tethered stylus and a touch sensitive processing apparatus, the stylus further comprises: a first signal circuit, coupled to the first component and a touch sensitive processing apparatus, configured for propagating the first signals from the touch sensitive processing apparatus to the first component; and a second signal circuit, coupled to the second component and the touch sensitive processing apparatus, configured for propagating the second signals from the touch sensitive processing apparatus to the second component.

In one embodiment, in order to provide a switch status to a touch sensitive processing apparatus, the stylus further comprises a third switch configured for receiving the first signals; and a third component with fixed impedance, coupled to the third switch and the conductive tip section, wherein the third switch is selectively being opened or closed, the first signals are propagated through the third switch and the third component to the conductive tip section when the third switch is being closed.

In one embodiment, in order to provide a switch status to a touch sensitive processing apparatus, the stylus further comprises a fourth switch configured for receiving the second signals; and a fourth component with fixed impedance, coupled to the fourth switch and the conductive tip section, wherein the fourth switch is selectively being opened or closed, the second signals are propagated through the fourth switch and the fourth component to the conductive tip section when the fourth switch is being closed.

One object of the present invention is to provide a method for transmitting electrical signals carrying pressure information from a stylus, comprising: receiving, by a first component with variable impedance reflecting a pressure, first signals encoded by a first PN code; receiving, by a second component with fixed impedance, second signals encoded by a second PN code; receiving, simultaneously, the first signals from the first component and the second signals from the second component by a conductive tip section; and transmitting electrical signals which is composed of the first signals and the second signals by the conductive tip section, wherein the first PN code is orthogonal to the second PN code.

In one embodiment, in order to provide the first PN code and the second PN code onboard the stylus, the method further comprises: generating the first signals according to the first PN code; generating the second signals according the second PN code; transmitting the first signals to the first component; and transmitting the second signals to the second component.

In one embodiment, in order to transmit status of onboard sensor of the stylus, the method further comprises: generating data codes according to status of at least one onboard sensor; generating first data codes according to the data codes and the first PN code; transmitting the first data codes to the first component; transmitting, by the first component, the first data codes to the conductive tip section; and transmitting, by the conductive tip section, the first data codes.

In one embodiment, in order to transmit status of onboard sensor of the stylus, the method further comprises: generating data codes according to status of at least one onboard sensor; generating second data codes according to the data codes and the second PN code; transmitting the second data codes to the second component; transmitting, by the second component, the second data codes to the conductive tip section; and transmitting, by the conductive tip section, the first data codes.

In one embodiment, in order to synchronize with receiving procedure of a touch sensitive processing apparatus of a touch panel, the method is further configured for: receiving a synchronization signal from an electronic device; and after the synchronization signal is received, executing the generating steps and the transmitting steps.

In one embodiment, in order to synchronize with receiving procedure of the touch sensitive processing apparatus of the touch panel where the stylus touches or approximates, the synchronization signal which is being transmitted from electrodes of a touch panel of the electronic device to the conductive tip section.

In one embodiment, in order to prevent conflicts of PN codes when multiple styli operate with one touch panel, the method further comprises: receiving a setting instruction from a human-machine interface of the stylus for designating a set of the first PN code and the second PN code.

In one embodiment, in order to provide PN code setting information to user, the method further comprises at least one of following steps: having a visual indicator of the stylus indicating a set of the first PN code and the second PN code; and having an audio indicator of the stylus indicating the set of the first PN code and the second PN code.

In one embodiment, in order to provide a wire connection between the corded or tethered stylus and a touch sensitive processing apparatus, the method further comprises: receiving, by a first signal circuit, the first signals from a touch sensitive processing apparatus; propagating, by the first signal circuit, the first signals to the first component; receiving, by a second signal circuit, the second signals from the touch sensitive processing apparatus; and propagating, by the second signal circuit, the second signals to the second component.

In one embodiment, in order to provide a switch status to a touch sensitive processing apparatus, the method further comprises: selectively receiving, by a third component with fixed impedance, the first signals; and selectively transmitting, by the third component, the first signals to the conductive tip section.

In one embodiment, in order to provide a switch status to a touch sensitive processing apparatus, the method further comprises: selectively receiving, by a fourth component with fixed impedance, the second signals; and selectively transmitting, by the fourth component, the second signals to the conductive tip section.

One object of the present invention is to provide a touch sensitive processing apparatus for receiving electrical signals carrying pressure information transmitted from a first stylus, comprising: a sensing circuit, configured for receiving the electrical signals via electrodes of a touch panel; and a processor, coupled to the sensing circuit, configured for: despreading a first preamble code of the received electrical signals in accordance with a first pseudo-random number (PN) code; despreading a second preamble code of the received electrical signals in accordance with a second PN code; and calculating the pressure information according to a first signal strength ratio of a first part of the received electrical signal and a second part of the received electrical signal, wherein the first part comprises the first preamble code and the second part comprises the second preamble code, wherein the first PN code is orthogonal to the second PN code.

In one embodiment, in order to trigger the stylus for transmitting electrical signals synchronously, the touch sensitive processing apparatus further comprises a driving circuit, coupled to the electrodes of the touch panel, wherein the processor is further configured for having the driving circuit to transmit a beacon signal via the electrodes of the touch panel before the receiving step is being executed.

In one embodiment, in order to receive status of sensor onboard the stylus, the processor is further configured for: decoding first data codes of the received electrical signal in accordance with the first PN code, wherein the first data codes represents status of at least one onboard sensor of the first stylus.

In one embodiment, in order to receive status of sensor onboard the stylus, the processor is further configured for: decoding second data codes of the received electrical signal in accordance with the second PN code, wherein the second data codes represents status of at least one onboard sensor of the first stylus.

In one embodiment, in order to correctly receive status of sensor onboard the stylus, the processor is further configured for: decoding first data codes of the received electrical signal in accordance with the first PN code; decoding second data codes of the received electrical signal in accordance with the second PN code; and determining data codes if the first data codes and the second data codes are the same, wherein the data codes represents status of at least one onboard sensor of the first stylus.

In one embodiment, in order to receive more smooth and averaged pressure information in a longer transmission, the first part further comprises the first data codes and the second part further comprises the second data codes.

In one embodiment, in order to synchronize with the transmission of the stylus more quickly, the processor is further configured for: coupling at least two of second electrodes of the touch panel as a synchronization channel, wherein the despreading steps of the first preamble code and the second preamble code are being executed on the received electrical signals of the synchronization channel to retrieve a first synchronization information and a second synchronization information, respectively, wherein the second electrodes are arranged in parallel to each other.

In one embodiment, in order to correctly and quickly receive status of sensor onboard the stylus by utilizing synchronization information, the processor is further configured for: decoding first data codes of the received electrical signal from at least one of first electrodes of the touch panel in accordance with the first PN code and the first synchronization information; decoding second data codes of the received electrical signal from at least one of the first electrodes of the touch panel in accordance with the second PN code and the second synchronization information; and determining data codes if the first data codes and the second data codes are the same, wherein the data codes represents status of at least one onboard sensor of the first stylus, wherein the first electrodes are arranged in parallel to each other, and the first electrodes intersect with the second electrodes.

In one embodiment, in order to concurrently receive electrical signals from multiple styli, the processor is further configured for: despreading a third preamble code of the received electrical signals in accordance with a third PN code; despreading a fourth preamble code of the received electrical signals in accordance with a fourth PN code; and calculating a pressure information of a second stylus according to a second signal strength ratio of a third part of the received electrical signal and a fourth part of the received electrical signal, wherein the third part comprises the third preamble code and the fourth part comprises the fourth preamble code, wherein the first PN code, the second PN code, the third PN code and the fourth PN code are orthogonal to each other.

In one embodiment, in order to provide a wire connection between a corded or tethered stylus and the touch sensitive processing apparatus, the touch sensitive processing apparatus further comprises: a stylus interface, coupled to a first signal circuit and a second signal circuit of the first stylus, wherein the processor, coupled to the stylus interface, is further configured for: generating the first preamble code in accordance with the first PN code; generating the second preamble code in accordance with the second PN code; and transmitting the first preamble code and the second preamble code to the first signal circuit and the second signal circuit via the stylus interface, respectively.

In one embodiment, in order to receive status of a switch of the stylus, the processor is further configured for: calculating a switch status of the first stylus according to the first signal strength ratio of the first part of the received electrical signal and the second part of the received electrical signal.

In one embodiment, in order to concurrently connect with multiple corded or tethered styli, the stylus interface is further coupled to a third signal circuit and a fourth signal circuit of a second stylus. The processor, coupled to the stylus interface, is further configured for: generating a third preamble code in accordance with a third PN code; generating a fourth preamble code in accordance with a fourth PN code; and transmitting the third preamble code and the fourth preamble code to the third signal circuit and the fourth signal circuit via the stylus interface, respectively, wherein the first PN code, the second PN code, the third PN code and the fourth PN code are orthogonal to each other.

One object of the present invention is to provide a method for receiving electrical signals carrying pressure information transmitted from a first stylus, comprising: receiving the electrical signals via electrodes of a touch panel; despreading a first preamble code of the received electrical signals in accordance with a first PN code; despreading a second preamble code of the received electrical signals in accordance with a second PN code; and calculating the pressure information according to a first signal strength ratio of a first part of the received electrical signal and a second part of the received electrical signal, wherein the first part comprises the first preamble code and the second part comprises the second preamble code, wherein the first PN code is orthogonal to the second PN code.

In one embodiment, in order to trigger the stylus for transmitting electrical signals synchronously, the method further comprises: transmitting a beacon signal via the electrodes of the touch panel before the receiving step is being executed.

In one embodiment, in order to receive status of sensor onboard the stylus, the method further comprises: decoding first data codes of the received electrical signal in accordance with the first PN code, wherein the first data codes represents status of at least one onboard sensor of the first stylus.

In one embodiment, in order to receive status of sensor onboard the stylus, the method further comprises: decoding second data codes of the received electrical signal in accordance with the second PN code, wherein the second data codes represents status of at least one onboard sensor of the first stylus.

In one embodiment, in order to correctly receive status of sensor onboard the stylus, the method further comprises: decoding first data codes of the received electrical signal in accordance with the first PN code; decoding second data codes of the received electrical signal in accordance with the second PN code; and determining data codes if the first data codes and the second data codes are the same, wherein the data codes represents status of at least one onboard sensor of the first stylus.

In one embodiment, in order to receive more smooth and averaged pressure information in a longer transmission, the first part further comprises the first data codes and the second part further comprises the second data codes.

In one embodiment, in order to synchronize with the transmission of the stylus more quickly, the method further comprises: coupling at least two of second electrodes of the touch panel as a synchronization channel, wherein the despreading steps of the first preamble code and the second preamble code are being executed on the received electrical signals of the synchronization channel to retrieve a first synchronization information and a second synchronization information, respectively, wherein the second electrodes are arranged in parallel to each other.

In one embodiment, in order to correctly and quickly receive status of sensor onboard the stylus by utilizing synchronization information, the method further comprises: decoding first data codes of the received electrical signal from at least one of first electrodes of the touch panel in accordance with the first PN code and the first synchronization information; decoding second data codes of the received electrical signal from at least one of the first electrodes of the touch panel in accordance with the second PN code and the second synchronization information; and determining data codes if the first data codes and the second data codes are the same, wherein the data codes represents status of at least one onboard sensor of the first stylus, wherein the first electrodes are arranged in parallel to each other, and the first electrodes intersect with the second electrodes.

In one embodiment, in order to concurrently receive electrical signals from multiple styli, the method further comprises: despreading a third preamble code of the received electrical signals in accordance with a third PN code; despreading a fourth preamble code of the received electrical signals in accordance with a fourth PN code; and calculating a pressure information of a second stylus according to a second signal strength ratio of a third part of the received electrical signal and a fourth part of the received electrical signal, wherein the third part comprises the third preamble code and the fourth part comprises the fourth preamble code, wherein the first PN code, the second PN code, the third PN code and the fourth PN code are orthogonal to each other.

In one embodiment, in order to provide a wire connection between a corded or tethered stylus and the touch sensitive processing apparatus, the method further comprises: generating the first preamble code in accordance with the first PN code; generating the second preamble code in accordance with the second PN code; and transmitting the first preamble code and the second preamble code to a first signal circuit and a second signal circuit of the first stylus, respectively.

In one embodiment, in order to receive status of a switch of the stylus, the method further comprises: calculating a switch status of the first stylus according to the first signal strength ratio of the first part of the received electrical signal and the second part of the received electrical signal.

In one embodiment, in order to concurrently connect with multiple corded or tethered styli, the method further comprises: generating a third preamble code in accordance with a third PN code; generating a fourth preamble code in accordance with a fourth PN code; and transmitting the third preamble code and the fourth preamble code to a third signal circuit and a fourth signal circuit of a second stylus, respectively, wherein the first PN code, the second PN code, the third PN code and the fourth PN code are orthogonal to each other.

One object of the present invention is to provide a touch system, which comprising: a touch panel; a first stylus; and a touch sensitive processing apparatus for receiving electrical signals carrying pressure information transmitted from the first stylus. The touch sensitive processing apparatus comprises: a sensing circuit, configured for receiving the electrical signals via electrodes of the touch panel; and a processor, coupled to the sensing circuit, configured for: despreading a first preamble code of the received electrical signals in accordance with a first PN code; despreading a second preamble code of the received electrical signals in accordance with a second PN code; and calculating the pressure information according to a first signal strength ratio of a first part of the received electrical signal and a second part of the received electrical signal, wherein the first part comprises the first preamble code and the second part comprises the second preamble code, wherein the first PN code is orthogonal to the second PN code.

In one embodiment, the first stylus further comprises: a first component with variable impedance reflecting a pressure, wherein the first component is configured for receiving first signals encoded by the first PN code; a second component with fixed impedance, wherein the second component is configured for receiving second signals encoded by the second PN code; and a conductive tip section configured for: receiving, simultaneously, the first signals from the first component and the second signals from the second component; and transmitting the electrical signals which is composed of the first signals and the second signals.

One object of the present invention is to provide a stylus for transmitting electrical signals carrying pressure information, comprising: a first component with variable impedance reflecting a pressure, wherein the first component is configured for receiving first signals encoded by a pseudo-random number (PN) code in a first time period; a second component with fixed impedance, wherein the second component is configured for receiving second signals encoded by the PN code in a second time period; and a conductive tip section configured for: receiving the first signals from the first component in the first time period; receiving the second signals from the second component in the second time period; transmitting electrical signals which is composed of the first signals in the first time period; and transmitting electrical signals which is composed of the second signals in the second time period.

In one embodiment, in order to provide the PN code onboard the stylus, the stylus further comprises a controller, configured for: generating the first signals according to the PN code; generating the second signals according the PN code; transmitting the first signals to the first component; and transmitting the second signals to the second component.

In one embodiment, in order to transmit status of onboard sensor of the stylus, the stylus further comprises: at least one onboard sensor coupled to the controller, wherein the controller is further configured for: generating data codes according to status of the at least one onboard sensor; generating first data codes according to the data codes and the PN code; and transmitting the first data codes to the first component. The first component is further configured for receiving the first data codes from the controller in the first time period. The conductive tip section is further configured for in the first time period: receiving the first data codes from the first component; and transmitting the first data codes.

In one embodiment, in order to transmit status of onboard sensor of the stylus, the stylus further comprises: at least one onboard sensor coupled to the controller, wherein the controller is further configured for: generating data codes according to status of the at least one onboard sensor; generating second data codes according to the data codes and the PN code; and transmitting the second data codes to the second component. The second component is further configured for receiving the second data codes from the controller in the second time period. The conductive tip section is further configured for in the second time period: receiving the second data codes from the second component; and transmitting the second data codes.

In one embodiment, in order to synchronize with receiving procedure of a touch sensitive processing apparatus of a touch panel, the controller is further configured for: receiving a synchronization signal from an electronic device; and after the synchronization signal is received, executing the generating steps and the transmitting steps.

In one embodiment, in order to synchronize with receiving procedure of the touch sensitive processing apparatus of the touch panel where the stylus touches or approximates, the controller is coupled to the conductive tip section for receiving the synchronization signal which is being transmitted from electrodes of a touch panel of the electronic device.

In one embodiment, in order to prevent conflicts of PN codes when multiple styli operate with one touch panel, the stylus further comprises a human-machine interface for user's input of PN codes, wherein the controller is further configured for receiving a setting instruction from the human-machine interface for designating the PN code.

In one embodiment, in order to provide PN code setting information to user, the stylus further comprises at least one of following device coupled to the controller for indicating the PN code: a visual indicator; and an audio indicator.

In one embodiment, in order to provide a wire connection between the corded or tethered stylus and a touch sensitive processing apparatus, the stylus further comprises: a first signal circuit, coupled to the first component and a touch sensitive processing apparatus, configured for propagating the first signals from the touch sensitive processing apparatus to the first component; and a second signal circuit, coupled to the second component and the touch sensitive processing apparatus, configured for propagating the second signals from the touch sensitive processing apparatus to the second component.

In order to provide a switch status to a touch sensitive processing apparatus, the stylus further comprises: a third switch configured for receiving the first signals in the first time period; and a third component with fixed impedance, coupled to the third switch and the conductive tip section, wherein the third switch is selectively being opened or closed, the first signals are propagated through the third switch and the third component to the conductive tip section when the third switch is being closed.

In order to provide a switch status to a touch sensitive processing apparatus, the stylus further comprises: a fourth switch configured for receiving the second signals in the second time period; and a fourth component with fixed impedance, coupled to the fourth switch and the conductive tip section, wherein the fourth switch is selectively being opened or closed, the second signals are propagated through the fourth switch and the fourth component to the conductive tip section when the fourth switch is being closed.

One object of the present invention is to provide a method for transmitting electrical signals carrying pressure information from a stylus, comprising: receiving, by a first component with variable impedance reflecting a pressure, first signals encoded by a PN code in a first time period; receiving, by a second component with fixed impedance, second signals encoded by the PN code in a second time period; receiving the first signals from the first component by a conductive tip section in the first time period; receiving the second signals from the second component by the conductive tip section in the second time period; and transmitting electrical signals which is composed of the first signals in the first time period by the conductive tip section; and transmitting electrical signals which is composed of the second signals in the second time period by the conductive tip section.

In one embodiment, in order to provide the PN code onboard the stylus, the method further comprises: generating the first signals according to the PN code; generating the second signals according the PN code; transmitting the first signals to the first component; and transmitting the second signals to the second component.

In one embodiment, in order to transmit status of onboard sensor of the stylus, the method further comprises: generating data codes according to status of at least one onboard sensor; generating first data codes according to the data codes and the PN code; transmitting the first data codes to the first component; transmitting, by the first component, the first data codes to the conductive tip section; and transmitting, by the conductive tip section, the first data codes.

In one embodiment, in order to transmit status of onboard sensor of the stylus, the method further comprises: generating data codes according to status of at least one onboard sensor; generating second data codes according to the data codes and the PN code; and transmitting the second data codes to the second component; transmitting, by the second component, the second data codes to the conductive tip section; and transmitting, by the conductive tip section, the second data codes.

In one embodiment, in order to synchronize with receiving procedure of a touch sensitive processing apparatus of a touch panel, the method further comprises: receiving a synchronization signal from an electronic device; and after the synchronization signal is received, executing the generating steps and the transmitting steps.

In one embodiment, in order to synchronize with receiving procedure of the touch sensitive processing apparatus of the touch panel where the stylus touches or approximates, wherein the synchronization signal which is being transmitted from electrodes of a touch panel of the electronic device to the conductive tip section.

In one embodiment, in order to prevent conflicts of PN codes when multiple styli operate with one touch panel, the method further comprises: receiving a setting instruction from a human-machine interface of the stylus for designating the PN code.

In one embodiment, in order to provide PN code setting information to user, the method further comprises at least one of following steps: having a visual indicator of the stylus indicating the PN code; and having an audio indicator of the stylus indicating the PN code.

In one embodiment, in order to provide a wire connection between the corded or tethered stylus and a touch sensitive processing apparatus, the method further comprises: receiving, by a first signal circuit, the first signals from a touch sensitive processing apparatus; propagating, by the first signal circuit, the first signals to the first component; receiving, by a second signal circuit, the second signals from the touch sensitive processing apparatus; and propagating, by the second signal circuit, the second signals to the second component.

In one embodiment, in order to provide a switch status to a touch sensitive processing apparatus, the method further comprises: selectively receiving, by a third component with fixed impedance, the first signals; and selectively transmitting, by the third component, the first signals to the conductive tip section.

In one embodiment, in order to provide a switch status to a touch sensitive processing apparatus, the method further comprises: selectively receiving, by a fourth component with fixed impedance, the second signals; and selectively transmitting, by the fourth component, the second signals to the conductive tip section.

One object of the present invention is to provide a touch sensitive processing apparatus for receiving electrical signals carrying pressure information transmitted from a first stylus, comprising: a sensing circuit, configured for receiving the electrical signals via electrodes of a touch panel; and a processor, coupled to the sensing circuit, configured for: despreading a first preamble code of the received electrical signals in accordance with a pseudo-random number (PN) code in a first time period; despreading a second preamble code of the received electrical signals in accordance with the PN code in a second time period; and calculating the pressure information according to a first signal strength ratio of a first part of the received electrical signal and a second part of the received electrical signal, wherein the first part comprises the first preamble code and the second part comprises the second preamble code.

In one embodiment, in order to trigger the stylus for transmitting electrical signals synchronously, the touch sensitive apparatus further comprises: a driving circuit, coupled to the electrodes of the touch panel, wherein the processor is further configured for having the driving circuit to transmit a beacon signal via the electrodes of the touch panel before the receiving steps are being executed.

In one embodiment, in order to receive status of sensor onboard the stylus, the processor is further configured for: decoding first data codes of the electrical signal received in the first time period in accordance with the PN code, wherein the first data codes represents status of at least one onboard sensor of the first stylus.

In one embodiment, in order to receive status of sensor onboard the stylus, the processor is further configured for: decoding second data codes of the electrical signal received in the second time period in accordance with the PN code, wherein the second data codes represents status of at least one onboard sensor of the first stylus.

In one embodiment, in order to correctly receive status of sensor onboard the stylus, the processor is further configured for: decoding first data codes of the electrical signal received in the first time period in accordance with the PN code; decoding second data codes of the electrical signal received in the second time period in accordance with the PN code; and determining data codes if the first data codes and the second data codes are the same, wherein the data codes represents status of at least one onboard sensor of the first stylus.

In one embodiment, in order to receive more smooth and averaged pressure information in a longer transmission, the first part further comprises the first data codes and the second part further comprises the second data codes.

In one embodiment, in order to synchronize with the transmission of the stylus more quickly, the processor is further configured for: coupling at least two of second electrodes of the touch panel as a synchronization channel, wherein the despreading steps of the first preamble code and the second preamble code are being executed on the received electrical signals of the synchronization channel to retrieve a first synchronization information and a second synchronization information, respectively, wherein the second electrodes are arranged in parallel to each other.

In one embodiment, in order to correctly and quickly receive status of sensor onboard the stylus by utilizing synchronization information, the processor is further configured for: decoding first data codes of the received electrical signal from at least one of first electrodes of the touch panel in accordance with the PN code and the first synchronization information; decoding second data codes of the received electrical signal from at least one of the first electrodes of the touch panel in accordance with the PN code and the second synchronization information; and determining data codes if the first data codes and the second data codes are the same, wherein the data codes represents status of at least one onboard sensor of the first stylus, wherein the first electrodes are arranged in parallel to each other, and the first electrodes intersect with the second electrodes.

In one embodiment, in order to receive electrical signals from multiple styli, the processor is further configured for: despreading a third preamble code of the electrical signals received in a third time period in accordance with a second PN code; despreading a fourth preamble code of the electrical signals received in a fourth time period in accordance with the second PN code; and calculating a pressure information of a second stylus according to a second signal strength ratio of a third part of the received electrical signal and a fourth part of the received electrical signal, wherein the third part comprises the third preamble code and the fourth part comprises the fourth preamble code, wherein the PN code and the second PN code are orthogonal to each other, wherein part of the third time period is overlapped with part of the first time period or part of the second time period.

In one embodiment, in order to provide a wire connection between a corded or tethered stylus and the touch sensitive processing apparatus, the touch sensitive processing apparatus further comprises: a stylus interface, coupled to a first signal circuit and a second signal circuit of the first stylus, wherein the processor, coupled to the stylus interface, is further configured for: generating the first preamble code in accordance with the PN code; generating the second preamble code in accordance with the PN code; transmitting the first preamble code to the first signal circuit via the stylus interface in the first time period; and transmitting the second preamble code to the second signal circuit via the stylus interface in the second time period.

In one embodiment, in order to receive status of a switch of the stylus, the processor is further configured for: calculating a switch status of the first stylus according to the first signal strength ratio of the first part of the received electrical signal and the second part of the received electrical signal.

In one embodiment, in order to concurrently connect with multiple styli, the stylus interface is further coupled to a third signal circuit and a fourth signal circuit of a second stylus. The processor, coupled to the stylus interface, is further configured for: generating a third preamble code in accordance with a second PN code in a third time period; generating a fourth preamble code in accordance with the second PN code in a fourth time period; transmitting the third preamble code to the third signal circuit in the third time period via the stylus interface; and transmitting the fourth preamble code to the fourth signal circuit in the fourth time period via the stylus interface, respectively, wherein the PN code and the second PN code are orthogonal to each other, wherein part of the third time period is overlapped with part of the first time period or part of the second time period.

One object of the present invention is to provide a method for receiving electrical signals carrying pressure information transmitted from a first stylus, comprising: receiving the electrical signals via electrodes of a touch panel; despreading a first preamble code of the electrical signals received in a first time period in accordance with a PN code; despreading a second preamble code of the electrical signals received in a second time period in accordance with the PN code; and calculating the pressure information according to a first signal strength ratio of a first part of the received electrical signal and a second part of the received electrical signal, wherein the first part comprises the first preamble code and the second part comprises the second preamble code.

In one embodiment, in order to trigger the stylus for transmitting electrical signals synchronously, the method further comprises transmitting a beacon signal via the electrodes of the touch panel before the receiving step is being executed.

In one embodiment, in order to receive status of sensor onboard the stylus, the method further comprises: decoding first data codes of the electrical signal received in the first time period in accordance with the PN code, wherein the first data codes represents status of at least one onboard sensor of the first stylus.

In one embodiment, in order to receive status of sensor onboard the stylus, the method further comprises: decoding second data codes of the electrical signal received in the second time period in accordance with the PN code, wherein the second data codes represents status of at least one onboard sensor of the first stylus.

In one embodiment, in order to correctly receive status of sensor onboard the stylus, the method further comprises: decoding first data codes of the electrical signal received in the first time period in accordance with the PN code; decoding second data codes of the electrical signal received in the second time period in accordance with the PN code; and determining data codes if the first data codes and the second data codes are the same, wherein the data codes represents status of at least one onboard sensor of the first stylus.

In one embodiment, in order to receive more smooth and averaged pressure information in a longer transmission, the first part further comprises the first data codes and the second part further comprises the second data codes.

In one embodiment, in order to synchronize with the transmission of the stylus more quickly, the method further comprises: coupling at least two of second electrodes of the touch panel as a synchronization channel, wherein the despreading steps of the first preamble code and the second preamble code are being executed on the received electrical signals of the synchronization channel to retrieve a first synchronization information and a second synchronization information, respectively, wherein the second electrodes are arranged in parallel to each other.

In one embodiment, in order to correctly and quickly receive status of sensor onboard the stylus by utilizing synchronization information, the method further comprises: decoding first data codes of the received electrical signal from at least one of first electrodes of the touch panel in accordance with the PN code and the first synchronization information; decoding second data codes of the received electrical signal from at least one of the first electrodes of the touch panel in accordance with the PN code and the second synchronization information; and determining data codes if the first data codes and the second data codes are the same, wherein the data codes represents status of at least one onboard sensor of the first stylus, wherein the first electrodes are arranged in parallel to each other, and the first electrodes intersect with the second electrodes.

In one embodiment, in order to concurrently receive electrical signals from multiple styli, the method further comprises: despreading a third preamble code of the electrical signals received in a third time period in accordance with a second PN code; despreading a fourth preamble code of the electrical signals received in a fourth time period in accordance with the second PN code; and calculating a pressure information of a second stylus according to a second signal strength ratio of a third part of the received electrical signal and a fourth part of the received electrical signal, wherein the third part comprises the third preamble code and the fourth part comprises the fourth preamble code, wherein the PN code and the second PN code are orthogonal to each other, wherein part of the third time period is overlapped with part of the first time period or part of the second time period.

In one embodiment, in order to provide a wire connection between a corded or tethered stylus and the touch sensitive processing apparatus, the method further comprises: generating the first preamble code in accordance with the PN code in the first time period; generating the second preamble code in accordance with the PN code in the second time period; transmitting the first preamble code to a first signal circuit of the first stylus in the first time period; and transmitting the second preamble code to a second signal circuit of the first stylus in the second time period.

In one embodiment, in order to receive status of a switch of the stylus, the method further comprises: calculating a switch status of the first stylus according to the first signal strength ratio of the first part of the received electrical signal and the second part of the received electrical signal.

In one embodiment, in order to concurrently connect with multiple corded or tethered styli, the method further comprises: generating a third preamble code in accordance with a second PN code in a third time period; generating a fourth preamble code in accordance with the second PN code in a fourth time period; transmitting the third preamble code to a third signal circuit of a second stylus in the third time period; and transmitting the fourth preamble code to a fourth signal circuit of the second stylus in the fourth time period, wherein the PN code and the second PN code are orthogonal to each other, wherein part of the third time period is overlapped with part of the first time period or part of the second time period.

One object of the present invention is to provide a touch system comprising: a touch panel; a first stylus; and a touch sensitive processing apparatus. The touch sensitive processing apparatus for receiving electrical signals carrying pressure information transmitted from the first stylus, comprising: a sensing circuit, configured for receiving the electrical signals via electrodes of the touch panel; and a processor, coupled to the sensing circuit, configured for: despreading a first preamble code of the received electrical signals in accordance with a PN code in a first time period; despreading a second preamble code of the received electrical signals in accordance with the PN code in a second time period; and calculating the pressure information according to a first signal strength ratio of a first part of the received electrical signal and a second part of the received electrical signal, wherein the first part comprises the first preamble code and the second part comprises the second preamble code.

In one embodiment, the first stylus comprising: a first component with variable impedance reflecting a pressure, wherein the first component is configured for receiving first signals encoded by the PN code in the first time period; a second component with fixed impedance, wherein the second component is configured for receiving second signals encoded by the PN code in the second time period; and a conductive tip section configured for: receiving the first signals from the first component in the first time period; receiving the second signals from the second component in the second time period; transmitting electrical signals which is composed of the first signals in the first time period; and transmitting electrical signals which is composed of the second signals in the second time period.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing apparatus for receiving electrical signals carrying pressure information transmitted from a first stylus, comprising:
   a sensing circuit, coupled to electrodes of a touch panel, wherein the electrodes comprise first electrodes in parallel to a first direction and second electrodes in parallel to a second direction, the first electrodes intersect with the second electrodes across the touch panel;
   a driving circuit, coupled to the first electrodes of the touch panel; and
   a processor, coupled to the sensing circuit and the driving circuit, configured for:
      having the driving circuit to transmit a beacon signal via the first electrodes of the touch panel;
      having the sensing circuit to receive the electrical signals via the first electrodes and the second electrodes when a turnaround time period following the transmitting is passed;
      despreading a first preamble code of the received electrical signals in accordance with a first pseudo-random number (PN) code corresponding to the first stylus;
      despreading a second preamble code of the received electrical signals in accordance with a second PN code corresponding to the first stylus; and
      calculating the pressure information according to a first signal strength ratio of a first part of the received electrical signals and a second part of the received electrical signals, wherein the first part comprises the first preamble code and the second part comprises the second preamble code,
wherein the first PN code is orthogonal to the second PN code.

2. The touch sensitive processing apparatus of claim 1, wherein the beacon signal comprises information of the turnaround time period.

3. The touch sensitive processing apparatus of claim 1, wherein the processor is further configured for:
decoding first data codes of the received electrical signals in accordance with the first PN code, wherein the first data codes represent status of at least one onboard sensor of the first stylus.

4. The touch sensitive processing apparatus of claim 1, wherein the processor is further configured for:
decoding second data codes of the received electrical signals in accordance with the second PN code, wherein the second data codes represent status of at least one onboard sensor of the first stylus.

5. The touch sensitive processing apparatus of claim 1, wherein the processor is further configured for:
decoding first data codes of the received electrical signals in accordance with the first PN code;
decoding second data codes of the received electrical signals in accordance with the second PN code; and
determining data codes if the first data codes and the second data codes are the same, wherein the data codes represent status of at least one onboard sensor of the first stylus.

6. The touch sensitive processing apparatus of claim 5, wherein the first part further comprises the first data codes and the second part further comprises the second data codes.

7. The touch sensitive processing apparatus of claim 1, wherein the processor is further configured for:
coupling at least two of the second electrodes of the touch panel as a synchronization channel, wherein the despreading steps of the first preamble code and the second preamble code are being executed on the received electrical signals of the synchronization channel to retrieve a first synchronization information and a second synchronization information, respectively;
decoding first data codes of the received electrical signals from at least one of first electrodes of the touch panel in accordance with the first PN code and the first synchronization information;
decoding second data codes of the received electrical signals from at least one of the first electrodes of the touch panel in accordance with the second PN code and the second synchronization information; and
determining data codes if the first data codes and the second data codes are the same, wherein the data codes represents status of at least one onboard sensor of the first stylus.

8. The touch sensitive processing apparatus of claim 1, wherein the processor is further configured for:
despreading a third preamble code of the received electrical signals in accordance with a third PN code corresponding to a second stylus;
despreading a fourth preamble code of the received electrical signals in accordance with a fourth PN code corresponding to the second stylus; and
calculating a pressure information of the second stylus according to a second signal strength ratio of a third part of the received electrical signals and a fourth part of the received electrical signals, wherein the third part comprises the third preamble code and the fourth part comprises the fourth preamble code,
wherein the first PN code, the second PN code, the third PN code and the fourth PN code are orthogonal to each other.

9. A method for receiving electrical signals carrying pressure information transmitted from a first stylus, comprising:
transmitting a beacon signal via first electrodes of a touch panel, wherein the touch panel comprises the first electrodes in parallel to a first direction and second electrodes in parallel to a second direction, the first electrodes intersect with the second electrodes across the touch panel;
receiving the electrical signals via the first electrodes and the second electrodes of the touch panel when a turnaround time period following the transmitting is passed;
despreading a first preamble code of the received electrical signals in accordance with a first PN code corresponding to the first stylus;
despreading a second preamble code of the received electrical signals in accordance with a second PN code corresponding to the first stylus; and
calculating the pressure information according to a first signal strength ratio of a first part of the received electrical signals and a second part of the received electrical signals, wherein the first part comprises the first preamble code and the second part comprises the second preamble code,
wherein the first PN code is orthogonal to the second PN code.

10. The method of claim 9, wherein the beacon signal comprises information of the turnaround time period.

11. The method of claim 9, further comprising:
decoding first data codes of the received electrical signals in accordance with the first PN code, wherein the first data codes represent status of at least one onboard sensor of the first stylus.

12. The method of claim 9, further comprising:
decoding second data codes of the received electrical signals in accordance with the second PN code, wherein the second data codes represent status of at least one onboard sensor of the first stylus.

13. The method of claim 9, further comprising:
decoding first data codes of the received electrical signals in accordance with the first PN code;
decoding second data codes of the received electrical signals in accordance with the second PN code; and
determining data codes if the first data codes and the second data codes are the same, wherein the data codes represent status of at least one onboard sensor of the first stylus.

14. The method of claim 13, wherein the first part further comprises the first data codes and the second part further comprises the second data codes.

15. The method of claim 9, further comprising:
coupling at least two of the second electrodes of the touch panel as a synchronization channel,
wherein the despreading steps of the first preamble code and the second preamble code are being executed on the received electrical signals of the synchronization channel to retrieve a first synchronization information and a second synchronization information, respectively;
decoding first data codes of the received electrical signals from at least one of first electrodes of the touch panel in accordance with the first PN code and the first synchronization information;

decoding second data codes of the received electrical signals from at least one of the first electrodes of the touch panel in accordance with the second PN code and the second synchronization information; and determining data codes if the first data codes and the second data codes are the same, wherein the data codes represents status of at least one onboard sensor of the first stylus.

16. The method of claim 9, further comprising:

despreading a third preamble code of the received electrical signals in accordance with a third PN code corresponding to a second stylus;

despreading a fourth preamble code of the received electrical signals in accordance with a fourth PN code corresponding to the second stylus; and calculating a pressure information of the second stylus according to a second signals strength ratio of a third part of the received electrical signals and a fourth part of the received electrical signals, wherein the third part comprises the third preamble code and the fourth part comprises the fourth preamble code, wherein the first PN code, the second PN code, the third PN code and the fourth PN code are orthogonal to each other.

17. A touch system, comprising:

a touch panel, comprises first electrodes in parallel to a first axis and second electrodes in parallel to a second axis, the first electrodes intersect with the second electrodes;

a first stylus; and a touch sensitive processing apparatus for receiving electrical signals carrying pressure information transmitted from the first stylus, comprising:
- a sensing circuit, coupled to the first electrodes and the second electrodes of the touch panel;
- a driving circuit, coupled to the first electrodes of the touch panel; and
- a processor, coupled to the sensing circuit and the driving circuit, configured for:
  - having the driving circuit to transmit a beacon signal via the first electrodes of the touch panel;
  - having the sensing circuit to receive the electrical signals via the first electrodes and the second electrodes when a turnaround time period following the transmitting is passed;
  - despreading a first preamble code of the received electrical signals in accordance with a first PN code corresponding to the first stylus;
  - despreading a second preamble code of the received electrical signals in accordance with a second PN code corresponding to the first stylus; and
  - calculating the pressure information according to a first signal strength ratio of a first part of the received electrical signals and a second part of the received electrical signals, wherein the first part comprises the first preamble code and the second part comprises the second preamble code, wherein the first PN code is orthogonal to the second PN code.

18. The touch system of claim 17, wherein the first stylus comprising:

a controller, configured for:
- receiving the beacon signal from the electrodes of the touch panel;
- generating first signals including the first preamble code according to the first PN code;
- generating second signals including the second preamble code according to the second PN code; and
- after the turnaround time period when the beacon signal is received, transmitting the first signals to a first component and transmitting the second signals to a second component;

the first component with variable impedance reflecting a pressure, wherein the first component is configured for receiving the first signals;

the second component with fixed impedance, wherein the second component is configured for receiving the second signals; and a conductive tip section configured for:
- receiving, simultaneously, the first signals from the first component and the second signals from the second component; and
- transmitting the electrical signals which is composed of the first signals and the second signals.

* * * * *